United States Patent
Mushiake et al.

(10) Patent No.: US 12,077,471 B2
(45) Date of Patent: Sep. 3, 2024

(54) ALKALI-FREE GLASS PLATE

(71) Applicant: Nippon Electric Glass Co., Ltd., Shiga (JP)

(72) Inventors: Atsushi Mushiake, Shiga (JP); Atsuki Saito, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 561 days.

(21) Appl. No.: 17/282,480

(22) PCT Filed: Sep. 25, 2019

(86) PCT No.: PCT/JP2019/037489
§ 371 (c)(1),
(2) Date: Apr. 2, 2021

(87) PCT Pub. No.: WO2020/071193
PCT Pub. Date: Apr. 9, 2020

(65) Prior Publication Data
US 2021/0380468 A1    Dec. 9, 2021

(30) Foreign Application Priority Data
Oct. 5, 2018  (JP) ................. 2018-189873

(51) Int. Cl.
| | |
|---|---|
| C03C 3/093 | (2006.01) |
| C03C 3/083 | (2006.01) |
| C03C 3/085 | (2006.01) |
| C03C 3/087 | (2006.01) |
| C03C 3/091 | (2006.01) |
| C03C 3/095 | (2006.01) |

(52) U.S. Cl.
CPC .............. *C03C 3/091* (2013.01); *C03C 3/083* (2013.01); *C03C 3/085* (2013.01); *C03C 3/087* (2013.01); *C03C 3/093* (2013.01); *C03C 3/095* (2013.01)

(58) Field of Classification Search
CPC ......... C03C 3/085; C03C 3/087; C03C 3/091; C03C 3/093
See application file for complete search history.

(56) References Cited

U.S. PATENT DOCUMENTS

| | | | |
|---|---|---|---|
| 4,180,618 A | 12/1979 | Alpha et al. | |
| 4,634,683 A | 1/1987 | Dumbaugh, Jr. | |
| 4,634,684 A | 1/1987 | Dumbaugh, Jr. | |
| 4,897,509 A | 1/1990 | Holleran et al. | |
| 2009/0286091 A1 | 11/2009 | Danielson et al. | |
| 2018/0044223 A1 | 2/2018 | Hayashi | |
| 2018/0086660 A1* | 3/2018 | Saito | G09F 9/301 |
| 2018/0141857 A1 | 5/2018 | Sakurabayashi | |
| 2019/0322568 A1 | 10/2019 | Saito | |
| 2020/0165155 A1 | 5/2020 | Saito | |

FOREIGN PATENT DOCUMENTS

| | | | | |
|---|---|---|---|---|
| CN | 107108338 A | * | 8/2017 | .......... C03B 17/064 |
| JP | 61-261232 | | 11/1986 | |
| JP | 62-100450 | | 5/1987 | |
| JP | 62-113735 | | 5/1987 | |
| JP | 63-291834 | | 11/1988 | |
| JP | 10-45422 | | 2/1998 | |
| JP | 2006-225215 | | 8/2006 | |
| JP | 5769617 | | 8/2015 | |
| JP | 2016-183091 | | 10/2016 | |
| JP | 2018-100208 | | 6/2018 | |
| WO | 2009/139861 | | 11/2009 | |
| WO | 2016/159345 | | 10/2016 | |
| WO | WO-2016159344 A1 | * | 10/2016 | ............. C03C 3/085 |
| WO | 2016/185863 | | 11/2016 | |
| WO | 2018/116731 | | 6/2018 | |
| WO | 2018/123675 | | 7/2018 | |

OTHER PUBLICATIONS

International Preliminary Report on Patentability and Written Opinion of the International Searching Authority issued Mar. 23, 2021 in International (PCT) Patent Application No. PCT/JP2019/037489.
International Search Report issued Dec. 17, 2019 in International (PCT) Application No. PCT/JP2019/037489.
Office Action and Search Report issued Jul. 19, 2022 in corresponding Chinese Patent Application No. 201980065642.0, with English translation.
Request for the Submission of an Opinion issued Dec. 15, 2023 in corresponding Korean Patent Application No. 10-2021-7010279 with English translation thereof.
Notice of Reasons for Refusal mailed Aug. 3, 2023 in corresponding Japanese Patent Application No. 2020-550322 with English machine translation.

* cited by examiner

*Primary Examiner* — Elizabeth A. Bolden
(74) *Attorney, Agent, or Firm* — Wenderoth, Lind & Ponack, L.L.P.

(57) ABSTRACT

The present invention provides an alkali-free glass sheet, including as a glass composition, in terms of mol %, 55% to 80% of $SiO_2$, 10% to 25% of $Al_2O_3$, 0% to 4% of $B_2O_3$, 0% to 30% of MgO, 0% to 25% of CaO, 0% to 15% of SrO, 0% to 15% of BaO, 0% to 5% of ZnO, and 0% to less than 1.0% of $Y_2O_3+La_2O_3$, being substantially free of an alkali metal oxide, and having a strain point of 750° C. or more.

8 Claims, No Drawings

ALKALI-FREE GLASS PLATE

TECHNICAL FIELD

The present invention relates to an alkali-free glass sheet, and more particularly, to an alkali-free glass sheet suitable as a substrate for forming a TFT circuit in a flat panel display, such as a liquid crystal display or an OLED display, or as a carrier glass for holding a resin substrate for forming the TFT circuit.

BACKGROUND ART

As is well known, a liquid crystal panel or an OLED panel includes a thin film transistor (TFT) for driving control.

As a thin film transistor configured to drive a display, amorphous silicon, low-temperature polysilicon, high-temperature polysilicon, and the like have been known. In recent years, along with the spread of large liquid crystal displays, smartphones, tablet PCs, and the like, there is an increasing need for higher resolution of a display. A low-temperature polysilicon TFT can meet this need, but a high-temperature film forming process of from 500° C. to 600° C. is involved. However, a related-art glass sheet has a large thermal shrinkage amount before and after the high-temperature film forming process, and hence pattern deviation of the thin film transistor is caused. Accordingly, in order to increase the resolution of the display, a glass sheet with low thermal shrinkage is required. In recent years, a further increase in definition of the display has been investigated. In this case, a further reduction in thermal shrinkage of the glass sheet is required.

CITATION LIST

Patent Literature 1: JP 5769617 B2

SUMMARY OF INVENTION

Technical Problem

As a main method of reducing the thermal shrinkage of the glass sheet, two methods are given. A first method is a method involving holding the glass sheet in advance at a temperature around a heat treatment temperature of the film forming process to anneal the glass sheet. In this method, glass undergoes structural relaxation and shrinks at the time of annealing, and hence a thermal shrinkage amount in the subsequent film forming process at high temperature can be suppressed. However, this method entails an increase in number of manufacturing steps and a longer manufacturing time, resulting in a rise in manufacturing cost of the glass sheet.

A second method is a method involving increasing the strain point of the glass sheet. In an overflow down-draw method, glass is generally cooled from a melting temperature to a forming temperature in a relatively short time. Under the influence of this, the fictive temperature of the glass sheet is increased, and the thermal shrinkage of the glass sheet is increased. In view of the foregoing, when the strain point of the glass sheet is increased, the viscosity of the glass sheet at a heat treatment temperature of the film forming process is increased, with the result that structural relaxation hardly proceeds. As a result, the thermal shrinkage of the glass sheet can be suppressed. Moreover, as the heat treatment temperature of the film forming process becomes higher, an increase in strain point has a higher effect on a reduction in thermal shrinkage. Accordingly, in the case of the low-temperature polysilicon TFT, it is desired that the strain point of the glass sheet be increased to the extent possible.

In Patent Literature 1, a high-strain-point glass including $Y_2O_3$ and/or $La_2O_3$ is disclosed. However, $Y_2O_3$ and $La_2O_3$ are rare earth elements, resulting in high raw material cost. There is a problem of a rise in manufacturing cost of the glass sheet.

The present invention has been made in view of the above-mentioned circumstances, and a technical object of the present invention is to devise an alkali-free glass sheet which has a high strain point and enables a reduction in manufacturing cost.

Solution to Problem

The inventors of the present invention have made extensive investigations, and as a result, have found that the above-mentioned technical object can be achieved by strictly restricting the contents of components and restricting a strain point to a predetermined value or more. The finding is proposed as the present invention. That is, according to one embodiment of the present invention, there is provided an alkali-free glass sheet, comprising as a glass composition, in terms of mol %, 55% to 80% of $SiO_2$, 10% to 25% of $Al_2O_3$, 0% to 4% of $B_2O_3$, 0% to 30% of MgO, 0% to 25% of CaO, 0% to 15% of SrO, 0% to 15% of BaO, 0% to 5% of ZnO, and 0% to less than 1.0% of $Y_2O_3+La_2O_3$, being substantially free of an alkali metal oxide, and having a strain point of 750° C. or more. Herein, the "$Y_2O_3+La_2O_3$" refers to the total content of $Y_2O_3$ and $La_2O_3$. The "substantially free of an alkali metal oxide" refers to a case in which the content of an alkali metal oxide ($Li_2O$, $Na_2O$, $K_2O$) in the glass composition is less than 0.5 mol %. The "strain point" refers to a value measured based on a method of ASTM C336.

In addition, it is preferred that the alkali-free glass sheet according to the one embodiment of the present invention satisfy a relationship of $[SiO_2]+14\times[Al_2O_3]-15\times[B_2O_3]+6\times[MgO]+[CaO]+14\times[SrO]+16\times[BaO]\geq 360$ mol %. Herein, the [$SiO_2$] refers to the content of $SiO_2$ in terms of mol %, the [$SiO_2$] refers to the content of $SiO_2$ in terms of mol %, the [$Al_2O_3$] refers to the content of $Al_2O_3$ in terms of mol %, the [$B_2O_3$] refers to the content of $B_2O_3$ in terms of mol %, the [MgO] refers to the content of MgO in terms of mol %, the [CaO] refers to the content of CaO in terms of mol %, the [SrO] refers to the content of SrO in terms of mol %, and the [BaO] refers to the content of BaO in terms of mol %.

In addition, it is preferred that the alkali-free glass sheet according to the one embodiment of the present invention satisfy a relationship of $17.8\times[SiO_2]+23.1\times[Al_2O_3]+3.7\times[B_2O_3]+12.9\times[MgO]+14.1\times[CaO]+15.5\times[SrO]+15.0\times[BaO]+7.2\times[ZnO]\geq 1,786$ mol %.

In addition, it is preferred that the alkali-free glass sheet according to the one embodiment of the present invention have a content of Rh of from 0.1 ppm by mass to 3 ppm by mass. Herein, the "Rh" includes not only Rh but also $RhO_2$ and $Rh_2O_3$, and $RhO_2$ and $Rh_2O_3$ are each represented in terms of Rh.

In addition, it is preferred that the alkali-free glass sheet according to the one embodiment of the present invention have a Young's modulus of 82 GPa or more. Herein, the "Young's modulus" may be measured by a flexural resonance method.

DESCRIPTION OF EMBODIMENTS

An alkali-free glass sheet of the present invention comprises as a glass composition, in terms of mol %, 55% to 80% of $SiO_2$, 10% to 25% of $Al_2O_3$, 0% to 4% of $B_2O_3$, 0% to 30% of MgO, 0% to 25% of CaO, 0% to 15% of SrO, 0% to 15% of BaO, 0% to 5% of ZnO, and 0% to less than 1.0% of $Y_2O_3+La_2O_3$, and is substantially free of an alkali metal oxide. The reasons why the contents of the components are limited as describe above are described below. In the descriptions of the contents of the components, the expression "%" represents "mol %", unless otherwise specified.

$SiO_2$ is a component which forms a glass skeleton, and is also a component which increases a strain point. Accordingly, the content of $SiO_2$ is preferably 55% or more, 60% or more, 63% or more, 65% or more, or 67% or more, particularly preferably 68% or more. Meanwhile, when the content of $SiO_2$ is too large, a viscosity at high temperature is increased, and thus meltability is liable to be reduced. Accordingly, the content of $SiO_2$ is preferably 80% or less, 78% or less, 75% or less, 74% or less, or 73% or less, particularly preferably 72% or less.

$Al_2O_3$ is a component which forms the glass skeleton, and is also a component which increases the strain point. Further, $Al_2O_3$ is a component which suppresses phase separation. Accordingly, the content of $Al_2O_3$ is preferably 10% or more, 10.5% or more, 11% or more, or 11.5% or more, particularly preferably 12% or more. Meanwhile, when the content of $Al_2O_3$ is too large, the viscosity at high temperature is increased, and thus the meltability is liable to be reduced. Accordingly, the content of $Al_2O_3$ is preferably 25% or less, 22% or less, 20% or less, 18% or less, 16% or less, or 15% or less, particularly preferably 14% or less.

The total content of $SiO_2$ and $Al_2O_3$ is preferably 70% or more, 75% or more, 80% or more, 81% or more, 82% or more, 83% or more, or 84% or more, particularly preferably 85% or more. When the total content of $SiO_2$ and $Al_2O_3$ is too small, the strain point is liable to be reduced. Meanwhile, when the total content of $SiO_2$ and $Al_2O_3$ is too large, the viscosity at high temperature is increased, and thus the meltability is liable to be reduced. Accordingly, the total content of $SiO_2$ and $Al_2O_3$ is preferably 90% or less, 89% or less, 88% or less, or 87% or less, particularly preferably 86% or less.

$B_2O_3$ is an optional component, but its introduction in a small amount leads to an improvement in meltability. Accordingly, the content of $B_2O_3$ is preferably 0.01% or more, 0.1% or more, 0.2% or more, 0.3% or more, or 0.4% or more, particularly preferably 0.5% or more. Meanwhile, when the content of $B_2O_3$ is too large, the strain point is significantly reduced, or β-OH is significantly increased. While the details are described later, when the β-OH is increased, a thermal shrinkage rate is increased. Accordingly, the content of $B_2O_3$ is preferably 4% or less, 3.5% or less, 3% or less, 2.5% or less, 2% or less, or 1.5% or less, particularly preferably 1% or less.

MgO is a component which reduces the viscosity at high temperature to improve the meltability, and is also a component which improves devitrification resistance through balance with other components. Further, from the viewpoint of mechanical characteristics, MgO is a component which remarkably increases a Young's modulus. Accordingly, the content of MgO is preferably 0% or more, 0.5% or more, 1% or more, or 1.5% or more, particularly preferably 2% or more. Meanwhile, when the content of MgO is too large, the strain point is liable to be reduced, or the balance with other components is lost, resulting in a higher devitrification tendency. Accordingly, the content of MgO is preferably 30% or less, 15% or less, 10% or less, 9% or less, 8% or less, 7.5% or less, 7% or less, or 6.5% or less, particularly preferably 6% or less.

CaO is a component which reduces the viscosity at high temperature to improve the meltability, and is also a component which improves the devitrification resistance through balance with other components. Accordingly, the content of CaO is preferably 0% or more, 0.5% or more, 1% or more, or 1.5% or more, particularly preferably 2% or more. Meanwhile, when the content of CaO is too large, the strain point is liable to be reduced. Accordingly, the content of CaO is preferably 25% or less, 15% or less, 10% or less, 9% or less, 8% or less, 7.5% or less, 7% or less, or 6.5% or less, particularly preferably 6% or less.

SrO is a component which reduces the viscosity at high temperature to improve the meltability, and is also a component which improves the devitrification resistance through balance with other components. Accordingly, the content of SrO is preferably 0% or more, 0.5% or more, 1% or more, or 1.5% or more, particularly preferably 2% or more. Meanwhile, when the content of SrO is too large, the strain point is liable to be reduced. Accordingly, the content of SrO is preferably 15% or less, 10% or less, 9% or less, 8% or less, 7% or less, 6% or less, or 5% or less, particularly preferably 4% or less.

BaO is a component which reduces the viscosity at high temperature to improve the meltability, and is also a component which improves the devitrification resistance through balance with other components. Accordingly, the content of BaO is preferably 0% or more, 0.5% or more, 1% or more, 1.5% or more, 2% or more, or 2.5% or more, particularly preferably 3% or more. Meanwhile, when the content of BaO is too large, the strain point is liable to be reduced. Accordingly, the content of BaO is preferably 15% or less, 10% or less, 9% or less, 8% or less, 7.5% or less, 7% or less, or 6.5% or less, particularly preferably 6% or less.

The total content of SrO and BaO is preferably 0% or more, 2% or more, 3% or more, or 4% or more, particularly preferably 5% or more. When the total content of SrO and BaO is too small, the meltability is liable to be reduced. Meanwhile, when the total content of SrO and BaO is too large, the glass composition loses its component balance, and the devitrification resistance is liable to be reduced. Accordingly, the total content of SrO and BaO is preferably 20% or less, 16% or less, 14% or less, 12% or less, 10% or less, or 9% or less, particularly preferably 8% or less.

The total content of MgO, CaO, SrO, and BaO is preferably 9.9% or more, 12% or more, 12.5% or more, 13% or more, or 13.5% or more, particularly preferably 14% or more. When the total content of MgO, CaO, SrO, and BaO is too small, the meltability is liable to be reduced. Meanwhile, when the total content of MgO, CaO, SrO, and BaO is too large, the strain point is reduced, or the glass composition loses its component balance and the devitrification resistance is liable to be reduced. Accordingly, the total content of MgO, CaO, SrO, and BaO is preferably 25% or less, 20% or less, 16% or less, 15.5% or less, 15% or less, or 14.5% or less, particularly preferably 14% or less.

The mole percent ratio $[B_2O_3]/([SrO]+[BaO])$ is preferably from 0 to 0.5, from 0 to 0.45, from 0 to 0.4, from 0 to 0.35, from 0.01 to 0.3, or from 0.05 to 0.25, particularly preferably from 0.1 to 0.2. When the mole percent ratio $[B_2O_3]/([SrO]+[BaO])$ is outside the above-mentioned ranges, the balance between the components is lost in a glass system according to the present invention, and the devitrification resistance is liable to be reduced. The "$[B_2O_3]/([SrO]+[BaO])$" refers to a value obtained by dividing the content of $B_2O_3$ by the total content of SrO and BaO.

$[SiO_2]+14\times[Al_2O_3]-15\times[B_2O_3]+6\times[MgO]+[CaO]+14\times[SrO]+16\times[BaO]$ is preferably 300% or more, 330% or more, 350% or more, 360% or more, 370% or more, 380% or more, 390% or more, 400% or more, 410% or more, 420% or more, or 430% or more. When $[SiO_2]+14\times[Al_2O_3]-15\times[B_2O_3]+6\times[MgO]+[CaO]+14\times[SrO]+16\times[BaO]$ is too small, it becomes difficult to achieve all of a high strain point, a high Young's modulus, and high devitrification resistance.

$17.8\times[SiO_2]+23.1\times[Al_2O_3]+3.7\times[B_2O_3]+12.9\times[MgO]+14.1\times[CaO]+15.5\times[SrO]+15.0\times[BaO]+7.2\times[ZnO]$ is preferably 1,740% or more, 1,750% or more, 1,760% or more, 1,770% or more, or 1,780% or more, particularly preferably 1,786% or more. When $17.8\times[SiO_2]+23.1\times[Al_2O_3]+3.7\times[B_2O_3]+12.9\times[MgO]+14.1\times[CaO]+15.5\times[SrO]+15.0\times[BaO]+7.2\times[ZnO]$ is too large, the thermal shrinkage of the glass sheet is liable to be increased.

$[Al_2O_3]+[B_2O_3]-[CaO]-[SrO]-[BaO]$ is preferably 0% or more or 0.1% or more, particularly preferably 1.0% or more. When $[Al_2O_3]\pm[B_2O_3]-[CaO]-[SrO]-[BaO]$ is too small, the amount of non-bridging oxygen or the like in glass is increased, and structural imbalance is liable to occur, with the result that thermal shrinkage is liable to occur in the glass sheet in a film forming process at high temperature. Meanwhile, when $[Al_2O_3]+[B_2O_3]-[CaO]-[SrO]-[BaO]$ is too large, a melting load is increased, or the devitrification resistance is reduced, resulting in a rise in manufacturing cost of the glass sheet. Accordingly, $[Al_2O_3]+[B_2O_3]-[CaO]-[SrO]-[BaO]$ is preferably 10.0% or less, 6.0% or less, 5.0% or less, 4.5% or less, 4.0% or less, or 3.0% or less, particularly preferably 2.0% or less.

$Y_2O_3$ is a component which increases the strain point, the Young's modulus, and the like. However, when the content thereof is too large, a density and raw material cost are liable to be increased. Accordingly, the content of $Y_2O_3$ is preferably from 0% to 0.8%, from 0% to 0.7%, from 0% to 0.5%, or from 0% to 0.2%, particularly preferably from 0% to 0.1%.

$La_2O_3$ is a component which increases the strain point, the Young's modulus, and the like. However, when the content thereof is too large, the density and the raw material cost are liable to be increased. Accordingly, the content of $La_2O_3$ is preferably from 0% to 0.8%, from 0% to 0.7%, from 0% to 0.5%, or from 0% to 0.2%, particularly preferably from 0% to 0.1%.

The total content of $Y_2O_3$ and $La_2O_3$ is preferably from 0% to less than 1.0%, from 0% to 0.8%, from 0% to 0.7%, from 0% to 0.5%, or from 0% to 0.2%, particularly preferably from 0% to 0.1%. However, when the total content of $Y_2O_3$ and $La_2O_3$ is too large, the density and the raw material cost are liable to be increased.

The alkali-free glass sheet of the present invention may comprise the following components in the glass composition in addition to the above-mentioned components.

ZnO is a component which increases the meltability. However, when ZnO is contained in a large amount, the glass is liable to devitrify, and in addition, the strain point is liable to be reduced. The content of ZnO is preferably from 0% to 5%, from 0% to 3%, from 0% to 0.5%, or from 0% to 0.3%, particularly preferably from 0% to 0.2%.

$P_2O_5$ is a component which remarkably reduces the liquidus temperature of an Al-based devitrified crystal while maintaining the strain point. However, when $P_2O_5$ is contained in a large amount, the Young's modulus is reduced, or the glass undergoes phase separation. In addition, P may be diffused from the glass and affect the performance of a TFT. Accordingly, the content of $P_2O_5$ is preferably from 0% to 1.5%, from 0% to 1.2%, or from 0% to 1%, particularly preferably from 0% to 0.5%.

$TiO_2$ is a component which reduces the viscosity at high temperature and thus increases the meltability, and is also a component which suppresses solarisation. However, when $TiO_2$ is contained in a large amount, the glass is colored, and thus a transmittance is liable to be reduced. Accordingly, the content of $TiO_2$ is preferably from 0 ppm by mass to 500 ppm by mass, from 0.1 ppm by mass to 100 ppm by mass, from 0.1 ppm by mass to 50 ppm by mass, from 0.5 ppm by mass to 30 ppm by mass, from 1 ppm by mass to 20 ppm by mass, or from 3 ppm by mass to 15 ppm by mass, particularly preferably from 5 ppm by mass to 10 ppm by mass.

$SnO_2$ is a component which exhibits a satisfactory fining action in a high temperature region. In addition, $SnO_2$ is a component which increases the strain point, and is also a component which reduces the viscosity at high temperature. The content of $SnO_2$ is preferably from 0% to 1%, from 0.001% to 1%, or from 0.05% to 0.5%, particularly preferably from 0.08% to 0.2%. When the content of $SnO_2$ is too large, a devitrified crystal of $SnO_2$ is liable to precipitate. When the content of $SnO_2$ is less than 0.001%, it becomes difficult to exhibit the above-mentioned effects.

$SnO_2$ is suitable as a fining agent, but any other fining agent than $SnO_2$ may be used as long as the characteristics of the glass are not significantly impaired. Specifically, $As_2O_3$, $Sb_2O_3$, $CeO_2$, $F_2$, $Cl_2$, $SO_3$, and C may be added at a total content of, for example, up to 0.5%, and metal powders, such as Al and Si, may be added at a total content of, for example, up to 0.5%.

$As_2O_3$ and $Sb_2O_3$ are excellent in fining property, but from an environmental viewpoint, it is preferred to introduce $As_2O_3$ and $Sb_2O_3$ in as small amounts as possible. Further, when $As_2O_3$ is contained in a large amount in the glass, solarization resistance tends to be reduced. Accordingly, the content thereof is preferably 1,000 ppm by mass or less or 100 ppm by mass or less, particularly preferably less than 30 ppm by mass. In addition, the content of $Sb_2O_3$ is preferably 1,000 ppm by mass or less or 100 ppm by mass or less, particularly preferably less than 30 ppm by mass.

Cl has an effect of promoting the melting of alkali-free glass. When Cl is added, a reduction in melting temperature can be achieved, and the action of the fining agent is promoted. As a result, while melting cost is reduced, the lifetime of a glass production kiln can be prolonged. However, when the content of Cl is too large, the strain point is liable to be reduced. Accordingly, the content of Cl is preferably 0.5% or less, particularly preferably 0.1% or less. An alkaline earth metal chloride, such as strontium chloride, aluminum chloride, or the like may be used as a raw material for introducing Cl.

Rh is a component which is included in a melting facility, and is thus a component which is eluted in a glass texture when the glass is melted at high temperature. Meanwhile, Rh is a component which colors the glass when Rh coexists with $SnO_2$. The content of Rh is preferably from 0 ppm by mass to 3 ppm by mass, from 0.1 ppm by mass to 3 ppm by mass, from 0.1 ppm by mass to 3 ppm by mass, from 0.2 ppm by mass to 2.5 ppm by mass, from 0.3 ppm by mass to 2 ppm by mass, or from 0.4 ppm by mass to 1.5 ppm by mass, particularly preferably from 0.5 ppm by mass to 1 ppm by mass. When the melting temperature is reduced, the content of Rh is easily reduced.

Ir has higher heat resistance than Pt or a Pt—Rh alloy, and is a component which can reduce bubbling of molten glass at an interface with the molten glass. In addition, Ir is a component which is included in the melting facility, and is thus a component which is eluted in the glass texture when the glass is melted at high temperature. Meanwhile, when the elution amount of Ir is increased, Ir may be precipitated as foreign matter in the glass. Accordingly, the content of Ir is preferably from 0 ppm by mass to 10 ppm by mass, from 0.01 ppm by mass to 10 ppm by mass, from 0.02 ppm by mass to 5 ppm by mass, from 0.03 ppm by mass to 3 ppm by mass, or from 0.04 ppm by mass to 2 ppm by mass, particularly preferably from 0.05 ppm by mass to 1 ppm by mass. The "Ir" includes not only Ir but also $IrO_2$ and $Ir_2O_3$, and $IrO_2$ and $Ir_2O_3$ are each represented in terms of Ir.

Molybdenum is a component which is used for an electrode in a melting step, and is thus a component which is eluted as $MoO_3$ in the glass texture when the glass is melted at high temperature. The content of $MoO_3$ is preferably from 0 ppm by mass to 50 ppm by mass, from 1 ppm by mass to 50 ppm by mass, from 3 ppm by mass to 40 ppm by mass, from 5 ppm by mass to 30 ppm by mass, or from 5 ppm by mass to 25 ppm by mass, particularly preferably from 5 ppm by mass to 20 ppm by mass. When the content of $MoO_3$ is too small, it becomes difficult to heat the molten glass through application of a current with a heating electrode, and hence it becomes difficult to reduce the β-OH.

$ZrO_2$ is a component which is included in a refractory in the melting step, and is thus a component which is eluted in the glass texture when the glass is melted at high temperature. In addition, $ZrO_2$ is a component which increases the liquidus temperature and weather resistance. Meanwhile, when the content of $ZrO_2$ is to be excessively reduced, an expensive refractory needs to be used in the melting step, which may result in a rise in manufacturing cost of the glass sheet. Accordingly, the content of $ZrO_2$ is preferably from 0 ppm by mass to 2,000 ppm by mass, from 500 ppm by mass to 2,000 ppm by mass, or from 550 ppm by mass to 1,500 ppm by mass, particularly preferably from 600 ppm by mass to 1,200 ppm by mass.

$Fe_2O_3$ is a component which is mixed in as a raw material impurity, and is also a component which reduces an electrical resistivity. The content of $Fe_2O_3$ is preferably from 50 ppm by mass to 300 ppm by mass or from 80 ppm by mass to 250 ppm by mass, particularly preferably from 100 ppm by mass to 200 ppm by mass. When the content of $Fe_2O_3$ is too small, the raw material cost is liable to rise. Meanwhile, when the content of $Fe_2O_3$ is too large, it becomes difficult to perform electric melting owing to an increase in electrical resistivity of the molten glass.

The alkali-free glass sheet of the present invention is substantially free of an alkali metal oxide, but a case in which an alkali metal oxide is mixed in as an inevitable impurity is not excluded. When an alkali metal oxide is mixed in as an inevitable impurity, the content of the alkali metal oxide (total content of $Li_2O$, $Na_2O$, and $K_2O$) is preferably from 10 ppm by mass to 1,000 ppm by mass, from 30 ppm by mass to 600 ppm by mass, from 50 ppm by mass to 300 ppm by mass, or from 70 ppm by mass to 200 ppm by mass, particularly preferably from 80 ppm by mass to 150 ppm by mass. In particular, the content of $Na_2O$ is preferably from 30 ppm by mass to 600 ppm by mass, from 50 ppm by mass to 300 ppm by mass, or from 70 ppm by mass to 200 ppm by mass, particularly preferably from 80 ppm by mass to 150 ppm by mass. When the content of the alkali metal oxide is too small, the use of a high-purity raw material is essential, resulting in a rise in batch cost. In addition, an electrical conductivity is excessively reduced, and it becomes difficult to perform electric melting. Meanwhile, when the content of the alkali metal oxide is too large, an alkali ion may be diffused in a semiconductor film in a heat treatment step.

The alkali-free glass sheet of the present invention preferably has the following characteristics.

The thermal expansion coefficient is preferably $46\times10^{-7}/°$ C. or less, $42\times10^{-7}/°$ C. or less, $40\times10^{-7}/°$ C. or less, or $38\times10^{-7}/°$ C. or less, particularly preferably $26\times10^{-7}/°$ C. or more and $36\times10^{-7}/°$ C. or less. When the thermal expansion coefficient is too high, the glass sheet is liable to have a local dimensional change owing to temperature variations in the film forming process at high temperature.

The density is preferably 2.80 $g/cm^3$ or less, 2.75 $g/cm^3$ or less, 2.70 $g/cm^3$ or less, 2.65 $g/cm^3$ or less, 2.60 $g/cm^3$ or less, or 2.55 $g/cm^3$ or less, particularly preferably from 2.45 $g/cm^3$ to 2.50 $g/cm^3$. When the density is too high, the deflection amount of the glass sheet is liable to be increased, and hence pattern deviation caused by stress is liable to be promoted in, for example, manufacturing steps for a display.

The strain point is 750° C. or more, preferably 760° C. or more, 765° C. or more, 770° C. or more, 775° C. or more, 780° C. or more, 785° C. or more, 790° C. or more, 795° C. or more, or 800° C. or more. When the strain point is too low, thermal shrinkage is liable to occur in the glass sheet in the film forming process at high temperature.

The annealing point is preferably 800° C. or more, 805° C. or more, 810° C. or more, 820° C. or more, 830° C. or more, or 840° C. or more, particularly preferably 850° C. or more. When the annealing point is too low, thermal shrinkage is liable to occur in the glass sheet in the film forming process at high temperature.

The softening point is preferably 1,040° C. or more, 1,060° C. or more, or 1,080° C. or more, particularly preferably 1,100° C. or more. When the softening point is too low, thermal shrinkage is liable to occur in the glass sheet in the film forming process at high temperature.

The temperature at a viscosity at high temperature of $10^{2.5}$ dPa·s is preferably 1,750° C. or less, 1,720° C. or less, 1,700° C. or less, 1,690° C. or less, or 1,680° C. or less, particularly preferably 1,670° C. or less. When the temperature at $10^{2.5}$ dPa·s is high, the meltability and the fining property are liable to be reduced, resulting in a rise in manufacturing cost of the glass sheet.

The Young's modulus is preferably 80 GPa or more, 81 GPa or more, or 82 GPa or more, particularly preferably 83 GPa or more. When the Young's modulus is too low, the deflection amount of the glass sheet is liable to be increased, and hence pattern deviation caused by stress is liable to be promoted in, for example, manufacturing steps for a display.

The specific Young's modulus is preferably 30 GPa/g·cm$^{-3}$ or more, 31 GPa/g·cm$^{-3}$ or more, or 32 GPa/g·cm$^{-3}$ or more, particularly preferably 33 GPa/g·cm$^{-3}$ or more. When the specific Young's modulus is too low, the deflection amount of the glass sheet is liable to be increased, and hence pattern deviation caused by stress is liable to be promoted in, for example, manufacturing steps for a display.

The β-OH is an indicator of the amount of water in the glass. When the β-OH is reduced, the strain point can be increased. In addition, even with the same glass composition, a glass sheet having lower β-OH has a lower thermal shrinkage rate at a temperature equal to or lower than the strain point. The β-OH is preferably 0.30/mm or less, 0.25/mm or less, 0.20/mm or less, or 0.15/mm or less, particularly preferably 0.10/mm or less. When the β-OH is too low, the meltability is liable to be reduced. Accordingly, the β-OH is preferably 0.01/mm or more, particularly preferably 0.03/mm or more.

As a method of reducing the β-OH, the following methods are given: (1) a method involving selecting raw materials having low water contents; (2) a method involving adding a component (such as Cl or $SO_3$) which reduces the β-OH to the glass; (3) a method involving reducing the amount of water in a furnace atmosphere; (4) a method involving performing $N_2$ bubbling in molten glass; (5) a method involving adopting a small melting furnace; (6) a method involving increasing the flow rate of molten glass; and (7) a method involving adopting an electric melting method.

Herein, the "β-OH" refers to a value determined using the following mathematical formula by measuring the transmittances of the glass with an FT-IR.

$$\beta\text{-}OH=(1/X)\log(T_1/T_2)$$

X: Thickness (mm)
$T_1$: Transmittance (%) at a reference wavelength of 3,846 $cm^{-1}$
$T_2$: Minimum transmittance (%) at a wavelength around a hydroxyl group absorption wavelength of 3,600 $cm^{-1}$ It is preferred that the alkali-free glass sheet of the present invention have overflow-joined surfaces in a middle portion thereof in a sheet thickness direction. That is, it is preferred that the alkali-free glass sheet of the present invention be formed by an overflow down-draw method. The overflow down-draw method refers to a method in which molten glass is caused to overflow from both sides of a wedge-shaped refractory, and the overflowing molten glasses are subjected to down-draw downward at the lower end of the wedge-shaped refractory while being joined, to thereby form the glass into a flat sheet shape. By the overflow down-draw method, surfaces which are to serve as the surfaces of the glass sheet are formed in a state of free surfaces without being brought into contact with the refractory. As a result, a glass sheet having good surface quality can be manufactured without polishing at low cost. Further, an increase in area and a reduction in thickness are easily achieved as well.

The forming may be performed by, for example, a slot-down method, a redraw method, a float method, or a roll-out method as well as the overflow down-draw method.

The sheet thickness of the alkali-free glass sheet of the present invention is not particularly limited, but is preferably 1.0 mm or less, 0.7 mm or less, or 0.5 mm or less, particularly preferably from 0.05 mm to 0.4 mm. As the sheet thickness becomes smaller, weight saving of a liquid crystal panel or an OLED panel is more easily achieved. The sheet thickness may be adjusted based on, for example, a flow rate and a forming speed (sheet-drawing speed) at the time of glass production.

A method of manufacturing the alkali-free glass sheet of the present invention on an industrial scale preferably comprises a melting step of loading a glass batch to a melting furnace and heating the glass batch through application of a current with a heating electrode to obtain molten glass, the glass batch having been blended so as to comprise as a glass composition, in terms of mol %, 55% to 80% of $SiO_2$, 10% to 25% of $Al_2O_3$, 0% to 4% of $B_2O_3$, 0% to 30% of MgO, 0% to 25% of CaO, 0% to 15% of SrO, 0% to 15% of BaO, 0% to 5% of ZnO, and 0% to less than 1.0% of $Y_2O_3+La_2O_3$, and be substantially free of an alkali metal oxide, and a forming step of forming the obtained molten glass into an alkali-free glass sheet having a sheet thickness of from 0.1 mm to 0.7 mm by an overflow down-draw method.

In general, a manufacturing process for the glass sheet comprises a melting step, a fining step, a supplying step, a stirring step, and a forming step. The melting step is a step of melting a glass batch obtained by blending glass raw materials to provide molten glass. The fining step is a step of fining the molten glass obtained in the melting step by an action of a fining agent or the like. The supplying step is a step of transferring the molten glass from one step to another. The stirring step is a step of stirring the molten glass to homogenize the molten glass. The forming step is a step of forming the molten glass into a glass sheet. A step other than the above-mentioned steps, for example, a state adjusting step of adjusting the molten glass to be in a state suitable for forming may be introduced after the stirring step as required.

When the alkali-free glass sheet is manufactured on an industrial scale, the glass is generally melted by heating with a combustion flame of a burner. The burner is generally arranged at an upper portion of a melting kiln, and uses fossil fuel as its fuel, specifically, for example, liquid fuel, such as heavy oil, or gas fuel, such as LPG. The combustion flame may be obtained by mixing the fossil fuel and oxygen gas. However, such method is liable to entail an increase in β-OH because a large amount of water is mixed in the molten glass during the melting. Accordingly, in manufacturing the alkali-free glass sheet of the present invention, it is preferred to perform heating through application of a current with a heating electrode, and it is more preferred to melt the glass by heating through application of a current with a heating electrode without heating with the combustion flame of the burner, that is, perform full electric melting. With this configuration, water is less liable to be mixed in the molten glass during the melting, and hence the β-OH is easily controlled to 0.30/mm or less, 0.25/mm or less, 0.20/mm or less, or 0.15/mm or less, particularly 0.10/mm or less. Further, when the heating through application of a current with a heating electrode is performed, the amount of energy required for obtaining the molten glass per unit mass is reduced, and the amount of a melt volatile is reduced. As a result, an environmental load can be reduced.

Further, with regard to the heating through application of a current, as the amount of water in the glass batch becomes smaller, the β-OH in the glass sheet is reduced more easily. Moreover, a raw material for introducing $B_2O_3$ is liable to be a maximum water mixing source. Accordingly, from the viewpoint of manufacturing a glass sheet having low β-OH, it is preferred to reduce the content of $B_2O_3$ to the extent possible. In addition, as the amount of water in the glass batch becomes smaller, the glass batch spreads in a melting kiln more uniformly, and hence a homogeneous glass sheet with high quality is easily manufactured.

The heating through application of a current with a heating electrode is preferably performed by applying an alternating voltage to a heating electrode arranged at a bottom portion or a side portion of a melting kiln so as to be brought into contact with the molten glass in the melting kiln. A material having heat resistance and corrosion resistance to the molten glass is preferably used as a material for the heating electrode, and for example, tin oxide, molybdenum, platinum, or rhodium may be used. In particular, molybdenum is preferred from the viewpoint of the degree of freedom of installation in a furnace.

The alkali-free glass sheet of the present invention is substantially free of an alkali metal oxide, and hence has a high electrical resistivity. Accordingly, when the heating through application of a current with a heating electrode is performed, a current flows through not only the molten glass but also a refractory for forming the melting kiln, and the refractory for forming the melting kiln may be damaged early. In order to prevent such situation, it is preferred to use, as a furnace refractory, a zirconia-based refractory, particularly a zirconia electrocast brick, having a high electrical resistivity. In addition, it is preferred to introduce a small amount of a component (such as $Fe_2O_3$) which reduces the electrical resistivity into the molten glass (glass composition), and the content of $Fe_2O_3$ is preferably from 50 ppm by mass to 300 ppm by mass or from 80 ppm by mass to 250 ppm by mass, particularly preferably from 100 ppm by mass to 200 ppm by mass. Further, the content of $ZrO_2$ in the zirconia-based refractory is preferably 85 mass % or more, particularly preferably 90 mass % or more.

EXAMPLES

Example 1

The present invention is hereinafter described by way of Examples. However, Examples below are merely examples, and the present invention is by no means limited to Examples below.

Examples (Sample Nos. 1 to 679) of the present invention are shown in Tables 1 to 49. The glass characteristics of Sample Nos. 281 to 679 are not actually measured values but calculation values calculated from composition factors.

TABLE 1

| | | No. 1 | No. 2 | No. 3 | No. 4 | No. 5 | No. 6 | No. 7 | No. 8 |
|---|---|---|---|---|---|---|---|---|---|
| mol % | $SiO_2$ | 72.9 | 58.8 | 64.1 | 71.7 | 75.1 | 59.8 | 59.8 | 59.8 |
| | $Al_2O_3$ | 11.3 | 11.6 | 12.7 | 14.2 | 14.8 | 25.0 | 25.0 | 25.0 |
| | $B_2O_3$ | 0.3 | 0.0 | 0.0 | 0.0 | 0.0 | 0.0 | 0.0 | 0.0 |
| | MgO | 3.1 | 29.4 | 0.0 | 0.0 | 0.0 | 15.0 | 0.0 | 0.0 |
| | CaO | 7.2 | 0.0 | 23.0 | 0.0 | 0.0 | 0.0 | 15.0 | 0.0 |
| | SrO | 0.5 | 0.0 | 0.0 | 13.9 | 0.0 | 0.0 | 0.0 | 15.0 |
| | BaO | 4.5 | 0.0 | 0.0 | 0.0 | 9.9 | 0.0 | 0.0 | 0.0 |
| | ZnO | 0.0 | 0.0 | 0.0 | 0.0 | 0.0 | 0.0 | 0.0 | 0.0 |
| | $SnO_2$ | 0.2 | 0.2 | 0.2 | 0.2 | 0.2 | 0.2 | 0.2 | 0.2 |
| | $[SiO_2] + [Al_2O_3]$ | 84.2 | 70.4 | 76.8 | 85.9 | 89.9 | 84.8 | 84.8 | 84.8 |
| | $[MgO] + [CaO] + [SrO] + [BaO]$ | 15.3 | 29.4 | 23.0 | 13.9 | 9.9 | 15.0 | 15.0 | 15.0 |
| | $[SrO] + [BaO]$ | 5.0 | 0.0 | 0.0 | 13.9 | 9.9 | 0.0 | 0.0 | 15.0 |
| | $[B_2O_3]/([SrO] + [BaO])$ | 0.1 | — | — | 0.0 | 0.0 | — | — | 0.0 |
| | $[Al_2O_3] + [B_2O_3] - [CaO] - [SrO] - [BaO]$ | −0.6 | 11.6 | −10.4 | 0.2 | 5.0 | 25.0 | 10.0 | 10.0 |
| | $[SiO_2] + 14[Al_2O_3] - 15[B_2O_3] + 6[MgO] + [CaO] + 14[SrO] + 16[BaO]$ | 331.4 | 397.7 | 264.4 | 464.9 | 440.4 | 499.8 | 424.8 | 619.8 |
| | $17.8[SiO_2] + 23.1[Al_2O_3] + 3.7[B_2O_3] + 12.9[MgO] + 14.1[CaO] + 15.5[SrO] + 15.0[BaO] + 7.2[ZnO]$ | 1,776.5 | 1,694.4 | 1,758.6 | 1,819.5 | 1,827.4 | 1,835.4 | 1,853.4 | 1,874.4 |
| Thermal expansion coefficient ($10^{-7}$/° C.) | | 39.8 | 42.0 | 50.7 | 42.9 | 36.0 | 32.0 | 38.2 | 40.9 |
| Density (g/cm³) | | 2.617 | 2.610 | 2.608 | 2.699 | 2.731 | 2.590 | 2.612 | 2.818 |
| Strain point (° C.) | | 756 | 742 | 754 | 822 | 835 | Unmeasured | 809 | 822 |
| Annealing point (° C.) | | 813 | 787 | 802 | 886 | 904 | Unmeasured | 858 | 875 |
| Softening point (° C.) | | 1,058 | 960 | 988 | 1,165 | Unmeasured | Unmeasured | 1,042 | Unmeasured |
| $10^{4.5}$ dPa · s (° C.) | | 1,401 | 1,180 | 1,243 | 1,438 | 1,516 | Unmeasured | Unmeasured | Unmeasured |
| $10^{4.0}$ dPa · s (° C.) | | 1,574 | 1,296 | 1,382 | 1,602 | 1,688 | Unmeasured | Unmeasured | Unmeasured |
| $10^{3.0}$ dPa · s (° C.) | | 1,682 | 1,374 | 1,475 | 1,708 | 1,800 | 1,578 | Unmeasured | Unmeasured |
| $10^{2.5}$ dPa · s (° C.) | | 1,335 | 1,138 | 1,193 | 1,379 | 1,458 | Unmeasured | Unmeasured | Unmeasured |
| Young's modulus (GPa) | | 81.0 | 99.2 | 85.9 | 79.5 | 77.8 | 102.3 | 94.0 | 89.5 |
| Specific Young's modulus (GPa/g · cm⁻³) | | 30.9 | 38.0 | 32.9 | 29.5 | 28.5 | 39.5 | 36.0 | 31.8 |
| β-OH (mm⁻¹) | | 0.13 | 0.08 | 0.08 | 0.04 | 0.04 | 0.07 | 0.14 | 0.14 |

| | | No. 9 | No. 10 | No. 11 | No. 12 | No. 13 | No. 14 |
|---|---|---|---|---|---|---|---|
| mol % | $SiO_2$ | 59.8 | 64.8 | 64.8 | 64.8 | 64.8 | 69.8 |
| | $Al_2O_3$ | 25.0 | 20.0 | 20.0 | 20.0 | 20.0 | 15.0 |
| | $B_2O_3$ | 0.0 | 0.0 | 0.0 | 0.0 | 0.0 | 0.0 |
| | MgO | 0.0 | 15.0 | 0.0 | 0.0 | 0.0 | 15.0 |
| | CaO | 0.0 | 0.0 | 15.0 | 0.0 | 0.0 | 0.0 |
| | SrO | 0.0 | 0.0 | 0.0 | 15.0 | 0.0 | 0.0 |
| | BaO | 15.0 | 0.0 | 0.0 | 0.0 | 15.0 | 0.0 |
| | ZnO | 0.0 | 0.0 | 0.0 | 0.0 | 0.0 | 0.0 |
| | $SnO_2$ | 0.2 | 0.2 | 0.2 | 0.2 | 0.2 | 0.2 |

TABLE 1-continued

|  |  |  |  |  |  |  |
|---|---|---|---|---|---|---|
| [SiO$_2$] + [Al$_2$O$_3$] | 84.8 | 84.8 | 84.8 | 84.8 | 84.8 | 84.8 |
| [MgO] + [CaO] + [SrO] + [BaO] | 15.0 | 15.0 | 15.0 | 15.0 | 15.0 | 15.0 |
| [SrO] + [BaO] | 15.0 | 0.0 | 0.0 | 15.0 | 15.0 | 0.0 |
| [B$_2$O$_3$]/([SrO] + [BaO]) | 0.0 | — | — | 0.0 | 0.0 | — |
| [Al$_2$O$_3$] + [B$_2$O$_3$] − [CaO] − [SrO] − [BaO] | 10.0 | 20.0 | 5.0 | 5.0 | 5.0 | 15.0 |
| [SiO$_2$] + 14[Al$_2$O$_3$] − 15[B$_2$O$_3$] + 6[MgO] + [CaO] + 14[SrO] + 16[BaO] | 649.8 | 434.8 | 359.8 | 554.8 | 584.8 | 369.8 |
| 17.8[SiO$_2$] + 23.1[Al$_2$O$_3$] + 3.7[B$_2$O$_3$] + 12.9[MgO] + 14.1[CaO] + 15.5[SrO] + 15.0[BaO] + 7.2[ZnO] | 1,866.9 | 1,808.9 | 1,826.9 | 1,847.9 | 1,840.4 | 1,782.4 |
| Thermal expansion coefficient (10$^{-7}$/° C.) | 43.5 | 30.4 | 37.6 | 41.7 | 45.3 | 28.7 |
| Density (g/cm$^3$) | 3.015 | 2.537 | 2.566 | 2.778 | 2.977 | 2.482 |
| Strain point (° C.) | Unmeasured | Unmeasured | 808 | 824 | 832 | Unmeasured |
| Annealing point (° C.) | Unmeasured | Unmeasured | 861 | 880 | 894 | Unmeasured |
| Softening point (° C.) | Unmeasured | Unmeasured | 1,060 | 1,091 | 1,120 | 1,044 |
| 10$^{4.5}$ dPa · s (° C.) | Unmeasured | Unmeasured | 1,327 | 1,365 | 1,413 | 1,330 |
| 10$^{4.0}$ dPa · s (° C.) | Unmeasured | Unmeasured | 1,453 | 1,506 | 1,554 | 1,475 |
| 10$^{3.0}$ dPa · s (° C.) | Unmeasured | Unmeasured | 1,538 | 1,595 | 1,645 | 1,568 |
| 10$^{2.5}$ dPa · s (° C.) | Unmeasured | Unmeasured | 1,277 | 1,312 | 1,358 | Unmeasured |
| Young's modulus (GPa) | 84.5 | 97.2 | 89.5 | 84.8 | 80.3 | 91.9 |
| Specific Young's modulus (GPa/g · cm$^{-3}$) | 28.0 | 38.3 | 34.9 | 30.5 | 27.0 | 37.0 |
| β-OH (mm$^{-1}$) | 0.07 | 0.11 | 0.05 | 0.07 | 0.05 | 0.12 |

TABLE 2

|  |  | No. 15 | No. 16 | No. 17 | No. 18 | No. 19 | No. 20 | No. 21 | No. 22 |
|---|---|---|---|---|---|---|---|---|---|
| mol % | SiO$_2$ | 69.8 | 69.8 | 69.8 | 69.8 | 69.8 | 69.8 | 69.8 | 64.8 |
|  | Al$_2$O$_3$ | 15.0 | 15.0 | 15.0 | 20.0 | 20.0 | 20.0 | 20.0 | 25.0 |
|  | B$_2$O$_3$ | 0..0 | 0.0 | 0.0 | 0.0 | 0.0 | 0.0 | 0.0 | 0.0 |
|  | MgO | 0.0 | 0.0 | 0.0 | 10.0 | 0.0 | 0.0 | 0.0 | 10.0 |
|  | CaO | 15.0 | 0.0 | 0.0 | 0.0 | 10.0 | 0.0 | 0.0 | 0.0 |
|  | SrO | 0.0 | 15.0 | 0.0 | 0.0 | 0.0 | 10.0 | 0.0 | 0.0 |
|  | BaO | 0.0 | 0.0 | 15.0 | 0.0 | 0.0 | 0.0 | 10.0 | 0.0 |
|  | ZnO | 0.0 | 0.0 | 0.0 | 0.0 | 0.0 | 0.0 | 0.0 | 0.0 |
|  | SnO$_2$ | 0.2 | 0.2 | 0.2 | 0.2 | 0.2 | 0.2 | 0.2 | 0.2 |
| [SiO$_2$] + [Al$_2$O$_3$] |  | 84.8 | 84.8 | 84.8 | 89.8 | 89.8 | 89.8 | 89.8 | 89.8 |
| [MgO] + [CaO] + [SrO] + [BaO] |  | 15.0 | 15.0 | 15.0 | 10.0 | 10.0 | 10.0 | 10.0 | 10.0 |
| [SrO] + [BaO] |  | 0.0 | 15.0 | 15.0 | 0.0 | 0.0 | 10.0 | 10.0 | 0.0 |
| [B$_2$O$_3$]/([SrO] + [BaO]) |  | — | 0.0 | 0.0 | — | — | 0.0 | 0.0 | — |
| [Al$_2$O$_3$] + [B$_2$O$_3$] − [CaO] − [SrO] − [BaO] |  | 0.0 | 0.0 | 0.0 | 20.0 | 10.0 | 10.0 | 10.0 | 25.0 |
| [SiO$_2$] + 14[Al$_2$O$_3$] − 15[B$_2$O$_3$] + 6[MgO] + [CaO] + 14[SrO] + 16[BaO] |  | 294.8 | 489.8 | 519.8 | 409.8 | 359.8 | 489.8 | 509.8 | 474.8 |
| 17.8[SiO$_2$] + 23.1[Al$_2$O$_3$] + 3.7[B$_2$O$_3$] + 12.9[MgO] + 14.1[CaO] + 15.5[SrO] + 15.0[BaO] + 7.2[ZnO] |  | 1,800.4 | 1,821.4 | 1,813.9 | 1,833.4 | 1,845.4 | 1,859.4 | 1,854.4 | 1,859.9 |
| Thermal expansion coefficient (10$^{-7}$/° C.) |  | 39.1 | 44.6 | 49.0 | 26.5 | 30.7 | 32.9 | 34.9 | Unmeasured |
| Density (g/cm$^3$) |  | 2.518 | 2.734 | 2.934 | 2.491 | 2.508 | 2.649 | 2.784 | Unmeasured |
| Strain point (° C.) |  | 808 | 823 | 832 | Unmeasured | 809 | 823 | 824 | Unmeasured |
| Annealing point (° C.) |  | 862 | 882 | 896 | Unmeasured | 870 | 881 | 888 | Unmeasured |
| Softening point (° C.) |  | 1,073 | 1,107 | 1,137 | Unmeasured | 1,078 | 1,101 | 1,023 | Unmeasured |
| 10$^{4.5}$ dPa · s (° C.) |  | 1,362 | 1,416 | 1,471 | Unmeasured | Unmeasured | Unmeasured | Unmeasured | Unmeasured |
| 10$^{4.0}$ dPa · s (° C.) |  | 1,515 | 1,573 | 1,630 | Unmeasured | Unmeasured | Unmeasured | Unmeasured | Unmeasured |
| 10$^{3.0}$ dPa · s (° C.) |  | 1,612 | 1,674 | 1,736 | Unmeasured | Unmeasured | Unmeasured | Unmeasured | Unmeasured |

TABLE 2-continued

| | | | | | | | | |
|---|---|---|---|---|---|---|---|---|
| $10^{2.5}$ dPa·s (° C.) | 1,305 | 1,356 | 1,407 | Unmeasured | Unmeasured | Unmeasured | Unmeasured | Unmeasured |
| Young's modulus (GPa) | 84.8 | 79.8 | 75.0 | 94.2 | 89.1 | 86.0 | 82.6 | Unmeasured |
| Specific Young's modulus (GPa/g·cm$^{-3}$) | 33.7 | 29.2 | 25.6 | 37.8 | 35.5 | 32.5 | 29.7 | Unmeasured |
| β-OH (mm$^{-1}$) | 0.07 | 0.13 | 0.13 | 0.15 | 0.15 | 0.15 | 0.07 | 0.04 |

| | | | No. 23 | No. 24 | No. 25 | No. 26 | No. 27 | No. 28 |
|---|---|---|---|---|---|---|---|---|
| mol % | SiO$_2$ | | 64.8 | 64.8 | 64.8 | 69.8 | 69.8 | 69.8 |
| | Al$_2$O$_3$ | | 25.0 | 25.0 | 25.0 | 15.0 | 15.0 | 15.0 |
| | B$_2$O$_3$ | | 0.0 | 0.0 | 0.0 | 0.0 | 0.0 | 0.0 |
| | MgO | | 0.0 | 0.0 | 0.0 | 7.5 | 7.5 | 7.5 |
| | CaO | | 10.0 | 0.0 | 0.0 | 7.5 | 0.0 | 0.0 |
| | SrO | | 0.0 | 10.0 | 0.0 | 0.0 | 7.5 | 0.0 |
| | BaO | | 0.0 | 0.0 | 10.0 | 0.0 | 0.0 | 7.5 |
| | ZnO | | 0.0 | 0.0 | 0.0 | 0.0 | 0.0 | 0.0 |
| | SnO$_2$ | | 0.2 | 0.2 | 0.2 | 0.2 | 0.2 | 0.2 |
| | [SiO$_2$] + [Al$_2$O$_3$] | | 89.8 | 89.8 | 89.8 | 84.8 | 84.8 | 84.8 |
| | [MgO] + [CaO] + [SrO] + [BaO] | | 10.0 | 10.0 | 10.0 | 15.0 | 15.0 | 15.0 |
| | [SrO] + [BaO] | | 0.0 | 10.0 | 10.0 | 0.0 | 7.5 | 7.5 |
| | [B$_2$O$_3$]/([SrO] + [BaO]) | | — | 0.0 | 0.0 | — | 0.0 | 0.0 |
| | [Al$_2$O$_3$] + [B$_2$O$_3$] − [CaO] − [SrO] − [BaO] | | 15.0 | 15.0 | 15.0 | 7.5 | 7.5 | 7.5 |
| | [SiO$_2$] + 14[Al$_2$O$_3$] − 15[B$_2$O$_3$] + 6[MgO] + [CaO] + 14[SrO] + 16[BaO] | | 424.8 | 554.8 | 574.8 | 332.3 | 429.8 | 444.8 |
| | 17.8[SiO$_2$] + 23.1[Al$_2$O$_3$] + 3.7[B$_2$O$_3$] + 12.9[MgO] + 14.1[CaO] + 15.5[SrO] + 15.0[BaO] + 7.2[ZnO] | | 1,871.9 | 1,885.9 | 1,880.9 | 1,791.4 | 1,801.9 | 1,798.2 |
| Thermal expansion coefficient ($10^{-7}$/° C.) | | | Unmeasured | Unmeasured | Unmeasured | 33.0 | 35.5 | 36.6 |
| Density (g/cm$^3$) | | | Unmeasured | Unmeasured | Unmeasured | 2.501 | 2.612 | 2.722 |
| Strain point (° C.) | | | Unmeasured | Unmeasured | Unmeasured | 773 | 776 | 780 |
| Annealing point (° C.) | | | Unmeasured | Unmeasured | Unmeasured | 828 | 833 | 839 |
| Softening point (° C.) | | | Unmeasured | Unmeasured | Unmeasured | 1,048 | 1,060 | 1,073 |
| $10^{4.5}$ dPa·s (° C.) | | | Unmeasured | Unmeasured | Unmeasured | 1,345 | 1,368 | 1,405 |
| $10^{4.0}$ dPa·s (° C.) | | | Unmeasured | Unmeasured | Unmeasured | 1,497 | 1,522 | 1,558 |
| $10^{3.0}$ dPa·s (° C.) | | | Unmeasured | Unmeasured | Unmeasured | 1,596 | 1,621 | 1,644 |
| $10^{2.5}$ dPa·s (° C.) | | | Unmeasured | Unmeasured | Unmeasured | 1,287 | 1,309 | 1,341 |
| Young's modulus (GPa) | | | Unmeasured | Unmeasured | Unmeasured | 89.1 | 86.5 | 83.9 |
| Specific Young's modulus (GPa/g·cm$^{-3}$) | | | Unmeasured | Unmeasured | Unmeasured | 35.6 | 33.1 | 30.8 |
| β-OH (mm$^{-1}$) | | | 0.15 | 0.06 | 0.06 | 0.06 | 0.08 | 0.08 |

TABLE 3

| | | No. 29 | No. 30 | No. 31 | No. 32 | No. 33 | No. 34 | No. 35 | No. 36 |
|---|---|---|---|---|---|---|---|---|---|
| mol % | SiO$_2$ | 69.8 | 69.8 | 69.8 | 69.8 | 69.8 | 69.8 | 69.8 | 69.8 |
| | Al$_2$O$_3$ | 15.0 | 15.0 | 15.0 | 13.0 | 13.0 | 13.0 | 13.0 | 13.0 |
| | B$_2$O$_3$ | 0..0 | 0.0 | 0.0 | 0.0 | 0.0 | 0.0 | 0.0 | 0.0 |
| | MgO | 0.0 | 0.0 | 0.0 | 8.5 | 8.5 | 8.5 | 0.0 | 0.0 |
| | CaO | 7.5 | 7.5 | 0.0 | 8.5 | 0.0 | 0.0 | 8.5 | 8.5 |
| | SrO | 7.5 | 0.0 | 7.5 | 0.0 | 8.5 | 0.0 | 8.5 | 0.0 |
| | BaO | 0.0 | 7.5 | 7.5 | 0.0 | 0.0 | 8.5 | 0.0 | 8.5 |
| | ZnO | 0.0 | 0.0 | 0.0 | 0.0 | 0.0 | 0.0 | 0.0 | 0.0 |
| | SnO$_2$ | 0.2 | 0.2 | 0.2 | 0.2 | 0.2 | 0.2 | 0.2 | 0.2 |
| | [SiO$_2$] + [Al$_2$O$_3$] | 84.8 | 84.8 | 84.8 | 82.8 | 82.8 | 82.8 | 82.8 | 82.8 |
| | [MgO] + [CaO] + [SrO] + [BaO] | 15.0 | 15.0 | 15.0 | 17.0 | 17.0 | 17.0 | 17.0 | 17.0 |
| | [SrO] + [BaO] | 7.5 | 7.5 | 15.0 | 0.0 | 8.5 | 8.5 | 8.5 | 8.5 |
| | [B$_2$O$_3$]/([SrO] + [BaO]) | 0.0 | 0.0 | 0.0 | — | 0.0 | 0.0 | 0.0 | 0.0 |
| | [Al$_2$O$_3$] + [B$_2$O$_3$] − [CaO] − [SrO] − [BaO] | 0.0 | 0.0 | 0.0 | 4.5 | 4.5 | 4.5 | −4.0 | −4.0 |

TABLE 3-continued

|  |  |  |  |  |  |  |  |
|---|---|---|---|---|---|---|---|
| $[SiO_2] + 14[Al_2O_3] - 15[B_2O_3] + 6[MgO] + [CaO] + 14[SrO] + 16[BaO]$ | 392.3 | 407.3 | 504.8 | 311.3 | 421.8 | 438.3 | 379.3 | 396.3 |
| $17.8[SiO_2] + 23.1[Al_2O_3] + 3.7[B_2O_3] + 12.9[MgO] + 14.1[CaO] + 15.5[SrO] + 15.0[BaO] + 7.2[ZnO]$ | 1,810.9 | 1,807.2 | 1,817.7 | 1,772.2 | 1,784.1 | 1,779.9 | 1,794.3 | 1,790.1 |
| Thermal expansion coefficient ($10^{-7}$/° C.) | 41.0 | 43.0 | 46.4 | 35.5 | 38.3 | 40.3 | 44.5 | 46.9 |
| Density (g/cm³) | 2.623 | 2.736 | 2.838 | 2.503 | 2.631 | 2.757 | 2.654 | 2.782 |
| Strain point (° C.) | 806 | 798 | 816 | 760 | 767 | 770 | 774 | 762 |
| Annealing point (° C.) | 863 | 856 | 879 | 814 | 823 | 829 | 830 | 819 |
| Softening point (° C.) | 1,075 | 1,091 | 1,117 | 1,035 | 1,048 | 1,060 | 1,052 | 1,051 |
| $10^{4.5}$ dPa · s (° C.) | 1,393 | 1,411 | 1,444 | 1,339 | 1,362 | 1,383 | 1,367 | 1,382 |
| $10^{4.0}$ dPa · s (° C.) | 1,547 | 1,570 | 1,605 | 1,495 | 1,519 | 1,545 | 1,528 | 1,549 |
| $10^{3.0}$ dPa · s (° C.) | 1,648 | 1,673 | 1,708 | 1,597 | 1,620 | 1,651 | 1,633 | 1,656 |
| $10^{2.5}$ dPa · s (° C.) | 1,330 | 1,352 | 1,382 | 1,280 | 1,301 | 1,321 | 1,306 | 1,318 |
| Young's modulus (GPa) | 83.0 | 80.5 | 78.1 | 87.9 | 85.2 | 82.1 | 81.9 | 79.3 |
| Specific Young's modulus (GPa/g · cm⁻³) | 31.6 | 29.4 | 27.5 | 35.1 | 32.4 | 29.8 | 30.9 | 28.5 |
| β-OH (mm⁻¹) | 0.10 | 0.09 | 0.14 | 0.05 | 0.08 | 0.07 | 0.07 | 0.09 |

|  |  |  | No. 37 | No. 38 | No. 39 | No. 40 | No. 41 | No. 42 |
|---|---|---|---|---|---|---|---|---|
| mol % | SiO₂ |  | 69.8 | 63.8 | 63.8 | 63.8 | 63.8 | 63.8 |
|  | Al₂O₃ |  | 13.0 | 18.0 | 18.0 | 18.0 | 18.0 | 18.0 |
|  | B₂O₃ |  | 0.0 | 0.0 | 0.0 | 0.0 | 0.0 | 0.0 |
|  | MgO |  | 0.0 | 9.0 | 9.0 | 9.0 | 0.0 | 0.0 |
|  | CaO |  | 0.0 | 9.0 | 0.0 | 0.0 | 9.0 | 9.0 |
|  | SrO |  | 8.5 | 0.0 | 9.0 | 0.0 | 9.0 | 0.0 |
|  | BaO |  | 8.5 | 0.0 | 0.0 | 9.0 | 0.0 | 9.0 |
|  | ZnO |  | 0.0 | 0.0 | 0.0 | 0.0 | 0.0 | 0.0 |
|  | SnO₂ |  | 0.2 | 0.2 | 0.2 | 0.2 | 0.2 | 0.2 |
|  | $[SiO_2] + [Al_2O_3]$ |  | 82.8 | 81.8 | 81.8 | 81.8 | 81.8 | 81.8 |
|  | $[MgO] + [CaO] + [SrO] + [BaO]$ |  | 17.0 | 18.0 | 18.0 | 18.0 | 18.0 | 18.0 |
|  | $[SrO] + [BaO]$ |  | 17.0 | 0.0 | 9.0 | 9.0 | 9.0 | 9.0 |
|  | $[B_2O_3]/([SrO] + [BaO])$ |  | 0.0 | — | 0.0 | 0.0 | 0.0 | 0.0 |
|  | $[Al_2O_3] + [B_2O_3] - [CaO] - [SrO] - [BaO]$ |  | −4.0 | 9.0 | 9.0 | 9.0 | 0.0 | 0.0 |
|  | $[SiO_2] + 14[Al_2O_3] - 15[B_2O_3] + 6[MgO] + [CaO] + 14[SrO] + 16[BaO]$ |  | 506.8 | 378.8 | 495.8 | 513.8 | 450.8 | 468.8 |
|  | $17.8[SiO_2] + 23.1[Al_2O_3] + 3.7[B_2O_3] + 12.9[MgO] + 14.1[CaO] + 15.5[SrO] + 15.0[BaO] + 7.2[ZnO]$ |  | 1,802.0 | 1,794.4 | 1,807.0 | 1,802.5 | 1,817.8 | 1,813.3 |
| Thermal expansion coefficient ($10^{-7}$/° C.) |  |  | 49.6 | 36.6 | 39.1 | 40.1 | 45.1 | 46.8 |
| Density (g/cm³) |  |  | 2.901 | 2.565 | 2.695 | 2.825 | 2.708 | 2.838 |
| Strain point (° C.) |  |  | 768 | 766 | 771 | 777 | 802 | 797 |
| Annealing point (° C.) |  |  | 828 | 818 | 824 | 814 | 856 | 855 |
| Softening point (° C.) |  |  | 1,063 | 1,019 | 1,032 | 1,042 | 1,060 | 1,065 |
| $10^{4.5}$ dPa · s (° C.) |  |  | 1,404 | 1,283 | 1,305 | 1,326 | 1,328 | 1,346 |
| $10^{4.0}$ dPa · s (° C.) |  |  | 1,576 | 1,417 | 1,442 | 1,467 | 1,468 | 1,489 |
| $10^{3.0}$ dPa · s (° C.) |  |  | 1,686 | 1,505 | 1,531 | 1,559 | 1,559 | 1,582 |
| $10^{2.5}$ dPa · s (° C.) |  |  | 1,338 | 1,233 | 1,253 | 1,273 | 1,276 | 1,292 |
| Young's modulus (GPa) |  |  | 77.1 | 93.1 | 90.0 | 86.7 | 85.7 | 82.9 |
| Specific Young's modulus (GPa/g · cm⁻³) |  |  | 26.6 | 36.3 | 33.4 | 30.7 | 31.6 | 29.2 |
| β-OH (mm⁻¹) |  |  | 0.09 | 0.08 | 0.14 | 0.08 | 0.07 | 0.07 |

TABLE 4

|  |  | No. 43 | No. 44 | No. 45 | No. 46 | No. 47 | No. 48 | No. 49 | No. 50 |
|---|---|---|---|---|---|---|---|---|---|
| mol % | SiO₂ | 63.8 | 63.8 | 63.8 | 63.8 | 63.8 | 63.8 | 63.8 | 69.8 |
|  | Al₂O₃ | 18.0 | 16.0 | 16.0 | 16.0 | 16.0 | 16.0 | 16.0 | 15.0 |
|  | B₂O₃ | 0.0 | 0.0 | 0.0 | 0.0 | 0.0 | 0.0 | 0.0 | 0.0 |
|  | MgO | 0.0 | 10.0 | 10.0 | 10.0 | 0.0 | 0.0 | 0.0 | 0.0 |
|  | CaO | 0.0 | 10.0 | 0.0 | 0.0 | 10.0 | 10.0 | 0.0 | 10.0 |
|  | SrO | 9.0 | 0.0 | 10.0 | 0.0 | 10.0 | 0.0 | 10.0 | 5.0 |
|  | BaO | 9.0 | 0.0 | 0.0 | 10.0 | 0.0 | 10.0 | 10.0 | 0.0 |
|  | ZnO | 0.0 | 0.0 | 0.0 | 0.0 | 0.0 | 0.0 | 0.0 | 0.0 |
|  | SnO₂ | 0.2 | 0.2 | 0.2 | 0.2 | 0.2 | 0.2 | 0.2 | 0.2 |
|  | $[SiO_2] + [Al_2O_3]$ | 81.8 | 79.8 | 79.8 | 79.8 | 79.8 | 79.8 | 79.8 | 84.8 |
|  | $[MgO] + [CaO] + [SrO] + [BaO]$ | 18.0 | 20.0 | 20.0 | 20.0 | 20.0 | 20.0 | 20.0 | 15.0 |
|  | $[SrO] + [BaO]$ | 18.0 | 0.0 | 10.0 | 10.0 | 10.0 | 10.0 | 20.0 | 5.0 |

TABLE 4-continued

|  | | | | | | | | |
|---|---|---|---|---|---|---|---|---|
| $[B_2O_3]/([SrO] + [BaO])$ | 0.0 | — | 0.0 | 0.0 | 0.0 | 0.0 | 0.0 | 0.0 |
| $[Al_2O_3] + [B_2O_3] - [CaO] - [SrO] - [BaO]$ | 0.0 | 6.0 | 6.0 | 6.0 | -4.0 | -4.0 | -4.0 | 0.0 |
| $[SiO_2] + 14[Al_2O_3] - 15[B_2O_3] + 6[MgO] + [CaO] + 14[SrO] + 16[BaO]$ | 585.8 | 357.8 | 487.8 | 507.8 | 437.8 | 457.8 | 587.8 | 359.8 |
| $17.8[SiO_2] + 23.1[Al_2O_3] + 3.7[B_2O_3] + 12.9[MgO] + 14.1[CaO] + 15.5[SrO] + 15.0[BaO] + 7.2[ZnO]$ | 1,825.9 | 1,775.2 | 1,789.2 | 1,784.2 | 1,801.2 | 1,796.2 | 1,810.2 | 1,807.4 |
| Thermal expansion coefficient ($10^{-7}$/° C.) | 49.9 | 38.8 | 41.5 | 43.8 | 47.3 | 50.7 | 53.8 | 40.9 |
| Density (g/cm³) | 2.959 | 2.568 | 2.716 | 2.863 | 2.736 | 2.880 | 3.024 | 2.591 |
| Strain point (° C.) | 817 | 756 | 761 | 766 | 779 | 768 | 777 | 804 |
| Annealing point (° C.) | 876 | 807 | 813 | 820 | 832 | 823 | 833 | 861 |
| Softening point (° C.) | 1,053 | 1,008 | 1,020 | 1,033 | 1,034 | 1,036 | 1,052 | 1,080 |
| $10^{4.5}$ dPa·s (° C.) | 1,382 | 1,269 | 1,294 | 1,314 | 1,309 | 1,325 | 1,364 | 1,374 |
| $10^{4.0}$ dPa·s (° C.) | 1,528 | 1,404 | 1,433 | 1,456 | 1,451 | 1,472 | 1,504 | 1,534 |
| $10^{3.0}$ dPa·s (° C.) | 1,620 | 1,492 | 1,524 | 1,547 | 1,543 | 1,565 | 1,598 | 1,630 |
| $10^{2.5}$ dPa·s (° C.) | 1,316 | 1,219 | 1,241 | 1,260 | 1,256 | 1,269 | 1,305 | 1,316 |
| Young's modulus (GPa) | 80.0 | 92.1 | 88.7 | 85.1 | 84.7 | 81.6 | 79.0 | 83.7 |
| Specific Young's modulus (GPa/g·cm⁻³) | 27.0 | 35.9 | 32.7 | 29.7 | 31.0 | 28.3 | 26.1 | 32.3 |
| β-OH (mm⁻¹) | 0.05 | 0.11 | 0.15 | 0.06 | 0.11 | 0.06 | 0.04 | 0.08 |

|  | | No. 51 | No. 52 | No. 53 | No. 54 | No. 55 | No. 56 |
|---|---|---|---|---|---|---|---|
| mol % | $SiO_2$ | 69.8 | 69.8 | 69.8 | 66.5 | 69.8 | 69.8 |
|  | $Al_2O_3$ | 15.0 | 15.0 | 15.0 | 14.3 | 15.0 | 15.0 |
|  | $B_2O_3$ | 0.0 | 0.0 | 0.0 | 0.0 | 0.0 | 0.0 |
|  | MgO | 0.0 | 0.0 | 0.0 | 0.0 | 0.0 | 0.0 |
|  | CaO | 10.0 | 5.0 | 5.0 | 4.8 | 0.0 | 0.0 |
|  | SrO | 0.0 | 10.0 | 5.0 | 0.0 | 10.0 | 5.0 |
|  | BaO | 5.0 | 0.0 | 5.0 | 14.3 | 5.0 | 10.0 |
|  | ZnO | 0.0 | 0.0 | 0.0 | 0.0 | 0.0 | 0.0 |
|  | $SnO_2$ | 0.2 | 0.2 | 0.2 | 0.2 | 0.2 | 0.2 |
| $[SiO_2] + [Al_2O_3]$ | | 84.8 | 84.8 | 84.8 | 80.8 | 84.8 | 84.8 |
| $[MgO] + [CaO] + [SrO] + [BaO]$ | | 15.0 | 15.0 | 15.0 | 19.0 | 15.0 | 15.0 |
| $[SrO] + [BaO]$ | | 5.0 | 10.0 | 10.0 | 14.3 | 15.0 | 15.0 |
| $[B_2O_3]/([SrO] + [BaO])$ | | 0.0 | 0.0 | 0.0 | 0.0 | 0.0 | 0.0 |
| $[Al_2O_3] + [B_2O_3] - [CaO] - [SrO] - [BaO]$ | | 0.0 | 0.0 | 0.0 | -4.8 | 0.0 | 0.0 |
| $[SiO_2] + 14[Al_2O_3] - 15[B_2O_3] + 6[MgO] + [CaO] + 14[SrO] + 16[BaO]$ | | 369.8 | 424.8 | 434.8 | 499.8 | 499.8 | 509.8 |
| $17.8[SiO_2] + 23.1[Al_2O_3] + 3.7[B_2O_3] + 12.9[MgO] + 14.1[CaO] + 15.5[SrO] + 15.0[BaO] + 7.2[ZnO]$ | | 1,804.9 | 1,814.4 | 1,811.9 | 1,794.6 | 1,818.9 | 1,816.4 |
| Thermal expansion coefficient ($10^{-7}$/° C.) | | 42.1 | 42.4 | 43.8 | 53.2 | 45.9 | 47.4 |
| Density (g/cm³) | | 2.665 | 2.662 | 2.734 | 2.989 | 2.804 | 2.875 |
| Strain point (° C.) | | 798 | 808 | 800 | 758 | 818 | 818 |
| Annealing point (° C.) | | 856 | 867 | 862 | 816 | 880 | 882 |
| Softening point (° C.) | | 1,082 | 1,089 | 1,094 | 1,041 | 1,112 | 1,121 |
| $10^{4.5}$ dPa·s (° C.) | | 1,392 | 1,398 | 1,410 | 1,359 | 1,430 | 1,453 |
| $10^{4.0}$ dPa·s (° C.) | | 1,547 | 1,556 | 1,568 | 1,517 | 1,591 | 1,617 |
| $10^{3.0}$ dPa·s (° C.) | | 1,649 | 1,658 | 1,669 | 1,617 | 1,698 | 1,730 |
| $10^{2.5}$ dPa·s (° C.) | | 1,332 | 1,338 | 1,349 | 1,297 | 1,369 | 1,389 |
| Young's modulus (GPa) | | 82.0 | 82.2 | 81.1 | 78.4 | 79.2 | 77.5 |
| Specific Young's modulus (GPa/g·cm⁻³) | | 30.8 | 30.9 | 29.7 | 26.2 | 28.2 | 27.0 |
| β-OH (mm⁻¹) | | 0.09 | 0.10 | 0.11 | 0.09 | 0.09 | 0.03 |

TABLE 5

|  | | No. 57 | No. 58 | No. 59 | No. 60 | No. 61 | No. 62 | No. 63 | No. 64 |
|---|---|---|---|---|---|---|---|---|---|
| mol % | $SiO_2$ | 69.8 | 69.8 | 69.8 | 69.8 | 69.8 | 69.8 | 69.8 | 69.8 |
|  | $Al_2O_3$ | 15.0 | 15.0 | 15.0 | 15.0 | 15.0 | 15.0 | 15.0 | 15.0 |
|  | $B_2O_3$ | 0.0 | 0.0 | 0.0 | 0.0 | 0.0 | 0.0 | 0.0 | 0.0 |
|  | MgO | 5.0 | 5.0 | 5.0 | 5.0 | 5.0 | 5.0 | 10.0 | 10.0 |
|  | CaO | 10.0 | 5.0 | 5.0 | 0.0 | 0.0 | 0.0 | 5.0 | 0.0 |
|  | SrO | 0.0 | 5.0 | 0.0 | 10.0 | 5.0 | 0.0 | 0.0 | 5.0 |
|  | BaO | 0.0 | 0.0 | 5.0 | 0.0 | 5.0 | 10.0 | 0.0 | 0.0 |
|  | ZnO | 0.0 | 0.0 | 0.0 | 0.0 | 0.0 | 0.0 | 0.0 | 0.0 |
|  | $SnO_2$ | 0.2 | 0.2 | 0.2 | 0.2 | 0.2 | 0.2 | 0.2 | 0.2 |

TABLE 5-continued

|  |  |  |  |  |  |  |  |  |
|---|---|---|---|---|---|---|---|---|
| [SiO$_2$] + [Al$_2$O$_3$] | 84.8 | 84.8 | 84.8 | 84.8 | 84.8 | 84.8 | 84.8 | 84.8 |
| [MgO] + [CaO] + [SrO] + [BaO] | 15.0 | 15.0 | 15.0 | 15.0 | 15.0 | 15.0 | 15.0 | 15.0 |
| [SrO] + [BaO] | 0.0 | 5.0 | 5.0 | 10.0 | 10.0 | 10.0 | 0.0 | 5.0 |
| [B$_2$O$_3$]/([SrO] + [BaO]) | — | 0.0 | 0.0 | 0.0 | 0.0 | 0.0 | — | 0.0 |
| [Al$_2$O$_3$] + [B$_2$O$_3$] − [CaO] − [SrO] − [BaO] | 5.0 | 5.0 | 5.0 | 5.0 | 5.0 | 5.0 | 10.0 | 10.0 |
| [SiO$_2$] + 14[Al$_2$O$_3$] − 15[B$_2$O$_3$] + 6[MgO] + [CaO] + 14[SrO] + 16[BaO] | 319.8 | 384.8 | 394.8 | 449.8 | 459.8 | 469.8 | 344.8 | 409.8 |
| 17.8[SiO$_2$] + 23.1[Al$_2$O$_3$] + 3.7[B$_2$O$_3$] + 12.9[MgO] + 14.1[CaO] + 15.5[SrO] + 15.0[BaO] + 7.2[ZnO] | 1,794.4 | 1,801.4 | 1,798.9 | 1,808.4 | 1,805.9 | 1,803.4 | 1,788.4 | 1,795.4 |
| Thermal expansion coefficient (10$^{-7}$/° C.) | 35.4 | 36.9 | 37.8 | 38.4 | 39.5 | 40.7 | 32.2 | 33.7 |
| Density (g/cm$^3$) | 2.505 | 2.582 | 2.656 | 2.654 | 2.725 | 2.796 | 2.492 | 2.569 |
| Strain point (° C.) | 776 | 776 | 773 | 782 | 782 | 788 | 771 | 773 |
| Annealing point (° C.) | 833 | 834 | 833 | 841 | 843 | 850 | 825 | 830 |
| Softening point (° C.) | 1,052 | 1,058 | 1,064 | 1,070 | 1,076 | 1,087 | 1,043 | 1,051 |
| 10$^{4.5}$ dPa · s (° C.) | 1,345 | 1,364 | 1,375 | 1,381 | 1,393 | 1,411 | 1,334 | 1,351 |
| 10$^{4.0}$ dPa · s (° C.) | 1,498 | 1,523 | 1,532 | 1,538 | 1,553 | 1,571 | 1,484 | 1,501 |
| 10$^{3.0}$ dPa · s (° C.) | 1,595 | 1,625 | 1,632 | 1,639 | 1,655 | 1,674 | 1,581 | 1,601 |
| 10$^{2.5}$ dPa · s (° C.) | 1,288 | 1,305 | 1,315 | 1,321 | 1,332 | 1,349 | 1,278 | 1,293 |
| Young's modulus (GPa) | 88.3 | 67.1 | 85.3 | 84.9 | 83.4 | 81.7 | 90.7 | 88.7 |
| Specific Young's modulus (GPa/g · cm$^{-3}$) | 35.3 | 33.7 | 32.1 | 32.0 | 30.6 | 29.2 | 36.4 | 34.5 |
| β-OH (mm$^{-1}$) | 0.04 | 0.14 | 0.09 | 0.15 | 0.08 | 0.12 | 0.08 | 0.13 |

|  |  | No. 65 | No. 66 | No. 67 | No. 68 | No. 69 | No. 70 |
|---|---|---|---|---|---|---|---|
| mol % | SiO$_2$ | 69.8 | 69.8 | 69.8 | 69.8 | 69.8 | 69.8 |
|  | Al$_2$O$_3$ | 15.0 | 15.0 | 15.0 | 15.0 | 15.0 | 15.0 |
|  | B$_2$O$_3$ | 0.0 | 0.0 | 0.0 | 0.0 | 0.0 | 0.0 |
|  | MgO | 10.0 | 0.0 | 6.0 | 7.0 | 2.5 | 2.5 |
|  | CaO | 0.0 | 5.0 | 0.0 | 0.0 | 12.5 | 10.0 |
|  | SrO | 0.0 | 0.0 | 9.0 | 4.0 | 0.0 | 2.5 |
|  | BaO | 5.0 | 10.0 | 0.0 | 4.0 | 0.0 | 0.0 |
|  | ZnO | 0.0 | 0.0 | 0.0 | 0.0 | 0.0 | 0.0 |
|  | SnO$_2$ | 0.2 | 0.2 | 0.2 | 0.2 | 0.2 | 0.2 |
|  | [SiO$_2$] + [Al$_2$O$_3$] | 84.8 | 84.8 | 84.8 | 84.8 | 84.8 | 84.8 |
|  | [MgO] + [CaO] + [SrO] + [BaO] | 15.0 | 15.0 | 15.0 | 15.0 | 15.0 | 15.0 |
|  | [SrO] + [BaO] | 5.0 | 10.0 | 9.0 | 8.0 | 0.0 | 2.5 |
|  | [B$_2$O$_3$]/([SrO] + [BaO]) | 0.0 | 0.0 | 0.0 | 0.0 | — | 0.0 |
|  | [Al$_2$O$_3$] + [B$_2$O$_3$] − [CaO] − [SrO] − [BaO] | 10.0 | 0.0 | 6.0 | 7.0 | 2.5 | 2.5 |
|  | [SiO$_2$] + 14[Al$_2$O$_3$] − 15[B$_2$O$_3$] + 6[MgO] + [CaO] + 14[SrO] + 16[BaO] | 419.8 | 444.8 | 441.8 | 441.8 | 407.3 | 339.8 |
|  | 17.8[SiO$_2$] + 23.1[Al$_2$O$_3$] + 3.7[B$_2$O$_3$] + 12.9[MgO] + 14.1[CaO] + 15.5[SrO] + 15.0[BaO] + 7.2[ZnO] | 1,792.9 | 1,809.4 | 1,805.8 | 1,801.2 | 1,797.4 | 1,800.9 |
| Thermal expansion coefficient (10$^{-7}$/° C.) |  | 34.3 | 44.6 | 37.2 | 37.0 | 37.5 | 38.0 |
| Density (g/cm$^3$) |  | 2.644 | 2.790 | 2.637 | 2.671 | 2.513 | 2.550 |
| Strain point (° C.) |  | 774 | 798 | 777 | 774 | 786 | 784 |
| Annealing point (° C.) |  | 832 | 860 | 836 | 833 | 842 | 842 |
| Softening point (° C.) |  | 1,056 | 1,100 | 1,065 | 1,066 | 1,062 | 1,064 |
| 10$^{4.5}$ dPa · s (° C.) |  | 1,359 | 1,432 | 1,376 | 1,380 | 1,356 | 1,363 |
| 10$^{4.0}$ dPa · s (° C.) |  | 1,513 | 1,594 | 1,533 | 1,538 | 1,510 | 1,519 |
| 10$^{3.0}$ dPa · s (° C.) |  | 1,611 | 1,694 | 1,632 | 1,638 | 1,608 | 1,617 |
| 10$^{2.5}$ dPa · s (° C.) |  | 1,301 | 1,388 | 1,316 | 1,320 | 1,299 | 1,305 |
| Young's modulus (GPa) |  | 86.9 | 78.9 | 86.0 | 85.3 | 86.9 | 86.4 |
| Specific Young's modulus (GPa/g · cm$^{-3}$) |  | 32.9 | 28.3 | 32.6 | 31.9 | 34.6 | 33.9 |
| β-OH (mm$^{-1}$) |  | 0.14 | 0.03 | 0.09 | 0.12 | 0.06 | 0.06 |

TABLE 6

|  |  | No. 71 | No. 72 | No. 73 | No. 74 | No. 75 | No. 76 | No. 77 | No. 78 |
|---|---|---|---|---|---|---|---|---|---|
| mol % | SiO$_2$ | 69.8 | 69.8 | 69.8 | 69.8 | 69.8 | 69.8 | 69.8 | 69.8 |
|  | Al$_2$O$_3$ | 15.0 | 15.0 | 15.0 | 15.0 | 15.0 | 15.0 | 15.0 | 15.0 |
|  | B$_2$O$_3$ | 0.0 | 0.0 | 0.0 | 0.0 | 0.0 | 0.0 | 0.0 | 0.0 |
|  | MgO | 2.5 | 2.5 | 2.5 | 2.5 | 2.5 | 0.0 | 1.0 | 1.0 |
|  | CaO | 10.0 | 5.0 | 5.0 | 5.0 | 5.0 | 10.0 | 6.0 | 6.0 |
|  | SrO | 0.0 | 7.5 | 5.0 | 2.5 | 0.0 | 2.5 | 8.0 | 4.0 |

TABLE 6-continued

|  |  |  |  |  |  |  |  |  |
|---|---|---|---|---|---|---|---|---|
| BaO | 2.5 | 0.0 | 2.5 | 5.0 | 7.5 | 2.5 | 0.0 | 4.0 |
| ZnO | 0.0 | 0.0 | 0.0 | 0.0 | 0.0 | 0.0 | 0.0 | 0.0 |
| $SnO_2$ | 0.2 | 0.2 | 0.2 | 0.2 | 0.2 | 0.2 | 0.2 | 0.2 |
| $[SiO_2] + [Al_2O_3]$ | 84.8 | 84.8 | 84.8 | 84.8 | 84.8 | 84.8 | 84.8 | 84.8 |
| $[MgO] + [CaO] + [SrO] + [BaO]$ | 15.0 | 15.0 | 15.0 | 15.0 | 15.0 | 15.0 | 15.0 | 15.0 |
| $[SrO] + [BaO]$ | 2.5 | 7.5 | 7.5 | 7.5 | 7.5 | 5.0 | 8.0 | 8.0 |
| $[B_2O_3]/([SrO] + [BaO])$ | 0.0 | 0.0 | 0.0 | 0.0 | 0.0 | 0.0 | 0.0 | 0.0 |
| $[Al_2O_3] + [B_2O_3] - [CaO] - [SrO] - [BaO]$ | 2.5 | 2.5 | 2.5 | 2.5 | 2.5 | 0.0 | 1.0 | 1.0 |
| $[SiO_2] + 14[Al_2O_3] - 15[B_2O_3] + 6[MgO] + [CaO] + 14[SrO] + 16[BaO]$ | 344.8 | 404.8 | 409.8 | 414.8 | 419.8 | 364.8 | 403.8 | 411.8 |
| $17.8[SiO_2] + 23.1[Al_2O_3] + 3.7[B_2O_3] + 12.9[MgO] + 14.1[CaO] + 15.5[SrO] + 15.0[BaO] + 7.2[ZnO]$ | 1,799.7 | 1,807.9 | 1,806.7 | 1,805.4 | 1,804.2 | 1,806.2 | 1,810.4 | 1,808.4 |
| Thermal expansion coefficient ($10^{-7}/°C$) | 38.5 | 39.5 | 39.9 | 40.5 | 41.0 | 41.2 | 41.0 | 41.6 |
| Density ($g/cm^3$) | 2.583 | 2.621 | 2.654 | 2.689 | 2.719 | 2.624 | 2.632 | 2.685 |
| Strain point (°C.) | 780 | 783 | 782 | 779 | 780 | 797 | 795 | 790 |
| Annealing point (°C.) | 838 | 842 | 841 | 839 | 840 | 856 | 854 | 850 |
| Softening point (°C.) | 1,066 | 1,072 | 1,074 | 1,076 | 1,080 | 1,080 | 1,080 | 1,082 |
| $10^{4.5}$ dPa·s (°C.) | 1,368 | 1,381 | 1,388 | 1,392 | 1,403 | 1,387 | 1,390 | 1,400 |
| $10^{4.0}$ dPa·s (°C.) | 1,522 | 1,539 | 1,546 | 1,552 | 1,565 | 1,545 | 1,548 | 1,560 |
| $10^{3.0}$ dPa·s (°C.) | 1,621 | 1,638 | 1,646 | 1,654 | 1,667 | 1,646 | 1,649 | 1,661 |
| $10^{2.5}$ dPa·s (°C.) | 1,310 | 1,321 | 1,328 | 1,331 | 1,341 | 1,327 | 1,330 | 1,339 |
| Young's modulus (GPa) | 85.6 | 85.0 | 84.3 | 83.3 | 82.5 | 83.3 | 83.9 | 82.7 |
| Specific Young's modulus (GPa/g·cm$^{-3}$) | 33.2 | 32.4 | 31.8 | 31.0 | 30.4 | 31.7 | 31.9 | 30.8 |
| β-OH (mm$^{-1}$) | 0.03 | 0.13 | 0.14 | 0.14 | 0.11 | 0.11 | 0.15 | 0.04 |

|  |  |  | No. 79 | No. 80 | No. 81 | No. 82 | No. 83 | No. 84 |
|---|---|---|---|---|---|---|---|---|
| mol % | $SiO_2$ | | 69.8 | 69.8 | 69.8 | 69.8 | 69.8 | 69.8 |
| | $Al_2O_3$ | | 15.0 | 15.0 | 15.0 | 15.0 | 15.0 | 15.0 |
| | $B_2O_3$ | | 0.0 | 0.0 | 0.0 | 0.0 | 0.0 | 0.0 |
| | MgO | | 1.0 | 2.5 | 2.5 | 2.5 | 2.5 | 7.5 |
| | CaO | | 6.0 | 0.0 | 0.0 | 0.0 | 0.0 | 2.5 |
| | SrO | | 0.0 | 12.5 | 7.5 | 5.0 | 0.0 | 0.0 |
| | BaO | | 8.0 | 0.0 | 5.0 | 7.5 | 12.5 | 5.0 |
| | ZnO | | 0.0 | 0.0 | 0.0 | 0.0 | 0.0 | 0.0 |
| | $SnO_2$ | | 0.2 | 0.2 | 0.2 | 0.2 | 0.2 | 0.2 |
| | $[SiO_2] + [Al_2O_3]$ | | 84.8 | 84.8 | 84.8 | 84.8 | 84.8 | 84.8 |
| | $[MgO] + [CaO] + [SrO] + [BaO]$ | | 15.0 | 15.0 | 15.0 | 15.0 | 15.0 | 15.0 |
| | $[SrO] + [BaO]$ | | 8.0 | 12.5 | 12.5 | 12.5 | 12.5 | 5.0 |
| | $[B_2O_3]/([SrO] + [BaO])$ | | 0.0 | 0.0 | 0.0 | 0.0 | 0.0 | 0.0 |
| | $[Al_2O_3] + [B_2O_3] - [CaO] - [SrO] - [BaO]$ | | 1.0 | 2.5 | 2.5 | 2.5 | 2.5 | 7.5 |
| | $[SiO_2] + 14[Al_2O_3] - 15[B_2O_3] + 6[MgO] + [CaO] + 14[SrO] + 16[BaO]$ | | 419.8 | 469.8 | 479.8 | 484.8 | 496.8 | 407.3 |
| | $17.8[SiO_2] + 23.1[Al_2O_3] + 3.7[B_2O_3] + 12.9[MgO] + 14.1[CaO] + 15.5[SrO] + 15.0[BaO] + 7.2[ZnO]$ | | 1,806.4 | 1,814.9 | 1,812.4 | 1,811.2 | 1,808.7 | 1,795.9 |
| Thermal expansion coefficient ($10^{-7}/°C$) | | | 42.5 | 41.3 | 42.3 | 43.0 | 44.3 | 36.0 |
| Density ($g/cm^3$) | | | 2.736 | 2.693 | 2.748 | 2.785 | 2.844 | 2.649 |
| Strain point (°C.) | | | 788 | 793 | 790 | 788 | 795 | 774 |
| Annealing point (°C.) | | | 849 | 853 | 852 | 851 | 860 | 832 |
| Softening point (°C.) | | | 1,088 | 1,085 | 1,092 | 1,098 | 1,118 | 1,062 |
| $10^{4.5}$ dPa·s (°C.) | | | 1,410 | 1,400 | 1,417 | 1,426 | 1,441 | 1,370 |
| $10^{4.0}$ dPa·s (°C.) | | | 1,572 | 1,559 | 1,580 | 1,590 | 1,602 | 1,527 |
| $10^{3.0}$ dPa·s (°C.) | | | 1,675 | 1,660 | 1,663 | 1,692 | 1,704 | 1,627 |
| $10^{2.5}$ dPa·s (°C.) | | | 1,348 | 1,339 | 1,354 | 1,363 | 1,380 | 1,311 |
| Young's modulus (GPa) | | | 81.4 | 83.0 | 81.2 | 80.6 | 78.1 | 86.5 |
| Specific Young's modulus (GPa/g·cm$^{-3}$) | | | 29.8 | 30.8 | 29.5 | 28.9 | 27.5 | 32.6 |
| β-OH (mm$^{-1}$) | | | 0.14 | 0.03 | 0.07 | 0.15 | 0.09 | 0.13 |

TABLE 7

|  |  | No. 85 | No. 86 | No. 87 | No. 88 | No. 89 | No. 90 | No. 91 | No. 92 |
|---|---|---|---|---|---|---|---|---|---|
| mol % | $SiO_2$ | 69.8 | 69.8 | 69.8 | 69.8 | 69.8 | 69.8 | 69.8 | 69.8 |
| | $Al_2O_3$ | 15.0 | 15.0 | 15.0 | 15.0 | 15.0 | 15.0 | 15.0 | 15.0 |
| | $B_2O_3$ | 0..0 | 0.0 | 0.0 | 0.0 | 0.0 | 0.0 | 0.0 | 0.0 |

TABLE 7-continued

|  | | | | | | | | | |
|---|---|---|---|---|---|---|---|---|---|
| MgO | 7.5 | 5.0 | 5.0 | 5.0 | 2.5 | 2.5 | 2.5 | 2.5 |
| CaO | 0.0 | 2.5 | 2.5 | 0.0 | 7.5 | 2.5 | 2.5 | 2.5 |
| SrO | 2.5 | 2.5 | 0.0 | 2.5 | 0.0 | 5.0 | 2.5 | 0.0 |
| BaO | 5.0 | 5.0 | 7.5 | 7.5 | 5.0 | 5.0 | 7.5 | 10.0 |
| ZnO | 0.0 | 0.0 | 0.0 | 0.0 | 0.0 | 0.0 | 0.0 | 0.0 |
| $SnO_2$ | 0.2 | 0.2 | 0.2 | 0.2 | 0.2 | 0.2 | 0.2 | 0.2 |
| $[SiO_2] + [Al_2O_3]$ | 84.8 | 84.8 | 84.8 | 84.8 | 84.8 | 84.8 | 84.8 | 84.8 |
| $[MgO] + [CaO] + [SrO] + [BaO]$ | 15.0 | 15.0 | 15.0 | 15.0 | 15.0 | 15.0 | 15.0 | 15.0 |
| $[SrO] + [BaO]$ | 7.5 | 7.5 | 7.5 | 10.0 | 5.0 | 10.0 | 10.0 | 10.0 |
| $[B_2O_3]/([SrO] + [BaO])$ | 0.0 | 0.0 | 0.0 | 0.0 | 0.0 | 0.0 | 0.0 | 0.0 |
| $[Al_2O_3] + [B_2O_3] - [CaO] - [SrO] - [BaO]$ | 7.5 | 5.0 | 5.0 | 5.0 | 2.5 | 2.5 | 2.5 | 2.5 |
| $[SiO_2] + 14[Al_2O_3] - 15[B_2O_3] + 6[MgO] + [CaO] + 14[SrO] + 16[BaO]$ | 439.8 | 427.3 | 432.3 | 464.8 | 382.3 | 447.3 | 452.3 | 457.3 |
| $17.8[SiO_2] + 23.1[Al_2O_3] + 3.7[B_2O_3] + 12.9[MgO] + 14.1[CaO] + 15.5[SrO] + 15.0[BaO] + 7.2[ZnO]$ | 1,799.4 | 1,802.4 | 1,801.2 | 1,804.7 | 1,801.9 | 1,808.9 | 1,807.7 | 1,806.4 |
| Thermal expansion coefficient ($10^{-7}/°$ C.) | 36.9 | 39.1 | 38.9 | 40.1 | 39.7 | 41.3 | 42.0 | 42.7 |
| Density (g/cm³) | 2.585 | 2.691 | 2.727 | 2.764 | 2.660 | 2.731 | 2.765 | 2.804 |
| Strain point (° C.) | 778 | 777 | 780 | 783 | 782 | 786 | 788 | 789 |
| Annealing point (° C.) | 837 | 837 | 840 | 844 | 841 | 846 | 849 | 852 |
| Softening point (° C.) | 1,068 | 1,072 | 1,075 | 1,081 | 1,072 | 1,084 | 1,088 | 1,094 |
| $10^{4.5}$ dPa·s (° C.) | 1,379 | 1,385 | 1,393 | 1,401 | 1,384 | 1,404 | 1,414 | 1,420 |
| $10^{4.0}$ dPa·s (° C.) | 1,537 | 1,544 | 1,551 | 1,562 | 1,544 | 1,563 | 1,576 | 1,580 |
| $10^{3.0}$ dPa·s (° C.) | 1,639 | 1,644 | 1,651 | 1,664 | 1,646 | 1,664 | 1,678 | 1,680 |
| $10^{2.5}$ dPa·s (° C.) | 1,319 | 1,325 | 1,332 | 1,340 | 1,324 | 1,343 | 1,351 | 1,358 |
| Young's modulus (GPa) | 85.4 | 84.6 | 83.5 | 82.6 | 83.9 | 82.5 | 81.3 | 80.7 |
| Specific Young's modulus (GPa/g·cm⁻³) | 31.8 | 31.4 | 30.6 | 29.9 | 31.5 | 30.2 | 29.4 | 28.8 |
| β-OH (mm⁻¹) | 0.05 | 0.12 | 0.12 | 0.08 | 0.15 | 0.04 | 0.11 | 0.07 |

| | | | No. 93 | No. 94 | No. 95 | No. 96 | No. 97 | No. 98 |
|---|---|---|---|---|---|---|---|---|
| mol % | $SiO_2$ | | 69.8 | 69.8 | 69.8 | 69.8 | 69.8 | 68.8 |
| | $Al_2O_3$ | | 15.0 | 15.0 | 15.0 | 15.0 | 15.0 | 15.0 |
| | $B_2O_3$ | | 0.0 | 0.0 | 0.0 | 0.0 | 0.0 | 1.0 |
| | MgO | | 2.5 | 3.5 | 3.5 | 3.5 | 3.5 | 2.5 |
| | CaO | | 0.0 | 4.0 | 5.0 | 3.0 | 3.5 | 5.0 |
| | SrO | | 2.5 | 0.0 | 0.0 | 0.0 | 1.5 | 0.0 |
| | BaO | | 10.0 | 7.5 | 6.5 | 8.5 | 6.5 | 7.5 |
| | ZnO | | 0.0 | 0.0 | 0.0 | 0.0 | 0.0 | 0.0 |
| | $SnO_2$ | | 0.2 | 0.2 | 0.2 | 0.2 | 0.2 | 0.2 |
| | $[SiO_2] + [Al_2O_3]$ | | 84.8 | 84.8 | 84.8 | 84.8 | 84.8 | 83.8 |
| | $[MgO] + [CaO] + [SrO] + [BaO]$ | | 15.0 | 15.0 | 15.0 | 15.0 | 15.0 | 15.0 |
| | $[SrO] + [BaO]$ | | 12.5 | 7.5 | 6.5 | 8.5 | 8.0 | 7.5 |
| | $[B_2O_3]/([SrO] + [BaO])$ | | 0.0 | 0.0 | 0.0 | 0.0 | 0.0 | 0.1 |
| | $[Al_2O_3] + [B_2O_3] - [CaO] - [SrO] - [BaO]$ | | 2.5 | 3.5 | 3.5 | 3.5 | 3.5 | 3.5 |
| | $[SiO_2] + 14[Al_2O_3] - 15[B_2O_3] + 6[MgO] + [CaO] + 14[SrO] + 16[BaO]$ | | 489.8 | 424.8 | 409.8 | 439.8 | 429.3 | 403.8 |
| | $17.8[SiO_2] + 23.1[Al_2O_3] + 3.7[B_2O_3] + 12.9[MgO] + 14.1[CaO] + 15.5[SrO] + 15.0[BaO] + 7.2[ZnO]$ | | 1,809.9 | 1,803.0 | 1,802.1 | 1,803.9 | 1,804.2 | 1,790.1 |
| Thermal expansion coefficient ($10^{-7}/°$ C.) | | | 43.8 | 40.3 | 39.5 | 41.0 | 40.3 | 41.2 |
| Density (g/cm³) | | | 2.834 | 2.731 | 2.701 | 2.760 | 2.723 | 2.725 |
| Strain point (° C.) | | | 797 | 780 | 779 | 782 | 780 | 767 |
| Annealing point (° C.) | | | 860 | 841 | 839 | 844 | 840 | 827 |
| Softening point (° C.) | | | 1,104 | 1,078 | 1,074 | 1,084 | 1,077 | 1,065 |
| $10^{4.5}$ dPa·s (° C.) | | | 1,438 | 1,395 | 1,391 | 1,404 | 1,396 | 1,381 |
| $10^{4.0}$ dPa·s (° C.) | | | 1,602 | 1,555 | 1,548 | 1,566 | 1,556 | 1,539 |
| $10^{3.0}$ dPa·s (° C.) | | | 1,706 | 16.54 | 1,649 | 1,671 | 1,655 | 1,640 |
| $10^{2.5}$ dPa·s (° C.) | | | 1,374 | 1,334 | 1,330 | 1,342 | 1,335 | 1,321 |
| Young's modulus (GPa) | | | 79.6 | 82.9 | 83.4 | 82.4 | 83.3 | 81.4 |
| Specific Young's modulus (GPa/g·cm⁻³) | | | 28.1 | 30.4 | 30.9 | 29.8 | 30.6 | 29.9 |
| β-OH (mm⁻¹) | | | 0.05 | 0.07 | 0.06 | 0.13 | 0.09 | 0.03 |

TABLE 8

|  |  | No. 99 | No. 100 | No. 101 | No. 102 | No. 103 | No. 104 | No. 105 | No. 106 |
|---|---|---|---|---|---|---|---|---|---|
| mol % | SiO$_2$ | 70.8 | 70.8 | 69.8 | 69.8 | 69.8 | 68.8 | 70.8 | 70.8 |
|  | Al$_2$O$_3$ | 15.0 | 14.0 | 16.0 | 14.0 | 16.0 | 15.0 | 15.0 | 14.0 |
|  | B$_2$O$_3$ | 0..0 | 0.0 | 0.0 | 0.0 | 0.0 | 0.0 | 0.0 | 0.0 |
|  | MgO | 4.7 | 5.0 | 4.7 | 5.3 | 5.0 | 5.3 | 3.3 | 3.5 |
|  | CaO | 2.3 | 2.5 | 2.3 | 2.7 | 2.5 | 2.7 | 4.7 | 5.0 |
|  | SrO | 2.3 | 2.5 | 2.3 | 2.7 | 2.5 | 2.7 | 0.0 | 0.0 |
|  | BaO | 4.7 | 5.0 | 4.7 | 5.3 | 5.0 | 5.3 | 6.1 | 6.5 |
|  | ZnO | 0.0 | 0.0 | 0.0 | 0.0 | 0.0 | 0.0 | 0.0 | 0.0 |
|  | SnO$_2$ | 0.2 | 0.2 | 0.2 | 0.2 | 0.2 | 0.2 | 0.2 | 0.2 |
|  | [SiO$_2$] + [Al$_2$O$_3$] | 85.8 | 84.8 | 85.8 | 83.8 | 84.8 | 83.8 | 85.8 | 84.8 |
|  | [MgO] + [CaO] + [SrO] + [BaO] | 14.0 | 15.0 | 14.0 | 16.0 | 15.0 | 16.0 | 14.0 | 15.0 |
|  | [SrO] + [BaO] | 7.0 | 7.5 | 7.0 | 8.0 | 7.5 | 8.0 | 6.1 | 6.5 |
|  | [B$_2$O$_3$]/([SrO] + [BaO]) | 0.0 | 0.0 | 0.0 | 0.0 | 0.0 | 0.0 | 0.0 | 0.0 |
|  | [Al$_2$O$_3$] + [B$_2$O$_3$] − [CaO] − [SrO] − [BaO] | 5.7 | 4.0 | 6.7 | 3.3 | 6.0 | 4.3 | 4.3 | 2.5 |
|  | [SiO$_2$] + 14[Al$_2$O$_3$] − 15[B$_2$O$_3$] + 6[MgO] + [CaO] + 14[SrO] + 16[BaO] | 418.5 | 414.3 | 431.5 | 423.1 | 440.3 | 436.1 | 402.1 | 396.8 |
|  | 17.8[SiO$_2$] + 23.1[Al$_2$O$_3$] + 3.7[B$_2$O$_3$] + 12.9[MgO] + 14.1[CaO] + 15.5[SrO] + 15.0[BaO] + 7.2[ZnO] | 1,806.0 | 1,797.1 | 1,811.3 | 1,793.6 | 1,807.7 | 1,798.9 | 1,805.7 | 1,796.8 |
| Thermal expansion coefficient (10$^{-7}$/° C.) |  | 37.0 | 38.7 | 36.7 | 40.2 | 38.5 | 40.2 | 38.1 | 39.8 |
| Density (g/cm$^3$) |  | 2.667 | 2.682 | 2.676 | 2.706 | 2.700 | 2.716 | 2.677 | 2.692 |
| Strain point (° C.) |  | 781 | 774 | 782 | 769 | 779 | 773 | 784 | 777 |
| Annealing point (° C.) |  | 841 | 834 | 842 | 828 | 838 | 832 | 845 | 837 |
| Softening point (° C.) |  | 1,077 | 1,072 | 1,073 | 1,062 | 1,068 | 1,062 | 1,081 | 1,075 |
| 10$^{4.5}$ dPa · s (° C.) |  | 1,400 | 1,396 | 1,385 | 1,381 | 1,375 | 1,369 | 1,403 | 1,401 |
| 10$^{4.0}$ dPa · s (° C.) |  | 1,559 | 1,555 | 1,540 | 1,539 | 1,528 | 1,525 | 1,563 | 1,562 |
| 10$^{3.0}$ dPa · s (° C.) |  | 1,660 | 1,657 | 1,637 | 1,639 | 1,626 | 1,623 | 1,664 | 1,667 |
| 10$^{2.5}$ dPa · s (° C.) |  | 1,338 | 1,334 | 1,325 | 1,320 | 1,316 | 1,310 | 1,341 | 1,338 |
| Young's modulus (GPa) |  | 84.5 | 83.7 | 85.5 | 83.5 | 85.5 | 84.6 | 83.6 | 82.5 |
| Specific Young's modulus (GPa/g · cm$^{-3}$) |  | 31.7 | 31.2 | 31.9 | 30.9 | 31.7 | 31.2 | 31.2 | 30.6 |
| β-OH (mm$^{-1}$) |  | 0.06 | 0.11 | 0.10 | 0.15 | 0.13 | 0.03 | 0.09 | 0.06 |

|  |  | No. 107 | No. 108 | No. 109 | No. 110 | No. 111 | No. 112 |
|---|---|---|---|---|---|---|---|
| mol % | SiO$_2$ | 69.8 | 69.8 | 68.8 | 68.8 | 71.8 | 71.8 |
|  | Al$_2$O$_3$ | 16.0 | 14.0 | 16.0 | 15.0 | 14.0 | 13.0 |
|  | B$_2$O$_3$ | 0.0 | 0.0 | 0.0 | 0.0 | 0.0 | 1.0 |
|  | MgO | 3.3 | 3.7 | 3.5 | 3.7 | 4.7 | 5.0 |
|  | CaO | 4.7 | 5.3 | 5.0 | 5.3 | 2.3 | 2.5 |
|  | SrO | 0.0 | 0.0 | 0.0 | 0.0 | 2.3 | 2.5 |
|  | BaO | 6.1 | 6.9 | 6.5 | 6.9 | 4.7 | 5.0 |
|  | ZnO | 0.0 | 0.0 | 0.0 | 0.0 | 0.0 | 0.0 |
|  | SnO$_2$ | 0.2 | 0.2 | 0.2 | 0.2 | 0.2 | 0.2 |
|  | [SiO$_2$] + [Al$_2$O$_3$] | 85.8 | 83.8 | 84.8 | 83.8 | 85.8 | 84.8 |
|  | [MgO] + [CaO] + [SrO] + [BaO] | 14.0 | 16.0 | 15.0 | 16.0 | 14.0 | 15.0 |
|  | [SrO] + [BaO] | 6.1 | 6.9 | 6.5 | 6.9 | 7.0 | 7.5 |
|  | [B$_2$O$_3$]/([SrO] + [BaO]) | 0.0 | 0.0 | 0.0 | 0.0 | 0.0 | 0.0 |
|  | [Al$_2$O$_3$] + [B$_2$O$_3$] − [CaO] − [SrO] − [BaO] | 5.3 | 1.7 | 4.5 | 2.7 | 4.7 | 3.0 |
|  | [SiO$_2$] + 14[Al$_2$O$_3$] − 15[B$_2$O$_3$] + 6[MgO] + [CaO] + 14[SrO] + 16[BaO] | 415.1 | 404.5 | 422.8 | 417.5 | 405.5 | 401.3 |
|  | 17.8[SiO$_2$] + 23.1[Al$_2$O$_3$] + 3.7[B$_2$O$_3$] + 12.9[MgO] + 14.1[CaO] + 15.5[SrO] + 15.0[BaO] + 7.2 [ZnO] | 1,810.0 | 1,793.2 | 1,807.4 | 1,798.5 | 1,800.7 | 1,791.8 |
| Thermal expansion coefficient (10$^{-7}$/° C.) |  | 37.7 | 41.5 | 39.3 | 41.4 | 37.0 | 38.8 |
| Density (g/cm$^3$) |  | 2.687 | 2.718 | 2.711 | 2.726 | 2.658 | 2.674 |
| Strain point (° C.) |  | 787 | 770 | 783 | 776 | 780 | 772 |
| Annealing point (° C.) |  | 846 | 831 | 843 | 835 | 841 | 833 |
| Softening point (° C.) |  | 1,078 | 1,065 | 1,071 | 1,064 | 1,081 | 1,073 |
| 10$^{4.5}$ dPa · s (° C.) |  | 1,392 | 1,386 | 1,378 | 1,375 | 1,412 | 1,412 |
| 10$^{4.0}$ dPa · s (° C.) |  | 1,548 | 1,545 | 1,531 | 1,532 | 1,577 | 1,578 |
| 10$^{3.0}$ dPa · s (° C.) |  | 1,648 | 1,648 | 1,627 | 1,632 | 1,681 | 1,678 |
| 10$^{2.5}$ dPa · s (° C.) |  | 1,332 | 1,324 | 1,319 | 1,315 | 1,348 | 1,347 |
| Young's modulus (GPa) |  | 84.7 | 82.9 | 84.6 | 83.6 | 83.6 | 82.7 |
| Specific Young's modulus (GPa/g · cm$^{-3}$) |  | 31.5 | 30.5 | 31.2 | 30.7 | 31.4 | 30.9 |
| β-OH (mm$^{-1}$) |  | 0.15 | 0.05 | 0.09 | 0.11 | 0.15 | 0.15 |

TABLE 9

|  |  | No. 113 | No. 114 | No. 115 | No. 116 | No. 117 | No. 118 | No. 119 | No. 120 |
|---|---|---|---|---|---|---|---|---|---|
| mol % | SiO$_2$ | 70.8 | 69.8 | 71.8 | 71.8 | 70.8 | 71.8 | 70.8 | 69.8 |
|  | Al$_2$O$_3$ | 13.0 | 13.0 | 14.0 | 13.0 | 13.0 | 14.0 | 14.0 | 14.0 |
|  | B$_2$O$_3$ | 0.0 | 0.0 | 0.0 | 0.0 | 0.0 | 0.0 | 0.0 | 0.0 |
|  | MgO | 5.3 | 5.7 | 3.3 | 3.5 | 3.7 | 7.0 | 7.5 | 8.0 |
|  | CaO | 2.7 | 2.8 | 4.7 | 5.0 | 5.3 | 0.0 | 0.0 | 0.0 |
|  | SrO | 2.7 | 2.8 | 0.0 | 0.0 | 0.0 | 7.0 | 7.5 | 8.0 |
|  | BaO | 5.3 | 5.7 | 6.1 | 6.5 | 6.9 | 0.0 | 0.0 | 0.0 |
|  | ZnO | 0.0 | 0.0 | 0.0 | 0.0 | 0.0 | 0.0 | 0.0 | 0.0 |
|  | SnO$_2$ | 0.2 | 0.2 | 0.2 | 0.2 | 0.2 | 0.2 | 0.2 | 0.2 |
|  | [SiO$_2$] + [Al$_2$O$_3$] | 83.8 | 82.8 | 85.8 | 84.8 | 83.8 | 85.8 | 84.8 | 83.8 |
|  | [MgO] + [CaO] + [SrO] + [BaO] | 16.0 | 17.0 | 14.0 | 15.0 | 16.0 | 14.0 | 15.0 | 16.0 |
|  | [SrO] + [BaO] | 8.0 | 8.5 | 6.1 | 6.5 | 6.9 | 7.0 | 7.5 | 8.0 |
|  | [B$_2$O$_3$]/([SrO] + [BaO]) | 0.0 | 0.0 | 0.0 | 0.0 | 0.0 | 0.0 | 0.0 | 0.0 |
|  | [Al$_2$O$_3$] + [B$_2$O$_3$] − [CaO] − [SrO] − [BaO] | 2.3 | 1.7 | 3.3 | 1.5 | 0.7 | 7.0 | 6.5 | 6.0 |
|  | [SiO$_2$] + 14[Al$_2$O$_3$] − 15[B$_2$O$_3$] + 6[MgO] + [CaO] + 14[SrO] + 16[BaO] | 410.1 | 419.0 | 389.1 | 383.8 | 391.5 | 407.8 | 416.8 | 425.8 |
|  | 17.8[SiO$_2$] + 23.1[Al$_2$O$_3$] + 3.7[B$_2$O$_3$] + 12.9[MgO] + 14.1[CaO] + 15.5[SrO] + 15.0[BaO] + 7.2[ZnO] | 1,788.3 | 1,784.7 | 1,800.4 | 1,791.5 | 1,787.9 | 1,800.2 | 1,796.6 | 1,793.0 |
| Thermal expansion coefficient (10$^{-7}$/° C.) |  | 40.3 | 41.5 | 37.9 | 39.9 | 41.5 | 34.4 | 35.7 | 36.5 |
| Density (g/cm$^3$) |  | 2.698 | 2.724 | 2.668 | 2.685 | 2.710 | 2.584 | 2.601 | 2.621 |
| Strain point (° C.) |  | 766 | 761 | 782 | 772 | 765 | 780 | 777 | 773 |
| Annealing point (° C.) |  | 826 | 820 | 844 | 833 | 826 | 839 | 835 | 830 |
| Softening point (° C.) |  | 1,063 | 1,052 | 1,084 | 1,075 | 1,064 | 1,071 | 1,063 | 1,054 |
| 10$^{4.5}$ dPa · s (° C.) |  | 1,392 | 1,375 | 1,418 | 1,414 | 1,396 | 1,394 | 1,377 | 1,364 |
| 10$^{4.0}$ dPa · s (° C.) |  | 1,558 | 1,538 | 1,585 | 1,583 | 1,561 | 1,556 | 1,537 | 1,520 |
| 10$^{3.0}$ dPa · s (° C.) |  | 1,659 | 1,641 | 1,688 | 1,692 | 1,668 | 1,662 | 1,641 | 1,622 |
| 10$^{2.5}$ dPa · s (° C.) |  | 1,328 | 1,312 | 1,353 | 1,348 | 1,332 | 1,332 | 1,316 | 1,304 |
| Young's modulus (GPa) |  | 82.9 | 83.1 | 82.7 | 82.0 | 81.9 | 85.9 | 86.1 | 86.4 |
| Specific Young's modulus (GPa/g · cm$^{-3}$) |  | 30.7 | 30.5 | 31.0 | 30.5 | 30.2 | 33.2 | 33.1 | 33.0 |
| β-OH (mm$^{-1}$) |  | 0.14 | 0.15 | 0.09 | 0.07 | 0.09 | 0.06 | 0.08 | 0.10 |

|  |  | No. 121 | No. 122 | No. 123 | No. 124 | No. 125 | No. 126 |
|---|---|---|---|---|---|---|---|
| mol % | SiO$_2$ | 68.8 | 67.8 | 71.8 | 71.8 | 70.8 | 70.3 |
|  | Al$_2$O$_3$ | 15.0 | 16.0 | 13.0 | 12.0 | 13.0 | 14.0 |
|  | B$_2$O$_3$ | 0.0 | 0.0 | 0.0 | 0.0 | 0.0 | 0.0 |
|  | MgO | 8.0 | 8.0 | 7.5 | 8.0 | 8.0 | 7.8 |
|  | CaO | 0.0 | 0.0 | 0.0 | 0.0 | 0.0 | 0.0 |
|  | SrO | 8.0 | 8.0 | 7.5 | 8.0 | 8.0 | 7.8 |
|  | BaO | 0.0 | 0.0 | 0.0 | 0.0 | 0.0 | 0.0 |
|  | ZnO | 0.0 | 0.0 | 0.0 | 0.0 | 0.0 | 0.0 |
|  | SnO$_2$ | 0.2 | 0.2 | 0.2 | 0.2 | 0.2 | 0.2 |
|  | [SiO$_2$] + [Al$_2$O$_3$] | 83.8 | 83.8 | 84.8 | 83.8 | 83.8 | 84.3 |
|  | [MgO] + [CaO] + [SrO] + [BaO] | 16.0 | 16.0 | 15.0 | 16.0 | 16.0 | 15.5 |
|  | [SrO] + [BaO] | 8.0 | 8.0 | 7.5 | 8.0 | 8.0 | 7.8 |
|  | [B$_2$O$_3$]/([SrO] + [BaO]) | 0.0 | 0.0 | 0.0 | 0.0 | 0.0 | 0.0 |
|  | [Al$_2$O$_3$] + [B$_2$O$_3$] − [CaO] − [SrO] − [BaO] | 7.0 | 8.0 | 5.5 | 4.0 | 5.0 | 6.3 |
|  | [SiO$_2$] + 14[Al$_2$O$_3$] − 15[B$_2$O$_3$] + 6[MgO] + [CaO] + 14[SrO] + 16[BaO] | 438.8 | 451.8 | 403.8 | 399.8 | 412.8 | 421.3 |
|  | 17.8[SiO$_2$] + 23.1[Al$_2$O$_3$] + 3.7[B$_2$O$_3$] + 12.9[MgO] + 14.1[CaO] + 15.5[SrO] + 15.0[BaO] + 7.2[ZnO] | 1,798.3 | 1,803.6 | 1,791.3 | 1,782.4 | 1,787.7 | 1,794.8 |
| Thermal expansion coefficient (10$^{-7}$/° C.) |  | 36.7 | 37.0 | 35.6 | 37.1 | 37.0 | 36.4 |
| Density (g/cm$^3$) |  | 2.630 | 2.640 | 2.592 | 2.602 | 2.611 | 2.612 |
| Strain point (° C.) |  | 775 | 777 | 772 | 764 | 767 | 772 |
| Annealing point (° C.) |  | 832 | 833 | 830 | 822 | 825 | 829 |
| Softening point (° C.) |  | 1,052 | 1,049 | 1,065 | 1,057 | 1,055 | 1,058 |
| 10$^{4.5}$ dPa · s (° C.) |  | 1,355 | 1,343 | 1,389 | 1,382 | 1,372 | 1,368 |
| 10$^{4.0}$ dPa · s (° C.) |  | 1,509 | 1,492 | 1,549 | 1,544 | 1,531 | 1,524 |
| 10$^{3.0}$ dPa · s (° C.) |  | 1,607 | 1,587 | 1,652 | 1,649 | 1,633 | 1,623 |
| 10$^{2.5}$ dPa · s (° C.) |  | 1,296 | 1,286 | 1,327 | 1,319 | 1,311 | 1,308 |
| Young's modulus (GPa) |  | 87.4 | 88.4 | 85.3 | 84.6 | 85.4 | 86.2 |
| Specific Young's modulus (GPa/g · cm$^{-3}$) |  | 33.2 | 33.5 | 32.9 | 32.5 | 32.7 | 33.0 |
| β-OH (mm$^{-1}$) |  | 0.12 | 0.03 | 0.04 | 0.11 | 0.09 | 0.15 |

TABLE 10

|  |  | No. 127 | No. 128 | No. 129 | No. 130 | No. 131 | No. 132 | No. 133 | No. 134 |
|---|---|---|---|---|---|---|---|---|---|
| mol % | $SiO_2$ | 69.8 | 71.8 | 70.8 | 69.8 | 71.8 | 70.8 | 69.8 | 67.8 |
|  | $Al_2O_3$ | 14.5 | 13.5 | 14.5 | 14.5 | 13.5 | 14.5 | 15.5 | 15.0 |
|  | $B_2O_3$ | 0.0 | 0.0 | 0.0 | 0.0 | 0.0 | 0.0 | 0.0 | 0.0 |
|  | MgO | 7.8 | 4.8 | 4.8 | 5.2 | 3.4 | 3.4 | 3.4 | 7.5 |
|  | CaO | 0.0 | 2.4 | 2.4 | 2.6 | 4.8 | 4.8 | 4.8 | 0.0 |
|  | SrO | 7.8 | 2.4 | 2.4 | 2.6 | 0.0 | 0.0 | 0.0 | 7.5 |
|  | BaO | 0.0 | 4.8 | 4.8 | 5.2 | 6.3 | 6.3 | 6.3 | 0.0 |
|  | ZnO | 0.0 | 0.0 | 0.0 | 0.0 | 0.0 | 0.0 | 0.0 | 2.0 |
|  | $SnO_2$ | 0.2 | 0.2 | 0.2 | 0.2 | 0.2 | 0.2 | 0.2 | 0.2 |
|  | [$SiO_2$] + [$Al_2O_3$] | 84.3 | 85.3 | 85.3 | 84.3 | 85.3 | 85.3 | 85.3 | 82.8 |
|  | [MgO] + [CaO] + [SrO] + [BaO] | 15.5 | 14.5 | 14.5 | 15.5 | 14.5 | 14.5 | 14.5 | 15.0 |
|  | [SrO] + [BaO] | 7.8 | 7.3 | 7.3 | 7.8 | 6.3 | 6.3 | 6.3 | 7.5 |
|  | [$B_2O_3$]/([SrO] + [BaO]) | 0.0 | 0.0 | 0.0 | 0.0 | 0.0 | 0.0 | 0.0 | 0.0 |
|  | [$Al_2O_3$] + [$B_2O_3$] − [CaO] − [SrO] − [BaO] | 6.8 | 3.8 | 4.8 | 4.2 | 2.4 | 3.4 | 4.4 | 7.5 |
|  | [$SiO_2$] + 14[$Al_2O_3$] − 15[$B_2O_3$] + 6[MgO] + [CaO] + 14[SrO] + 16[BaO] | 427.8 | 403.4 | 416.4 | 425.2 | 386.5 | 399.5 | 412.5 | 427.8 |
|  | 17.8[$SiO_2$] + 23.1[$Al_2O_3$] + 3.7[$B_2O_3$] + 12.9[MgO] + 14.1[CaO] + 15.5[SrO] + 15.0[BaO] + 7.2[ZnO] | 1,797.5 | 1,796.3 | 1,801.6 | 1,798.0 | 1,795.9 | 1,801.2 | 1,806.5 | 1,780.7 |
| Thermal expansion coefficient ($10^{-7}/°$ C.) | | 36.3 | 38.1 | 37.7 | 39.0 | 38.9 | 38.9 | 38.5 | 36.5 |
| Density (g/cm³) | | 2.617 | 2.665 | 2.675 | 2.699 | 2.676 | 2.686 | 2.694 | 2.662 |
| Strain point (° C.) | | 773 | 774 | 776 | 772 | 776 | 779 | 780 | 757 |
| Annealing point (° C.) | | 831 | 835 | 836 | 832 | 837 | 839 | 841 | 812 |
| Softening point (° C.) | | 1,056 | 1,077 | 1,075 | 1,065 | 1,080 | 1,078 | 1,075 | 1,031 |
| $10^{4.5}$ dPa · s (° C.) | | 1,364 | 1,408 | 1,399 | 1,383 | 1,412 | 1,401 | 1,392 | 1,331 |
| $10^{4.0}$ dPa · s (° C.) | | 1,518 | 1,570 | 1,559 | 1,543 | 1,576 | 1,561 | 1,549 | 1,481 |
| $10^{3.0}$ dPa · s (° C.) | | 1,616 | 1,672 | 1,661 | 1,643 | 1,680 | 1,662 | 1,649 | 1,577 |
| $10^{2.5}$ dPa · s (° C.) | | 1,305 | 1,345 | 1,337 | 1,322 | 1,348 | 1,339 | 1,331 | 1,273 |
| Young's modulus (GPa) | | 86.4 | 83.1 | 83.9 | 84.0 | 82.1 | 83.0 | 83.7 | 88.1 |
| Specific Young's modulus (GPa/g · cm⁻³) | | 33.0 | 31.2 | 31.4 | 31.1 | 30.7 | 30.9 | 31.1 | 33.1 |
| β-OH (mm⁻¹) | | 0.09 | 0.07 | 0.12 | 0.03 | 0.14 | 0.14 | 0.11 | 0.13 |

|  |  | No. 135 | No. 136 | No. 137 | No. 138 | No. 139 | No. 140 |
|---|---|---|---|---|---|---|---|
| mol % | $SiO_2$ | 65.8 | 69.8 | 69.8 | 67.8 | 65.8 | 69.8 |
|  | $Al_2O_3$ | 15.0 | 15.0 | 15.0 | 15.0 | 15.0 | 15.0 |
|  | $B_2O_3$ | 0.0 | 0.0 | 0.0 | 0.0 | 0.0 | 0.0 |
|  | MgO | 7.5 | 6.5 | 5.5 | 0.0 | 0.0 | 0.0 |
|  | CaO | 0.0 | 0.0 | 0.0 | 10.0 | 10.0 | 9.0 |
|  | SrO | 7.5 | 6.5 | 5.5 | 0.0 | 0.0 | 0.0 |
|  | BaO | 0.0 | 0.0 | 0.0 | 5.0 | 5.0 | 4.0 |
|  | ZnO | 4.0 | 2.0 | 4.0 | 2.0 | 4.0 | 2.0 |
|  | $SnO_2$ | 0.2 | 0.2 | 0.2 | 0.2 | 0.2 | 0.2 |
|  | [$SiO_2$] + [$Al_2O_3$] | 80.8 | 84.8 | 84.8 | 82.8 | 80.8 | 84.8 |
|  | [MgO] + [CaO] + [SrO] + [BaO] | 15.0 | 13.0 | 11.0 | 15.0 | 15.0 | 13.0 |
|  | [SrO] + [BaO] | 7.5 | 6.5 | 5.5 | 5.0 | 5.0 | 4.0 |
|  | [$B_2O_3$]/([SrO] + [BaO]) | 0.0 | 0.0 | 0.0 | 0.0 | 0.0 | 0.0 |
|  | [$Al_2O_3$] + [$B_2O_3$] − [CaO] − [SrO] − [BaO] | 7.5 | 8.5 | 9.5 | 0.0 | 0.0 | 2.0 |
|  | [$SiO_2$] + 14[$Al_2O_3$] − 15[$B_2O_3$] + 6[MgO] + [CaO] + 14[SrO] + 16[BaO] | 425.8 | 409.8 | 389.8 | 367.8 | 365.8 | 352.8 |
|  | 17.8[$SiO_2$] + 23.1[$Al_2O_3$] + 3.7[$B_2O_3$] + 12.9[MgO] + 14.1[CaO] + 15.5[SrO] + 15.0[BaO] + 7.2[ZnO] | 1,759.5 | 1,787.9 | 1,773.9 | 1,783.7 | 1,762.5 | 1,790.2 |
| Thermal expansion coefficient ($10^{-7}/°$ C.) | | 37.5 | 33.6 | 31.9 | 42.2 | 43.0 | 38.7 |
| Density (g/cm³) | | 2.710 | 2.623 | 2.631 | 2.715 | 2.763 | 2.659 |
| Strain point (° C.) | | 742 | 762 | 751 | 763 | 742 | 770 |
| Annealing point (° C.) | | 796 | 820 | 808 | 820 | 796 | 830 |
| Softening point (° C.) | | 1,008 | 1,046 | 1,035 | 1,045 | 1,015 | 1,061 |
| $10^{4.5}$ dPa · s (° C.) | | 1,295 | 1,354 | 1,346 | 1,349 | 1,311 | 1,373 |
| $10^{4.0}$ dPa · s (° C.) | | 1,440 | 1,509 | 1,500 | 1,501 | 1,459 | 1,529 |
| $10^{3.0}$ dPa · s (° C.) | | 1,536 | 1,607 | 1,599 | 1,600 | 1,555 | 1,629 |
| $10^{2.5}$ dPa · s (° C.) | | 1,240 | 1,295 | 1,286 | 1,291 | 1,254 | 1,313 |
| Young's modulus (GPa) | | 88.9 | 87.6 | 88.2 | 83.8 | 85.3 | 84.1 |
| Specific Young's modulus (GPa/g · cm⁻³) | | 32.8 | 33.4 | 33.5 | 30.9 | 30.9 | 31.6 |
| β-OH (mm⁻¹) | | 0.06 | 0.07 | 0.08 | 0.10 | 0.09 | 0.07 |

TABLE 11

| | | No. 141 | No. 142 | No. 143 | No. 144 | No. 145 | No. 146 | No. 147 | No. 148 | No. 149 | No. 150 | No. 151 | No. 152 | No. 153 | No. 154 |
|---|---|---|---|---|---|---|---|---|---|---|---|---|---|---|---|
| mol % | SiO$_2$ | 69.8 | 69.8 | 70.8 | 70.8 | 69.8 | 69.8 | 68.8 | 68.8 | 68.9 | 68.9 | 68.9 | 68.9 | 70.5 | 69.5 |
| | Al$_2$O$_3$ | 15.0 | 11.4 | 11.4 | 10.4 | 12.4 | 10.4 | 12.4 | 11.4 | 13.6 | 13.6 | 14.1 | 14.6 | 13.1 | 13.1 |
| | B$_2$O$_3$ | 0.0 | 0.0 | 0.0 | 0.0 | 0.0 | 0.0 | 0.0 | 0.0 | 3.4 | 2.4 | 3.4 | 2.4 | 0.3 | 0.3 |
| | MgO | 0.0 | 9.3 | 8.3 | 9.3 | 8.3 | 10.3 | 9.3 | 10.3 | 1.7 | 1.7 | 1.7 | 1.7 | 6.1 | 7.1 |
| | CaO | 8.0 | 0.0 | 0.0 | 0.0 | 0.0 | 0.0 | 0.0 | 0.0 | 9.4 | 10.4 | 8.4 | 8.4 | 3.8 | 3.8 |
| | SrO | 0.0 | 9.3 | 9.3 | 9.3 | 9.3 | 9.3 | 9.3 | 9.3 | 1.6 | 1.6 | 1.6 | 1.6 | 2.1 | 2.1 |
| | BaO | 3.0 | 0.0 | 0.0 | 0.0 | 0.0 | 0.0 | 0.0 | 0.0 | 1.2 | 1.2 | 1.7 | 2.2 | 3.9 | 3.9 |
| | ZnO | 4.0 | 0.0 | 0.0 | 0.0 | 0.0 | 0.0 | 0.0 | 0.0 | 0.0 | 0.0 | 0.0 | 0.0 | 0.0 | 0.0 |
| | SnO$_2$ | 0.2 | 0.2 | 0.2 | 0.2 | 0.2 | 0.2 | 0.2 | 0.2 | 0.2 | 0.2 | 0.2 | 0.2 | 0.2 | 0.2 |
| | [SiO$_2$] + [Al$_2$O$_3$] | 84.8 | 81.2 | 82.2 | 81.2 | 82.2 | 80.2 | 81.2 | 80.2 | 82.5 | 82.5 | 83.0 | 83.5 | 83.6 | 82.6 |
| | [MgO] + [CaO] + [SrO] + [BaO] | 11.0 | 18.6 | 17.6 | 18.6 | 17.6 | 19.6 | 18.6 | 19.6 | 13.9 | 14.9 | 13.4 | 13.9 | 15.9 | 16.9 |
| | [SrO] + [BaO] | 3.0 | 9.3 | 9.3 | 9.3 | 9.3 | 9.3 | 9.3 | 9.3 | 2.8 | 2.8 | 3.3 | 3.8 | 6.0 | 6.0 |
| | [B$_2$O$_3$]/([SrO] + [BaO]) | 0.0 | 0.0 | 0.0 | 0.0 | 0.0 | 0.0 | 0.0 | 0.0 | 1.2 | 0.9 | 1.0 | 0.6 | 0.1 | 0.1 |
| | [Al$_2$O$_3$] + [B$_2$O$_3$] − [CaO] − [SrO] − [BaO] | 4.0 | 2.1 | 2.1 | 1.1 | 3.1 | 1.1 | 3.1 | 2.1 | 4.8 | 2.8 | 5.8 | 4.8 | 3.6 | 3.6 |
| | [SiO$_2$] + 14[Al$_2$O$_3$] − 15[B$_2$O$_3$] + 6[MgO] + [CaO] + 14[SrO] + 16[BaO] | 335.8 | 415.4 | 410.4 | 402.4 | 423.4 | 407.4 | 428.4 | 420.4 | 269.5 | 285.5 | 283.5 | 313.5 | 381.6 | 386.6 |
| | 17.8[SiO$_2$] + 23.1[Al$_2$O$_3$] + 3.7[B$_2$O$_3$] + 12.9[MgO] + 14.1[CaO] + 15.5[SrO] + 15.0[BaO] + 7.2[ZnO] | 1,775.5 | 1,769.9 | 1,774.8 | 1,764.6 | 1,780.1 | 1,759.7 | 1,775.2 | 1,765.0 | 1,750.4 | 1,760.8 | 1,755.4 | 1,770.7 | 1,781.9 | 1,770.0 |
| Thermal expansion coefficient (10$^{-7}$/° C.) | | 35.7 | 40.5 | 39.9 | 40.9 | 39.9 | 42.5 | 40.2 | 41.2 | 37.4 | 38.9 | 37.0 | 37.5 | 38.5 | 39.1 |
| Density (g/cm$^3$) | | 2.653 | 2.649 | 2.638 | 2.644 | 2.670 | 2.671 | 2.659 | 2.662 | 2.528 | 2.546 | 2.543 | 2.572 | 2.644 | 2.655 |
| Strain point (° C.) | | 754 | 754 | 758 | 750 | 761 | 743 | 757 | 749 | 736 | 745 | 740 | 752 | 761 | 755 |
| Annealing point (° C.) | | 812 | 809 | 814 | 805 | 818 | 797 | 812 | 804 | 795 | 803 | 799 | 812 | 819 | 812 |
| Softening point (° C.) | | 1,043 | 1,033 | 1,042 | 1,031 | 1,043 | 1,015 | 1,032 | 1,023 | 1,028 | 1,032 | 1,033 | 1,043 | 1,054 | 1,043 |
| 10$^{4.5}$ dPa · s (° C.) | | 1,355 | 1,343 | 1,361 | 1,348 | 1,356 | 1,318 | 1,338 | 1,326 | 1,339 | 1,341 | 1,346 | 1,354 | 1,377 | 1,356 |
| 10$^{4.0}$ dPa · s (° C.) | | 1,512 | 1,503 | 1,524 | 1,510 | 1,516 | 1,476 | 1,494 | 1,483 | 1,499 | 1,498 | 1,504 | 1,510 | 1,540 | 1,515 |
| 10$^{3.0}$ dPa · s (° C.) | | 1,613 | 1,607 | 1,627 | 1,616 | 1,619 | 1,580 | 1,594 | 1,585 | 1,602 | 1,598 | 1,606 | 1,610 | 1,643 | 1,617 |
| 10$^{2.5}$ dPa · s (° C.) | | 1,295 | 1,283 | 1,299 | 1,286 | 1,295 | 1,259 | 1,278 | 1,267 | 1,279 | 1,281 | 1,286 | 1,294 | 1,315 | 1,296 |
| Young's modulus (GPa) | | 85.6 | 84.7 | 84.0 | 83.8 | 85.0 | 84.8 | 85.6 | 85.5 | 85.9 | 81.9 | 80.7 | 81.9 | 83.9 | 84.6 |
| Specific Young's modulus (GPa/g · cm$^{-3}$) | | 32.3 | 32.0 | 31.8 | 31.7 | 31.8 | 31.8 | 32.2 | 32.1 | 34.0 | 32.2 | 31.7 | 31.9 | 30.7 | 31.9 |
| β-OH (mm$^{-1}$) | | 0.05 | 0.08 | 0.04 | 0.08 | 0.14 | 0.05 | 0.11 | 0.09 | 0.14 | 0.04 | 0.05 | 0.09 | 0.11 | 0.13 |

TABLE 12

| | | No. 155 | No. 156 | No. 157 | No. 158 | No. 159 | No. 160 | No. 161 | No. 162 | No. 163 | No. 164 | No. 165 | No. 166 | No. 167 | No. 168 |
|---|---|---|---|---|---|---|---|---|---|---|---|---|---|---|---|
| mol % | $SiO_2$ | 68.5 | 69.5 | 68.5 | 69.8 | 68.8 | 69.8 | 69.8 | 69.8 | 69.8 | 69.8 | 68.8 | 68.8 | 68.8 | 68.8 |
| | $Al_2O_3$ | 13.1 | 14.1 | 14.1 | 14.0 | 14.0 | 14.0 | 14.0 | 14.0 | 14.0 | 14.0 | 14.0 | 14.0 | 14.0 | 14.0 |
| | $B_2O_3$ | 0.3 | 0.3 | 0.3 | 1.0 | 2.0 | 1.0 | 1.0 | 1.0 | 1.0 | 1.0 | 2.0 | 2.0 | 2.0 | 2.0 |
| | MgO | 8.1 | 6.1 | 7.1 | 7.5 | 7.5 | 7.5 | 7.5 | 7.5 | 7.5 | 7.5 | 7.5 | 7.5 | 7.5 | 7.5 |
| | CaO | 3.8 | 3.8 | 3.8 | 0.0 | 0.0 | 1.0 | 0.0 | 2.0 | 5.5 | 0.0 | 1.0 | 0.0 | 2.0 | 1.0 |
| | SrO | 2.1 | 2.1 | 2.1 | 7.5 | 7.5 | 6.5 | 6.5 | 5.5 | 1.0 | 5.5 | 6.5 | 6.5 | 5.5 | 5.5 |
| | BaO | 3.9 | 3.9 | 3.9 | 0.0 | 0.0 | 0.0 | 1.0 | 0.0 | 1.0 | 2.0 | 0.0 | 1.0 | 0.0 | 1.0 |
| | ZnO | 0.0 | 0.0 | 0.0 | 0.0 | 0.0 | 0.0 | 0.0 | 0.0 | 0.0 | 0.0 | 0.0 | 0.0 | 0.0 | 0.0 |
| | $SnO_2$ | 0.2 | 0.2 | 0.2 | 0.2 | 0.2 | 0.2 | 0.2 | 0.2 | 0.2 | 0.2 | 0.2 | 0.2 | 0.2 | 0.2 |
| | $[SiO_2] + [Al_2O_3]$ | 81.6 | 83.6 | 82.6 | 83.8 | 82.8 | 83.8 | 83.8 | 83.8 | 83.8 | 83.8 | 82.8 | 82.8 | 82.8 | 82.8 |
| | $[MgO] + [CaO] + [SrO] + [BaO]$ | 17.9 | 15.9 | 16.9 | 15.0 | 15.0 | 15.0 | 15.0 | 15.0 | 15.0 | 15.0 | 15.0 | 15.0 | 15.0 | 15.0 |
| | $[SrO] + [BaO]$ | 6.0 | 6.0 | 6.0 | 7.5 | 7.5 | 6.5 | 7.5 | 5.5 | 6.5 | 7.5 | 6.5 | 7.5 | 5.5 | 6.5 |
| | $[B_2O_3]/([SrO] + [BaO])$ | 0.1 | 0.1 | 0.1 | 0.1 | 0.3 | 0.2 | 0.1 | 0.2 | 0.2 | 0.1 | 0.3 | 0.3 | 0.4 | 0.3 |
| | $[Al_2O_3] + [B_2O_3] - [CaO] - [SrO] - [BaO]$ | 3.6 | 4.6 | 7.5 | 8.5 | 7.5 | 7.5 | 7.5 | 7.5 | 7.5 | 7.5 | 8.5 | 8.5 | 8.5 | 8.5 |
| | $[SiO_2] + 14[Al_2O_3] - 15[B_2O_3] + 6[MgO] + [CaO] + 14[SrO] + 16[BaO]$ | 391.6 | 394.6 | 399.6 | 400.8 | 384.8 | 387.8 | 402.8 | 374.8 | 389.8 | 404.8 | 371.8 | 386.8 | 358.8 | 373.8 |
| | $17.8[SiO_2] + 23.1[Al_2O_3] + 3.7[B_2O_3] + 12.9[MgO] + 14.1[CaO] + 15.5[SrO] + 15.0[BaO] + 7.2[ZnO]$ | 1,772.1 | 1,787.2 | 1,782.3 | 1,782.5 | 1,768.4 | 1,781.1 | 1,782.0 | 1,779.7 | 1,780.6 | 1,781.5 | 1,767.0 | 1,767.9 | 1,765.6 | 1,766.5 |
| Thermal expansion coefficient ($10^{-7}$/° C.) | | 39.6 | 37.9 | 38.8 | 35.4 | 35.8 | 35.3 | 35.3 | 35.1 | 35.5 | 36.4 | 35.7 | 36.2 | 35.3 | 35.6 |
| Density (g/cm³) | | 2.667 | 2.653 | 2.664 | 2.595 | 2.590 | 2.581 | 2.609 | 2.566 | 2.594 | 2.625 | 2.575 | 2.602 | 2.561 | 2.589 |
| Strain point (° C.) | | 750 | 765 | 759 | 762 | 750 | 760 | 761 | 760 | 760 | 761 | 748 | 748 | 746 | 746 |
| Annealing point (° C.) | | 807 | 822 | 816 | 820 | 807 | 817 | 819 | 816 | 817 | 819 | 805 | 806 | 803 | 804 |
| Softening point (° C.) | | 1,033 | 1,052 | 1,042 | 1,047 | 1,032 | 1,045 | 1,048 | 1,043 | 1,047 | 1,050 | 1,031 | 1,033 | 1,029 | 1,032 |
| $10^{4.5}$ dPa · s (° C.) | | 1,337 | 1,364 | 1,347 | 1,365 | 1,341 | 1,357 | 1,364 | 1,355 | 1,361 | 1,370 | 1,343 | 1,345 | 1,339 | 1,340 |
| $10^{4.0}$ dPa · s (° C.) | | 1,492 | 1,522 | 1,503 | 1,527 | 1,496 | 1,512 | 1,523 | 1,513 | 1,519 | 1,528 | 1,497 | 1,501 | 1,494 | 1,497 |
| $10^{3.0}$ dPa · s (° C.) | | 1,590 | 1,623 | 1,602 | 1,629 | 1,595 | 1,610 | 1,622 | 1,612 | 1,617 | 1,627 | 1,596 | 1,602 | 1,592 | 1,596 |
| $10^{2.5}$ dPa · s (° C.) | | 1,278 | 1,304 | 1,288 | 1,303 | 1,281 | 1,297 | 1,303 | 1,295 | 1,301 | 1,308 | 1,283 | 1,285 | 1,279 | 1,281 |
| Young's modulus (GPa) | | 85.4 | 84.9 | 85.6 | 85.0 | 84.0 | 85.5 | 84.7 | 85.9 | 85.2 | 84.4 | 84.5 | 83.8 | 84.9 | 84.6 |
| Specific Young's modulus (GPa/g · cm⁻³) | | 32.0 | 32.0 | 32.1 | 32.7 | 32.4 | 33.1 | 32.5 | 33.5 | 32.8 | 32.1 | 32.8 | 32.2 | 33.1 | 32.5 |
| β-OH (mm⁻¹) | | 0.12 | 0.06 | 0.07 | 0.09 | 0.03 | 0.11 | 0.13 | 0.03 | 0.08 | 0.06 | 0.09 | 0.15 | 0.08 | 0.12 |

TABLE 13

| | | No. 169 | No. 170 | No. 171 | No. 172 | No. 173 | No. 174 | No. 175 | No. 176 | No. 177 | No. 178 | No. 179 | No. 180 | No. 181 | No. 182 |
|---|---|---|---|---|---|---|---|---|---|---|---|---|---|---|---|
| mol % | $SiO_2$ | 68.8 | 70.2 | 69.8 | 69.8 | 69.8 | 68.9 | 68.9 | 68.9 | 68.9 | 70.0 | 69.5 | 70.2 | 69.7 | 68.9 |
| | $Al_2O_3$ | 14.0 | 12.9 | 12.9 | 12.9 | 12.9 | 13.6 | 13.6 | 13.6 | 13.6 | 13.1 | 13.1 | 12.9 | 12.9 | 13.6 |
| | $B_2O_3$ | 2.0 | 0.3 | 0.3 | 0.3 | 0.3 | 3.4 | 2.4 | 3.4 | 2.4 | 0.3 | 0.3 | 0.0 | 0.0 | 3.9 |
| | MgO | 7.5 | 6.3 | 6.5 | 7.0 | 6.5 | 2.2 | 2.7 | 2.7 | 3.2 | 6.1 | 6.4 | 6.4 | 6.4 | 1.7 |
| | CaO | 0.0 | 3.9 | 4.0 | 4.0 | 4.5 | 8.4 | 8.4 | 7.4 | 7.4 | 3.8 | 3.8 | 3.8 | 3.8 | 8.4 |
| | SrO | 5.5 | 2.2 | 2.2 | 1.7 | 1.7 | 1.6 | 1.6 | 1.6 | 1.6 | 2.1 | 2.1 | 2.1 | 2.1 | 1.6 |
| | BaO | 2.0 | 4.0 | 4.1 | 4.1 | 4.1 | 1.7 | 2.2 | 2.2 | 2.7 | 3.9 | 3.9 | 3.9 | 3.9 | 1.2 |
| | ZnO | 0.0 | 0.0 | 0.0 | 0.0 | 0.0 | 0.0 | 0.0 | 0.0 | 0.0 | 0.5 | 1.0 | 0.5 | 1.0 | 0.5 |
| | $SnO_2$ | 0.2 | 0.2 | 0.2 | 0.2 | 0.2 | 0.2 | 0.2 | 0.2 | 0.2 | 0.5 | 0.2 | 0.2 | 0.2 | 0.2 |
| | $[SiO_2] + [Al_2O_3]$ | 82.8 | 83.1 | 82.7 | 82.7 | 82.7 | 82.5 | 82.5 | 82.5 | 82.5 | 83.1 | 82.6 | 83.1 | 82.6 | 82.5 |
| | $[MgO] + [CaO] + [SrO] + [BaO]$ | 15.0 | 16.4 | 16.8 | 16.8 | 16.8 | 13.9 | 14.9 | 13.9 | 14.9 | 15.9 | 15.9 | 16.2 | 16.2 | 12.9 |
| | $[SrO] + [BaO]$ | 7.5 | 6.2 | 6.3 | 5.8 | 5.8 | 3.3 | 3.8 | 3.8 | 4.3 | 6.0 | 6.0 | 6.0 | 6.0 | 2.8 |
| | $[B_2O_3]/([SrO] + [BaO])$ | 0.3 | 0.0 | 0.0 | 0.1 | 0.1 | 1.0 | 0.6 | 0.9 | 0.6 | 0.1 | 0.1 | 0.0 | 0.0 | 1.4 |
| | $[Al_2O_3] + [B_2O_3] - [CaO] - [SrO] - [BaO]$ | 8.5 | 3.1 | 2.9 | 3.4 | 2.9 | 5.3 | 3.8 | 5.8 | 4.3 | 3.6 | 3.6 | 3.1 | 3.1 | 6.3 |
| | $[SiO_2] + 14[Al_2O_3] - 15[B_2O_3] + 6[MgO] + [CaO] + 14[SrO] + 16[BaO]$ | 388.8 | 382.8 | 385.3 | 381.3 | 378.8 | 279.5 | 305.5 | 289.5 | 315.5 | 381.1 | 380.6 | 384.8 | 384.3 | 261.0 |
| | $17.8[SiO_2] + 23.1[Al_2O_3] + 3.7[B_2O_3] + 12.9[MgO] + 14.1[CaO] + 15.5[SrO] + 15.0[BaO] + 7.2[ZnO]$ | 1,767.4 | 1,779.0 | 1,777.4 | 1,776.1 | 1,776.7 | 1,750.3 | 1,760.5 | 1,750.1 | 1,760.4 | 1,776.6 | 1,771.3 | 1,778.3 | 1,773.0 | 1,741.8 |
| Thermal expansion coefficient ($10^{-7}/°C$) | | 36.4 | 39.2 | 39.9 | 39.3 | 39.7 | 37.4 | 38.6 | 37.4 | 38.7 | 39.0 | 38.9 | 39.2 | 39.2 | 36.1 |
| Density (g/cm³) | | 2.618 | 2.654 | 2.661 | 2.653 | 2.653 | 2.540 | 2.571 | 2.552 | 2.586 | 2.657 | 2.668 | 2.659 | 2.672 | 2.523 |
| Strain point (°C) | | 748 | 756 | 753 | 754 | 754 | 734 | 741 | 733 | 740 | 754 | 750 | 757 | 752 | 726 |
| Annealing point (°C) | | 806 | 814 | 812 | 812 | 812 | 793 | 800 | 792 | 799 | 813 | 807 | 814 | 809 | 785 |
| Softening point (°C) | | 1,035 | 1,048 | 1,043 | 1,043 | 1,043 | 1,027 | 1,031 | 1,027 | 1,032 | 1,045 | 1,038 | 1,046 | 1,039 | 1,022 |
| $10^{4.5}$ dPa·s (°C) | | 1,347 | 1,367 | 1,361 | 1,359 | 1,358 | 1,342 | 1,343 | 1,344 | 1,344 | 1,364 | 1,354 | 1,366 | 1,356 | 1,342 |
| $10^{4.0}$ dPa·s (°C) | | 1,503 | 1,529 | 1,524 | 1,519 | 1,518 | 1,499 | 1,503 | 1,503 | 1,504 | 1,525 | 1,512 | 1,525 | 1,513 | 1,502 |
| $10^{3.0}$ dPa·s (°C) | | 1,602 | 1,633 | 1,629 | 1,622 | 1,620 | 1,599 | 1,604 | 1,605 | 1,606 | 1,629 | 1,613 | 1,627 | 1,616 | 1,605 |
| $10^{2.5}$ dPa·s (°C) | | 1,287 | 1,305 | 1,299 | 1,298 | 1,297 | 1,282 | 1,283 | 1,283 | 1,284 | 1,302 | 1,293 | 1,304 | 1,295 | 1,281 |
| Young's modulus (GPa) | | Unmeasured | 84.1 | 84.1 | 84.4 | 84.1 | 80.7 | 81.9 | 80.8 | 81.8 | 84.2 | 84.6 | 84.6 | 84.9 | 80.3 |
| Specific Young's modulus (GPa·g·cm⁻³) | | Unmeasured | 31.7 | 31.6 | 31.8 | 31.7 | 31.8 | 31.9 | 31.7 | 31.6 | 31.7 | 31.7 | 31.8 | 31.8 | 31.8 |
| β-OH (mm⁻¹) | | 0.12 | 0.10 | 0.10 | 0.06 | 0.08 | 0.14 | 0.07 | 0.09 | 0.11 | 0.07 | 0.14 | 0.03 | 0.08 | 0.05 |

TABLE 14

| | | No. 183 | No. 184 | No. 185 | No. 186 | No. 187 | No. 188 | No. 189 | No. 190 | No. 191 | No. 192 | No. 193 | No. 194 | No. 195 | No. 196 |
|---|---|---|---|---|---|---|---|---|---|---|---|---|---|---|---|
| mol % | $SiO_2$ | 68.9 | 70.0 | 69.5 | 69.8 | 69.8 | 69.8 | 69.8 | 69.4 | 69.9 | 68.9 | 68.9 | 68.9 | 68.9 | 70.1 |
| | $Al_2O_3$ | 13.6 | 13.4 | 13.7 | 13.1 | 13.1 | 13.1 | 13.1 | 13.6 | 13.6 | 14.0 | 14.0 | 14.0 | 14.0 | 12.8 |
| | $B_2O_3$ | 3.4 | 0.5 | 0.7 | 1.0 | 1.0 | 1.0 | 1.0 | 3.4 | 3.4 | 3.0 | 3.7 | 3.0 | 3.0 | 0.5 |
| | MgO | 1.7 | 6.1 | 6.1 | 6.1 | 6.1 | 6.1 | 6.6 | 2.7 | 2.7 | 3.2 | 3.7 | 2.7 | 3.2 | 6.1 |
| | CaO | 8.4 | 3.8 | 3.8 | 4.3 | 4.3 | 4.8 | 4.3 | 6.9 | 6.4 | 6.9 | 6.4 | 6.9 | 6.4 | 4.8 |
| | SrO | 1.6 | 2.1 | 2.1 | 2.1 | 1.6 | 1.6 | 1.6 | 1.6 | 1.6 | 1.6 | 1.6 | 2.1 | 2.1 | 1.6 |
| | BaO | 1.2 | 3.9 | 3.9 | 3.4 | 3.9 | 3.4 | 3.4 | 2.2 | 2.2 | 2.2 | 2.2 | 2.2 | 2.2 | 3.9 |
| | ZnO | 1.0 | 0.0 | 0.0 | 0.0 | 0.0 | 0.0 | 0.0 | 0.0 | 0.0 | 0.0 | 0.0 | 0.0 | 0.0 | 0.0 |
| | $SnO_2$ | 0.2 | 0.2 | 0.2 | 0.2 | 0.2 | 0.2 | 0.2 | 0.2 | 0.2 | 0.2 | 0.2 | 0.2 | 0.2 | 0.2 |
| | $[SiO_2] + [Al_2O_3]$ | 82.5 | 83.4 | 83.2 | 82.9 | 82.9 | 82.9 | 82.9 | 83.0 | 83.5 | 82.9 | 82.9 | 82.9 | 82.9 | 82.9 |
| | $[MgO] + [CaO] + [SrO] + [BaO]$ | 12.9 | 15.9 | 15.9 | 15.9 | 15.9 | 15.9 | 15.9 | 13.4 | 12.9 | 13.9 | 13.9 | 13.9 | 13.9 | 16.4 |
| | $[SrO] + [BaO]$ | 2.8 | 6.0 | 6.0 | 5.5 | 5.5 | 5.0 | 5.0 | 3.8 | 3.8 | 3.8 | 3.8 | 4.3 | 4.3 | 5.5 |
| | $[B_2O_3]/([SrO] + [BaO])$ | 1.2 | 0.1 | 0.1 | 0.2 | 0.2 | 0.2 | 0.2 | 0.9 | 0.9 | 0.8 | 0.8 | 0.7 | 0.7 | 0.1 |
| | $[Al_2O_3] + [B_2O_3] - [CaO] - [SrO] - [BaO]$ | 5.8 | 4.1 | 4.6 | 4.3 | 4.3 | 4.3 | 4.8 | 6.3 | 6.8 | 6.3 | 6.8 | 5.8 | 6.3 | 3.0 |
| | $[SiO_2] + 14[Al_2O_3] - 15[B_2O_3] + 6[MgO] + [CaO] + 14[SrO] + 16[BaO]$ | 268.5 | 382.3 | 383.3 | 362.9 | 363.9 | 356.4 | 358.9 | 289.5 | 289.5 | 303.6 | 306.1 | 307.6 | 310.1 | 368.0 |
| | $17.8[SiO_2] + 23.1[Al_2O_3] + 3.7[B_2O_3] + 12.9[MgO] + 14.1[CaO] + 15.5[SrO] + 15.0[BaO] + 7.2[ZnO]$ | 1,743.5 | 1,780.7 | 1,779.5 | 1,771.6 | 1,771.4 | 1,770.9 | 1,770.3 | 1,752.0 | 1,753.8 | 1,757.3 | 1,756.7 | 1,758.6 | 1,758.0 | 1,775.0 |
| | Thermal expansion coefficient ($10^{-7}$/° C.) | 36.3 | 38.4 | 38.5 | 38.1 | 38.3 | 38.0 | 37.6 | 36.2 | 35.4 | 36.7 | 36.2 | 37.2 | 37.0 | 39.1 |
| | Density (g/cm³) | 2.539 | 2.644 | 2.648 | 2.624 | 2.632 | 2.617 | 2.616 | 2.549 | 2.542 | 2.558 | 2.559 | 2.568 | 2.568 | 2.640 |
| | Strain point (° C.) | 725 | 758 | 756 | 750 | 750 | 750 | 750 | 734 | 737 | 738 | 737 | 740 | 738 | 753 |
| | Annealing point (° C.) | 784 | 816 | 814 | 808 | 809 | 808 | 808 | 794 | 797 | 797 | 796 | 799 | 797 | 810 |
| | Softening point (° C.) | 1,020 | 1,049 | 1,046 | 1,041 | 1,042 | 1,040 | 1,040 | 1,031 | 1,035 | 1,031 | 1,029 | 1,033 | 1,031 | 1,043 |
| | $10^{4.5}$ dPa · s (° C.) | 1,340 | 1,368 | 1,363 | 1,358 | 1,361 | 1,360 | 1,355 | 1,350 | Unmeasured | Unmeasured | 1,340 | 1,346 | 1,341 | 1,363 |
| | $10^{4.0}$ dPa · s (° C.) | 1,498 | 1,528 | 1,520 | 1,517 | 1,523 | 1,522 | 1,513 | 1,508 | Unmeasured | Unmeasured | 1,499 | 1,506 | 1,498 | 1,526 |
| | $10^{3.0}$ dPa · s (° C.) | 1,599 | 1,630 | 1,619 | 1,622 | 1,628 | 1,626 | 1,614 | 1,612 | Unmeasured | Unmeasured | 1,599 | 1,605 | 1,600 | 1,630 |
| | $10^{2.5}$ dPa · s (° C.) | 1,279 | 1,307 | 1,302 | 1,297 | 1,299 | 1,298 | 1,294 | 1,289 | Unmeasured | Unmeasured | 1,280 | 1,280 | 1,282 | 1,301 |
| | Young's modulus (GPa) | 81.2 | 84.1 | 84.4 | 83.6 | 83.3 | 83.8 | 83.9 | 80.4 | 80.2 | 81.6 | 82.0 | 81.3 | 81.4 | 84.0 |
| | Specific Young's modulus (GPa/g · cm⁻³) | 32.0 | 31.8 | 31.9 | 31.9 | 31.7 | 32.0 | 32.1 | 31.5 | 31.6 | 31.9 | 32.0 | 31.7 | 31.7 | 31.8 |
| | β-OH (mm⁻¹) | 0.13 | 0.06 | 0.05 | 0.12 | 0.07 | 0.11 | 0.12 | 0.10 | 0.13 | 0.04 | 0.03 | 0.06 | 0.06 | 0.10 |

TABLE 15

| | | No. 197 | No. 198 | No. 199 | No. 200 | No. 201 | No. 202 | No. 203 | No. 204 | No. 205 | No. 206 | No. 207 | No. 208 | No. 209 | No. 210 |
|---|---|---|---|---|---|---|---|---|---|---|---|---|---|---|---|
| mol % | $SiO_2$ | 70.1 | 70.1 | 70.1 | 70.1 | 69.6 | 70.1 | 70.1 | 70.1 | 70.1 | 701 | 70.1 | 70.1 | 69.3 | 69.7 |
| | $Al_2O_3$ | 12.8 | 12.8 | 12.8 | 12.8 | 12.8 | 12.8 | 12.8 | 12.8 | 12.8 | 12.8 | 12.8 | 12.8 | 13.6 | 13.6 |
| | $B_2O_3$ | 0.0 | 0.0 | 0.0 | 0.0 | 0.5 | 0.7 | 0.4 | 1.0 | 0.7 | 0.7 | 0.7 | 0.6 | 3.0 | 2.6 |
| | MgO | 6.1 | 5.6 | 5.1 | 4.6 | 5.1 | 5.9 | 5.7 | 5.6 | 5.7 | 5.3 | 5.7 | 5.9 | 3.2 | 3.7 |
| | CaO | 5.3 | 6.3 | 7.3 | 8.3 | 7.3 | 4.6 | 4.6 | 5.5 | 5.6 | 6.0 | 5.7 | 5.3 | 6.9 | 6.4 |
| | SrO | 1.6 | 1.1 | 0.6 | 0.0 | 0.6 | 1.3 | 1.3 | 0.9 | 1.0 | 0.4 | 1.2 | 1.4 | 1.1 | 0.6 |
| | BaO | 3.9 | 3.9 | 3.9 | 4.0 | 3.9 | 3.9 | 3.9 | 3.9 | 3.9 | 4.5 | 3.6 | 3.7 | 2.7 | 3.2 |
| | ZnO | 0.0 | 0.0 | 0.0 | 0.0 | 0.0 | 0.5 | 1.0 | 0.0 | 0.0 | 0.0 | 0.0 | 0.0 | 0.0 | 0.0 |
| | $SnO_2$ | 0.2 | 0.2 | 0.2 | 0.2 | 0.2 | 0.2 | 0.2 | 0.2 | 0.2 | 0.2 | 0.2 | 0.2 | 0.2 | 0.2 |
| | $[SiO_2] + [Al_2O_3]$ | 82.9 | 82.9 | 82.9 | 82.9 | 82.4 | 82.9 | 82.9 | 82.9 | 82.9 | 82.9 | 82.9 | 82.9 | 82.9 | 83.3 |
| | $[MgO] + [CaO] + [SrO] + [BaO]$ | 16.9 | 16.9 | 16.9 | 16.9 | 16.9 | 15.7 | 15.5 | 15.9 | 16.2 | 16.2 | 16.2 | 16.3 | 13.9 | 13.9 |
| | $[SrO] + [BaO]$ | 5.5 | 5.0 | 4.5 | 4.0 | 4.5 | 5.2 | 5.2 | 4.8 | 4.9 | 4.9 | 4.8 | 5.1 | 3.8 | 3.8 |
| | $[B_2O_3]/([SrO] + [BaO])$ | 0.0 | 0.0 | 0.0 | 0.0 | 0.1 | 0.1 | 0.1 | 0.2 | 0.1 | 0.1 | 0.1 | 0.1 | 0.8 | 0.7 |
| | $[Al_2O_3] + [B_2O_3] - [CaO] - [SrO] - [BaO]$ | 2.0 | 1.5 | 1.0 | 0.5 | 1.5 | 3.7 | 3.4 | 3.5 | 3.0 | 2.6 | 3.0 | 3.0 | 5.9 | 6.0 |
| | $[SiO_2] + 14[Al_2O_3] - 15[B_2O_3] + 6[MgO] + [CaO] + 14[SrO] + 16[BaO]$ | 376.0 | 367.0 | 358.0 | 349.2 | 350.0 | 359.4 | 362.7 | 348.4 | 355.0 | 354.2 | 353.1 | 359.8 | 299.4 | 309.3 |
| | $17.8[SiO_2] + 23.1[Al_2O_3] + 3.7[B_2O_3] + 12.9[MgO] + 14.1[CaO] + 15.5[SrO] + 15.0[BaO] + 7.2[ZnO]$ | 1,780.2 | 1,780.1 | 1,780.0 | 1,779.8 | 1,772.9 | 1,769.3 | 1,769.2 | 1,769.4 | 1,772.5 | 1,772.7 | 1,772.6 | 1,773.7 | 1,754.9 | 1,759.7 |
| Thermal expansion coefficient ($10^{-7}/°$ C.) | | 39.5 | 39.9 | 40.2 | 40.4 | 40.1 | 38.0 | 38.2 | 38.4 | 39.2 | 39.2 | 39.1 | 38.8 | 37.3 | 36.9 |
| Density (g/cm³) | | 2.649 | 2.643 | 2.636 | 2.632 | 2.634 | 2.637 | 2.649 | 2.618 | 2.627 | 2.638 | 2.621 | 2.628 | 2.561 | 2.572 |
| Strain point (° C.) | | 758 | 758 | 758 | 759 | 749 | 748 | 746 | 745 | 750 | 750 | 750 | 750 | 736 | 740 |
| Annealing point (° C.) | | 816 | 815 | 815 | 816 | 806 | 806 | 804 | 804 | 808 | 809 | 808 | 808 | 794 | 799 |
| Softening point (° C.) | | 1,045 | 1,045 | 1,044 | 1,045 | 1,036 | 1,040 | 1,040 | 1,039 | 1,041 | 1,042 | 1,041 | 1,042 | 1,030 | 1,035 |
| $10^{4.5}$ dPa · s (° C.) | | 1,365 | 1,362 | 1,361 | 1,362 | 1,355 | 1,363 | 1,356 | 1,358 | 1,357 | 1,360 | 1,357 | 1,359 | 1,358 | 1,358 |
| $10^{4.0}$ dPa · s (° C.) | | 1,526 | 1,522 | 1,521 | 1,523 | 1,515 | 1,525 | 1,516 | 1,518 | 1,519 | 1,521 | 1,520 | 1,518 | 1,518 | 1,524 |
| $10^{3.0}$ dPa · s (° C.) | | 1,629 | 1,625 | 1,623 | 1,625 | 1,618 | 1,628 | 1,618 | 1,621 | 1,622 | 1,623 | 1,625 | 1,620 | 1,625 | 1,631 |
| $10^{2.5}$ dPa · s (° C.) | | 1,303 | 1,301 | 1,300 | 1,301 | 1,293 | 1,301 | 1,295 | 1,297 | 1,296 | 1,299 | 1,296 | 1,298 | 1,295 | 1,295 |
| Young's modulus (GPa) | | 84.5 | 84.6 | 84.4 | 84.2 | 84.0 | 84.0 | 84.4 | 83.3 | 83.4 | 83.4 | 83.6 | 84.0 | 80.9 | 81.5 |
| Specific Young's modulus (GPa/g · cm⁻³) | | 31.9 | 32.0 | 32.0 | 32.0 | 31.9 | 31.9 | 31.9 | 31.8 | 31.7 | 31.6 | 31.9 | 31.9 | 31.6 | 31.7 |
| β-OH (mm⁻¹) | | 0.12 | 0.07 | 0.03 | 0.11 | 0.12 | 0.13 | 0.10 | 0.08 | 0.07 | 0.06 | 0.09 | 0.12 | 0.14 | 0.03 |

TABLE 16

| | | No. 211 | No. 212 | No. 213 | No. 214 | No. 215 | No. 216 | No. 217 | No. 218 | No. 219 | No. 220 | No. 221 | No. 222 | No. 223 | No. 224 |
|---|---|---|---|---|---|---|---|---|---|---|---|---|---|---|---|
| mol % | $SiO_2$ | 70.1 | 69.7 | 70.3 | 70.3 | 63.7 | 72.9 | 63.1 | 70.3 | 70.5 | 70.4 | 72.9 | 70.4 | 70.5 | 70.3 |
| | $Al_2O_3$ | 13.6 | 13.6 | 12.8 | 12.8 | 18.0 | 11.3 | 18.0 | 12.8 | 12.5 | 12.5 | 11.6 | 12.6 | 12.4 | 12.6 |
| | $B_2O_3$ | 2.2 | 2.1 | 0.7 | 0.7 | 1.1 | 0.3 | 1.7 | 0.7 | 0.7 | 1.0 | 0.3 | 0.7 | 0.7 | 0.8 |
| | MgO | 4.2 | 3.7 | 5.3 | 5.3 | 6.0 | 3.1 | 6.0 | 5.1 | 5.7 | 3.3 | 2.8 | 5.1 | 5.1 | 5.7 |
| | CaO | 5.9 | 6.4 | 6.0 | 6.0 | 9.0 | 7.2 | 9.0 | 6.2 | 4.4 | 7.6 | 7.2 | 6.2 | 6.2 | 4.4 |
| | SrO | 0.1 | 1.1 | 0.4 | 0.2 | 0.0 | 0.5 | 0.0 | 0.4 | 2.1 | 0.4 | 0.5 | 0.4 | 0.4 | 2.1 |
| | BaO | 3.7 | 3.2 | 4.3 | 4.5 | 2.0 | 4.5 | 2.0 | 4.3 | 3.9 | 4.6 | 4.5 | 4.4 | 4.5 | 3.9 |
| | ZnO | 0.0 | 0.0 | 0.0 | 0.0 | 0.0 | 0.0 | 0.0 | 0.0 | 0.0 | 0.0 | 0.0 | 0.0 | 0.0 | 0.0 |
| | $SnO_2$ | 0.2 | 0.2 | 0.2 | 0.2 | 0.2 | 0.2 | 0.2 | 0.2 | 0.2 | 0.2 | 0.2 | 0.2 | 0.2 | 0.2 |
| | $[SiO_2] + [Al_2O_3]$ | 83.7 | 83.3 | 83.1 | 83.1 | 81.7 | 84.2 | 81.1 | 83.1 | 83.0 | 82.9 | 84.5 | 83.0 | 82.9 | 82.9 |
| | $[MgO] + [CaO] + [SrO] + [BaO]$ | 13.9 | 14.4 | 16.0 | 16.0 | 17.0 | 15.3 | 17.0 | 16.0 | 16.1 | 15.9 | 15.0 | 16.1 | 16.2 | 16.1 |
| | $[SrO] + [BaO]$ | 3.8 | 4.3 | 4.7 | 4.7 | 2.0 | 5.0 | 2.0 | 4.7 | 6.0 | 5.0 | 5.0 | 4.8 | 4.9 | 6.0 |
| | $[B_2O_3]/([SrO] + [BaO])$ | 0.6 | 0.5 | 0.1 | 0.1 | 0.6 | 0.1 | 0.9 | 0.1 | 0.1 | 0.2 | 0.1 | 0.1 | 0.1 | 0.1 |
| | $[Al_2O_3] + [B_2O_3] - [CaO] - [SrO] - [BaO]$ | 6.1 | 5.0 | 2.8 | 2.8 | 8.1 | −0.6 | 8.7 | 2.6 | 2.8 | 0.9 | −0.3 | 2.3 | 2.0 | 3.0 |
| | $[SiO_2] + 14[Al_2O_3] - 15[B_2O_3] + 6[MgO] + [CaO] + 14[SrO] + 16[BaO]$ | 319.2 | 323.8 | 351.2 | 351.6 | 376.2 | 331.4 | 366.6 | 350.2 | 365.4 | 337.0 | 333.8 | 349.1 | 348.0 | 365.1 |
| | $17.8[SiO_2] + 23.1[Al_2O_3] + 3.7[B_2O_3] + 12.9[MgO] + 14.1[CaO] + 15.5[SrO] + 15.0[BaO] + 7.2[ZnO]$ | 1,764.5 | 1,765.6 | 1,773.3 | 1,773.2 | 1,788.0 | 1,776.5 | 1,779.6 | 1,773.5 | 1,772.9 | 1,770.5 | 1,779.6 | 1,772.2 | 1,770.8 | 1,772.0 |
| Thermal expansion coefficient ($10^{-7}/°C$) | | 35.6 | 37.7 | 39.0 | 39.1 | Unmeasured | Unmeasured | Unmeasured | 39.5 | 39.3 | 40.5 | Unmeasured | 39.1 | 39.9 | 39.2 |
| Density (g/cm³) | | 2.580 | 2.589 | 2.629 | 2.631 | Unmeasured | Unmeasured | Unmeasured | 2.629 | 2.939 | 2.637 | Unmeasured | 2.632 | 2.635 | 2.640 |
| Strain point (°C) | | 744 | 744 | 750 | 751 | 761 | 753 | 752 | 749 | 748 | 742 | 754 | 744 | 744 | 744 |
| Annealing point (°C) | | 804 | 804 | 809 | 809 | 815 | 814 | 805 | 807 | 805 | 801 | 815 | 804 | 803 | 803 |
| Softening point (°C) | | 1,041 | 1,039 | 1,043 | 1,044 | 1,021 | 1,059 | 1,011 | 1,043 | 1,044 | 1,040 | 1,062 | 1,042 | 1,041 | 1,041 |
| $10^{4.5}$ dPa · s (°C) | | 1,363 | 1,361 | 1,362 | 1,362 | 1,285 | 1,393 | 1,278 | 1,364 | 1,367 | 1,366 | 1,405 | 1,363 | 1,365 | 1,365 |
| $10^{4.0}$ dPa · s (°C) | | 1,524 | 1,521 | 1,524 | 1,524 | 1,423 | 1,566 | 1,412 | 1,525 | 1,530 | 1,531 | 1,578 | 1,527 | 1,528 | 1,528 |
| $10^{3.0}$ dPa · s (°C) | | 1,629 | 1,624 | 1,628 | 1,628 | 1,511 | 1,675 | 1,500 | 1,627 | 1,633 | 1,636 | 1,693 | 1,632 | 1,633 | 1,633 |
| $10^{2.5}$ dPa · s (°C) | | 1,301 | 1,299 | 1,300 | 1,301 | 1,234 | 1,328 | 1,277 | 1,302 | 1,305 | 1,303 | 1,339 | 1,301 | 1,303 | 1,303 |
| Young's modulus (GPa) | | 81.7 | 81.7 | 83.1 | 83.0 | Unmeasured | Unmeasured | Unmeasured | 83.1 | 93.0 | 91.5 | Unmeasured | 83.1 | 82.9 | 83.3 |
| Specific Young's modulus (GPa/g · cm⁻³) | | 31.7 | 31.6 | 31.6 | 31.5 | Unmeasured | Unmeasured | Unmeasured | 31.6 | 31.5 | 30.9 | Unmeasured | 31.6 | 31.5 | 31.5 |
| β-OH (mm⁻¹) | | 0.03 | 0.15 | 0.11 | 0.13 | 0.03 | 0.15 | 0.12 | 0.04 | 0.10 | 0.15 | 0.15 | 0.08 | 0.13 | 0.10 |

TABLE 17

| | | No. 225 | No. 226 | No. 227 | No. 228 | No. 229 | No. 230 | No. 231 | No. 232 | No. 233 | No. 234 | No. 235 | No. 236 | No. 237 | No. 238 |
|---|---|---|---|---|---|---|---|---|---|---|---|---|---|---|---|
| mol % | $SiO_2$ | 70.1 | 70.1 | 70.2 | 70.1 | 70.0 | 69.6 | 70.2 | 69.4 | 69.4 | 69.4 | 69.4 | 69.4 | 69.4 | 69.4 |
| | $Al_2O_3$ | 12.7 | 12.7 | 12.8 | 12.7 | 12.6 | 12.8 | 12.0 | 13.6 | 13.6 | 13.1 | 13.1 | 13.6 | 13.6 | 13.6 |
| | $B_2O_3$ | 0.9 | 0.7 | 0.7 | 0.8 | 0.7 | 0.9 | 0.8 | 2.4 | 2.4 | 2.4 | 2.2 | 2.4 | 1.9 | 1.9 |
| | MgO | 5.7 | 5.1 | 5.0 | 5.6 | 5.7 | 4.9 | 3.0 | 2.7 | 2.7 | 2.7 | 2.7 | 2.7 | 3.2 | 3.2 |
| | CaO | 4.4 | 6.2 | 6.2 | 4.6 | 4.4 | 6.3 | 7.6 | 7.2 | 7.2 | 7.2 | 7.7 | 6.7 | 7.2 | 6.7 |
| | SrO | 2.1 | 0.5 | 0.3 | 2.1 | 2.2 | 0.3 | 1.0 | 1.6 | 0.3 | 0.3 | 0.3 | 0.3 | 0.3 | 0.3 |
| | BaO | 3.9 | 4.5 | 4.6 | 3.9 | 4.2 | 5.0 | 5.2 | 2.9 | 4.2 | 4.7 | 4.7 | 4.7 | 4.2 | 4.7 |
| | ZnO | 0.0 | 0.0 | 0.0 | 0.0 | 0.0 | 0.0 | 0.0 | 0.0 | 0.0 | 0.0 | 0.0 | 0.0 | 0.0 | 0.0 |
| | $SnO_2$ | 0.2 | 0.2 | 0.2 | 0.2 | 0.2 | 0.2 | 0.2 | 0.2 | 0.2 | 0.2 | 0.2 | 0.2 | 0.2 | 0.2 |
| | $[SiO_2]+[Al_2O_3]$ | 82.8 | 82.8 | 83.0 | 82.8 | 82.6 | 82.4 | 82.2 | 83.0 | 83.0 | 82.5 | 82.5 | 83.0 | 83.0 | 83.0 |
| | $[MgO]+[CaO]+[SrO]+[BaO]$ | 16.1 | 15.3 | 16.1 | 16.2 | 16.5 | 16.5 | 16.8 | 14.4 | 14.4 | 14.9 | 14.9 | 14.4 | 14.9 | 14.9 |
| | $[SrO]+[BaO]$ | 6.0 | 5.0 | 4.9 | 6.0 | 6.4 | 5.3 | 6.2 | 4.5 | 4.5 | 5.0 | 5.0 | 5.0 | 4.5 | 5.0 |
| | $[B_2O_3]/([SrO]+[BaO])$ | 0.2 | 0.1 | 0.1 | 0.1 | 0.1 | 0.2 | 0.1 | 0.5 | 0.5 | 0.5 | 0.5 | 0.5 | 0.4 | 0.4 |
| | $[Al_2O_3]+[B_2O_3]-[CaO]-[SrO]-[BaO]$ | 3.2 | 2.2 | 2.4 | 2.9 | 2.5 | 2.1 | -1.0 | 4.3 | 4.3 | 3.3 | 2.8 | 4.3 | 3.8 | 3.8 |
| | $[SiO_2]+14[Al_2O_3]-15[B_2O_3]+6[MgO]+[CaO]+14[SrO]+16[BaO]$ | 364.8 | 353.2 | 352.9 | 365.9 | 372.5 | 355.2 | 349.0 | 316.0 | 318.6 | 319.6 | 317.1 | 326.1 | 329.1 | 336.6 |
| | $17.8[SiO_2]+23.1[Al_2O_3]+3.7[B_2O_3]+12.9[MgO]+14.1[CaO]+15.5[SrO]+15.0[BaO]+7.2[ZnO]$ | 1,771.1 | 1,772.2 | 1,773.4 | 1,772.3 | 1,772.3 | 1,769.6 | 1,769.1 | 1,763.0 | 1,762.4 | 1,758.3 | 1,758.9 | 1,762.8 | 1,767.0 | 1,767.4 |
| Thermal expansion coefficient ($10^{-7}/°C$) | | 39.4 | 39.5 | 39.2 | 39.3 | 40.0 | 40.5 | 42.8 | 38.1 | 38.4 | 39.6 | 40.0 | 38.7 | 38.8 | 38.9 |
| Density (g/cm$^3$) | | 2.640 | 2.640 | 2.639 | 2.642 | 2.656 | 2.655 | 2.675 | 2.586 | 2.607 | 2.624 | 2.624 | 2.620 | 2.615 | 2.630 |
| Strain point (°C) | | 744 | 746 | 748 | 745 | 745 | 743 | 738 | 741 | 742 | 734 | 734 | 740 | 743 | 742 |
| Annealing point (°C) | | 803 | 804 | 806 | 804 | 803 | 802 | 796 | 800 | 802 | 794 | 794 | 800 | 802 | 802 |
| Softening point (°C) | | 1,040 | 1,040 | 1,042 | 1,041 | 1,040 | 1,035 | 1,032 | 1,037 | 1,038 | 1,033 | 1,033 | 1,038 | 1,038 | 1,039 |
| $10^{4.5}$ dPa·s (°C) | | 1,362 | 1,361 | 1,361 | 1,362 | 1,363 | 1,356 | 1,360 | 1,358 | 1,363 | 1,356 | 1,357 | 1,360 | 1,361 | 1,363 |
| $10^{4.0}$ dPa·s (°C) | | 1,524 | 1,524 | 1,524 | 1,524 | 1,526 | 1,518 | 1,527 | 1,519 | 1,525 | 1,521 | 1,522 | 1,522 | 1,526 | 1,525 |
| $10^{3.0}$ dPa·s (°C) | | 1,629 | 1,627 | 1,627 | 1,628 | 1,631 | 1,618 | 1,632 | 1,625 | 1,629 | 1,624 | 1,627 | 1,628 | 1,640 | 1,628 |
| $10^{2.5}$ dPa·s (°C) | | 1,300 | 1,299 | 1,299 | 1,300 | 1,301 | 1,294 | 1,296 | 1,296 | 1,300 | 1,294 | 1,294 | 1,298 | 1,298 | 1,301 |
| Young's modulus (GPa) | | 83.3 | 83.2 | 83.1 | 83.2 | 83.0 | 82.5 | 81.2 | 81.2 | 80.7 | 80.1 | 79.9 | 80.5 | 81.6 | 81.3 |
| Specific Young's modulus (GPa/g·cm$^{-3}$) | | 31.6 | 31.5 | 31.5 | 31.5 | 31.3 | 31.1 | 30.4 | 31.4 | 31.0 | 30.5 | 30.4 | 30.7 | 31.2 | 30.9 |
| β-OH (mm$^{-1}$) | | 0.05 | 0.08 | 0.07 | 0.09 | 0.03 | 0.08 | 0.09 | 0.09 | 0.10 | 0.08 | 0.15 | 0.08 | 0.14 | 0.07 |

TABLE 18

| | | No. 239 | No. 240 | No. 241 | No. 242 | No. 243 | No. 244 | No. 245 | No. 246 | No. 247 | No. 248 | No. 249 | No. 250 | No. 251 | No. 252 |
|---|---|---|---|---|---|---|---|---|---|---|---|---|---|---|---|
| mol % | $SiO_2$ | 69.4 | 71.3 | 72.3 | 72.3 | 72.3 | 72.3 | 72.3 | 72.3 | 72.3 | 71.3 | 71.3 | 71.3 | 71.8 | 71.3 |
| | $Al_2O_3$ | 13.1 | 10.7 | 10.7 | 10.7 | 10.7 | 10.7 | 11.7 | 11.7 | 11.7 | 11.7 | 11.7 | 11.7 | 10.7 | 10.7 |
| | $B_2O_3$ | 1.9 | 0.0 | 0.0 | 0.0 | 0.0 | 0.0 | 0.0 | 0.0 | 0.0 | 0.0 | 0.0 | 0.0 | 0.0 | 0.0 |
| | MgO | 3.7 | 0.0 | 0.0 | 0.0 | 1.0 | 2.0 | 1.0 | 2.0 | 3.0 | 1.0 | 2.0 | 3.0 | 1.0 | 1.0 |
| | CaO | 6.7 | 11.5 | 11.5 | 11.5 | 10.5 | 9.5 | 10.5 | 9.5 | 8.5 | 10.5 | 9.5 | 8.5 | 11.5 | 11.5 |
| | SrO | 0.3 | 1.3 | 0.3 | 0.3 | 0.3 | 0.3 | 0.3 | 0.3 | 0.3 | 0.3 | 0.3 | 0.3 | 0.8 | 1.3 |
| | BaO | 4.7 | 5.0 | 5.0 | 4.0 | 5.0 | 5.0 | 4.0 | 4.0 | 4.0 | 5.0 | 5.0 | 5.0 | 4.0 | 4.0 |
| | ZnO | 0.0 | 0.0 | 0.0 | 0.0 | 0.0 | 0.0 | 0.0 | 0.0 | 0.0 | 0.0 | 0.0 | 0.0 | 0.0 | 0.0 |
| | $SnO_2$ | 0.2 | 0.2 | 0.2 | 0.2 | 0.2 | 0.2 | 0.2 | 0.2 | 0.2 | 0.2 | 0.2 | 0.2 | 0.2 | 0.2 |
| | $[SiO_2] + [Al_2O_3]$ | 82.5 | 82.0 | 83.0 | 83.0 | 83.0 | 83.0 | 84.0 | 84.0 | 84.0 | 83.0 | 83.0 | 83.0 | 82.5 | 82.0 |
| | $[MgO] + [CaO] + [SrO] + [BaO]$ | 15.4 | 17.8 | 16.8 | 16.8 | 16.8 | 16.8 | 15.8 | 15.8 | 15.8 | 16.8 | 16.8 | 16.8 | 17.3 | 17.8 |
| | $[SrO] + [BaO]$ | 5.0 | 6.3 | 5.3 | 4.3 | 5.3 | 5.3 | 4.3 | 4.3 | 4.3 | 5.3 | 5.3 | 5.3 | 4.8 | 5.3 |
| | $[B_2O_3]/([SrO] + [BaO])$ | 0.4 | 0.0 | 0.0 | 0.0 | 0.0 | 0.0 | 0.0 | 0.0 | 0.0 | 0.0 | 0.0 | 0.0 | 0.0 | 0.0 |
| | $[Al_2O_3] + [B_2O_3] - [CaO] - [SrO] - [BaO]$ | 3.3 | −7.1 | −6.1 | −5.1 | −5.1 | −4.1 | −3.1 | −2.1 | −1.1 | −4.1 | −3.1 | −2.1 | −5.6 | −6.1 |
| | $[SiO_2] + 14[Al_2O_3] - 15[B_2O_3] + 6[MgO] + [CaO] + 14[SrO] + 16[BaO]$ | 332.6 | 330.8 | 317.8 | 307.8 | 322.8 | 327.8 | 320.8 | 325.8 | 330.8 | 335.8 | 340.8 | 345.8 | 314.3 | 320.8 |
| | $17.8[SiO_2] + 23.1[Al_2O_3] + 3.7[B_2O_3] + 12.9[MgO] + 14.1[CaO] + 15.5[SrO] + 15.0[BaO] + 7.2[ZnO]$ | 1,762.3 | 1,773.6 | 1,775.9 | 1,773.8 | 1,774.7 | 1,773.5 | 1,782.8 | 1,781.6 | 1,780.4 | 1,780.0 | 1,776.8 | 1,777.6 | 1,772.7 | 1,771.5 |
| Thermal expansion coefficient ($10^{-7}$/° C.) | | 39.4 | 46.5 | 45.0 | 43.5 | 44.0 | 43.3 | 42.0 | 41.0 | 40.3 | 44.0 | 43.0 | 42.3 | 44.8 | 45.5 |
| Density (g/cm³) | | 2.630 | 2.697 | 2.666 | 2.631 | 2.661 | 2.659 | 2.623 | 2.620 | 2.616 | 2.668 | 2.665 | 2.662 | 2.645 | 2.661 |
| Strain point (° C.) | | 736 | 744 | 750 | 750 | 747 | 746 | 764 | 760 | 759 | 755 | 753 | 752 | 743 | 743 |
| Annealing point (° C.) | | 796 | 799 | 807 | 807 | 805 | 804 | 822 | 820 | 818 | 813 | 811 | 810 | 800 | 799 |
| Softening point (° C.) | | 1,033 | 1,023 | 1,037 | 1,038 | 1,037 | 1,039 | 1,057 | 1,056 | 1,056 | 1,043 | 1,044 | 1,044 | 1,031 | 1,026 |
| $10^{4.5}$ dPa · s (° C.) | | 1,356 | 1,347 | 1,369 | 1,370 | 1,374 | 1,384 | 1,393 | 1,389 | 1,379 | 1,372 | 1,375 | 1,378 | 1,358 | 1,348 |
| $10^{4.0}$ dPa · s (° C.) | | 1,520 | 1,517 | 1,542 | 1,543 | 1,547 | 1,556 | 1,564 | 1,561 | 1,551 | 1,541 | 1,544 | 1,546 | 1,529 | 1,517 |
| $10^{3.0}$ dPa · s (° C.) | | 1,628 | 1,628 | 1,655 | 1,654 | 1,661 | 1,667 | 1,673 | 1,675 | 1,664 | 1,650 | 1,652 | 1,653 | 1,642 | 1,626 |
| $10^{2.5}$ dPa · s (° C.) | | 1,294 | 1,283 | 1,303 | 1,305 | 1,308 | 1,317 | 1,327 | 1,324 | 1,316 | 1,308 | 1,310 | 1,313 | 1,294 | 1,285 |
| Young's modulus (GPa) | | 81.3 | 80.3 | 80.2 | 81.1 | 80.3 | 80.8 | 81.2 | 81.6 | 82.1 | 80.9 | 81.3 | 81.7 | 80.6 | 80.7 |
| Specific Young's modulus (GPa/g · cm⁻³) | | 30.9 | 29.8 | 30.1 | 30.8 | 30.2 | 30.4 | 31.0 | 31.1 | 31.4 | 30.3 | 30.5 | 30.7 | 30.5 | 30.3 |
| β-OH (mm⁻¹) | | 0.07 | 0.11 | 0.14 | 0.14 | 0.04 | 0.06 | 0.12 | 0.12 | 0.10 | 0.04 | 0.15 | 0.12 | 0.13 | 0.10 |

TABLE 19

| | | No. 253 | No. 254 | No. 255 | No. 256 | No. 257 | No. 258 | No. 259 | No. 260 | No. 261 | No. 262 | No. 263 | No. 264 | No. 265 | No. 266 |
|---|---|---|---|---|---|---|---|---|---|---|---|---|---|---|---|
| mol % | $SiO_2$ | 71.8 | 71.8 | 71.8 | 71.8 | 71.3 | 71.3 | 71.5 | 71.5 | 71.5 | 71.5 | 71.7 | 72.0 | 71.7 | 72.0 |
| | $Al_2O_3$ | 10.7 | 10.7 | 10.9 | 11.1 | 11.1 | 11.3 | 11.0 | 11.0 | 11.0 | 11.0 | 10.7 | 10.7 | 10.7 | 10.7 |
| | $B_2O_3$ | 0.0 | 0.0 | 0.3 | 0.6 | 0.3 | 0.6 | 0.0 | 0.0 | 0.0 | 0.0 | 0.0 | 0.0 | 0.0 | 0.0 |
| | MgO | 1.0 | 1.0 | 1.0 | 1.0 | 1.0 | 1.0 | 1.0 | 1.0 | 1.0 | 1.0 | 1.0 | 1.0 | 1.0 | 1.0 |
| | CaO | 11.0 | 10.5 | 11.0 | 10.5 | 11.0 | 10.5 | 11.0 | 10.5 | 10.5 | 10.0 | 11.1 | 10.8 | 10.1 | 9.8 |
| | SrO | 1.3 | 1.8 | 0.8 | 0.8 | 1.1 | 1.1 | 0.3 | 1.8 | 1.3 | 1.8 | 1.3 | 1.3 | 1.3 | 1.3 |
| | BaO | 4.0 | 4.0 | 4.0 | 4.0 | 4.0 | 4.0 | 5.0 | 4.0 | 4.5 | 4.5 | 5.0 | 5.0 | 5.0 | 5.0 |
| | ZnO | 0.0 | 0.0 | 0.0 | 0.0 | 0.0 | 0.0 | 0.0 | 0.0 | 0.0 | 0.0 | 0.0 | 0.0 | 0.0 | 0.0 |
| | $SnO_2$ | 0.2 | 0.2 | 0.2 | 0.2 | 0.2 | 0.2 | 0.2 | 0.2 | 0.2 | 0.2 | 0.2 | 0.2 | 0.2 | 0.2 |
| | $[SiO_2] + [Al_2O_3]$ | 82.5 | 82.5 | 82.7 | 82.9 | 82.4 | 82.6 | 82.5 | 82.5 | 82.5 | 82.5 | 82.4 | 82.7 | 82.4 | 82.7 |
| | $[MgO] + [CaO] + [SrO] + [BaO]$ | 17.3 | 17.3 | 16.8 | 16.3 | 17.1 | 16.6 | 17.3 | 17.3 | 17.3 | 17.3 | 17.4 | 17.1 | 17.4 | 17.1 |
| | $[SrO] + [BaO]$ | 5.3 | 5.8 | 4.8 | 4.8 | 5.1 | 5.1 | 5.3 | 5.8 | 5.8 | 6.3 | 6.3 | 6.3 | 6.3 | 6.3 |
| | $[B_2O_3]/([SrO] + [BaO])$ | 0.0 | 0.0 | 0.1 | 0.1 | 0.1 | 0.1 | 0.0 | 0.0 | 0.0 | 0.0 | 0.0 | 0.0 | 0.0 | 0.0 |
| | $[Al_2O_3] + [B_2O_3] - [CaO] - [SrO] - [BaO]$ | −5.6 | −5.6 | −4.6 | −3.6 | −4.7 | −3.7 | −5.3 | −5.3 | −5.3 | −5.3 | −6.7 | −6.4 | −5.7 | −5.4 |
| | $[SiO_2] + 14[Al_2O_3] - 15[B_2O_3] + 6[MgO] + [CaO] + 14[SrO] + 16[BaO]$ | 320.8 | 327.3 | 312.3 | 309.9 | 318.6 | 316.4 | 326.7 | 331.2 | 332.2 | 338.7 | 330.8 | 330.8 | 335.8 | 335.8 |
| | $17.8[SiO_2] + 23.1[Al_2O_3] + 3.7[B_2O_3] + 12.9[MgO] + 14.1[CaO] + 15.5[SrO] + 15.0[BaO] + 7.2[ZnO]$ | 1,773.4 | 1,774.1 | 1,771.3 | 1,770.0 | 1,771.7 | 1,770.4 | 1,774.5 | 1,775.7 | 1,775.4 | 1,776.1 | 1,775.1 | 1,776.2 | 1,773.9 | 1,775.0 |
| Thermal expansion coefficient ($10^{-7}/°C$) | | 44.6 | 44.8 | 44.1 | 43.4 | 44.2 | 43.4 | 45.3 | 44.8 | 45.0 | 45.1 | 46.3 | 45.7 | 45.4 | 44.8 |
| Density (g/cm³) | | 2.654 | 2.661 | 2.638 | 2.631 | 2.650 | 2.641 | 2.672 | 2.662 | 2.671 | 2.679 | 2.690 | 2.686 | 2.686 | 2.681 |
| Strain point (°C) | | 745 | 744 | 743 | 740 | 741 | 740 | 747 | 746 | 744 | 747 | 745 | 746 | 742 | 742 |
| Annealing point (°C) | | 802 | 801 | 800 | 799 | 799 | 798 | 803 | 803 | 801 | 804 | 801 | 802 | 799 | 800 |
| Softening point (°C) | | 1,032 | 1,032 | 1,034 | 1,036 | 1,031 | 1,034 | 1,034 | 1,033 | 1,032 | 1,034 | 1,029 | 1,032 | 1,031 | 1,034 |
| $10^{4.5}$ dPa·s (°C) | | 1,360 | 1,359 | 1,363 | 1,368 | 1,357 | 1,361 | 1,360 | 1,362 | 1,362 | 1,362 | 1,357 | 1,363 | 1,360 | 1,366 |
| $10^{4.0}$ dPa·s (°C) | | 1,531 | 1,530 | 1,535 | 1,540 | 1,527 | 1,531 | 1,530 | 1,533 | 1,532 | 1,533 | 1,528 | 1,537 | 1,533 | 1,539 |
| $10^{3.0}$ dPa·s (°C) | | 1,642 | 1,641 | 1,646 | 1,652 | 1,636 | 1,639 | 1,641 | 1,644 | 1,642 | 1,643 | 1,640 | 1,647 | 1,646 | 1,651 |
| $10^{2.5}$ dPa·s (°C) | | 1,296 | 1,295 | 1,298 | 1,303 | 1,293 | 1,297 | 1,296 | 1,297 | 1,297 | 1,298 | 1,292 | 1,298 | 1,295 | 1,301 |
| Young's modulus (GPa) | | 80.6 | 80.6 | 80.4 | 80.2 | 80.6 | 80.4 | 80.6 | 80.6 | 80.5 | 80.5 | 79.9 | 80.0 | 80.3 | 80.4 |
| Specific Young's modulus (GPa/g·cm⁻³) | | 30.4 | 30.3 | 30.5 | 30.5 | 30.4 | 30.5 | 30.1 | 30.3 | 30.1 | 30.1 | 29.7 | 29.8 | 29.9 | 30.0 |
| β-OH (mm⁻¹) | | 0.10 | 0.05 | 0.05 | 0.08 | 0.04 | 0.13 | 0.14 | 0.15 | 0.03 | 0.03 | 0.04 | 0.13 | 0.09 | 0.08 |

TABLE 20

| | | No. 267 | No. 268 | No. 269 | No. 270 | No. 271 | No. 272 | No. 273 | No. 274 | No. 275 | No. 276 | No. 277 | No. 278 | No. 279 | No. 280 |
|---|---|---|---|---|---|---|---|---|---|---|---|---|---|---|---|
| mol % | SiO$_2$ | 72.2 | 69.6 | 71.2 | 69.4 | 71.5 | 72.0 | 72.0 | 72.0 | 72.0 | 71.8 | 71.6 | 69.8 | 71.8 | 71.6 |
| | Al$_2$O$_3$ | 10.7 | 10.7 | 10.7 | 11.3 | 10.4 | 11.3 | 11.9 | 12.4 | 12.1 | 11.2 | 11.9 | 14.0 | 11.9 | 12.4 |
| | B$_2$O$_3$ | 0.0 | 0.4 | 0.1 | 2.4 | 0.8 | 0.5 | 0.0 | 1.5 | 1.8 | 0.2 | 0.2 | 0.0 | 0.0 | 1.9 |
| | MgO | 0.0 | 2.0 | 0.7 | 1.6 | 0.6 | 0.0 | 0.0 | 0.0 | 0.0 | 2.0 | 4.0 | 2.0 | 0.0 | 0.0 |
| | CaO | 10.6 | 10.8 | 10.8 | 10.2 | 10.4 | 10.1 | 9.4 | 8.8 | 8.8 | 8.8 | 6.8 | 6.0 | 9.4 | 8.8 |
| | SrO | 1.3 | 1.3 | 1.3 | 0.4 | 0.5 | 1.2 | 1.1 | 1.0 | 1.0 | 0.8 | 0.3 | 8.0 | 1.1 | 1.0 |
| | BaO | 5.0 | 5.0 | 5.0 | 4.4 | 5.6 | 4.7 | 4.4 | 4.1 | 4.1 | 5.0 | 5.0 | 0.0 | 4.4 | 4.1 |
| | ZnO | 0.0 | 0.0 | 0.0 | 0.0 | 0.0 | 0.0 | 0.0 | 0.0 | 0.0 | 0.0 | 0.0 | 0.0 | 0.0 | 0.0 |
| | SnO$_2$ | 0.2 | 0.2 | 0.2 | 0.2 | 0.2 | 0.2 | 0.2 | 0.2 | 0.2 | 0.2 | 0.2 | 0.2 | 0.2 | 0.2 |
| | [SiO$_2$] + [Al$_2$O$_3$] | 82.9 | 80.3 | 81.9 | 80.8 | 81.9 | 83.3 | 83.9 | 84.4 | 84.1 | 83.0 | 82.5 | 83.8 | 83.7 | 84.0 |
| | [MgO] + [CaO] + [SrO] + [BaO] | 16.9 | 19.1 | 17.8 | 16.6 | 17.1 | 16.0 | 14.9 | 13.9 | 13.9 | 16.6 | 16.1 | 16.0 | 14.9 | 13.9 |
| | [SrO] + [BaO] | 6.3 | 6.3 | 6.3 | 4.8 | 6.1 | 5.9 | 5.5 | 5.1 | 5.1 | 5.8 | 5.3 | 8.0 | 5.5 | 5.1 |
| | [B$_2$O$_3$]/([SrO] + [BaO]) | 0.0 | 0.1 | 0.0 | 0.5 | 0.1 | 0.1 | 0.0 | 0.3 | 0.4 | 0.0 | 0.0 | 0.0 | 0.2 | 0.4 |
| | [Al$_2$O$_3$] + [B$_2$O$_3$] − [CaO] − [SrO] − [BaO] | −6.2 | −6.0 | −6.3 | −1.3 | −5.3 | −4.2 | −2.0 | 0.0 | 0.0 | −3.2 | 0.0 | 0.0 | −1.8 | 0.4 |
| | [SiO$_2$] + 14[Al$_2$O$_3$] − 15[B$_2$O$_3$] + 6[MgO] + [CaO] + 14[SrO] + 16[BaO] | 330.8 | 334.4 | 332.7 | 288.4 | 315.7 | 324.8 | 318.8 | 311.5 | 302.8 | 337.6 | 360.2 | 395.8 | 315.6 | 305.1 |
| | 17.8[SiO$_2$] + 23.1[Al$_2$O$_3$] + 3.7[B$_2$O$_3$] + 12.9[MgO] + 14.1[CaO] + 15.5[SrO] + 15.0[BaO] + 7.2[ZnO] | 1,776.9 | 1,760.8 | 1,771.4 | 1,743.7 | 1,762.0 | 1,776.0 | 1,775.8 | 1,774.7 | 1,768.9 | 1,774.8 | 1,777.2 | 1,800.2 | 1,773.0 | 1,769.0 |
| Thermal expansion coefficient (10$^{-7}$/° C.) | | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured |
| Density (g/cm$^3$) | | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured |
| Strain point (° C.) | | Unmeasured | 727 | 740 | 713 | 727 | 747 | 751 | 756 | 749 | 745 | 749 | 777 | 751 | 746 |
| Annealing point (° C.) | | Unmeasured | 782 | 797 | 771 | 784 | 806 | Unmeasured | Unmeasured | 812 | 804 | 809 | 835 | 813 | 803 |
| Softening point (° C.) | | Unmeasured | 1,005 | 1,024 | 1,004 | 1,016 | 1,043 | Unmeasured | Unmeasured | 1,058 | 1,043 | 1,051 | 1,062 | 1,058 | 1,031 |
| 10$^{4.5}$ dPa · s (° C.) | | Unmeasured | 1,318 | 1,349 | 1,327 | 1,350 | 1,384 | Unmeasured | Unmeasured | 1,399 | 1,380 | 1,387 | 1,377 | 1,395 | 1,345 |
| 10$^{4.0}$ dPa · s (° C.) | | Unmeasured | 1,483 | 1,519 | 1,494 | 1,524 | 1,559 | Unmeasured | Unmeasured | 1,572 | 1,552 | 1,557 | 1,536 | 1,565 | 1,503 |
| 10$^{3.0}$ dPa · s (° C.) | | Unmeasured | 1,589 | 1,630 | 1,600 | 1,636 | 1,670 | Unmeasured | Unmeasured | 1,682 | 1,662 | 1,667 | 1,638 | 1,674 | 1,604 |
| 10$^{2.5}$ dPa · s (° C.) | | Unmeasured | 1,256 | 1,285 | 1,264 | 1,284 | 1,317 | Unmeasured | Unmeasured | 1,333 | 1,314 | 1,322 | 1,316 | 1,330 | 1,284 |
| Young's modulus (GPa) | | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured |
| Specific Young's modulus (GPa/g · cm$^{-3}$) | | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured |
| β-OH (mm$^{-1}$) | | 0.08 | 0.05 | 0.10 | 0.04 | 0.10 | 0.03 | 0.11 | 0.06 | 0.09 | 0.03 | 0.15 | 0.12 | 0.07 | 0.15 |

TABLE 21

| | | No. 281 | No. 282 | No. 283 | No. 284 | No. 285 | No. 286 | No. 287 | No. 288 | No. 289 | No. 290 | No. 291 | No. 292 | No. 293 | No. 294 |
|---|---|---|---|---|---|---|---|---|---|---|---|---|---|---|---|
| mol % | $SiO_2$ | 71.9 | 71.9 | 71.9 | 71.9 | 71.9 | 71.9 | 71.9 | 71.9 | 71.9 | 71.9 | 71.9 | 71.9 | 71.9 | 71.9 |
| | $Al_2O_3$ | 13.5 | 13.5 | 13.5 | 13.5 | 13.5 | 13.0 | 13.0 | 13.0 | 13.0 | 13.0 | 13.0 | 13.0 | 13.0 | 13.0 |
| | $B_2O_3$ | 0.0 | 0.0 | 0.0 | 3.8 | 0.5 | 3.3 | 3.3 | 3.3 | 4.3 | 1.0 | 3.3 | 3.3 | 3.8 | 0.5 |
| | MgO | 3.3 | 3.3 | 3.3 | 4.7 | 3.3 | 4.7 | 4.7 | 5.7 | 4.7 | 3.3 | 4.7 | 5.2 | 4.7 | 3.3 |
| | CaO | 4.7 | 4.7 | 5.2 | 4.7 | 4.7 | 4.7 | 1.0 | 4.7 | 4.7 | 4.7 | 0.5 | 0.0 | 0.0 | 4.7 |
| | SrO | 0.0 | 0.5 | 0.0 | 0.0 | 0.0 | 0.0 | 4.7 | 0.0 | 0.0 | 0.0 | 6.6 | 6.6 | 6.6 | 0.0 |
| | BaO | 6.6 | 6.1 | 6.1 | 6.1 | 6.1 | 7.1 | 6.1 | 6.1 | 6.1 | 6.1 | 6.6 | 6.6 | 6.6 | 6.6 |
| | ZnO | 0.0 | 0.0 | 0.0 | 0.0 | 0.0 | 0.0 | 0.0 | 0.0 | 0.0 | 0.0 | 0.0 | 0.0 | 0.0 | 0.0 |
| | $SnO_2$ | 0.1 | 0.1 | 0.1 | 0.1 | 0.1 | 0.1 | 0.1 | 0.1 | 0.1 | 0.1 | 0.1 | 0.1 | 0.1 | 0.1 |
| | $[SiO_2] + [Al_2O_3]$ | 85.4 | 85.4 | 85.4 | 85.4 | 85.4 | 84.9 | 84.9 | 84.9 | 84.9 | 84.9 | 84.9 | 84.9 | 84.9 | 84.9 |
| | $[MgO] + [CaO] + [SrO] + [BaO]$ | 14.5 | 14.5 | 14.5 | 14.6 | 14.0 | 15.0 | 15.0 | 15.0 | 15.1 | 14.0 | 15.0 | 15.1 | 15.1 | 14.6 |
| | $[SrO] + [BaO]$ | 6.6 | 6.6 | 6.1 | 6.1 | 6.1 | 7.1 | 7.1 | 6.1 | 6.1 | 6.1 | 7.1 | 6.6 | 6.6 | 6.6 |
| | $[B_2O_3]/([SrO] + [BaO])$ | 0.0 | 0.0 | 0.0 | 0.0 | 0.0 | 0.0 | 0.0 | 0.0 | 0.0 | 0.2 | 0.0 | 0.0 | 0.0 | 0.1 |
| | $[Al_2O_3] + [B_2O_3] - [CaO] - [SrO] - [BaO]$ | 2.2 | 2.3 | 2.2 | 2.7 | 3.3 | 1.2 | 1.3 | 1.2 | 2.2 | 3.3 | 1.2 | 1.2 | 1.7 | 2.2 |
| | $[SiO_2] + 14[Al_2O_3] - 15[B_2O_3] + 6[MgO] + [CaO] + 14[SrO] + 16[BaO]$ | 390.8 | 389.2 | 382.8 | 386.0 | 374.7 | 391.8 | 389.2 | 376.3 | 382.0 | 360.2 | 390.8 | 384.3 | 387.0 | 376.5 |
| | $17.8[SiO_2] + 23.1[Al_2O_3] + 3.7[B_2O_3] + 12.9[MgO] + 14.1[CaO] + 15.5[SrO] + 15.0[BaO] + 7.2[ZnO]$ | 1,798.6 | 1,798.4 | 1,798.1 | 1,798.0 | 1,792.5 | 1,794.6 | 1,794.6 | 1,793.6 | 1,792.9 | 1,782.8 | 1,794.8 | 1,794.6 | 1,794.4 | 1,789.3 |
| Thermal expansion coefficient ($10^{-7}$/°C.) | | 39.1 | 39.0 | 38.8 | 38.4 | 38.1 | 40.3 | 40.0 | 39.7 | 38.9 | 38.2 | 40.2 | 40.0 | 39.6 | 39.2 |
| Density (g/cm³) | | 2.687 | 2.679 | 2.672 | 2.672 | 2.662 | 2.703 | 2.688 | 2.675 | 2.673 | 2.655 | 2.696 | 2.689 | 2.688 | 2.679 |
| Strain point (°C.) | | 776 | 776 | 775 | 774 | 768 | 770 | 771 | 770 | 768 | 756 | 770 | 770 | 769 | 763 |
| Annealing point (°C.) | | 838 | 838 | 837 | 836 | 832 | 833 | 833 | 831 | 829 | 821 | 833 | 832 | 831 | 827 |
| Softening point (°C.) | | 1,082 | 1,081 | 1,079 | 1,078 | 1,076 | 1,077 | 1,075 | 1,072 | 1,071 | 1,066 | 1,076 | 1,074 | 1,074 | 1,071 |
| $10^{4.5}$ dPa·s (°C.) | | 1,415 | 1,413 | 1,411 | 1,411 | 1,411 | 1,411 | 1,409 | 1,405 | 1,404 | 1,405 | 1,410 | 1,408 | 1,408 | 1,408 |
| $10^{4.0}$ dPa·s (°C.) | | 1,581 | 1,580 | 1,577 | 1,576 | 1,578 | 1,581 | 1,578 | 1,573 | 1,571 | 1,574 | 1,579 | 1,577 | 1,575 | 1,578 |
| $10^{3.0}$ dPa·s (°C.) | | 1,686 | 1,685 | 1,682 | 1,681 | 1,684 | 1,687 | 1,684 | 1,679 | 1,677 | 1,681 | 1,685 | 1,683 | 1,681 | 1,683 |
| $10^{2.5}$ dPa·s (°C.) | | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured |
| Young's modulus (GPa) | | 82.0 | 82.1 | 82.3 | 82.6 | 81.7 | 81.4 | 81.6 | 82.0 | 82.5 | 80.8 | 81.5 | 81.7 | 82.0 | 81.2 |
| Specific Young's modulus (GPa·g·cm⁻³) | | 30.5 | 30.6 | 30.8 | 30.9 | 30.7 | 30.1 | 30.4 | 30.7 | 30.9 | 30.4 | 30.2 | 30.4 | 30.5 | 30.3 |
| β-OH (mm⁻¹) | | 0.14 | 0.14 | 0.06 | 0.13 | 0.15 | 0.15 | 0.15 | 0.08 | 0.07 | 0.03 | 0.15 | 0.11 | 0.13 | 0.08 |

TABLE 22

| | | No. 295 | No. 296 | No. 297 | No. 298 | No. 299 | No. 300 | No. 301 | No. 302 | No. 303 | No. 304 | No. 305 | No. 306 | No. 307 | No. 308 |
|---|---|---|---|---|---|---|---|---|---|---|---|---|---|---|---|
| mol % | $SiO_2$ | 71.9 | 71.9 | 71.9 | 71.9 | 71.9 | 71.9 | 71.9 | 71.9 | 71.9 | 71.9 | 71.9 | 71.9 | 71.9 | 71.9 |
| | $Al_2O_3$ | 12.5 | 12.5 | 12.5 | 12.5 | 12.5 | 12.5 | 12.5 | 12.5 | 12.5 | 12.5 | 12.5 | 12.5 | 12.5 | 12.5 |
| | $B_2O_3$ | 0.0 | 0.0 | 0.0 | 0.0 | 1.5 | 0.0 | 0.0 | 0.0 | 0.5 | 0.0 | 0.0 | 0.0 | 1.0 | 0.0 |
| | MgO | 3.3 | 3.3 | 3.3 | 4.8 | 3.3 | 3.3 | 3.3 | 3.8 | 3.3 | 3.3 | 3.3 | 4.3 | 3.3 | 3.3 |
| | CaO | 4.7 | 4.7 | 6.2 | 4.7 | 4.7 | 0.5 | 5.2 | 4.7 | 4.7 | 1.0 | 5.7 | 4.7 | 4.7 | 5.2 |
| | SrO | 0.0 | 1.5 | 0.0 | 0.0 | 0.0 | 7.1 | 0.0 | 0.0 | 0.0 | 6.6 | 0.0 | 0.0 | 0.0 | 0.5 |
| | BaO | 7.6 | 6.1 | 6.1 | 6.1 | 6.1 | 0.0 | 7.1 | 7.1 | 7.1 | 0.0 | 6.6 | 6.6 | 6.6 | 6.6 |
| | ZnO | 0.0 | 0.0 | 0.0 | 0.0 | 0.0 | 0.0 | 0.0 | 0.0 | 0.0 | 0.0 | 0.0 | 0.0 | 0.0 | 0.0 |
| | $SnO_2$ | 0.1 | 0.1 | 0.1 | 0.1 | 0.1 | 0.1 | 0.1 | 0.1 | 0.1 | 0.1 | 0.1 | 0.1 | 0.1 | 0.1 |
| | $[SiO_2] + [Al_2O_3]$ | 84.4 | 84.4 | 84.4 | 84.4 | 84.4 | 84.4 | 84.4 | 84.4 | 84.4 | 84.4 | 84.4 | 84.4 | 84.4 | 84.4 |
| | $[MgO] + [CaO] + [SrO] + [BaO]$ | 15.5 | 15.5 | 15.5 | 15.5 | 14.0 | 15.5 | 15.6 | 15.6 | 15.0 | 15.5 | 15.6 | 15.6 | 14.5 | 15.6 |
| | $[SrO] + [BaO]$ | 7.6 | 7.6 | 6.1 | 6.1 | 6.1 | 7.6 | 7.1 | 7.1 | 7.1 | 7.6 | 6.6 | 6.6 | 6.6 | 7.1 |
| | $[B_2O_3]/([SrO] + [BaO])$ | 0.0 | 0.0 | 0.0 | 0.0 | 0.2 | 0.0 | 0.0 | 0.0 | 0.1 | 0.0 | 0.0 | 0.0 | 0.2 | 0.0 |
| | $[Al_2O_3] + [B_2O_3] - [CaO] - [SrO] - [BaO]$ | 0.2 | 0.3 | 0.2 | 1.8 | 3.3 | 0.2 | 0.2 | 0.7 | 1.2 | 0.2 | 0.2 | 1.2 | 2.2 | 0.2 |
| | $[SiO_2] + 14[Al_2O_3] - 15[B_2O_3] + 6[MgO] + [CaO] + 14[SrO] + 16[BaO]$ | 392.8 | 389.2 | 369.8 | 377.4 | 345.7 | 391.8 | 385.3 | 388.0 | 377.3 | 390.8 | 377.8 | 383.0 | 361.8 | 384.3 |
| | $17.8[SiO_2] + 23.1[Al_2O_3] + 3.7[B_2O_3] + 12.9[MgO] + 14.1[CaO] + 15.5[SrO] + 15.0[BaO] + 7.2[ZnO]$ | 1,790.5 | 1,790.8 | 1,789.1 | 1,787.3 | 1,773.1 | 1,790.8 | 1,790.5 | 1,789.9 | 1,784.9 | 1,791.0 | 1,790.1 | 1,788.8 | 1,779.2 | 1,790.8 |
| Thermal expansion coefficient ($10^{-7}/°C$) | | 41.4 | 41.1 | 10.5 | 39.3 | 38.3 | 41.3 | 41.1 | 40.7 | 40.4 | 41.2 | 40.9 | 40.0 | 39.3 | 41.0 |
| Density (g/cm³) | | 2.719 | 2.697 | 2.677 | 2.674 | 2.647 | 2.712 | 2.705 | 2.704 | 2.696 | 2.705 | 2.692 | 2.689 | 2.672 | 2.698 |
| Strain point (°C) | | 764 | 765 | 764 | 763 | 745 | 764 | 764 | 763 | 757 | 764 | 764 | 763 | 751 | 764 |
| Annealing point (°C) | | 826 | 826 | 824 | 823 | 811 | 826 | 825 | 824 | 821 | 826 | 824 | 823 | 815 | 825 |
| Softening point (°C) | | 1,072 | 1,069 | 1,064 | 1,064 | 1,056 | 1,071 | 1,069 | 1,069 | 1,066 | 1,070 | 1,067 | 1,067 | 1,061 | 1,068 |
| $10^{4.5}$ dPa·s (°C) | | 1,407 | 1,404 | 1,398 | 1,398 | 1,398 | 1,406 | 1,404 | 1,404 | 1,404 | 1,405 | 1,401 | 1,401 | 1,401 | 1,403 |
| $10^{4.0}$ dPa·s (°C) | | 1,578 | 1,575 | 1,568 | 1,565 | 1,571 | 1,577 | 1,575 | 1,574 | 1,577 | 1,576 | 1,571 | 1,569 | 1,575 | 1,573 |
| $10^{3.0}$ dPa·s (°C) | | 1,686 | 1,682 | 1,675 | 1,672 | 1,677 | 1,684 | 1,682 | 1,681 | 1,683 | 1,683 | 1,678 | 1,677 | 1,680 | 1,680 |
| $10^{2.5}$ dPa·s (°C) | | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured |
| Young's modulus (GPa) | | 80.8 | 81.2 | 81.7 | 82.4 | 79.9 | 80.9 | 81.1 | 81.4 | 80.5 | 81.1 | 81.4 | 81.9 | 80.2 | 81.3 |
| Specific Young's modulus (GPa·g·cm⁻³) | | 29.7 | 30.1 | 30.5 | 30.8 | 30.2 | 29.8 | 30.0 | 30.1 | 29.9 | 30.0 | 30.3 | 30.5 | 30.0 | 30.1 |
| β-OH (mm⁻¹) | | 0.06 | 0.14 | 0.05 | 0.04 | 0.05 | 0.13 | 0.07 | 0.13 | 0.05 | 0.06 | 0.12 | 0.08 | 0.03 | 0.08 |

TABLE 23

| | | No. 309 | No. 310 | No. 311 | No. 312 | No. 313 | No. 314 | No. 315 | No. 316 | No. 317 | No. 318 | No. 319 | No. 320 | No. 321 | No. 322 |
|---|---|---|---|---|---|---|---|---|---|---|---|---|---|---|---|
| mol % | $SiO_2$ | 71.9 | 71.9 | 71.9 | 71.9 | 71.9 | 71.9 | 71.9 | 71.9 | 71.9 | 71.9 | 71.9 | 71.9 | 71.9 | 71.9 |
| | $Al_2O_3$ | 12.5 | 12.5 | 12.5 | 12.5 | 12.5 | 12.0 | 12.0 | 12.0 | 12.0 | 12.0 | 12.0 | 12.0 | 12.0 | 12.0 |
| | $B_2O_3$ | 0.0 | 0.5 | 0.0 | 0.5 | 0.5 | 0.0 | 0.0 | 0.0 | 0.0 | 2.0 | 0.0 | 0.0 | 0.0 | 1.0 |
| | MgO | 3.8 | 3.3 | 3.8 | 3.3 | 3.8 | 3.3 | 3.3 | 3.3 | 5.3 | 3.3 | 3.3 | 3.3 | 4.3 | 3.3 |
| | CaO | 4.7 | 4.7 | 5.2 | 5.2 | 4.7 | 4.7 | 4.7 | 6.7 | 4.7 | 4.7 | 4.7 | 5.7 | 4.7 | 4.7 |
| | SrO | 0.5 | 0.5 | 0.0 | 0.0 | 0.0 | 0.0 | 2.0 | 0.0 | 0.0 | 0.0 | 1.0 | 0.0 | 0.0 | 0.0 |
| | BaO | 6.6 | 6.6 | 6.6 | 6.6 | 6.6 | 8.1 | 6.1 | 6.1 | 6.1 | 6.1 | 7.1 | 7.1 | 7.1 | 7.1 |
| | ZnO | 0.0 | 0.0 | 0.0 | 0.0 | 0.0 | 0.0 | 0.0 | 0.0 | 0.0 | 0.0 | 0.0 | 0.0 | 0.0 | 0.0 |
| | $SnO_2$ | 0.1 | 0.1 | 0.1 | 0.1 | 0.1 | 0.1 | 0.1 | 0.1 | 0.1 | 0.1 | 0.1 | 0.1 | 0.1 | 0.1 |
| | $[SiO_2] + [Al_2O_3]$ | 84.4 | 84.4 | 84.4 | 84.4 | 84.4 | 83.9 | 83.9 | 83.9 | 83.9 | 83.9 | 83.9 | 83.9 | 83.9 | 83.9 |
| | $[MgO] + [CaO] + [SrO] + [BaO]$ | 15.6 | 15.1 | 15.6 | 15.1 | 15.1 | 16.1 | 16.0 | 16.0 | 16.0 | 14.0 | 16.0 | 16.1 | 16.1 | 15.0 |
| | $[SrO] + [BaO]$ | 7.1 | 7.1 | 6.6 | 6.6 | 6.6 | 8.1 | 8.1 | 6.1 | 6.1 | 6.1 | 8.1 | 7.1 | 7.1 | 7.1 |
| | $[B_2O_3]/([SrO] + [BaO])$ | 0.0 | 0.1 | 0.0 | 0.1 | 0.1 | 0.0 | 0.0 | 0.0 | 0.0 | 0.3 | 0.0 | 0.0 | 0.0 | 0.1 |
| | $[Al_2O_3] + [B_2O_3] - [CaO] - [SrO] - [BaO]$ | 0.7 | 1.2 | 0.7 | 1.2 | 1.7 | −0.8 | −0.7 | −0.8 | 1.3 | 3.3 | −0.8 | −0.8 | 0.2 | 1.2 |
| | $[SiO_2] + 14[Al_2O_3] - 15[B_2O_3] + 6[MgO] + [CaO] + 14[SrO] + 16[BaO]$ | 387.0 | 376.5 | 380.5 | 370.0 | 372.5 | 393.8 | 389.2 | 363.3 | 373.4 | 331.2 | 391.8 | 378.8 | 384.0 | 362.8 |
| | $17.8[SiO_2] + 23.1[Al_2O_3] + 3.7[B_2O_3] + 12.9[MgO] + 14.1[CaO] + 15.5[SrO] + 15.0[BaO] + 7.2[ZnO]$ | 1,790.6 | 1,786.0 | 1,789.9 | 1,785.3 | 1,784.7 | 1,786.5 | 1,787.0 | 1,784.6 | 1,782.2 | 1,763.4 | 1,787.0 | 1,786.0 | 1,784.8 | 1,775.2 |
| Thermal expansion coefficient ($10^{-7}$/° C.) | | 40.6 | 40.2 | 40.4 | 40.1 | 39.7 | 42.6 | 42.1 | 41.4 | 39.8 | 38.4 | 42.4 | 42.0 | 41.2 | 40.5 |
| Density (g/cm³) | | 2.697 | 2.688 | 2.690 | 2.681 | 2.680 | 2.736 | 2.706 | 2.680 | 2.675 | 2.640 | 2.721 | 2.708 | 2.706 | 2.688 |
| Strain point (° C.) | | 763 | 757 | 763 | 757 | 757 | 758 | 758 | 758 | 758 | 736 | 758 | 758 | 758 | 746 |
| Annealing point (° C.) | | 824 | 820 | 823 | 819 | 819 | 818 | 818 | 816 | 817 | 800 | 818 | 817 | 817 | 809 |
| Softening point (° C.) | | 1,068 | 1,065 | 1,066 | 1,064 | 1,063 | 1,065 | 1,062 | 1,057 | 1,058 | 1,045 | 1,063 | 1,061 | 1,061 | 1,054 |
| $10^{4.5}$ dPa · s (° C.) | | 1,403 | 1,403 | 1,401 | 1,401 | 1,401 | 1,402 | 1,399 | 1,391 | 1,391 | 1,390 | 1,401 | 1,397 | 1,397 | 1,396 |
| $10^{4.0}$ dPa · s (° C.) | | 1,572 | 1,575 | 1,570 | 1,573 | 1,572 | 1,575 | 1,570 | 1,561 | 1,558 | 1,568 | 1,572 | 1,567 | 1,566 | 1,574 |
| $10^{3.0}$ dPa · s (° C.) | | 1,679 | 1,680 | 1,677 | 1,678 | 1,678 | 1,683 | 1,678 | 1,670 | 1,667 | 1,671 | 1,681 | 1,676 | 1,675 | 1,677 |
| $10^{2.5}$ dPa · s (° C.) | | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured |
| Young's modulus (GPa) | | 81.6 | 80.7 | 81.7 | 80.9 | 81.1 | 80.1 | 80.7 | 81.4 | 82.4 | 79.0 | 80.4 | 80.8 | 81.3 | 79.6 |
| Specific Young's modulus (GPa/g · cm⁻³) | | 30.2 | 30.0 | 30.4 | 30.2 | 30.3 | 29.3 | 29.8 | 30.4 | 30.8 | 29.9 | 29.6 | 29.8 | 30.0 | 29.6 |
| β-OH (mm⁻¹) | | 0.06 | 0.04 | 0.06 | 0.15 | 0.03 | 0.05 | 0.03 | 0.11 | 0.05 | 0.11 | 0.13 | 0.14 | 0.08 | 0.14 |

TABLE 24

| | | No. 323 | No. 324 | No. 325 | No. 326 | No. 327 | No. 328 | No. 329 | No. 330 | No. 331 | No. 332 | No. 333 | No. 334 | No. 335 | No. 336 |
|---|---|---|---|---|---|---|---|---|---|---|---|---|---|---|---|
| mol % | $SiO_2$ | 71.9 | 71.9 | 71.9 | 71.9 | 71.9 | 71.9 | 71.9 | 71.9 | 71.9 | 71.9 | 71.9 | 71.9 | 71.9 | 71.9 |
| | $Al_2O_3$ | 12.0 | 12.0 | 12.0 | 12.0 | 12.0 | 12.0 | 14.5 | 14.5 | 14.5 | 15.0 | 15.0 | 15.0 | 15.0 | 15.0 |
| | $B_2O_3$ | 0.0 | 0.0 | 1.0 | 0.0 | 1.0 | 1.0 | 0.0 | 3.3 | 0.0 | 3.3 | 3.3 | 0.0 | 0.0 | 0.0 |
| | MgO | 3.3 | 4.3 | 3.3 | 4.3 | 3.3 | 4.3 | 3.3 | 3.3 | 2.8 | 4.7 | 3.7 | 2.3 | 3.3 | 2.8 |
| | CaO | 5.7 | 4.7 | 4.7 | 5.7 | 5.7 | 4.7 | 4.7 | 4.2 | 4.7 | 0.0 | 0.0 | 4.7 | 4.2 | 4.7 |
| | SrO | 1.0 | 1.0 | 1.0 | 0.0 | 0.0 | 0.0 | 0.0 | 0.0 | 0.0 | 0.0 | 0.0 | 0.0 | 0.0 | 0.0 |
| | BaO | 6.1 | 6.1 | 6.1 | 6.1 | 6.1 | 6.1 | 5.6 | 6.1 | 6.1 | 5.1 | 6.1 | 6.1 | 5.6 | 5.6 |
| | ZnO | 0.0 | 0.0 | 0.0 | 0.0 | 0.0 | 0.0 | 0.0 | 0.0 | 0.0 | 0.0 | 0.0 | 0.0 | 0.0 | 0.0 |
| | $SnO_2$ | 0.1 | 0.1 | 0.1 | 0.1 | 0.1 | 0.1 | 0.1 | 0.1 | 0.1 | 0.1 | 0.1 | 0.1 | 0.1 | 0.1 |
| | $[SiO_2] + [Al_2O_3]$ | 83.9 | 83.9 | 83.9 | 83.9 | 83.9 | 83.9 | 86.4 | 86.4 | 86.4 | 86.9 | 86.9 | 86.9 | 86.9 | 86.9 |
| | $[MgO] + [CaO] + [SrO] + [BaO]$ | 16.0 | 16.0 | 15.0 | 16.1 | 15.0 | 15.0 | 13.5 | 13.5 | 13.6 | 13.0 | 13.0 | 13.1 | 13.1 | 13.1 |
| | $[SrO] + [BaO]$ | 7.1 | 7.1 | 7.1 | 6.1 | 6.1 | 6.1 | 5.6 | 6.1 | 6.1 | 5.1 | 6.1 | 6.1 | 5.6 | 5.6 |
| | $[B_2O_3]/([SrO] + [BaO])$ | 0.0 | 0.0 | 0.1 | 0.0 | 0.2 | 0.2 | 0.0 | 0.0 | 0.0 | 0.0 | 0.0 | 0.0 | 0.0 | 0.0 |
| | $[Al_2O_3] + [B_2O_3] - [CaO] - [SrO] - [BaO]$ | −0.8 | 0.3 | 1.3 | 0.2 | 1.2 | 2.3 | 4.2 | 4.2 | 3.7 | 5.2 | 5.2 | 4.2 | 5.2 | 4.7 |
| | $[SiO_2] + 14[Al_2O_3] - 15[B_2O_3] + 6[MgO] + [CaO] + 14[SrO] + 16[BaO]$ | 376.3 | 381.4 | 360.2 | 368.5 | 347.3 | 352.4 | 388.8 | 395.8 | 394.0 | 387.8 | 402.3 | 398.0 | 395.3 | 393.0 |
| | $17.8[SiO_2] + 23.1[Al_2O_3] + 3.7[B_2O_3] + 12.9[MgO] + 14.1[CaO] + 15.5[SrO] + 15.0[BaO] + 7.2[ZnO]$ | 1,786.0 | 1,784.8 | 1,775.2 | 1,783.9 | 1,774.2 | 1,773.0 | 1,806.7 | 1,807.1 | 1,808.2 | 1,810.8 | 1,811.6 | 1,813.3 | 1,811.7 | 1,812.7 |
| Thermal expansion coefficient ($10^{-7}$/° C.) | | 41.8 | 40.9 | 40.2 | 40.6 | 39.9 | 39.1 | 36.9 | 37.1 | 37.5 | 35.7 | 36.3 | 37.0 | 36.0 | 36.4 |
| Density (g/cm³) | | 2.693 | 2.691 | 2.673 | 2.677 | 2.660 | 2.657 | 2.654 | 2.667 | 2.669 | 2.638 | 2.664 | 2.667 | 2.651 | 2.652 |
| Strain point (° C.) | | 758 | 758 | 746 | 757 | 746 | 747 | 785 | 785 | 787 | 788 | 790 | 794 | 789 | 791 |
| Annealing point (° C.) | | 817 | 817 | 809 | 816 | 808 | 808 | 846 | 847 | 849 | 847 | 850 | 854 | 849 | 850 |
| Softening point (° C.) | | 1,059 | 1,060 | 1,053 | 1,057 | 1,051 | 1,051 | 1,092 | 1,095 | 1,097 | 1,097 | 1,102 | 1,106 | 1,100 | 1,101 |
| $10^{4.5}$ dPa · s (° C.) | | 1,395 | 1,395 | 1,394 | 1,391 | 1,390 | 1,391 | 1,418 | 1,421 | 1,422 | 1,418 | 1,424 | 1,428 | 1,421 | 1,423 |
| $10^{4.0}$ dPa · s (° C.) | | 1,565 | 1,564 | 1,571 | 1,559 | 1,567 | 1,564 | 1,580 | 1,583 | 1,585 | 1,580 | 1,587 | 1,590 | 1,583 | 1,584 |
| $10^{3.0}$ dPa · s (° C.) | | 1,674 | 1,673 | 1,674 | 1,668 | 1,670 | 1,669 | 1,681 | 1,685 | 1,687 | 1,677 | 1,684 | 1,689 | 1,680 | 1,682 |
| $10^{2.5}$ dPa · s(° C.) | | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured |
| Young's modulus (GPa) | | 81.1 | 81.6 | 79.9 | 82.0 | 80.3 | 80.7 | 83.2 | 82.9 | 82.7 | 83.8 | 83.2 | 82.8 | 83.5 | 83.4 |
| Specific Young's modulus (GPa · g · cm⁻³) | | 30.1 | 30.3 | 29.9 | 30.6 | 30.2 | 30.4 | 31.3 | 31.1 | 31.0 | 31.8 | 31.2 | 31.0 | 31.5 | 31.4 |
| β-OH (mm⁻¹) | | 0.09 | 0.11 | 0.10 | 0.12 | 0.09 | 0.09 | 0.12 | 0.03 | 0.05 | 0.05 | 0.09 | 0.09 | 0.06 | 0.12 |

TABLE 25

| | | No. 337 | No. 338 | No. 339 | No. 340 | No. 341 | No. 342 | No. 343 | No. 344 | No. 345 | No. 346 | No. 347 | No. 348 | No. 349 | No. 350 |
|---|---|---|---|---|---|---|---|---|---|---|---|---|---|---|---|
| mol % | SiO$_2$ | 71.9 | 71.9 | 71.9 | 71.9 | 71.9 | 71.9 | 71.9 | 71.9 | 71.9 | 71.9 | 71.9 | 71.9 | 71.9 | 71.9 |
| | Al$_2$O$_3$ | 15.0 | 15.5 | 15.5 | 15.5 | 15.5 | 15.5 | 15.5 | 15.5 | 15.5 | 15.5 | 16.0 | 16.0 | 16.0 | 16.0 |
| | B$_2$O$_3$ | 0.0 | 0.0 | 0.0 | 0.0 | 0.0 | 0.0 | 0.0 | 0.0 | 0.0 | 0.0 | 0.0 | 0.0 | 0.0 | 0.0 |
| | MgO | 2.8 | 3.3 | 3.3 | 1.8 | 3.3 | 2.8 | 3.3 | 2.3 | 2.8 | 2.3 | 3.3 | 3.3 | 1.3 | 3.3 |
| | CaO | 4.2 | 4.7 | 3.2 | 4.7 | 4.2 | 4.7 | 3.7 | 4.7 | 3.7 | 4.2 | 4.7 | 2.7 | 4.7 | 3.7 |
| | SrO | 0.0 | 0.0 | 0.0 | 0.0 | 0.0 | 0.0 | 0.0 | 0.0 | 0.0 | 0.0 | 0.0 | 0.0 | 0.0 | 0.0 |
| | BaO | 6.1 | 4.6 | 6.1 | 6.1 | 5.1 | 5.1 | 5.6 | 5.6 | 6.1 | 6.1 | 4.1 | 6.1 | 6.1 | 5.1 |
| | ZnO | 0.0 | 0.0 | 0.0 | 0.0 | 0.0 | 0.0 | 0.0 | 0.0 | 0.0 | 0.0 | 0.0 | 0.0 | 0.0 | 0.0 |
| | SnO$_2$ | 0.1 | 0.1 | 0.1 | 0.1 | 0.1 | 0.1 | 0.1 | 0.1 | 0.1 | 0.1 | 0.1 | 0.1 | 0.1 | 0.1 |
| | [SiO$_2$] + [Al$_2$O$_3$] | 86.9 | 87.4 | 87.4 | 87.4 | 87.4 | 87.4 | 87.4 | 87.4 | 87.4 | 87.4 | 87.9 | 87.9 | 87.9 | 87.9 |
| | [MgO] + [CaO] + [SrO] + [BaO] | 13.1 | 12.5 | 12.5 | 12.5 | 12.6 | 12.6 | 12.6 | 12.6 | 12.6 | 12.6 | 12.0 | 12.0 | 12.1 | 12.1 |
| | [SrO] + [BaO] | 6.1 | 4.6 | 6.1 | 6.1 | 5.1 | 5.1 | 5.6 | 5.6 | 6.1 | 6.1 | 4.1 | 6.1 | 6.1 | 5.1 |
| | [B$_2$O$_3$]/([SrO] + [BaO]) | 0.0 | 0.0 | 0.0 | 0.0 | 0.0 | 0.0 | 0.0 | 0.0 | 0.0 | 0.0 | 0.0 | 0.0 | 0.0 | 0.0 |
| | [Al$_2$O$_3$] + [B$_2$O$_3$] − [CaO] − [SrO] − [BaO] | 4.7 | 6.2 | 6.2 | 4.8 | 6.2 | 5.7 | 6.2 | 5.2 | 5.7 | 5.2 | 7.2 | 7.2 | 5.3 | 7.2 |
| | [SiO$_2$] + 14[Al$_2$O$_3$] − 15[B$_2$O$_3$] + 6[MgO] + [CaO] + 14[SrO] + 16[BaO] | 400.5 | 386.8 | 408.8 | 401.4 | 394.3 | 392.0 | 401.8 | 397.0 | 406.5 | 404.0 | 385.8 | 415.3 | 405.4 | 400.8 |
| | 17.8[SiO$_2$] + 23.1[Al$_2$O$_3$] + 3.7[B$_2$O$_3$] + 12.9[MgO] + 14.1[CaO] + 15.5[SrO] + 15.0[BaO] + 7.2[ZnO] | 1,813.2 | 1,814.8 | 1,816.1 | 1,817.9 | 1,815.7 | 1,816.3 | 1,816.2 | 1,817.3 | 1,817.2 | 1,817.8 | 1,818.9 | 1,820.6 | 1,823.0 | 1,820.2 |
| Thermal expansion coefficient (10$^{-7}$/° C.) | | 36.7 | 34.7 | 35.5 | 36.6 | 34.9 | 35.3 | 35.2 | 35.9 | 35.8 | 36.2 | 33.6 | 34.7 | 36.1 | 34.2 |
| Density (g/cm$^3$) | | 2.666 | 2.622 | 2.662 | 2.665 | 2.635 | 2.636 | 2.649 | 2.651 | 2.663 | 2.664 | 2.605 | 2.659 | 2.664 | 2.633 |
| Strain point (° C.) | | 792 | 791 | 794 | 800 | 792 | 794 | 793 | 797 | 796 | 798 | 794 | 798 | 806 | 795 |
| Annealing point (° C.) | | 852 | 848 | 853 | 860 | 849 | 851 | 851 | 856 | 855 | 857 | 848 | 854 | 865 | 850 |
| Softening point (° C.) | | 1,104 | 1,102 | 1,109 | 1,114 | 1,104 | 1,106 | 1,106 | 1,110 | 1,110 | 1,112 | 1,106 | 1,114 | 1,119 | 1,110 |
| 10$^{4.5}$ dPa · s (° C.) | | 1,426 | 1,417 | 1,427 | 1,432 | 1,421 | 1,422 | 1,424 | 1,427 | 1,429 | 1,430 | 1,416 | 1,428 | 1,437 | 1,422 |
| 10$^{4.0}$ dPa · s (° C.) | | 1,588 | 1,582 | 1,593 | 1,596 | 1,585 | 1,586 | 1,589 | 1,591 | 1,594 | 1,595 | 1,585 | 1,601 | 1,603 | 1,593 |
| 10$^{3.0}$ dPa · s (° C.) | | 1,686 | 1,672 | 1,683 | 1,690 | 1,675 | 1,678 | 1,679 | 1,684 | 1,685 | 1,687 | 1,666 | 1,681 | 1,691 | 1,673 |
| 10$^{2.5}$ dPa · s (° C.) | | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured |
| Young's modulus (GPa) | | 83.0 | 84.4 | 83.5 | 82.8 | 84.1 | 83.9 | 83.8 | 83.4 | 83.3 | 83.1 | 85.0 | 83.8 | 82.9 | 84.4 |
| Specific Young's modulus (GPa · g · cm$^{-3}$) | | 31.1 | 32.2 | 31.4 | 31.1 | 31.9 | 31.8 | 31.6 | 31.5 | 31.3 | 31.2 | 32.6 | 31.5 | 31.1 | 32.1 |
| β-OH (mm$^{-1}$) | | 0.08 | 0.03 | 0.08 | 0.03 | 0.04 | 0.09 | 0.15 | 0.15 | 0.04 | 0.11 | 0.05 | 0.07 | 0.06 | 0.03 |

TABLE 26

| | | No. 351 | No. 352 | No. 353 | No. 354 | No. 355 | No. 356 | No. 357 | No. 358 | No. 359 | No. 360 | No. 361 | No. 362 | No. 363 | No. 364 |
|---|---|---|---|---|---|---|---|---|---|---|---|---|---|---|---|
| mol % | $SiO_2$ | 71.9 | 71.9 | 71.9 | 71.9 | 71.9 | 71.9 | 71.9 | 71.9 | 71.9 | 71.9 | 71.9 | 71.9 | 71.9 | 71.9 |
| | $Al_2O_3$ | 16.0 | 16.0 | 14.0 | 14.0 | 14.0 | 14.0 | 14.0 | 14.0 | 14.0 | 14.0 | 14.0 | 14.0 | 14.0 | 14.0 |
| | $B_2O_3$ | 0.0 | 0.0 | 0.0 | 0.0 | 0.0 | 0.0 | 0.0 | 0.0 | 0.0 | 0.0 | 0.0 | 0.0 | 0.0 | 0.0 |
| | MgO | 2.3 | 2.3 | 10.0 | 10.0 | 10.0 | 8.0 | 8.0 | 8.0 | 8.0 | 8.0 | 6.0 | 6.0 | 6.0 | 6.0 |
| | CaO | 4.7 | 3.7 | 4.0 | 0.0 | 0.0 | 6.0 | 0.0 | 0.0 | 0.0 | 0.0 | 4.0 | 4.0 | 4.0 | 6.0 |
| | SrO | 0.0 | 0.0 | 0.0 | 4.0 | 0.0 | 0.0 | 6.0 | 6.0 | 0.0 | 0.0 | 0.0 | 0.0 | 0.0 | 0.0 |
| | BaO | 5.1 | 6.1 | 0.0 | 0.0 | 4.0 | 0.0 | 0.0 | 0.0 | 6.0 | 6.0 | 4.0 | 4.0 | 4.0 | 4.0 |
| | ZnO | 0.0 | 0.0 | 0.0 | 0.0 | 0.0 | 0.0 | 0.0 | 0.0 | 0.0 | 0.0 | 0.0 | 0.0 | 0.0 | 0.0 |
| | $SnO_2$ | 0.1 | 0.1 | 0.1 | 0.1 | 0.1 | 0.1 | 0.1 | 0.1 | 0.1 | 0.1 | 0.1 | 0.1 | 0.1 | 0.1 |
| | $[SiO_2] + [Al_2O_3]$ | 87.9 | 87.9 | 85.9 | 85.9 | 85.9 | 85.9 | 85.9 | 85.9 | 85.9 | 85.9 | 85.9 | 85.9 | 85.9 | 85.9 |
| | $[MgO] + [CaO] + [SrO] + [BaO]$ | 12.1 | 12.1 | 14.0 | 14.0 | 14.0 | 14.0 | 14.0 | 14.0 | 14.0 | 14.0 | 14.0 | 14.0 | 14.0 | 14.0 |
| | $[SrO] + [BaO]$ | 5.1 | 6.1 | 0.0 | 4.0 | 4.0 | 0.0 | 6.0 | 6.0 | 6.0 | 8.0 | 8.0 | 4.0 | 4.0 | 8.0 |
| | $[B_2O_3]/([SrO] + [BaO])$ | 0.0 | 0.0 | — | 0.0 | 0.0 | — | 0.0 | 0.0 | — | 0.0 | 0.0 | 0.0 | 0.0 | 0.0 |
| | $[Al_2O_3] + [B_2O_3] - [CaO] - [SrO] - [BaO]$ | 6.2 | 6.2 | 10.0 | 10.0 | 10.0 | 8.0 | 8.0 | 8.0 | 6.0 | 6.0 | 6.0 | 6.0 | 6.0 | 6.0 |
| | $[SiO_2] + 14[Al_2O_3] - 15[B_2O_3] + 6[MgO] + [CaO] + 14[SrO] + 16[BaO]$ | 396.0 | 410.5 | 331.9 | 383.9 | 391.9 | 321.9 | 399.9 | 411.9 | 311.9 | 415.9 | 431.9 | 363.9 | 371.9 | 423.9 |
| | $17.8[SiO_2] + 23.1[Al_2O_3] + 3.7[B_2O_3] + 12.9[MgO] + 14.1[CaO] + 15.5[SrO] + 15.0[BaO] + 7.2[ZnO]$ | 1,821.4 | 1,822.3 | 1,788.6 | 1,794.2 | 1,792.2 | 1,791.0 | 1,799.4 | 1,796.4 | 1,793.4 | 1,804.6 | 1,800.6 | 1,799.0 | 1,797.0 | 1,802.6 |
| Thermal expansion coefficient ($10^{-7}/°C$) | | 34.9 | 35.4 | 30.1 | 31.2 | 31.9 | 31.3 | 33.1 | 34.4 | 32.6 | 35.2 | 37.0 | 33.9 | 34.7 | 36.1 |
| Density (g/cm$^3$) | | 2.635 | 3.661 | 2.488 | 2.541 | 2.597 | 2.493 | 2.572 | 2.657 | 2.497 | 2.603 | 2.717 | 2.550 | 2.606 | 2.660 |
| Strain point (°C) | | 800 | 802 | 771 | 780 | 782 | 770 | 778 | 780 | 773 | 780 | 779 | 774 | 773 | 779 |
| Annealing point (°C) | | 856 | 859 | 830 | 836 | 839 | 828 | 837 | 841 | 831 | 841 | 847 | 834 | 833 | 843 |
| Softening point (°C) | | 1,113 | 1,116 | 1,048 | 1,057 | 1,063 | 1,053 | 1,065 | 1,077 | 1,058 | 1,076 | 1,093 | 1,066 | 1,069 | 1,084 |
| $10^{4.5}$ dPa·s (°C) | | 1,426 | 1,433 | 1,358 | 1,370 | 1,381 | 1,364 | 1,385 | 1,402 | 1,370 | 1,399 | 1,422 | 1,385 | 1,396 | 1,411 |
| $10^{4.0}$ dPa·s (°C) | | 1,594 | 1,601 | 1,517 | 1,534 | 1,546 | 1,521 | 1,548 | 1,566 | 1,527 | 1,563 | 1,587 | 1,544 | 1,557 | 1,575 |
| $10^{3.0}$ dPa·s (°C) | | 1,678 | 1,685 | 1,613 | 1,629 | 1,641 | 1,619 | 1,646 | 1,664 | 1,626 | 1,664 | 1,689 | 1,645 | 1,658 | 1,677 |
| $10^{2.5}$ dPa·s (°C) | | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured |
| Young's modulus (GPa) | | 84.0 | 83.4 | 89.5 | 88.2 | 87.0 | 88.6 | 86.6 | 84.8 | 87.7 | 85.0 | 82.6 | 86.3 | 85.1 | 83.8 |
| Specific Young's modulus (GPa·g·cm$^{-3}$) | | 31.9 | 31.3 | 36.0 | 34.7 | 33.5 | 35.5 | 33.7 | 31.9 | 35.1 | 32.7 | 30.4 | 33.9 | 32.7 | 31.5 |
| β-OH (mm$^{-1}$) | | 0.11 | 0.11 | 0.12 | 0.14 | 0.12 | 0.04 | 0.04 | 0.08 | 0.08 | 0.15 | 0.11 | 0.05 | 0.04 | 0.09 |

TABLE 27

| | | No. 365 | No. 366 | No. 367 | No. 368 | No. 369 | No. 370 | No. 371 | No. 372 | No. 373 | No. 374 | No. 375 | No. 376 | No. 377 | No. 378 |
|---|---|---|---|---|---|---|---|---|---|---|---|---|---|---|---|
| mol % | $SiO_2$ | 71.9 | 71.9 | 71.9 | 71.9 | 71.9 | 71.9 | 71.9 | 71.9 | 71.9 | 71.9 | 71.9 | 71.9 | 71.9 | 71.9 |
| | $Al_2O_3$ | 14.0 | 14.0 | 14.0 | 14.0 | 14.0 | 14.0 | 14.0 | 14.0 | 14.0 | 14.0 | 14.0 | 14.0 | 14.0 | 14.0 |
| | $B_2O_3$ | 0.0 | 0.0 | 0.0 | 0.0 | 0.0 | 0.0 | 0.0 | 0.0 | 0.0 | 4.0 | 4.0 | 4.0 | 4.0 | 4.0 |
| | MgO | 6.0 | 6.0 | 6.0 | 6.0 | 6.0 | 6.0 | 4.0 | 4.0 | 4.0 | 8.0 | 8.0 | 6.0 | 6.0 | 6.0 |
| | CaO | 6.0 | 6.0 | 2.0 | 2.0 | 0.0 | 0.0 | 0.0 | 0.0 | 0.0 | 2.0 | 0.0 | 0.0 | 0.0 | 0.0 |
| | SrO | 2.0 | 0.0 | 6.0 | 0.0 | 2.0 | 0.0 | 0.0 | 0.0 | 0.0 | 0.0 | 2.0 | 4.0 | 4.0 | 2.0 |
| | BaO | 0.0 | 2.0 | 0.0 | 6.0 | 6.0 | 8.0 | 10.0 | 10.0 | 10.0 | 0.0 | 0.0 | 0.0 | 0.0 | 2.0 |
| | ZnO | 0.0 | 0.0 | 0.0 | 0.0 | 0.0 | 0.0 | 0.0 | 0.0 | 0.0 | 0.0 | 0.0 | 0.0 | 0.0 | 0.0 |
| | $SnO_2$ | 0.1 | 0.1 | 0.1 | 0.1 | 0.1 | 0.1 | 0.1 | 0.1 | 0.1 | 0.1 | 0.1 | 0.1 | 0.1 | 0.1 |
| | $[SiO_2] + [Al_2O_3]$ | 85.9 | 85.9 | 85.9 | 85.9 | 85.9 | 85.9 | 85.9 | 85.9 | 85.9 | 85.9 | 85.9 | 85.9 | 85.9 | 85.9 |
| | $[MgO] + [CaO] + [SrO] + [BaO]$ | 14.0 | 14.0 | 14.0 | 14.0 | 14.0 | 14.0 | 14.0 | 14.0 | 14.0 | 10.0 | 10.0 | 10.0 | 10.0 | 10.0 |
| | $[SrO] + [BaO]$ | 2.0 | 2.0 | 6.0 | 6.0 | 8.0 | 8.0 | 10.0 | 10.0 | 10.0 | 0.0 | 2.0 | 4.0 | 4.0 | 4.0 |
| | $[B_2O_3]/([SrO] + [BaO])$ | 0.0 | 0.0 | 0.0 | 0.0 | 0.0 | — | 0.0 | 0.0 | 0.0 | 0.0 | 2.0 | 0.0 | 0.0 | 0.0 |
| | $[Al_2O_3] + [B_2O_3] - [CaO] - [SrO] - [BaO]$ | 6.0 | 6.0 | 6.0 | 6.0 | 6.0 | 6.0 | 4.0 | 4.0 | 4.0 | 4.0 | 4.0 | 4.0 | 4.0 | 4.0 |
| | $[SiO_2] + 14[Al_2O_3] - 15[B_2O_3] + 6[MgO] + [CaO] + 14[SrO] + 16[BaO]$ | 337.9 | 341.9 | 389.9 | 401.9 | 427.9 | 419.9 | 301.9 | 431.9 | 451.9 | 327.9 | 331.9 | 353.9 | 361.9 | 357.9 |
| | $17.8[SiO_2] + 23.1[Al_2O_3] + 3.7[B_2O_3] + 12.9[MgO] + 14.1[CaO] + 15.5[SrO] + 15.0[BaO] + 7.2[ZnO]$ | 1,796.2 | 1,795.2 | 1,801.8 | 1,798.8 | 1,801.6 | 1,803.6 | 1,795.8 | 1,809.8 | 1,804.8 | 1,798.6 | 1,797.6 | 1,801.4 | 1,799.4 | 1,800.4 |
| Thermal expansion coefficient ($10^{-7}$/° C.) | | 33.3 | 33.7 | 34.6 | 35.8 | 36.5 | 35.7 | 34.0 | 37.4 | 39.7 | 34.7 | 35.1 | 35.4 | 36.2 | 35.8 |
| Density (g/cm³) | | 2.524 | 2.552 | 2.576 | 2.661 | 2.688 | 2.631 | 2.502 | 2.634 | 2.776 | 2.528 | 2.556 | 2.554 | 2.611 | 2.583 |
| Strain point (° C.) | | 773 | 772 | 776 | 776 | 779 | 780 | 781 | 788 | 785 | 779 | 778 | 779 | 777 | 778 |
| Annealing point (° C.) | | 832 | 830 | 837 | 839 | 845 | 842 | 838 | 849 | 855 | 838 | 836 | 839 | 837 | 837 |
| Softening point (° C.) | | 1,062 | 1,063 | 1,070 | 1,080 | 1,069 | 1,060 | 1,064 | 1,090 | 1,111 | 1,068 | 1,069 | 1,072 | 1,075 | 1,074 |
| $10^{4.5}$ dPa · s (° C.) | | 1,377 | 1,383 | 1,392 | 1,409 | 1,416 | 1,405 | 1,375 | 1,413 | 1,440 | 1,383 | 1,389 | 1,391 | 1,402 | 1,396 |
| $10^{4.0}$ dPa · s (° C.) | | 1,535 | 1,541 | 1,553 | 1,572 | 1,581 | 1,569 | 1,533 | 1,578 | 1,609 | 1,541 | 1,547 | 1,550 | 1,563 | 1,556 |
| $10^{3.0}$ dPa · s (° C.) | | 1,636 | 1,642 | 1,654 | 1,673 | 1,683 | 1,670 | 1,634 | 1,681 | 1,712 | 1,643 | 1,650 | 1,653 | 1,665 | 1,659 |
| $10^{2.5}$ dPa · s (° C.) | | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured |
| Young's modulus (GPa) | | 87.0 | 86.4 | 85.7 | 83.9 | 83.2 | 84.4 | 86.7 | 83.4 | 80.4 | 86.1 | 85.5 | 85.4 | 84.2 | 84.8 |
| Specific Young's modulus (GPa·g·cm⁻³) | | 34.5 | 33.9 | 33.2 | 31.5 | 30.9 | 32.1 | 34.7 | 31.7 | 29.0 | 34.0 | 33.4 | 33.4 | 32.2 | 32.8 |
| β-OH (mm⁻¹) | | 0.14 | 0.03 | 0.15 | 0.12 | 0.05 | 0.07 | 0.11 | 0.06 | 0.07 | 0.05 | 0.04 | 0.03 | 0.05 | 0.15 |

TABLE 28

| | | No. 379 | No. 380 | No. 381 | No. 382 | No. 383 | No. 384 | No. 385 | No. 386 | No. 387 | No. 388 | No. 389 | No. 390 | No. 391 | No. 392 |
|---|---|---|---|---|---|---|---|---|---|---|---|---|---|---|---|
| mol % | $SiO_2$ | 71.9 | 71.9 | 71.9 | 71.9 | 71.9 | 71.9 | 71.9 | 71.9 | 71.9 | 71.9 | 71.9 | 71.9 | 71.9 | 71.9 |
| | $Al_2O_3$ | 14.0 | 14.0 | 14.0 | 14.0 | 14.0 | 14.0 | 14.0 | 14.0 | 14.0 | 14.0 | 14.0 | 14.0 | 14.0 | 14.0 |
| | $B_2O_3$ | 0.0 | 0.0 | 0.0 | 0.0 | 0.0 | 0.0 | 0.0 | 0.0 | 0.0 | 0.0 | 0.0 | 0.0 | 0.0 | 0.0 |
| | MgO | 4.0 | 4.0 | 4.0 | 4.0 | 2.0 | 2.0 | 2.0 | 2.0 | 2.0 | 2.0 | 2.0 | 2.0 | 2.0 | 2.0 |
| | CaO | 4.0 | 4.0 | 4.0 | 4.0 | 10.0 | 10.0 | 8.0 | 8.0 | 8.0 | 6.0 | 6.0 | 6.0 | 6.0 | 4.0 |
| | SrO | 6.0 | 6.0 | 2.0 | 4.0 | 2.0 | 0.0 | 4.0 | 4.0 | 2.0 | 0.0 | 6.0 | 2.0 | 4.0 | 8.0 |
| | BaO | 0.0 | 0.0 | 4.0 | 2.0 | 0.0 | 2.0 | 0.0 | 0.0 | 2.0 | 6.0 | 0.0 | 4.0 | 2.0 | 0.0 |
| | ZnO | 0.0 | 0.0 | 0.0 | 0.0 | 0.0 | 0.0 | 0.0 | 0.0 | 0.0 | 0.0 | 0.0 | 0.0 | 0.0 | 0.0 |
| | $SnO_2$ | 0.1 | 0.1 | 0.1 | 0.1 | 0.1 | 0.1 | 0.1 | 0.1 | 0.1 | 0.1 | 0.1 | 0.1 | 0.1 | 0.1 |
| | $[SiO_2] + [Al_2O_3]$ | 85.9 | 85.9 | 85.9 | 85.9 | 85.9 | 85.9 | 85.9 | 85.9 | 85.9 | 85.9 | 85.9 | 85.9 | 85.9 | 85.9 |
| | $[MgO] + [CaO] + [SrO] + [BaO]$ | 14.0 | 14.0 | 14.0 | 14.0 | 14.0 | 14.0 | 14.0 | 14.0 | 14.0 | 14.0 | 14.0 | 14.0 | 14.0 | 14.0 |
| | $[SrO] + [BaO]$ | 6.0 | 6.0 | 6.0 | 6.0 | 2.0 | 2.0 | 4.0 | 4.0 | 4.0 | 6.0 | 6.0 | 6.0 | 6.0 | 8.0 |
| | $[B_2O_3]/([SrO] + [BaO])$ | 0.0 | 0.0 | 0.0 | 0.0 | 0.0 | 0.0 | 0.0 | 0.0 | 0.0 | 0.0 | 0.0 | 0.0 | 0.0 | 0.0 |
| | $[Al_2O_3] + [B_2O_3] - [CaO] - [SrO] - [BaO]$ | 4.0 | 4.0 | 4.0 | 4.0 | 2.0 | 2.0 | 2.0 | 2.0 | 2.0 | 2.0 | 2.0 | 2.0 | 2.0 | 2.0 |
| | $[SiO_2] + 14[Al_2O_3] - 15[B_2O_3] + 6[MgO] + [CaO] + 14[SrO] + 16[BaO]$ | 379.9 | 391.9 | 387.9 | 383.9 | 317.9 | 321.9 | 343.9 | 351.9 | 347.9 | 369.9 | 381.9 | 377.9 | 373.9 | 395.9 |
| | $17.8[SiO_2] + 23.1[Al_2O_3] + 3.7[B_2O_3] + 12.9[MgO] + 14.1[CaO] + 15.5[SrO] + 15.0[BaO] + 7.2[ZnO]$ | 1,804.2 | 1,801.2 | 1,802.2 | 1,803.2 | 1,801.0 | 1,800.0 | 1,803.8 | 1,801.8 | 1,802.8 | 1,806.6 | 1,803.6 | 1,804.6 | 1,805.6 | 1,809.4 |
| Thermal expansion coefficient ($10^{-7}/°C$) | | 36.0 | 37.4 | 36.9 | 36.5 | 36.2 | 36.5 | 36.9 | 37.8 | 37.3 | 37.6 | 38.9 | 38.5 | 38.0 | 38.3 |
| Density (g/cm³) | | 2.581 | 2.666 | 2.638 | 2.609 | 2.533 | 2.561 | 2.559 | 2.616 | 2.587 | 2.586 | 2.671 | 2.642 | 2.614 | 2.612 |
| Strain point (°C) | | 780 | 778 | 779 | 780 | 788 | 786 | 787 | 785 | 786 | 788 | 786 | 786 | 787 | 791 |
| Annealing point (°C) | | 841 | 841 | 840 | 841 | 847 | 845 | 848 | 844 | 846 | 850 | 847 | 847 | 848 | 852 |
| Softening point (°C) | | 1,077 | 1,084 | 1,081 | 1,079 | 1,076 | 1,077 | 1,081 | 1,083 | 1,082 | 1,085 | 1,091 | 1,089 | 1,087 | 1,091 |
| $10^{4.5}$ dPa·s (°C) | | 1,398 | 1,415 | 1,409 | 1,404 | 1,388 | 1,393 | 1,396 | 1,406 | 1,401 | 1,403 | 1,418 | 1,413 | 1,408 | 1,411 |
| $10^{4.0}$ dPa·s (°C) | | 1,559 | 1,578 | 1,572 | 1,565 | 1,548 | 1,554 | 1,556 | 1,569 | 1,563 | 1,565 | 1,584 | 1,578 | 1,572 | 1,574 |
| $10^{3.0}$ dPa·s (°C) | | 1,662 | 1,682 | 1,675 | 1,669 | 1,650 | 1,657 | 1,660 | 1,673 | 1,666 | 1,669 | 1,688 | 1,682 | 1,676 | 1,679 |
| $10^{2.5}$ dPa·s (°C) | | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured |
| Young's modulus (GPa) | | 84.7 | 82.9 | 83.5 | 84.1 | 85.2 | 84.6 | 84.5 | 83.3 | 83.9 | 83.8 | 82.0 | 82.6 | 83.2 | 83.2 |
| Specific Young's modulus (GPa·g·cm⁻³) | | 32.8 | 31.1 | 31.7 | 32.2 | 33.6 | 33.0 | 33.0 | 31.8 | 32.4 | 32.4 | 30.7 | 31.3 | 31.8 | 31.8 |
| β-OH (mm⁻¹) | | 0.06 | 0.13 | 0.12 | 0.06 | 0.13 | 0.13 | 0.15 | 0.11 | 0.09 | 0.05 | 0.12 | 0.14 | 0.10 | 0.06 |

TABLE 29

| | | No. 393 | No. 394 | No. 395 | No. 396 | No. 397 | No. 398 | No. 399 | No. 400 | No. 401 | No. 402 | No. 403 | No. 404 | No. 405 | No. 406 |
|---|---|---|---|---|---|---|---|---|---|---|---|---|---|---|---|
| mol % | $SiO_2$ | 71.9 | 71.9 | 71.9 | 71.9 | 71.9 | 71.9 | 71.9 | 71.9 | 71.9 | 71.9 | 71.9 | 71.9 | 71.9 | 71.9 |
| | $Al_2O_3$ | 14.0 | 14.0 | 14.0 | 14.0 | 14.0 | 14.0 | 14.0 | 14.0 | 14.0 | 14.0 | 14.0 | 14.0 | 14.0 | 14.0 |
| | $B_2O_3$ | 0.0 | 2.0 | 2.0 | 2.0 | 2.0 | 2.0 | 2.0 | 2.0 | 2.0 | 2.0 | 0.0 | 0.0 | 0.0 | 0.0 |
| | MgO | 2.0 | 4.0 | 4.0 | 4.0 | 2.0 | 2.0 | 2.0 | 2.0 | 2.0 | 2.0 | 0.0 | 0.0 | 0.0 | 0.0 |
| | CaO | 4.0 | 6.0 | 4.0 | 4.0 | 10.0 | 10.0 | 8.0 | 6.0 | 4.0 | 8.0 | 10.0 | 8.0 | 6.0 | 4.0 |
| | SrO | 0.0 | 2.0 | 4.0 | 6.0 | 0.0 | 0.0 | 2.0 | 4.0 | 6.0 | 0.0 | 4.0 | 6.0 | 8.0 | 10.0 |
| | BaO | 8.0 | 0.0 | 0.0 | 0.0 | 0.0 | 0.0 | 0.0 | 0.0 | 0.0 | 0.0 | 0.0 | 0.0 | 0.0 | 0.0 |
| | ZnO | 0.0 | 0.0 | 0.0 | 0.0 | 0.0 | 0.0 | 0.0 | 0.0 | 0.0 | 0.0 | 0.0 | 0.0 | 0.0 | 0.0 |
| | $SnO_2$ | 0.1 | 0.1 | 0.1 | 0.1 | 0.1 | 0.1 | 0.1 | 0.1 | 0.1 | 0.1 | 0.1 | 0.1 | 0.1 | 0.1 |
| | $[SiO_2] + [Al_2O_3]$ | 85.9 | 85.9 | 85.9 | 85.9 | 85.9 | 85.9 | 85.9 | 85.9 | 85.9 | 85.9 | 85.9 | 85.9 | 85.9 | 85.9 |
| | $[MgO] + [CaO] + [SrO] + [BaO]$ | 14.0 | 14.0 | 14.0 | 14.0 | 14.0 | 14.0 | 14.0 | 14.0 | 14.0 | 10.0 | 14.0 | 14.0 | 14.0 | 14.0 |
| | $[SrO] + [BaO]$ | 8.0 | 0.0 | 0.0 | 0.0 | 0.0 | 0.0 | 2.0 | 4.0 | 6.0 | 0.0 | 4.0 | 6.0 | 8.0 | 10.0 |
| | $[B_2O_3]/([SrO] + [BaO])$ | 0.0 | 0.0 | 0.0 | 0.0 | 0.0 | 0.0 | 0.0 | 0.0 | 0.0 | 0.0 | 0.0 | 0.0 | 0.0 | 0.0 |
| | $[Al_2O_3] + [B_2O_3] - [CaO] - [SrO] - [BaO]$ | 2.0 | 0.0 | 0.0 | 2.0 | 2.0 | 2.0 | 2.0 | 2.0 | 2.0 | 2.0 | 0.0 | 0.0 | 0.0 | 0.0 |
| | $[SiO_2] + 14[Al_2O_3] - 15[B_2O_3] + 6[MgO] + [CaO] + 14[SrO] + 16[BaO]$ | 411.9 | 399.9 | 403.9 | 407.9 | 421.9 | 441.9 | 425.9 | 429.9 | 433.9 | 437.9 | 471.9 | 475.9 | 479.9 | 483.9 |
| | $17.8[SiO_2] + 23.1[Al_2O_3] + 3.7[B_2O_3] + 12.9[MgO] + 14.1[CaO] + 15.5[SrO] + 15.0[BaO] + 7.2[ZnO]$ | 1,805.4 | 1,808.4 | 1,807.4 | 1,806.4 | 1,812.2 | 1,807.2 | 1,811.2 | 1,810.2 | 1,809.2 | 1,808.2 | 1,812.2 | 1,817.2 | 1,816.2 | 1,815.2 |
| Thermal expansion coefficient ($10^{-7}/°C.$) | | 40.1 | 38.7 | 39.2 | 39.6 | 39.0 | 41.2 | 39.5 | 39.9 | 40.4 | 40.8 | 42.9 | 43.4 | 43.8 | 44.3 |
| Density (g/cm$^3$) | | 2.726 | 2.640 | 2.669 | 2.697 | 2.639 | 2.781 | 2.667 | 2.696 | 2.724 | 2.752 | 2.753 | 2.782 | 2.810 | 2.838 |
| Strain point (°C.) | | 798 | 791 | 790 | 789 | 796 | 793 | 795 | 795 | 794 | 794 | 817 | 816 | 816 | 816 |
| Annealing point (°C.) | | 852 | 852 | 851 | 852 | 856 | 859 | 856 | 856 | 857 | 858 | 876 | 877 | 878 | 879 |
| Softening point (°C.) | | 1,103 | 1,093 | 1,096 | 1,099 | 1,097 | 1,117 | 1,100 | 1,104 | 1,109 | 1,113 | 1,123 | 1,127 | 1,130 | 1,132 |
| $10^{4.5}$ dPa · s (°C.) | | 1,431 | 1,416 | 1,421 | 1,426 | 1,419 | 1,443 | 1,424 | 1,429 | 1,434 | 1,438 | 1,445 | 1,449 | 1,453 | 1,457 |
| $10^{4.0}$ dPa · s (°C.) | | 1,599 | 1,581 | 1,587 | 1,593 | 1,584 | 1,615 | 1,590 | 1,596 | 1,602 | 1,609 | 1,621 | 1,627 | 1,633 | 1,639 |
| $10^{3.0}$ dPa · s (°C.) | | 1,703 | 1,685 | 1,691 | 1,697 | 1,688 | 1,717 | 1,694 | 1,700 | 1,706 | 1,712 | 1,720 | 1,725 | 1,730 | 1,735 |
| $10^{2.5}$ dPa · s (°C.) | | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured |
| Young's modulus (GPa) | | 80.8 | 82.6 | 82.0 | 81.4 | 82.5 | 79.5 | 81.9 | 81.3 | 80.7 | 80.1 | 79.0 | 78.4 | 77.8 | 77.2 |
| Specific Young's modulus (GPa/g · cm$^{-3}$) | | 29.6 | 31.3 | 30.7 | 30.2 | 31.3 | 28.6 | 30.7 | 30.2 | 29.6 | 29.1 | 28.7 | 28.2 | 27.7 | 27.2 |
| β-OH (mm$^{-1}$) | | 0.12 | 0.04 | 0.04 | 0.14 | 0.07 | 0.08 | 0.15 | 0.07 | 0.15 | 0.05 | 0.05 | 0.05 | 0.05 | 0.14 |

TABLE 30

| | | No. 407 | No. 408 | No. 409 | No. 410 | No. 411 | No. 412 | No. 413 | No. 414 | No. 415 | No. 416 | No. 417 | No. 418 | No. 419 | No. 420 |
|---|---|---|---|---|---|---|---|---|---|---|---|---|---|---|---|
| mol % | SiO$_2$ | 71.7 | 71.5 | 71.3 | 71.1 | 70.9 | 70.7 | 70.5 | 70.3 | 70.1 | 69.9 | 69.7 | 69.5 | 69.3 | 69.1 |
| | Al$_2$O$_3$ | 14.0 | 14.0 | 14.0 | 14.0 | 14.0 | 14.0 | 14.0 | 14.0 | 14.0 | 14.0 | 14.0 | 14.0 | 14.0 | 14.0 |
| | B$_2$O$_3$ | 0.2 | 0.4 | 0.6 | 0.8 | 1.0 | 1.2 | 1.4 | 1.6 | 1.8 | 2.0 | 2.2 | 2.4 | 2.6 | 2.8 |
| | MgO | 3.3 | 3.3 | 3.3 | 3.3 | 3.3 | 3.3 | 3.3 | 3.3 | 3.3 | 3.3 | 3.3 | 3.3 | 3.3 | 3.3 |
| | CaO | 4.7 | 4.7 | 4.7 | 4.7 | 4.7 | 4.7 | 4.7 | 4.7 | 4.7 | 4.7 | 4.7 | 4.7 | 4.7 | 4.7 |
| | SrO | 0.0 | 0.0 | 0.0 | 0.0 | 0.0 | 0.0 | 0.0 | 0.0 | 0.0 | 0.0 | 0.0 | 0.0 | 0.0 | 0.0 |
| | BaO | 6.1 | 6.1 | 6.1 | 6.1 | 6.1 | 6.1 | 6.1 | 6.1 | 6.1 | 6.1 | 6.1 | 6.1 | 6.1 | 6.1 |
| | ZnO | 0.0 | 0.0 | 0.0 | 0.0 | 0.0 | 0.0 | 0.0 | 0.0 | 0.0 | 0.0 | 0.0 | 0.0 | 0.0 | 0.0 |
| | SnO$_2$ | 0.1 | 0.1 | 0.1 | 0.1 | 0.1 | 0.1 | 0.1 | 0.1 | 0.1 | 0.1 | 0.1 | 0.1 | 0.1 | 0.1 |
| | [SiO$_2$] + [Al$_2$O$_3$] | 85.7 | 85.5 | 85.3 | 85.1 | 84.9 | 84.7 | 84.5 | 84.3 | 84.1 | 83.9 | 83.7 | 83.5 | 83.3 | 83.1 |
| | [MgO] + [CaO] + [SrO] + [BaO] | 14.0 | 14.0 | 14.0 | 14.0 | 14.0 | 14.0 | 14.0 | 14.0 | 14.0 | 14.0 | 14.0 | 14.0 | 14.0 | 14.0 |
| | [SrO] + [BaO] | 6.1 | 6.1 | 6.1 | 6.1 | 6.1 | 6.1 | 6.1 | 6.1 | 6.1 | 6.1 | 6.1 | 6.1 | 6.1 | 6.1 |
| | [B$_2$O$_3$]/([SrO] + [BaO]) | 0.0 | 0.1 | 0.1 | 0.1 | 0.2 | 0.2 | 0.2 | 0.3 | 0.3 | 0.3 | 0.4 | 0.4 | 0.4 | 0.5 |
| | [Al$_2$O$_3$] + [B$_2$O$_3$] − [CaO] − [SrO] − [BaO] | 3.5 | 3.7 | 3.9 | 4.1 | 4.3 | 4.5 | 4.7 | 4.9 | 5.1 | 5.3 | 5.5 | 5.7 | 5.9 | 6.1 |
| | [SiO$_2$] + 14[Al$_2$O$_3$] − 15[B$_2$O$_3$] + 6[MgO] + [CaO] + 14[SrO] + 16[BaO] | 386.0 | 382.8 | 379.6 | 376.4 | 373.2 | 370.0 | 366.8 | 363.6 | 360.4 | 357.2 | 354.0 | 350.8 | 347.6 | 344.4 |
| | 17.8[SiO$_2$] + 23.1[Al$_2$O$_3$] + 3.7[B$_2$O$_3$] + 12.9[MgO] + 14.1[CaO] + 15.5[SrO] + 15.0[BaO] + 7.2[ZnO] | 1,799.3 | 1,796.5 | 1,793.7 | 1,790.9 | 1,788.1 | 1,785.2 | 1,782.4 | 1,779.6 | 1,776.8 | 1,774.0 | 1,771.1 | 1,768.3 | 1,765.5 | 1,762.7 |
| Thermal expansion coefficient (10$^{-7}$/° C.) | | 38.0 | 38.0 | 38.1 | 38.1 | 38.1 | 38.2 | 38.2 | 38.2 | 38.3 | 38.3 | 38.3 | 38.4 | 38.4 | 38.4 |
| Density (g/cm$^3$) | | 2.668 | 2.667 | 2.666 | 2.664 | 2.663 | 2.662 | 2.660 | 2.659 | 2.657 | 2.656 | 2.655 | 2.653 | 2.652 | 2.651 |
| Strain point (° C.) | | 776 | 772 | 768 | 764 | 760 | 757 | 753 | 750 | 747 | 744 | 741 | 739 | 736 | 734 |
| Annealing point (° C.) | | 839 | 835 | 832 | 828 | 825 | 821 | 818 | 815 | 811 | 808 | 805 | 802 | 799 | 796 |
| Softening point (° C.) | | 1,082 | 1,078 | 1,074 | 1,070 | 1,066 | 1,063 | 1,059 | 1,056 | 1,053 | 1,050 | 1,047 | 1,043 | 1,040 | 1,036 |
| 10$^{4.5}$ dPa · s (° C.) | | 1,413 | 1,410 | 1,406 | 1,403 | 1,399 | 1,396 | 1,392 | 1,389 | 1,385 | 1,382 | 1,378 | 1,374 | 1,371 | 1,367 |
| 10$^{4.0}$ dPa · s (° C.) | | 1,577 | 1,573 | 1,569 | 1,565 | 1,561 | 1,557 | 1,553 | 1,549 | 1,545 | 1,541 | 1,537 | 1,533 | 1,530 | 1,526 |
| 10$^{3.0}$ dPa · s (° C.) | | 1,682 | 1,678 | 1,675 | 1,671 | 1,668 | 1,664 | 1,660 | 1,656 | 1,652 | 1,648 | 1,644 | 1,640 | 1,636 | 1,632 |
| 10$^{2.5}$ dPa · s (° C.) | | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured |
| Young's modulus (GPa) | | 82.4 | 82.2 | 82.0 | 81.8 | 81.6 | 81.4 | 81.2 | 81.0 | 80.8 | 80.6 | 80.5 | 80.3 | 80.1 | 79.9 |
| Specific Young's modulus (GPa · g · cm$^{-3}$) | | 30.9 | 30.8 | 30.8 | 30.7 | 30.6 | 30.6 | 30.5 | 30.5 | 30.4 | 30.4 | 30.3 | 30.2 | 30.2 | 30.1 |
| β-OH (mm$^{-1}$) | | 0.12 | 0.03 | 0.10 | 0.11 | 0.08 | 0.10 | 0.05 | 0.13 | 0.04 | 0.10 | 0.04 | 0.05 | 0.07 | 0.12 |

TABLE 31

| | | No. 421 | No. 422 | No. 423 | No. 424 | No. 425 | No. 426 | No. 427 | No. 428 | No. 429 | No. 430 | No. 431 | No. 432 | No. 433 | No. 434 |
|---|---|---|---|---|---|---|---|---|---|---|---|---|---|---|---|
| mol % | $SiO_2$ | 68.9 | 68.9 | 69.4 | 69.9 | 70.4 | 70.9 | 71.4 | 72.4 | 72.9 | 73.4 | 73.9 | 74.4 | 74.9 | 73.6 |
| | $Al_2O_3$ | 14.0 | 15.5 | 15.3 | 15.0 | 14.8 | 14.5 | 14.3 | 13.8 | 13.5 | 13.3 | 13.0 | 12.8 | 12.5 | 12.0 |
| | $B_2O_3$ | 3.0 | 0.0 | 0.0 | 0.0 | 0.0 | 0.0 | 0.0 | 0.0 | 0.0 | 0.0 | 0.0 | 0.0 | 0.0 | 0.0 |
| | MgO | 3.3 | 3.6 | 3.6 | 3.5 | 3.4 | 3.4 | 3.3 | 3.2 | 3.2 | 3.1 | 3.0 | 3.0 | 2.9 | 3.3 |
| | CaO | 4.7 | 5.2 | 5.1 | 5.0 | 4.9 | 4.8 | 4.8 | 4.6 | 4.5 | 4.4 | 4.3 | 4.3 | 4.2 | 4.8 |
| | SrO | 0.0 | 0.0 | 0.0 | 0.0 | 0.0 | 0.0 | 0.0 | 0.0 | 0.0 | 0.0 | 0.0 | 0.0 | 0.0 | 0.0 |
| | BaO | 6.1 | 6.7 | 6.6 | 6.5 | 6.4 | 6.3 | 6.2 | 6.0 | 5.9 | 5.7 | 5.6 | 5.5 | 5.4 | 6.2 |
| | ZnO | 0.0 | 0.0 | 0.0 | 0.0 | 0.0 | 0.0 | 0.0 | 0.0 | 0.0 | 0.0 | 0.0 | 0.0 | 0.0 | 0.0 |
| | $SnO_2$ | 0.1 | 0.1 | 0.1 | 0.1 | 0.1 | 0.1 | 0.1 | 0.1 | 0.1 | 0.1 | 0.1 | 0.1 | 0.1 | 0.1 |
| | $[SiO_2] + [Al_2O_3]$ | 82.9 | 84.4 | 84.7 | 84.9 | 85.2 | 85.4 | 85.7 | 86.2 | 86.4 | 86.7 | 86.9 | 87.2 | 87.4 | 85.6 |
| | $[MgO] + [CaO] + [SrO] + [BaO]$ | 14.0 | 15.5 | 15.3 | 15.0 | 14.8 | 14.5 | 14.3 | 13.8 | 13.5 | 13.3 | 13.0 | 12.8 | 12.5 | 14.3 |
| | $[SrO] + [BaO]$ | 6.1 | 6.7 | 6.6 | 6.5 | 6.4 | 6.3 | 6.2 | 6.0 | 5.9 | 5.7 | 5.6 | 5.5 | 5.4 | 6.2 |
| | $[B_2O_3]/([SrO] + [BaO])$ | 0.5 | 0.0 | 0.0 | 0.0 | 0.0 | 0.0 | 0.0 | 0.0 | 0.0 | 0.0 | 0.0 | 0.0 | 0.0 | 0.0 |
| | $[Al_2O_3] + [B_2O_3] - [CaO] - [SrO] - [BaO]$ | 6.3 | 3.6 | 3.6 | 3.5 | 3.4 | 3.4 | 3.3 | 3.2 | 3.2 | 3.1 | 3.0 | 3.0 | 2.9 | 1.0 |
| | $[SiO_2] + 14[Al_2O_3] - 15[B_2O_3] + 6[MgO] + [CaO] + 14[SrO] + 16[BaO]$ | 341.2 | 420.2 | 415.1 | 409.9 | 404.7 | 399.6 | 394.4 | 384.1 | 378.9 | 373.7 | 368.6 | 363.4 | 358.2 | 365.7 |
| | $17.8[SiO_2] + 23.1[Al_2O_3] + 3.7[B_2O_3] + 12.9[MgO] + 14.1[CaO] + 15.5[SrO] + 15.0[BaO] + 7.2[ZnO]$ | 1,759.9 | 1,804.7 | 1,804.3 | 1,803.9 | 1,803.4 | 1,803.0 | 1,802.6 | 1,801.7 | 1,801.3 | 1,800.9 | 1,800.5 | 1,800.0 | 1,799.6 | 1,790.4 |
| Thermal expansion coefficient ($10^{-7}/°C$) | | 38.5 | 40.6 | 40.2 | 39.7 | 39.3 | 38.8 | 38.4 | 37.5 | 37.1 | 36.7 | 36.3 | 36.0 | 35.6 | 38.6 |
| Density (g/cm³) | | 2.649 | 2.719 | 2.710 | 2.702 | 2.694 | 2.686 | 2.678 | 2.662 | 2.653 | 2.645 | 2.637 | 2.629 | 2.621 | 2.662 |
| Strain point (°C) | | 732 | 777 | 778 | 778 | 779 | 779 | 780 | 781 | 782 | 782 | 783 | 783 | 784 | 769 |
| Annealing point (°C) | | 793 | 836 | 837 | 838 | 839 | 840 | 842 | 844 | 845 | 846 | 847 | 848 | 849 | 832 |
| Softening point (°C) | | 1,032 | 1,066 | 1,069 | 1,072 | 1,075 | 1,079 | 1,083 | 1,092 | 1,096 | 1,101 | 1,106 | 1,111 | 1,116 | 1,085 |
| $10^{4.5}$ dPa·s (°C) | | 1,363 | 1,383 | 1,388 | 1,394 | 1,400 | 1,406 | 1,411 | 1,422 | 1,427 | 1,433 | 1,438 | 1,443 | 1,447 | 1,422 |
| $10^{4.0}$ dPa·s (°C) | | 1,522 | 1,536 | 1,543 | 1,551 | 1,558 | 1,565 | 1,573 | 1,588 | 1,596 | 1,604 | 1,612 | 1,620 | 1,628 | 1,601 |
| $10^{3.0}$ dPa·s (°C) | | 1,628 | 1,635 | 1,643 | 1,652 | 1,660 | 1,668 | 1,677 | 1,693 | 1,701 | 1,708 | 1,716 | 1,723 | 1,730 | 1,707 |
| $10^{2.5}$ dPa·s (°C) | | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured |
| Young's modulus (GPa) | | 79.7 | 83.9 | 83.6 | 83.4 | 83.2 | 83.0 | 82.8 | 82.3 | 82.1 | 81.9 | 81.7 | 81.5 | 81.3 | 81.0 |
| Specific Young's modulus (GPa·g·cm⁻³) | | 30.1 | 30.8 | 30.9 | 30.9 | 30.9 | 30.9 | 30.9 | 30.9 | 31.0 | 31.0 | 31.0 | 31.0 | 31.0 | 30.4 |
| β-OH (mm⁻¹) | | 0.14 | 0.07 | 0.06 | 0.09 | 0.15 | 0.10 | 0.05 | 0.03 | 0.08 | 0.09 | 0.04 | 0.08 | 0.08 | 0.14 |

TABLE 32

| | | No. 435 | No. 436 | No. 437 | No. 438 | No. 439 | No. 440 | No. 441 | No. 442 | No. 443 | No. 444 | No. 445 | No. 446 | No. 447 | No. 448 |
|---|---|---|---|---|---|---|---|---|---|---|---|---|---|---|---|
| mol % | $SiO_2$ | 73.2 | 72.7 | 72.3 | 71.1 | 70.6 | 70.2 | 69.8 | 69.4 | 71.8 | 71.6 | 71.5 | 71.3 | 71.2 | 71.0 |
| | $Al_2O_3$ | 12.5 | 13.0 | 13.5 | 15.0 | 15.5 | 16.0 | 16.5 | 17.0 | 14.0 | 13.9 | 13.9 | 13.9 | 13.9 | 13.8 |
| | $B_2O_3$ | 0.0 | 0.0 | 0.0 | 0.0 | 0.0 | 0.0 | 0.0 | 0.0 | 0.2 | 0.4 | 0.6 | 0.8 | 1.0 | 1.2 |
| | MgO | 3.3 | 3.3 | 3.3 | 3.2 | 3.2 | 3.2 | 3.2 | 3.2 | 3.3 | 3.3 | 3.2 | 3.2 | 3.2 | 3.2 |
| | CaO | 4.7 | 4.7 | 4.7 | 4.6 | 4.6 | 4.6 | 4.5 | 4.5 | 4.7 | 4.6 | 4.6 | 4.6 | 4.6 | 4.6 |
| | SrO | 0.0 | 0.0 | 0.0 | 0.0 | 0.0 | 0.0 | 0.0 | 0.0 | 0.0 | 0.0 | 0.0 | 0.0 | 0.0 | 0.0 |
| | BaO | 6.2 | 6.1 | 6.1 | 6.0 | 6.0 | 5.9 | 5.9 | 5.9 | 6.1 | 6.0 | 6.0 | 6.0 | 6.0 | 6.0 |
| | ZnO | 0.0 | 0.0 | 0.0 | 0.0 | 0.0 | 0.0 | 0.0 | 0.0 | 0.0 | 0.0 | 0.0 | 0.0 | 0.0 | 0.0 |
| | $SnO_2$ | 0.1 | 0.1 | 0.1 | 0.1 | 0.1 | 0.1 | 0.1 | 0.1 | 0.1 | 0.1 | 0.1 | 0.1 | 0.1 | 0.1 |
| | $[SiO_2] + [Al_2O_3]$ | 85.7 | 85.7 | 85.8 | 86.1 | 86.1 | 86.2 | 86.3 | 86.4 | 85.7 | 85.6 | 85.4 | 85.2 | 85.0 | 84.9 |
| | $[MgO] + [CaO] + [SrO] + [BaO]$ | 14.2 | 14.2 | 14.1 | 13.8 | 13.8 | 13.7 | 13.6 | 13.5 | 14.0 | 13.9 | 13.9 | 13.9 | 13.9 | 13.8 |
| | $[SrO] + [BaO]$ | 6.2 | 6.1 | 6.1 | 6.0 | 6.0 | 5.9 | 5.9 | 5.9 | 6.1 | 6.0 | 6.0 | 6.0 | 6.0 | 6.0 |
| | $[B_2O_3]/([SrO] + [BaO])$ | 0.0 | 0.0 | 0.0 | 0.0 | 0.0 | 0.0 | 0.0 | 0.0 | 0.0 | 0.1 | 0.1 | 0.1 | 0.2 | 0.2 |
| | $[Al_2O_3] + [B_2O_3] - [CaO] - [SrO] - [BaO]$ | 1.6 | 2.1 | 2.7 | 4.4 | 5.0 | 5.5 | 6.1 | 6.6 | 3.5 | 3.7 | 3.8 | 4.0 | 4.2 | 4.4 |
| | $[SiO_2] + 14[Al_2O_3] - 15[B_2O_3] + 6[MgO] + [CaO] + 14[SrO] + 16[BaO]$ | 371.6 | 377.5 | 383.4 | 401.0 | 406.9 | 412.7 | 418.6 | 424.5 | 385.5 | 381.7 | 377.9 | 374.1 | 370.3 | 366.6 |
| | $17.8[SiO_2] + 23.1[Al_2O_3] + 3.7[B_2O_3] + 12.9[MgO] + 14.1[CaO] + 15.5[SrO] + 15.0[BaO] + 7.2[ZnO]$ | 1,793.3 | 1,796.3 | 1,799.2 | 1,808.0 | 1,811.0 | 1,813.9 | 1,816.9 | 1,819.8 | 1,799.3 | 1,796.4 | 1,793.6 | 1,790.7 | 1,787.8 | 1,785.0 |
| Thermal expansion coefficient ($10^{-7}/°C$) | | 38.4 | 38.3 | 38.1 | 37.7 | 37.5 | 37.4 | 37.3 | 37.2 | 37.9 | 37.9 | 37.9 | 37.9 | 37.9 | 37.9 |
| Density (g/cm³) | | 2.664 | 2.666 | 2.668 | 2.674 | 2.676 | 2.678 | 2.680 | 2.682 | 2.667 | 2.665 | 2.663 | 2.661 | 2.658 | 2.656 |
| Strain point (°C) | | 772 | 775 | 778 | 785 | 787 | 789 | 791 | 793 | 776 | 772 | 768 | 764 | 761 | 757 |
| Annealing point (°C) | | 835 | 838 | 841 | 845 | 846 | 846 | 846 | 846 | 839 | 836 | 832 | 829 | 825 | 822 |
| Softening point (°C) | | 1,086 | 1,086 | 1,087 | 1,088 | 1,088 | 1,088 | 1,088 | 1,088 | 1,083 | 1,079 | 1,075 | 1,071 | 1,068 | 1,065 |
| $10^{4.5}$ dPa·s (°C) | | 1,421 | 1,420 | 1,419 | 1,411 | 1,407 | 1,403 | 1,399 | 1,395 | 1,414 | 1,411 | 1,408 | 1,405 | 1,402 | 1,399 |
| $10^{4.0}$ dPa·s (°C) | | 1,596 | 1,591 | 1,586 | 1,570 | 1,564 | 1,559 | 1,555 | 1,550 | 1,578 | 1,574 | 1,571 | 1,568 | 1,565 | 1,562 |
| $10^{3.0}$ dPa·s (°C) | | 1,702 | 1,697 | 1,671 | 1,670 | 1,663 | 1,655 | 1,648 | 1,640 | 1,682 | 1,680 | 1,678 | 1,675 | 1,672 | 1,670 |
| $10^{2.5}$ dPa·s (°C) | | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured |
| Young's modulus (GPa) | | 81.4 | 81.8 | 82.2 | 83.4 | 83.8 | 84.2 | 84.6 | 85.0 | 82.3 | 82.1 | 81.9 | 81.7 | 81.5 | 81.3 |
| Specific Young's modulus (GPa·g·cm⁻³) | | 30.5 | 30.7 | 30.8 | 31.2 | 31.3 | 31.4 | 31.6 | 31.7 | 30.9 | 30.8 | 30.8 | 30.7 | 30.7 | 30.6 |
| β-OH (mm⁻¹) | | 0.04 | 0.09 | 0.14 | 0.13 | 0.10 | 0.15 | 0.04 | 0.04 | 0.05 | 0.05 | 0.09 | 0.11 | 0.09 | 0.15 |

TABLE 33

| | | No. 449 | No. 450 | No. 451 | No. 452 | No. 453 | No. 454 | No. 455 | No. 456 | No. 457 | No. 458 | No. 459 | No. 460 | No. 461 | No. 462 |
|---|---|---|---|---|---|---|---|---|---|---|---|---|---|---|---|
| mol % | $SiO_2$ | 70.9 | 70.7 | 70.6 | 70.5 | 70.3 | 70.2 | 70.0 | 69.9 | 69.7 | 74.1 | 73.7 | 73.4 | 73.0 | 72.6 |
| | $Al_2O_3$ | 13.8 | 13.8 | 13.7 | 13.7 | 13.7 | 13.7 | 13.6 | 13.6 | 13.6 | 14.4 | 14.4 | 14.3 | 14.2 | 14.1 |
| | $B_2O_3$ | 1.4 | 1.6 | 1.8 | 2.0 | 2.2 | 2.4 | 2.6 | 2.8 | 3.0 | 0.0 | 0.0 | 0.0 | 0.0 | 0.0 |
| | MgO | 3.2 | 3.2 | 3.2 | 3.2 | 3.2 | 3.2 | 3.2 | 3.2 | 3.2 | 0.3 | 0.8 | 1.3 | 1.8 | 2.3 |
| | CaO | 4.6 | 4.6 | 4.6 | 4.6 | 4.6 | 4.6 | 4.5 | 4.5 | 4.5 | 4.8 | 4.8 | 4.8 | 4.7 | 4.7 |
| | SrO | 0.0 | 0.0 | 0.0 | 0.0 | 0.0 | 0.0 | 0.0 | 0.0 | 0.0 | 0.0 | 0.0 | 0.0 | 0.0 | 0.0 |
| | BaO | 6.0 | 6.0 | 6.0 | 5.9 | 5.9 | 5.9 | 5.9 | 5.9 | 5.9 | 6.3 | 6.2 | 6.2 | 6.2 | 6.1 |
| | ZnO | 0.0 | 0.0 | 0.0 | 0.0 | 0.0 | 0.0 | 0.0 | 0.0 | 0.0 | 0.0 | 0.0 | 0.0 | 0.0 | 0.0 |
| | $SnO_2$ | 0.1 | 0.1 | 0.1 | 0.1 | 0.1 | 0.1 | 0.1 | 0.1 | 0.1 | 0.1 | 0.1 | 0.1 | 0.1 | 0.1 |
| | $[SiO_2] + [Al_2O_3]$ | 84.7 | 84.5 | 84.4 | 84.2 | 84.0 | 83.8 | 83.7 | 83.5 | 83.3 | 88.5 | 88.1 | 87.6 | 87.2 | 86.8 |
| | $[MgO] + [CaO] + [SrO] + [BaO]$ | 13.8 | 13.8 | 13.7 | 13.7 | 13.7 | 13.7 | 13.6 | 13.6 | 13.6 | 11.4 | 11.8 | 12.3 | 12.7 | 13.1 |
| | $[SrO] + [BaO]$ | 6.0 | 6.0 | 6.0 | 5.9 | 5.9 | 5.9 | 5.9 | 5.9 | 5.9 | 6.3 | 6.2 | 6.2 | 6.2 | 6.1 |
| | $[B_2O_3]/([SrO] + [BaO])$ | 0.2 | 0.3 | 0.3 | 0.3 | 0.4 | 0.4 | 0.4 | 0.5 | 0.5 | 0.0 | 0.0 | 0.0 | 0.0 | 0.0 |
| | $[Al_2O_3] + [B_2O_3] - [CaO] - [SrO] - [BaO]$ | 4.6 | 4.8 | 5.0 | 5.2 | 5.4 | 5.6 | 5.8 | 6.0 | 6.2 | 3.4 | 3.4 | 3.3 | 3.3 | 3.3 |
| | $[SiO_2] + 14[Al_2O_3] - 15[B_2O_3] + 6[MgO] + [CaO] + 14[SrO] + 16[BaO]$ | 362.8 | 359.0 | 355.2 | 351.4 | 347.7 | 343.9 | 340.1 | 336.3 | 332.5 | 382.8 | 383.9 | 385.0 | 386.0 | 387.1 |
| | $17.8[SiO_2] + 23.1[Al_2O_3] + 3.7[B_2O_3] + 12.9[MgO] + 14.1[CaO] + 15.5[SrO] + 15.0[BaO] + 7.2[ZnO]$ | 1,782.1 | 1,779.2 | 1,776.3 | 1,773.5 | 1,770.6 | 1,767.7 | 1,764.9 | 1,762.0 | 1,759.1 | 1,817.9 | 1,815.3 | 1,812.6 | 1,810.0 | 1,807.3 |
| Thermal expansion coefficient ($10^{-7}$/° C.) | | 37.9 | 37.8 | 37.8 | 37.8 | 37.8 | 37.8 | 37.8 | 37.8 | 37.7 | 36.0 | 36.3 | 36.6 | 37.0 | 37.3 |
| Density (g/cm³) | | 2.654 | 2.652 | 2.649 | 2.647 | 2.645 | 2.642 | 2.640 | 2.638 | 2.636 | 2.651 | 2.654 | 2.657 | 2.660 | 2.663 |
| Strain point (° C.) | | 754 | 750 | 747 | 744 | 741 | 739 | 736 | 734 | 732 | 809 | 805 | 801 | 795 | 790 |
| Annealing point (° C.) | | 819 | 815 | 812 | 809 | 806 | 803 | 800 | 797 | 794 | 876 | 870 | 864 | 858 | 853 |
| Softening point (° C.) | | 1,062 | 1,058 | 1,055 | 1,052 | 1,049 | 1,046 | 1,043 | 1,039 | 1,036 | 1,128 | 1,125 | 1,121 | 1,115 | 1,106 |
| $10^{4.5}$ dPa · s (° C.) | | 1,396 | 1,394 | 1,391 | 1,387 | 1,384 | 1,381 | 1,378 | 1,375 | 1,372 | 1,464 | 1,456 | 1,448 | 1,440 | 1,432 |
| $10^{4.0}$ dPa · s (° C.) | | 1,559 | 1,556 | 1,553 | 1,550 | 1,547 | 1,543 | 1,540 | 1,537 | 1,534 | 1,642 | 1,631 | 1,620 | 1,610 | 1,600 |
| $10^{3.0}$ dPa · s (° C.) | | 1,667 | 1,664 | 1,661 | 1,658 | 1,654 | 1,651 | 1,648 | 1,645 | 1,641 | 1,735 | 1,727 | 1,719 | 1,710 | 1,702 |
| $10^{2.5}$ dPa · s (° C.) | | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured |
| Young's modulus (GPa) | | 81.0 | 80.8 | 80.6 | 80.4 | 80.2 | 80.0 | 79.8 | 79.5 | 79.3 | 80.8 | 81.1 | 81.4 | 81.7 | 82.0 |
| Specific Young's modulus (GPa/g · cm⁻³) | | 30.5 | 30.5 | 30.4 | 30.4 | 30.3 | 30.3 | 30.2 | 30.2 | 30.1 | 30.5 | 30.6 | 30.6 | 30.7 | 30.8 |
| β-OH (mm⁻¹) | | 0.05 | 0.11 | 0.08 | 0.15 | 0.13 | 0.13 | 0.15 | 0.05 | 0.07 | 0.12 | 0.07 | 0.06 | 0.12 | 0.07 |

TABLE 34

| | | No. 463 | No. 464 | No. 465 | No. 466 | No. 467 | No. 468 | No. 469 | No. 470 | No. 471 | No. 472 | No. 473 | No. 474 | No. 475 | No. 476 |
|---|---|---|---|---|---|---|---|---|---|---|---|---|---|---|---|
| mol % | SiO$_2$ | 72.2 | 71.5 | 71.1 | 70.8 | 70.4 | 70.0 | 69.6 | 74.1 | 73.8 | 73.4 | 73.0 | 72.6 | 72.3 | 71.5 |
| | Al$_2$O$_3$ | 14.1 | 13.9 | 13.9 | 13.8 | 13.7 | 13.6 | 13.6 | 14.4 | 14.3 | 14.3 | 14.2 | 14.1 | 14.1 | 13.9 |
| | B$_2$O$_3$ | 0.0 | 0.0 | 0.0 | 0.0 | 0.0 | 0.0 | 0.0 | 0.0 | 0.0 | 0.0 | 0.0 | 0.0 | 0.0 | 0.0 |
| | MgO | 2.8 | 3.8 | 4.3 | 4.8 | 5.3 | 5.8 | 6.3 | 3.4 | 3.4 | 3.3 | 3.3 | 3.3 | 3.3 | 3.2 |
| | CaO | 4.7 | 4.6 | 4.6 | 4.6 | 4.6 | 4.5 | 4.5 | 1.7 | 2.2 | 2.7 | 3.2 | 3.7 | 4.2 | 5.2 |
| | SrO | 0.0 | 0.0 | 0.0 | 0.0 | 0.0 | 0.0 | 0.0 | 0.0 | 0.0 | 0.0 | 0.0 | 0.0 | 0.0 | 0.0 |
| | BaO | 6.1 | 6.0 | 6.0 | 6.0 | 5.9 | 5.9 | 5.9 | 6.3 | 6.2 | 6.2 | 6.2 | 6.1 | 6.1 | 6.0 |
| | ZnO | 0.0 | 0.0 | 0.0 | 0.0 | 0.0 | 0.0 | 0.0 | 0.0 | 0.0 | 0.0 | 0.0 | 0.0 | 0.0 | 0.0 |
| | SnO$_2$ | 0.1 | 0.1 | 0.1 | 0.1 | 0.1 | 0.1 | 0.1 | 0.1 | 0.1 | 0.1 | 0.1 | 0.1 | 0.1 | 0.1 |
| | [SiO$_2$] + [Al$_2$O$_3$] | 86.3 | 85.4 | 85.0 | 84.5 | 84.1 | 83.6 | 83.2 | 88.6 | 88.1 | 87.7 | 87.2 | 86.6 | 86.3 | 85.4 |
| | [MgO] + [CaO] + [SrO] + [BaO] | 13.6 | 14.5 | 14.9 | 15.4 | 15.8 | 16.3 | 16.7 | 11.3 | 11.8 | 12.2 | 12.7 | 13.1 | 13.6 | 14.5 |
| | [SrO] + [BaO] | 6.1 | 6.0 | 6.0 | 6.0 | 5.9 | 5.9 | 5.9 | 6.3 | 6.2 | 6.2 | 6.2 | 6.1 | 6.1 | 6.0 |
| | [B$_2$O$_3$]/([SrO] + [BaO]) | 0.0 | 0.0 | 0.0 | 0.0 | 0.0 | 0.0 | 0.0 | 0.0 | 0.0 | 0.0 | 0.0 | 0.0 | 0.0 | 0.0 |
| | [Al$_2$O$_3$] + [B$_2$O$_3$] − [CaO] − [SrO] − [BaO] | 3.3 | 3.2 | 3.2 | 3.2 | 3.2 | 3.2 | 3.2 | 6.5 | 5.9 | 5.4 | 4.9 | 4.3 | 3.8 | 2.7 |
| | [SiO$_2$] + 14[Al$_2$O$_3$] − 15[B$_2$O$_3$] + 6[MgO] + [CaO] + 14[SrO] + 16[BaO] | 388.2 | 390.4 | 391.5 | 392.6 | 393.7 | 394.7 | 395.8 | 398.2 | 396.7 | 395.2 | 393.7 | 392.2 | 390.7 | 387.6 |
| | 17.8[SiO$_2$] + 23.1[Al$_2$O$_3$] + 3.7[B$_2$O$_3$] + 12.9[MgO] + 14.1[CaO] + 15.5[SrO] + 15.0[BaO] + 7.2[ZnO] | 1,804.6 | 1,799.3 | 1,796.7 | 1,794.0 | 1,791.4 | 1,788.7 | 1,786.0 | 1,814.4 | 1,812.4 | 1,810.3 | 1,808.0 | 1,806.2 | 1,804.1 | 1,800.0 |
| Thermal expansion coefficient (10$^{-7}$/° C.) | | 37.6 | 38.3 | 38.7 | 39.0 | 39.4 | 39.7 | 40.1 | 33.7 | 34.4 | 35.1 | 35.8 | 36.5 | 37.3 | 38.8 |
| Density (g/cm$^3$) | | 2.667 | 2.673 | 2.676 | 2.680 | 2.683 | 2.686 | 2.689 | 2.643 | 2.648 | 2.652 | 2.657 | 2.661 | 2.666 | 2.675 |
| Strain point (° C.) | | 785 | 776 | 772 | 769 | 766 | 764 | 762 | 798 | 795 | 792 | 789 | 786 | 783 | 777 |
| Annealing point (° C.) | | 847 | 838 | 833 | 829 | 825 | 822 | 819 | 861 | 858 | 856 | 852 | 849 | 846 | 839 |
| Softening point (° C.) | | 1,096 | 1,078 | 1,071 | 1,065 | 1,060 | 1,056 | 1,052 | 1,128 | 1,124 | 1,118 | 1,111 | 1,103 | 1,095 | 1,079 |
| 10$^{4.5}$ dPa · s (° C.) | | 1,424 | 1,408 | 1,400 | 1,391 | 1,383 | 1,374 | 1,366 | 1,457 | 1,450 | 1,444 | 1,437 | 1,430 | 1,423 | 1,409 |
| 10$^{4.0}$ dPa · s (° C.) | | 1,590 | 1,571 | 1,561 | 1,552 | 1,543 | 1,534 | 1,525 | 1,637 | 1,626 | 1,616 | 1,606 | 1,597 | 1,588 | 1,572 |
| 10$^{3.0}$ dPa · s (° C.) | | 1,693 | 1,675 | 1,665 | 1,656 | 1,646 | 1,636 | 1,626 | 1,721 | 1,716 | 1,710 | 1,705 | 1,698 | 1,691 | 1,677 |
| 10$^{2.5}$ dPa · s (° C.) | | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured |
| Young's modulus (GPa) | | 82.3 | 82.9 | 83.2 | 83.5 | 83.7 | 84.0 | 84.3 | 82.2 | 82.3 | 82.4 | 82.4 | 82.5 | 82.5 | 82.6 |
| Specific Young's modulus (GPa/g · cm$^{-3}$) | | 30.9 | 31.0 | 31.1 | 31.1 | 31.2 | 31.3 | 31.4 | 31.1 | 31.1 | 31.1 | 31.0 | 31.0 | 31.0 | 30.9 |
| β-OH (mm$^{-1}$) | | 0.10 | 0.06 | 0.05 | 0.03 | 0.14 | 0.11 | 0.04 | 0.06 | 0.10 | 0.015 | 0.05 | 0.05 | 0.11 | 0.13 |

TABLE 35

| | | No. 477 | No. 478 | No. 479 | No. 480 | No. 481 | No. 482 | No. 483 | No. 484 | No. 485 | No. 486 | No. 487 | No. 488 | No. 489 | No. 490 |
|---|---|---|---|---|---|---|---|---|---|---|---|---|---|---|---|
| mol % | $SiO_2$ | 71.7 | 70.7 | 70.4 | 70.0 | 69.6 | 71.8 | 71.6 | 71.5 | 71.3 | 71.2 | 71.0 | 70.9 | 70.7 | 70.6 |
| | $Al_2O_3$ | 13.8 | 13.8 | 13.7 | 13.6 | 13.6 | 14.0 | 13.9 | 13.9 | 13.9 | 13.9 | 13.8 | 13.8 | 13.8 | 13.7 |
| | $B_2O_3$ | 0.0 | 0.0 | 0.0 | 0.0 | 0.0 | 0.0 | 0.0 | 0.0 | 0.0 | 0.0 | 0.0 | 0.0 | 0.0 | 0.0 |
| | MgO | 3.2 | 3.2 | 3.2 | 3.2 | 3.2 | 3.3 | 3.3 | 3.2 | 3.2 | 3.2 | 3.2 | 3.2 | 3.2 | 3.2 |
| | CaO | 5.7 | 6.2 | 6.7 | 7.2 | 7.7 | 4.7 | 4.6 | 4.6 | 4.6 | 4.6 | 4.6 | 4.6 | 4.6 | 4.6 |
| | SrO | 0.0 | 0.0 | 0.0 | 0.0 | 0.0 | 0.2 | 0.4 | 0.6 | 0.8 | 1.0 | 1.2 | 1.4 | 1.6 | 1.8 |
| | BaO | 6.0 | 6.0 | 5.9 | 5.9 | 5.9 | 6.1 | 6.0 | 6.0 | 6.0 | 6.0 | 6.0 | 6.0 | 6.0 | 6.0 |
| | ZnO | 0.0 | 0.0 | 0.0 | 0.0 | 0.0 | 0.0 | 0.0 | 0.0 | 0.0 | 0.0 | 0.0 | 0.0 | 0.0 | 0.0 |
| | $SnO_2$ | 0.1 | 0.1 | 0.1 | 0.1 | 0.1 | 0.1 | 0.1 | 0.1 | 0.1 | 0.1 | 0.1 | 0.1 | 0.1 | 0.1 |
| | $[SiO_2] + [Al_2O_3]$ | 85.0 | 84.5 | 84.1 | 83.6 | 83.2 | 85.7 | 85.6 | 85.4 | 85.2 | 85.0 | 84.9 | 84.7 | 84.5 | 84.4 |
| | $[MgO] + [CaO] + [SrO] + [BaO]$ | 14.9 | 15.4 | 15.8 | 16.3 | 16.7 | 14.2 | 14.3 | 14.5 | 14.7 | 14.9 | 15.0 | 15.2 | 15.4 | 15.5 |
| | $[SrO] + [BaO]$ | 6.0 | 6.0 | 5.9 | 5.9 | 5.9 | 6.3 | 6.4 | 6.6 | 6.8 | 7.0 | 7.2 | 7.4 | 7.6 | 7.8 |
| | $[B_2O_3]/([SrO] + [BaO])$ | 0.0 | 0.0 | 0.0 | 0.0 | 0.0 | 0.0 | 0.0 | 0.0 | 0.0 | 0.0 | 0.0 | 0.0 | 0.0 | 0.0 |
| | $[Al_2O_3] + [B_2O_3] - [CaO] - [SrO] - [BaO]$ | 2.1 | 1.6 | 1.1 | 0.5 | 0.0 | 3.1 | 2.9 | 2.6 | 2.4 | 2.2 | 2.0 | 1.8 | 1.6 | 1.4 |
| | $[SiO_2] + 14[Al_2O_3] - 15[B_2O_3] + 6[MgO] + [CaO] + 14[SrO] + 16[BaO]$ | 386.1 | 384.6 | 383.1 | 381.5 | 380.0 | 391.3 | 393.3 | 395.3 | 397.3 | 399.3 | 401.4 | 403.4 | 405.4 | 407.4 |
| | $17.8[SiO_2] + 23.1[Al_2O_3] + 3.7[B_2O_3] + 12.9[MgO] + 14.1[CaO] + 15.5[SrO] + 15.0[BaO] + 7.2[ZnO]$ | 1,797.9 | 1,795.8 | 1,793.8 | 1,791.7 | 1,789.6 | 1,801.7 | 1,801.1 | 1,800.6 | 1,800.1 | 1,799.6 | 1,799.1 | 1,798.6 | 1,798.1 | 1,797.6 |
| Thermal expansion coefficient ($10^{-7}$/° C.) | | 39.5 | 40.3 | 41.1 | 41.9 | 42.6 | 38.3 | 38.7 | 39.0 | 39.4 | 39.8 | 40.1 | 40.5 | 40.9 | 41.2 |
| Density (g/cm³) | | 2.679 | 2.684 | 2.688 | 2.693 | 2.697 | 2.674 | 2.678 | 2.683 | 2.687 | 2.692 | 2.696 | 2.700 | 2.705 | 2.709 |
| Strain point (° C.) | | 774 | 771 | 769 | 766 | 762 | 780 | 779 | 778 | 777 | 776 | 775 | 774 | 773 | 772 |
| Annealing point (° C.) | | 835 | 831 | 828 | 824 | 820 | 842 | 841 | 840 | 839 | 838 | 837 | 835 | 834 | 833 |
| Softening point (° C.) | | 1,072 | 1,066 | 1,061 | 1,056 | 1,052 | 1,085 | 1,083 | 1,081 | 1,079 | 1,077 | 1,075 | 1,073 | 1,071 | 1,069 |
| $10^{4.5}$ dPa·s (° C.) | | 1,401 | 1,394 | 1,386 | 1,378 | 1,370 | 1,415 | 1,413 | 1,411 | 1,409 | 1,406 | 1,404 | 1,402 | 1,400 | 1,398 |
| $10^{4.0}$ dPa·s (° C.) | | 1,564 | 1,556 | 1,547 | 1,538 | 1,529 | 1,579 | 1,576 | 1,574 | 1,572 | 1,570 | 1,568 | 1,565 | 1,563 | 1,560 |
| $10^{3.0}$ dPa·s (° C.) | | 1,669 | 1,660 | 1,652 | 1,643 | 1,634 | 1,683 | 1,681 | 1,679 | 1,677 | 1,675 | 1,672 | 1,670 | 1,668 | 1,665 |
| $10^{2.5}$ dPa·s (° C.) | | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured |
| Young's modulus (GPa) | | 82.7 | 82.7 | 82.8 | 82.8 | 82.9 | 82.5 | 82.5 | 82.4 | 82.4 | 82.3 | 82.3 | 82.2 | 82.2 | 82.1 |
| Specific Young's modulus (GPa·g·cm⁻³) | | 30.9 | 30.8 | 30.8 | 30.8 | 30.7 | 30.9 | 30.8 | 32.7 | 30.7 | 30.6 | 30.5 | 30.5 | 30.4 | 30.3 |
| β-OH (mm⁻¹) | | 0.14 | 0.09 | 0.12 | 0.11 | 0.11 | 0.10 | 0.07 | 0.05 | 0.07 | 0.10 | 0.07 | 0.03 | 0.08 | 0.04 |

TABLE 36

| | | No. 491 | No. 492 | No. 493 | No. 494 | No. 495 | No. 496 | No. 497 | No. 498 | No. 499 | No. 500 | No. 501 | No. 502 | No. 503 | No. 504 |
|---|---|---|---|---|---|---|---|---|---|---|---|---|---|---|---|
| mol % | $SiO_2$ | 70.5 | 70.3 | 70.2 | 70.0 | 69.9 | 69.7 | 74.2 | 73.8 | 73.4 | 73.0 | 72.6 | 72.3 | 71.5 | 71.1 |
| | $Al_2O_3$ | 13.7 | 13.7 | 13.7 | 13.6 | 13.6 | 13.6 | 14.4 | 14.4 | 14.3 | 14.2 | 14.1 | 14.1 | 13.9 | 13.8 |
| | $B_2O_3$ | 0.0 | 0.0 | 0.0 | 0.0 | 0.0 | 0.0 | 0.0 | 0.0 | 0.0 | 0.0 | 0.0 | 0.0 | 0.0 | 0.0 |
| | MgO | 3.2 | 3.2 | 3.2 | 3.2 | 3.2 | 3.2 | 3.4 | 3.4 | 3.3 | 3.3 | 3.3 | 3.3 | 3.2 | 3.2 |
| | CaO | 4.6 | 4.6 | 4.6 | 4.5 | 4.5 | 4.5 | 4.8 | 4.8 | 4.8 | 4.7 | 4.7 | 4.7 | 4.6 | 4.6 |
| | SrO | 2.0 | 2.2 | 2.4 | 2.6 | 2.8 | 3.0 | 0.0 | 0.0 | 0.0 | 0.0 | 0.0 | 0.0 | 0.0 | 0.0 |
| | BaO | 5.9 | 5.9 | 5.9 | 5.9 | 5.9 | 5.9 | 3.1 | 3.6 | 4.1 | 4.6 | 5.1 | 5.6 | 6.6 | 7.1 |
| | ZnO | 0.0 | 0.0 | 0.0 | 0.0 | 0.0 | 0.0 | 0.0 | 0.0 | 0.0 | 0.0 | 0.0 | 0.0 | 0.0 | 0.0 |
| | $SnO_2$ | 0.1 | 0.1 | 0.1 | 0.1 | 0.1 | 0.1 | 0.1 | 0.1 | 0.1 | 0.1 | 0.1 | 0.1 | 0.1 | 0.1 |
| | $[SiO_2] + [Al_2O_3]$ | 84.2 | 84.0 | 83.8 | 83.7 | 83.5 | 83.3 | 88.6 | 88.2 | 87.7 | 87.2 | 86.8 | 86.3 | 85.4 | 85.0 |
| | $[MgO] + [CaO] + [SrO] + [BaO]$ | 15.7 | 15.9 | 16.1 | 16.2 | 16.4 | 16.6 | 11.3 | 11.7 | 12.2 | 12.7 | 13.1 | 13.6 | 14.5 | 14.9 |
| | $[SrO] + [BaO]$ | 7.9 | 8.1 | 8.3 | 8.5 | 8.7 | 8.9 | 3.1 | 3.6 | 4.1 | 4.6 | 5.1 | 5.6 | 6.6 | 7.1 |
| | $[B_2O_3]/([SrO] + [BaO])$ | 0.0 | 0.0 | 0.0 | 0.0 | 0.0 | 0.0 | 0.0 | 0.0 | 0.0 | 0.0 | 0.0 | 0.0 | 0.0 | 0.0 |
| | $[Al_2O_3] + [B_2O_3] - [CaO] - [SrO] - [BaO]$ | 1.2 | 1.0 | 0.8 | 0.6 | 0.4 | 0.2 | 6.5 | 6.0 | 5.4 | 4.9 | 4.3 | 3.8 | 2.7 | 2.1 |
| | $[SiO_2] + 14[Al_2O_3] - 15[B_2O_3] + 6[MgO] + [CaO] + 14[SrO] + 16[BaO]$ | 409.4 | 411.5 | 413.5 | 415.5 | 417.5 | 419.5 | 351.0 | 357.4 | 363.9 | 370.3 | 376.8 | 383.2 | 396.1 | 402.5 |
| | $17.8[SiO_2] + 23.1[Al_2O_3] + 3.7[B_2O_3] + 12.9[MgO] + 14.1[CaO] + 15.5[SrO] + 15.0[BaO] + 7.2[ZnO]$ | 1,797.1 | 1,796.6 | 1,796.1 | 1,795.6 | 1,795.0 | 1,794.5 | 1,811.8 | 1,810.1 | 1,808.5 | 1,806.9 | 1,805.3 | 1,803.7 | 1,800.4 | 1,798.8 |
| Thermal expansion coefficient ($10^{-7}/°C$) | | 41.6 | 42.0 | 42.3 | 42.7 | 43.1 | 43.4 | 32.0 | 32.9 | 33.9 | 34.9 | 35.9 | 37.0 | 39.1 | 40.2 |
| Density (g/cm³) | | 2.713 | 2.718 | 2.722 | 2.727 | 2.731 | 2.735 | 2.556 | 2.575 | 2.594 | 2.613 | 2.633 | 2.652 | 2.690 | 2.709 |
| Strain point (°C) | | 771 | 770 | 769 | 767 | 766 | 765 | 792 | 790 | 788 | 787 | 758 | 783 | 778 | 775 |
| Annealing point (°C) | | 832 | 830 | 829 | 827 | 826 | 824 | 850 | 850 | 849 | 848 | 846 | 845 | 840 | 837 |
| Softening point (°C) | | 1,067 | 1,065 | 1,063 | 1,062 | 1,060 | 1,058 | 1,114 | 1,111 | 1,107 | 1,102 | 1,097 | 1,092 | 1,082 | 1,077 |
| $10^{4.5}$ dPa·s (°C) | | 1,396 | 1,394 | 1,391 | 1,389 | 1,387 | 1,385 | 1,437 | 1,434 | 1,431 | 1,428 | 1,424 | 1,420 | 1,412 | 1,408 |
| $10^{4.0}$ dPa·s (°C) | | 1,558 | 1,555 | 1,553 | 1,550 | 1,548 | 1,545 | 1,613 | 1,606 | 1,600 | 1,594 | 1,589 | 1,585 | 1,576 | 1,572 |
| $10^{3.0}$ dPa·s (°C) | | 1,663 | 1,661 | 1,658 | 1,656 | 1,653 | 1,650 | 1,698 | 1,696 | 1,695 | 1,693 | 1,690 | 1,688 | 1,681 | 1,677 |
| $10^{2.5}$ dPa·s (°C) | | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured |
| Young's modulus (GPa) | | 82.1 | 82.1 | 82.0 | 82.0 | 81.9 | 81.9 | 84.2 | 84.0 | 83.7 | 83.4 | 83.1 | 82.8 | 82.3 | 82.0 |
| Specific Young's modulus (GPa·g·cm⁻³) | | 30.3 | 30.2 | 30.1 | 30.1 | 30.0 | 29.9 | 33.0 | 32.6 | 32.3 | 31.9 | 31.6 | 31.2 | 30.6 | 30.3 |
| β-OH (mm⁻¹) | | 0.10 | 0.04 | 0.12 | 0.14 | 0.10 | 0.10 | 0.11 | 0.09 | 0.15 | 0.13 | 0.04 | 0.03 | 0.04 | 0.14 |

TABLE 37

| | | No. 505 | No. 506 | No. 507 | No. 508 | No. 509 | No. 510 | No. 511 | No. 512 | No. 513 | No. 514 | No. 515 | No. 516 | No. 517 | No. 518 |
|---|---|---|---|---|---|---|---|---|---|---|---|---|---|---|---|
| mol % | $SiO_2$ | 70.7 | 70.3 | 70.0 | 69.6 | 68.9 | 69.4 | 69.9 | 70.4 | 70.9 | 71.4 | 72.4 | 72.9 | 73.4 | 73.9 |
| | $Al_2O_3$ | 13.8 | 13.7 | 13.6 | 13.5 | 14.4 | 14.2 | 13.9 | 13.7 | 13.5 | 13.2 | 12.8 | 12.5 | 12.3 | 12.1 |
| | $B_2O_3$ | 0.0 | 0.0 | 0.0 | 0.0 | 0.0 | 0.0 | 0.0 | 0.0 | 0.0 | 0.0 | 0.0 | 0.0 | 0.0 | 0.0 |
| | MgO | 3.2 | 3.2 | 3.2 | 3.2 | 5.5 | 5.4 | 5.4 | 5.3 | 5.2 | 5.1 | 4.9 | 4.8 | 4.7 | 4.6 |
| | CaO | 4.6 | 4.6 | 4.5 | 4.5 | 2.8 | 2.7 | 2.7 | 2.6 | 2.6 | 2.5 | 2.5 | 2.4 | 2.4 | 2.3 |
| | SrO | 0.0 | 0.0 | 0.0 | 0.0 | 2.8 | 2.7 | 2.7 | 2.6 | 2.6 | 2.5 | 2.5 | 2.4 | 2.4 | 2.3 |
| | BaO | 7.6 | 8.1 | 8.6 | 9.1 | 5.5 | 5.4 | 5.4 | 5.3 | 5.2 | 5.1 | 4.9 | 4.8 | 4.7 | 4.6 |
| | ZnO | 0.0 | 0.0 | 0.0 | 0.0 | 0.0 | 0.0 | 0.0 | 0.0 | 0.0 | 0.0 | 0.0 | 0.0 | 0.0 | 0.0 |
| | $SnO_2$ | 0.1 | 0.1 | 0.1 | 0.1 | 0.1 | 0.1 | 0.1 | 0.1 | 0.1 | 0.1 | 0.1 | 0.1 | 0.1 | 0.1 |
| | $[SiO_2] + [Al_2O_3]$ | 84.5 | 84.0 | 83.6 | 83.1 | 83.3 | 83.6 | 83.8 | 84.1 | 84.4 | 84.6 | 85.2 | 85.4 | 85.7 | 86.0 |
| | $[MgO] + [CaO] + [SrO] + [BaO]$ | 15.4 | 15.9 | 16.3 | 16.8 | 16.6 | 16.3 | 16.1 | 15.8 | 15.5 | 15.3 | 14.7 | 14.5 | 14.2 | 13.9 |
| | $[SrO] + [BaO]$ | 7.6 | 8.1 | 8.6 | 9.1 | 8.3 | 8.2 | 8.0 | 7.9 | 7.8 | 7.6 | 7.4 | 7.2 | 7.1 | 7.0 |
| | $[B_2O_3]/([SrO] + [BaO])$ | 0.0 | 0.0 | 0.0 | 0.0 | 0.0 | 0.0 | 0.0 | 0.0 | 0.0 | 0.0 | 0.0 | 0.0 | 0.0 | 0.0 |
| | $[Al_2O_3] + [B_2O_3] + [CaO] - [SrO] - [BaO]$ | 1.6 | 1.0 | 0.5 | -0.1 | 3.3 | 3.3 | 3.2 | 3.2 | 3.1 | 3.1 | 2.9 | 2.9 | 2.8 | 2.8 |
| | $[SiO_2] + 14[Al_2O_3] - 15[B_2O_3] + 6[MgO] + [CaO] + 14[SrO] + 16[BaO]$ | 409.0 | 415.4 | 421.9 | 428.3 | 433.7 | 428.3 | 422.9 | 417.6 | 412.2 | 406.8 | 396.0 | 390.6 | 385.2 | 379.9 |
| | $17.8[SiO_2] + 23.1[Al_2O_3] + 3.7[B_2O_3] + 12.9[MgO] + 14.1[CaO] + 15.5[SrO] + 15.0[BaO] + 7.2[ZnO]$ | 1,797.2 | 1,795.6 | 1,794.0 | 1,792.3 | 1,795.3 | 1,795.0 | 1,794.7 | 1,794.4 | 1,794.2 | 1,793.9 | 1,793.3 | 1,793.1 | 1,792.8 | 1,792.5 |
| Thermal expansion coefficient ($10^{-7}$/° C.) | | 41.3 | 42.4 | 43.5 | 44.6 | 41.2 | 40.7 | 40.3 | 39.8 | 39.3 | 38.9 | 38.0 | 37.6 | 37.2 | 36.8 |
| Density (g/cm³) | | 2.729 | 2.748 | 2.767 | 2.786 | 2.721 | 2.713 | 2.705 | 2.696 | 2.688 | 2.680 | 2.664 | 2.655 | 2.647 | 2.639 |
| Strain point (° C.) | | 772 | 769 | 766 | 762 | 756 | 767 | 767 | 768 | 768 | 769 | 770 | 770 | 771 | 771 |
| Annealing point (° C.) | | 834 | 831 | 827 | 823 | 825 | 826 | 827 | 828 | 829 | 830 | 832 | 833 | 835 | 836 |
| Softening point (° C.) | | 1,073 | 1,069 | 1,065 | 1,060 | 1,058 | 1,061 | 1,063 | 1,065 | 1,068 | 1,071 | 1,078 | 1,083 | 1,087 | 1,092 |
| $10^{4.5}$ dPa·s (° C.) | | 1,404 | 1,399 | 1,395 | 1,390 | 1,372 | 1,378 | 1,384 | 1,390 | 1,396 | 1,402 | 1,413 | 1,418 | 1,424 | 1,429 |
| $10^{4.0}$ dPa·s (° C.) | | 1,567 | 1,562 | 1,556 | 1,550 | 1,529 | 1,536 | 1,543 | 1,551 | 1,558 | 1,566 | 1,581 | 1,589 | 1,597 | 1,605 |
| $10^{3.0}$ dPa·s (° C.) | | 1,673 | 1,668 | 1,663 | 1,658 | 1,628 | 1,637 | 1,646 | 1,654 | 1,663 | 1,671 | 1,687 | 1,695 | 1,703 | 1,710 |
| $10^{2.5}$ dPa·s (° C.) | | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured |
| Young's modulus (GPa) | | 81.7 | 81.4 | 81.1 | 80.8 | 83.9 | 83.7 | 83.5 | 83.2 | 83.0 | 82.8 | 82.4 | 82.2 | 81.9 | 81.7 |
| Specific Young's modulus (GPa·g·cm⁻³) | | 29.9 | 29.6 | 29.3 | 29.0 | 30.8 | 30.8 | 30.9 | 30.9 | 30.9 | 30.9 | 30.9 | 30.9 | 31.0 | 31.0 |
| β-OH (mm⁻¹) | | 0.14 | 0.04 | 0.04 | 0.05 | 0.12 | 0.05 | 0.05 | 0.09 | 0.13 | 0.13 | 0.13 | 0.12 | 0.10 | 0.12 |

TABLE 38

| | | No. 519 | No. 520 | No. 521 | No. 522 | No. 523 | No. 524 | No. 525 | No. 526 | No. 527 | No. 528 | No. 529 | No. 530 | No. 531 | No. 532 |
|---|---|---|---|---|---|---|---|---|---|---|---|---|---|---|---|
| mol % | SiO$_2$ | 74.4 | 74.9 | 74.4 | 74.0 | 73.6 | 73.1 | 72.7 | 72.3 | 71.5 | 71.1 | 70.7 | 70.2 | 69.8 | 69.4 |
| | Al$_2$O$_3$ | 11.8 | 11.6 | 10.0 | 10.5 | 11.0 | 11.5 | 12.0 | 12.5 | 13.5 | 14.0 | 14.5 | 15.0 | 15.5 | 16.0 |
| | B$_2$O$_3$ | 0.0 | 0.0 | 0.0 | 0.0 | 0.0 | 0.0 | 0.0 | 0.0 | 0.0 | 0.0 | 0.0 | 0.0 | 0.0 | 0.0 |
| | MgO | 4.6 | 4.5 | 5.2 | 5.1 | 5.1 | 5.1 | 5.1 | 5.0 | 5.0 | 4.9 | 4.9 | 4.9 | 4.9 | 4.8 |
| | CaO | 2.3 | 2.2 | 2.6 | 2.6 | 2.6 | 2.5 | 2.5 | 2.5 | 2.5 | 2.5 | 2.5 | 2.4 | 2.4 | 2.4 |
| | SrO | 2.3 | 2.2 | 2.6 | 2.6 | 2.6 | 2.5 | 2.5 | 2.5 | 2.5 | 2.5 | 2.5 | 2.4 | 2.4 | 2.4 |
| | BaO | 4.6 | 4.5 | 5.2 | 5.1 | 5.1 | 5.1 | 5.1 | 5.0 | 5.0 | 4.9 | 4.9 | 4.9 | 4.9 | 4.8 |
| | ZnO | 0.0 | 0.0 | 0.0 | 0.0 | 0.0 | 0.0 | 0.0 | 0.0 | 0.0 | 0.0 | 0.0 | 0.0 | 0.0 | 0.0 |
| | SnO$_2$ | 0.1 | 0.1 | 0.1 | 0.1 | 0.1 | 0.1 | 0.1 | 0.1 | 0.1 | 0.1 | 0.1 | 0.1 | 0.1 | 0.1 |
| | [SiO$_2$] + [Al$_2$O$_3$] | 86.2 | 86.5 | 84.4 | 84.5 | 84.6 | 84.6 | 84.7 | 84.8 | 85.0 | 85.1 | 85.2 | 85.2 | 85.3 | 85.4 |
| | [MgO] + [CaO] + [SrO] + [BaO] | 13.7 | 13.4 | 15.5 | 15.4 | 15.3 | 15.3 | 15.2 | 15.1 | 14.9 | 14.8 | 14.7 | 14.7 | 14.6 | 14.5 |
| | [SrO] + [BaO] | 6.8 | 6.7 | 7.8 | 7.7 | 7.7 | 7.6 | 7.6 | 7.5 | 7.5 | 7.4 | 7.4 | 7.3 | 7.3 | 7.2 |
| | [B$_2$O$_3$]/([SrO] + [BaO]) | 0.0 | 0.0 | 0.0 | 0.0 | 0.0 | 0.0 | 0.0 | 0.0 | 0.0 | 0.0 | 0.0 | 0.0 | 0.0 | 0.0 |
| | [Al$_2$O$_3$] + [B$_2$O$_3$] - [CaO] - [SrO] - [BaO] | 2.7 | 2.7 | -0.3 | 0.2 | 0.8 | 1.3 | 1.9 | 2.4 | 3.6 | 4.1 | 4.7 | 5.2 | 5.8 | 6.3 |
| | [SiO$_2$] + 14[Al$_2$O$_3$] - 15[B$_2$O$_3$] + 6[MgO] + [CaO] + 14[SrO] + 16[BaO] | 374.5 | 369.1 | 367.0 | 372.7 | 378.4 | 384.2 | 389.9 | 395.7 | 407.1 | 412.9 | 418.6 | 424.4 | 430.1 | 435.8 |
| | 17.8[SiO$_2$] + 23.1[Al$_2$O$_3$] + 3.7[B$_2$O$_3$] + 12.9[MgO] + 14.1[CaO] + 15.5[SrO] + 15.0[BaO] + 7.2[ZnO] | 1,792.2 | 1,792.0 | 1,775.9 | 1,778.8 | 1,781.8 | 1,784.7 | 1,787.7 | 1,790.7 | 1,796.6 | 1,799.5 | 1,802.5 | 1,805.5 | 1,808.4 | 1,811.4 |
| Thermal expansion coefficient (10$^{-7}$/° C.) | | 36.4 | 36.1 | 39.6 | 39.4 | 39.2 | 39.0 | 38.8 | 38.6 | 38.3 | 38.1 | 38.0 | 37.9 | 37.7 | 37.6 |
| Density (g/cm$^3$) | | 2.631 | 2.622 | 2.660 | 2.662 | 2.664 | 2.666 | 2.668 | 2.670 | 2.674 | 2.676 | 2.678 | 2.680 | 2.682 | 2.684 |
| Strain point (° C.) | | 772 | 772 | 751 | 754 | 757 | 760 | 763 | 766 | 772 | 774 | 776 | 778 | 779 | 781 |
| Annealing point (° C.) | | 837 | 738 | 811 | 814 | 818 | 821 | 825 | 828 | 834 | 836 | 837 | 839 | 839 | 839 |
| Softening point (° C.) | | 1,097 | 1,102 | 1,062 | 1,066 | 1,069 | 1,071 | 1,073 | 1,074 | 1,075 | 1,075 | 1,074 | 1,074 | 1,073 | 1,072 |
| 10$^{4.5}$ dPa · s (° C.) | | 1,434 | 1,439 | 1,410 | 1,411 | 1,411 | 1,411 | 1,410 | 1,409 | 1,405 | 1,402 | 1,399 | 1,396 | 1,392 | 1,388 |
| 10$^{4.0}$ dPa · s (° C.) | | 1,613 | 1,621 | 1,595 | 1,592 | 1,589 | 1,586 | 1,582 | 1,578 | 1,568 | 1,563 | 1,558 | 1,552 | 1,547 | 1,542 |
| 10$^{3.0}$ dPa · s (° C.) | | 1,718 | 1,725 | 1,700 | 1,699 | 1,696 | 1,693 | 1,689 | 1,685 | 1,673 | 1,667 | 1,660 | 1,653 | 1,645 | 1,638 |
| 10$^{2.5}$ dPa · s (° C.) | | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured |
| Young's modulus (GPa) | | 81.5 | 81.3 | 80.2 | 80.6 | 81.0 | 81.4 | 81.8 | 82.2 | 83.0 | 83.4 | 83.8 | 84.2 | 84.6 | 84.9 |
| Specific Young's modulus (GPa·g·cm$^{-3}$) | | 31.0 | 31.0 | 30.2 | 30.3 | 30.4 | 30.5 | 30.7 | 30.8 | 31.0 | 31.2 | 31.3 | 31.4 | 31.5 | 31.7 |
| β-OH (mm$^{-1}$) | | 0.03 | 0.15 | 0.08 | 0.05 | 0.15 | 0.03 | 0.05 | 0.12 | 0.08 | 0.12 | 0.09 | 0.05 | 0.15 | 0.10 |

TABLE 39

| | | No. 533 | No. 534 | No. 535 | No. 536 | No. 537 | No. 538 | No. 539 | No. 540 | No. 541 | No. 542 | No. 543 | No. 544 | No. 545 | No. 546 |
|---|---|---|---|---|---|---|---|---|---|---|---|---|---|---|---|
| mol % | SiO$_2$ | 71.8 | 71.6 | 71.5 | 71.3 | 71.2 | 71.0 | 10.9 | 70.7 | 70.6 | 70.5 | 70.3 | 70.2 | 70.0 | 69.9 |
| | Al$_2$O$_3$ | 13.0 | 12.9 | 12.9 | 12.9 | 12.9 | 12.8 | 12.8 | 12.8 | 12.8 | 12.7 | 12.7 | 12.7 | 12.7 | 12.6 |
| | B$_2$O$_3$ | 0.2 | 0.4 | 0.6 | 0.8 | 1.0 | 1.2 | 1.4 | 1.6 | 1.8 | 2.0 | 2.2 | 2.4 | 2.6 | 2.8 |
| | MgO | 5.0 | 5.0 | 5.0 | 5.0 | 4.9 | 4.9 | 4.9 | 4.9 | 4.9 | 4.9 | 4.9 | 4.9 | 4.9 | 4.9 |
| | CaO | 2.5 | 2.5 | 2.5 | 2.5 | 2.5 | 2.5 | 2.5 | 2.5 | 2.5 | 2.4 | 2.4 | 2.4 | 2.4 | 2.4 |
| | SrO | 2.5 | 2.5 | 2.5 | 2.5 | 2.5 | 2.5 | 2.5 | 2.5 | 2.5 | 2.4 | 2.4 | 2.4 | 2.4 | 2.4 |
| | BaO | 5.0 | 5.0 | 5.0 | 5.0 | 4.9 | 4.9 | 4.9 | 4.9 | 4.9 | 4.9 | 4.9 | 4.9 | 4.9 | 4.9 |
| | ZnO | 0.0 | 0.0 | 0.0 | 0.0 | 0.0 | 0.0 | 0.0 | 0.0 | 0.0 | 0.0 | 0.0 | 0.0 | 0.0 | 0.0 |
| | SnO$_2$ | 0.1 | 0.1 | 0.1 | 0.1 | 0.1 | 0.1 | 0.1 | 0.1 | 0.1 | 0.1 | 0.1 | 0.1 | 0.1 | 0.1 |
| | [SiO$_2$] + [Al$_2$O$_3$] | 84.7 | 84.6 | 84.4 | 84.2 | 84.1 | 83.9 | 83.7 | 83.5 | 83.4 | 83.2 | 83.0 | 82.9 | 82.7 | 82.5 |
| | [MgO] + [CaO] + [SrO] + [BaO] | 15.0 | 14.9 | 14.9 | 14.9 | 14.9 | 14.8 | 14.8 | 14.8 | 14.7 | 14.7 | 14.7 | 14.6 | 14.6 | 14.6 |
| | [SrO] + [BaO] | 7.5 | 7.5 | 7.5 | 7.4 | 7.4 | 7.4 | 7.4 | 7.4 | 7.4 | 7.3 | 7.3 | 7.3 | 7.3 | 7.3 |
| | [B$_2$O$_3$]/([SrO] + [BaO]) | 0.0 | 0.1 | 0.1 | 0.1 | 0.1 | 0.2 | 0.2 | 0.2 | 0.2 | 0.3 | 0.3 | 0.3 | 0.4 | 0.4 |
| | [Al$_2$O$_3$] + [B$_2$O$_3$] − [CaO] − [SrO] − [BaO] | 3.2 | 3.4 | 3.6 | 3.8 | 4.0 | 4.2 | 4.4 | 4.6 | 4.7 | 4.9 | 5.1 | 5.3 | 5.5 | 5.7 |
| | [SiO$_2$] + 14[Al$_2$O$_3$] − 15[B$_2$O$_3$] + 6[MgO] + [CaO] + 14[SrO] + 16[BaO] | 397.6 | 393.8 | 390.0 | 386.2 | 382.4 | 378.6 | 374.8 | 371.0 | 367.2 | 363.4 | 359.6 | 355.8 | 352.0 | 348.1 |
| | 17.8[SiO$_2$] + 23.1[Al$_2$O$_3$] + 3.7[B$_2$O$_3$] + 12.9[MgO] + 14.1[CaO] + 15.5[SrO] + 15.0[BaO] + 7.2[ZnO] | 1,790.8 | 1,787.9 | 1,785.1 | 1,782.2 | 1,779.4 | 1,776.5 | 1,773.7 | 1,770.8 | 1,768.0 | 1,765.1 | 1,762.3 | 1,759.4 | 1,756.6 | 1,753.7 |
| Thermal expansion coefficient (10$^{-7}$/° C.) | | 38.4 | 38.4 | 38.4 | 38.4 | 38.4 | 38.3 | 38.3 | 38.3 | 38.3 | 38.3 | 38.3 | 38.3 | 38.2 | 38.2 |
| Density (g/cm$^3$) | | 2.669 | 2.667 | 2.665 | 2.663 | 2.660 | 2.658 | 2.656 | 2.653 | 2.651 | 2.649 | 2.647 | 2.644 | 2.642 | 2.640 |
| Strain point (° C.) | | 766 | 762 | 759 | 756 | 753 | 750 | 747 | 744 | 741 | 739 | 736 | 734 | 731 | 729 |
| Annealing point (° C.) | | 828 | 825 | 821 | 818 | 815 | 812 | 809 | 806 | 803 | 800 | 797 | 794 | 791 | 788 |
| Softening point (° C.) | | 1,071 | 1,098 | 1,064 | 1,061 | 1,057 | 1,054 | 1,051 | 1,047 | 1,044 | 1,040 | 1,037 | 1,033 | 1,029 | 1,025 |
| 10$^{4.5}$ dPa · s (° C.) | | 1,405 | 1,402 | 1,399 | 1,396 | 1,393 | 1,390 | 1,387 | 1,384 | 1,381 | 1,378 | 1,375 | 1,372 | 1,369 | 1,366 |
| 10$^{4.0}$ dPa · s (° C.) | | 1,571 | 1,568 | 1,565 | 1,562 | 1,559 | 1,556 | 1,553 | 1,550 | 1,547 | 1,544 | 1,541 | 1,538 | 1,535 | 1,531 |
| 10$^{3.0}$ dPa · s (° C.) | | 1,676 | 1,674 | 1,671 | 1,668 | 1,665 | 1,662 | 1,658 | 1,655 | 1,652 | 1,648 | 1,645 | 1,642 | 1,638 | 1,635 |
| 10$^{2.5}$ dPa · s (° C.) | | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured |
| Young's modulus (GPa) | | 82.4 | 82.2 | 81.9 | 81.7 | 81.5 | 81.3 | 81.1 | 80.9 | 80.6 | 80.4 | 80.2 | 80.0 | 79.8 | 79.6 |
| Specific Young's modulus (GPa · g · cm$^{-3}$) | | 30.9 | 30.8 | 30.7 | 30.7 | 30.6 | 30.6 | 30.5 | 30.5 | 30.4 | 30.4 | 30.3 | 30.3 | 30.2 | 30.1 |
| β-OH (mm$^{-1}$) | | 0.10 | 0.03 | 0.06 | 0.09 | 0.07 | 0.12 | 0.13 | 0.12 | 0.06 | 0.06 | 0.04 | 0.10 | 0.05 | 0.04 |

TABLE 40

| | | No. 547 | No. 548 | No. 549 | No. 550 | No. 551 | No. 552 | No. 553 | No. 554 | No. 555 | No. 556 | No. 557 | No. 558 | No. 559 | No. 560 |
|---|---|---|---|---|---|---|---|---|---|---|---|---|---|---|---|
| mol % | $SiO_2$ | 69.7 | 74.2 | 73.8 | 73.4 | 73.0 | 72.7 | 72.3 | 71.5 | 71.1 | 70.8 | 70.4 | 70.0 | 69.6 | 73.7 |
| | $Al_2O_3$ | 12.6 | 13.4 | 13.3 | 13.3 | 13.2 | 13.1 | 13.1 | 12.9 | 12.9 | 12.8 | 12.7 | 12.7 | 12.6 | 13.3 |
| | $B_2O_3$ | 3.0 | 0.0 | 0.0 | 0.0 | 0.0 | 0.0 | 0.0 | 0.0 | 0.0 | 0.0 | 0.0 | 0.0 | 0.0 | 0.0 |
| | MgO | 4.8 | 2.0 | 2.5 | 3.0 | 3.5 | 4.0 | 4.5 | 5.5 | 6.0 | 6.5 | 7.0 | 7.5 | 8.0 | 5.1 |
| | CaO | 2.4 | 2.6 | 2.6 | 2.6 | 2.5 | 2.5 | 2.5 | 2.5 | 2.5 | 2.5 | 2.4 | 2.4 | 2.4 | 2.6 |
| | SrO | 2.4 | 2.6 | 2.6 | 2.6 | 2.5 | 2.5 | 2.5 | 2.5 | 2.5 | 2.4 | 2.4 | 2.4 | 2.4 | 2.6 |
| | BaO | 4.8 | 5.2 | 5.1 | 5.1 | 5.1 | 5.1 | 5.0 | 5.0 | 4.9 | 4.9 | 4.9 | 4.9 | 4.8 | 5.1 |
| | ZnO | 0.0 | 0.0 | 0.0 | 0.0 | 0.0 | 0.0 | 0.0 | 0.0 | 0.0 | 0.0 | 0.0 | 0.0 | 0.0 | 0.0 |
| | $SnO_2$ | 0.1 | 0.1 | 0.1 | 0.1 | 0.1 | 0.1 | 0.1 | 0.1 | 0.1 | 0.1 | 0.1 | 0.1 | 0.1 | 0.1 |
| | $[SiO_2] + [Al_2O_3]$ | 82.4 | 87.6 | 87.1 | 86.7 | 86.2 | 85.8 | 85.3 | 84.5 | 84.0 | 83.6 | 83.1 | 82.7 | 82.2 | 87.1 |
| | $[MgO] + [CaO] + [SrO] + [BaO]$ | 14.5 | 12.3 | 12.8 | 13.2 | 13.7 | 14.1 | 14.6 | 15.4 | 15.9 | 16.3 | 16.8 | 17.2 | 17.7 | 12.8 |
| | $[SrO] + [BaO]$ | 7.3 | 7.7 | 7.7 | 7.7 | 7.6 | 7.6 | 7.5 | 7.5 | 7.4 | 7.4 | 7.3 | 7.3 | 7.3 | 7.7 |
| | $[B_2O_3]/([SrO] + [BaO])$ | 0.4 | 0.0 | 0.0 | 0.0 | 0.0 | 0.0 | 0.0 | 0.0 | 0.0 | 0.0 | 0.0 | 0.0 | 0.0 | 0.0 |
| | $[Al_2O_3] + [B_2O_3] - [CaO] - [SrO] - [BaO]$ | 5.9 | 3.1 | 3.1 | 3.1 | 3.0 | 3.0 | 3.0 | 3.0 | 3.0 | 3.0 | 2.9 | 2.9 | 2.9 | 5.6 |
| | $[SiO_2] + 14[Al_2O_3] - 15[B_2O_3] + 6[MgO] + [CaO] + 14[SrO] + 16[BaO]$ | 344.3 | 395.1 | 396.2 | 397.2 | 398.3 | 399.3 | 400.4 | 402.4 | 403.5 | 404.5 | 405.6 | 406.6 | 407.7 | 409.1 |
| | $17.8[SiO_2] + 23.1[Al_2O_3] + 3.7[B_2O_3] + 12.9[MgO] + 14.1[CaO] + 15.5[SrO] + 15.0[BaO] + 7.2[ZnO]$ | 1,750.9 | 1,809.6 | 1,806.9 | 1,804.3 | 1,801.6 | 1,798.9 | 1,796.3 | 1,791.0 | 1,788.3 | 1,785.6 | 1,783.0 | 1,780.3 | 1,777.7 | 1,803.5 |
| Thermal expansion coefficient ($10^{-7}$/° C.) | | 38.2 | 36.4 | 36.8 | 37.1 | 37.4 | 37.8 | 38.1 | 38.8 | 39.1 | 39.5 | 39.8 | 40.2 | 40.6 | 34.9 |
| Density (g/cm³) | | 2.637 | 2.652 | 2.656 | 2.659 | 2.662 | 2.665 | 2.669 | 2.675 | 2.678 | 2.682 | 2.685 | 2.688 | 2.691 | 2.650 |
| Strain point (° C.) | | 727 | 798 | 792 | 786 | 781 | 776 | 772 | 767 | 764 | 763 | 761 | 760 | 758 | 784 |
| Annealing point (° C.) | | 786 | 863 | 857 | 851 | 846 | 841 | 836 | 827 | 823 | 820 | 817 | 814 | 812 | 851 |
| Softening point (° C.) | | 1,021 | 1,127 | 1,121 | 1,112 | 1,102 | 1,091 | 1,082 | 1,069 | 1,064 | 1,059 | 1,054 | 1,049 | 1,044 | 1,114 |
| $10^{4.5}$ dPa · s (° C.) | | 1,363 | 1,456 | 1,448 | 1,440 | 1,432 | 1,424 | 1,416 | 1,399 | 1,391 | 1,382 | 1,374 | 1,365 | 1,356 | 1,442 |
| $10^{4.0}$ dPa · s (° C.) | | 1,528 | 1,634 | 1,623 | 1,613 | 1,603 | 1,593 | 1,583 | 1,564 | 1,554 | 1,544 | 1,535 | 1,525 | 1,515 | 1,615 |
| $10^{3.0}$ dPa · s (° C.) | | 1,631 | 1,733 | 1,724 | 1,716 | 1,707 | 1,698 | 1,689 | 1,669 | 1,659 | 1,649 | 1,639 | 1,629 | 1,618 | 1,714 |
| $10^{2.5}$ dPa · s (° C.) | | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured |
| Young's modulus (GPa) | | 79.3 | 80.8 | 81.1 | 81.4 | 81.7 | 82.0 | 82.3 | 82.9 | 83.2 | 83.5 | 83.8 | 84.1 | 84.4 | 82.3 |
| Specific Young's modulus (GPa · g · cm⁻³) | | 30.1 | 30.5 | 30.5 | 30.6 | 30.7 | 30.8 | 30.8 | 31.0 | 31.1 | 31.1 | 31.2 | 31.3 | 31.3 | 31.1 |
| β-OH (mm⁻¹) | | 0.07 | 0.11 | 0.09 | 0.06 | 0.12 | 0.11 | 0.10 | 0.14 | 0.05 | 0.07 | 0.06 | 0.11 | 0.11 | 0.14 |

TABLE 41

| | | No. 561 | No. 562 | No. 563 | No. 564 | No. 565 | No. 566 | No. 567 | No. 568 | No. 569 | No. 570 | No. 571 | No. 572 | No. 573 | No. 574 |
|---|---|---|---|---|---|---|---|---|---|---|---|---|---|---|---|
| mol % | SiO$_2$ | 73.4 | 73.0 | 72.6 | 72.3 | 71.5 | 71.2 | 70.8 | 70.4 | 70.1 | 69.7 | 73.7 | 73.4 | 73.0 | 72.6 |
| | Al$_2$O$_3$ | 13.3 | 13.2 | 13.1 | 13.1 | 12.9 | 12.9 | 12.8 | 12.7 | 12.7 | 12.6 | 13.3 | 13.3 | 13.2 | 13.1 |
| | B$_2$O$_3$ | 0.0 | 0.0 | 0.0 | 0.0 | 0.0 | 0.0 | 0.0 | 0.0 | 0.0 | 0.0 | 0.0 | 0.0 | 0.0 | 0.0 |
| | MgO | 5.1 | 5.1 | 5.1 | 5.0 | 5.0 | 4.9 | 4.9 | 4.9 | 4.9 | 4.8 | 5.1 | 5.1 | 5.1 | 5.1 |
| | CaO | 0.5 | 1.0 | 1.5 | 2.0 | 3.0 | 3.5 | 4.0 | 4.5 | 5.0 | 5.5 | 2.6 | 2.6 | 2.5 | 2.5 |
| | SrO | 2.6 | 2.5 | 2.5 | 2.5 | 2.5 | 2.5 | 2.5 | 2.4 | 2.4 | 2.4 | 0.0 | 0.5 | 1.0 | 1.5 |
| | BaO | 5.1 | 5.1 | 5.1 | 5.0 | 5.0 | 4.9 | 4.9 | 4.9 | 4.9 | 4.8 | 5.1 | 5.1 | 5.1 | 5.1 |
| | ZnO | 0.0 | 0.0 | 0.0 | 0.0 | 0.0 | 0.0 | 0.0 | 0.0 | 0.0 | 0.0 | 0.0 | 0.0 | 0.0 | 0.0 |
| | SnO$_2$ | 0.1 | 0.1 | 0.1 | 0.1 | 0.1 | 0.1 | 0.1 | 0.1 | 0.1 | 0.1 | 0.1 | 0.1 | 0.1 | 0.1 |
| | [SiO$_2$] + [Al$_2$O$_3$] | 86.6 | 86.2 | 85.8 | 85.3 | 84.5 | 84.0 | 83.6 | 83.2 | 82.7 | 82.3 | 87.1 | 86.6 | 86.2 | 85.8 |
| | [MgO] + [CaO] + [SrO] + [BaO] | 13.3 | 13.7 | 14.1 | 14.6 | 15.4 | 15.9 | 16.3 | 16.7 | 17.2 | 17.6 | 12.8 | 13.3 | 13.7 | 14.1 |
| | [SrO] + [BaO] | 7.7 | 7.6 | 7.6 | 7.5 | 7.5 | 7.4 | 7.4 | 7.3 | 7.3 | 7.3 | 5.1 | 5.6 | 6.1 | 6.6 |
| | [B$_2$O$_3$]/([SrO] + [BaO]) | 0.0 | 0.0 | 0.0 | 0.0 | 0.0 | 0.0 | 0.0 | 0.0 | 0.0 | 0.0 | 0.0 | 0.0 | 0.0 | 0.0 |
| | [Al$_2$O$_3$] + [B$_2$O$_3$] − [CaO] − [SrO] − [BaO] | 5.1 | 4.6 | 4.1 | 3.5 | 2.5 | 1.9 | 1.4 | 0.9 | 0.4 | −0.2 | 5.6 | 5.1 | 4.6 | 4.1 |
| | [SiO$_2$] + 14[Al$_2$O$_3$] − 15[B$_2$O$_3$] + 6[MgO] + [CaO] + 14[SrO] + 16[BaO] | 407.6 | 406.0 | 404.5 | 402.9 | 399.9 | 398.3 | 396.8 | 395.2 | 393.7 | 392.1 | 375.8 | 380.9 | 386.0 | 391.2 |
| | 17.8[SiO$_2$] + 23.1[Al$_2$O$_3$] + 3.7[B$_2$O$_3$] + 12.9[MgO] + 14.1[CaO] + 15.5[SrO] + 15.0[BaO] + 7.2[ZnO] | 1,801.5 | 1,799.5 | 1,797.6 | 1,795.6 | 1,791.6 | 1,789.7 | 1,787.7 | 1,785.7 | 1,783.7 | 1,781.8 | 1,799.9 | 1,798.7 | 1,797.4 | 1,796.1 |
| Thermal expansion coefficient (10$^{-7}$/° C.) | | 35.6 | 36.3 | 37.0 | 37.7 | 39.2 | 39.9 | 40.7 | 41.4 | 42.2 | 42.9 | 34.1 | 34.9 | 35.8 | 36.6 |
| Density (g/cm$^3$) | | 2.654 | 2.659 | 2.663 | 2.667 | 2.676 | 2.681 | 2.685 | 2.689 | 2.694 | 2.698 | 2.616 | 2.627 | 2.638 | 2.649 |
| Strain point (° C.) | | 781 | 778 | 775 | 772 | 766 | 763 | 760 | 757 | 754 | 751 | 779 | 777 | 775 | 774 |
| Annealing point (° C.) | | 847 | 843 | 839 | 835 | 827 | 823 | 819 | 815 | 810 | 806 | 844 | 842 | 840 | 837 |
| Softening point (° C.) | | 1,105 | 1,097 | 1,089 | 1,081 | 1,069 | 1,063 | 1,058 | 1,052 | 1,047 | 1,041 | 1,100 | 1,094 | 1,089 | 1,084 |
| 10$^{4.5}$ dPa · s (° C.) | | 1,435 | 1,429 | 1,422 | 1,415 | 1,400 | 1,393 | 1,385 | 1,378 | 1,370 | 1,362 | 1,432 | 1,428 | 1,423 | 1,418 |
| 10$^{4.0}$ dPa · s (° C.) | | 1,606 | 1,598 | 1,590 | 1,582 | 1,565 | 1,557 | 1,548 | 1,539 | 1,529 | 1,520 | 1,602 | 1,596 | 1,590 | 1,585 |
| 10$^{3.0}$ dPa · s (° C.) | | 1,708 | 1,701 | 1,694 | 1,687 | 1,671 | 1,663 | 1,654 | 1,645 | 1,636 | 1,627 | 1,703 | 1,699 | 1,695 | 1,690 |
| 10$^{2.5}$ dPa · s (° C.) | | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured |
| Young's modulus (GPa) | | 82.4 | 82.4 | 82.5 | 82.5 | 82.6 | 82.7 | 82.7 | 82.8 | 82.8 | 82.9 | 83.2 | 83.1 | 82.9 | 82.8 |
| Specific Young's modulus (GPa/g · cm$^{-3}$) | | 31.0 | 31.0 | 31.0 | 30.9 | 30.9 | 30.8 | 30.8 | 30.8 | 30.8 | 30.7 | 31.8 | 31.6 | 31.4 | 31.3 |
| β-OH (mm$^{-1}$) | | 0.12 | 0.08 | 0.14 | 0.03 | 0.15 | 0.15 | 0.06 | 0.09 | 0.13 | 0.06 | 0.15 | 0.15 | 0.03 | 0.13 |

TABLE 42

| | | No. 575 | No. 576 | No. 577 | No. 578 | No. 579 | No. 580 | No. 581 | No. 582 | No. 583 | No. 584 | No. 585 | No. 586 | No. 587 | No. 588 |
|---|---|---|---|---|---|---|---|---|---|---|---|---|---|---|---|
| mol % | $SiO_2$ | 72.3 | 71.5 | 71.2 | 70.8 | 70.4 | 70.1 | 69.7 | 74.2 | 73.8 | 73.4 | 73.0 | 72.7 | 72.3 | 71.5 |
| | $Al_2O_3$ | 13.1 | 12.9 | 12.9 | 12.8 | 12.7 | 12.7 | 12.6 | 13.4 | 13.3 | 13.3 | 13.2 | 13.1 | 13.1 | 12.9 |
| | $B_2O_3$ | 0.0 | 0.0 | 0.0 | 0.0 | 0.0 | 0.0 | 0.0 | 0.0 | 0.0 | 0.0 | 0.0 | 0.0 | 0.0 | 0.0 |
| | MgO | 5.0 | 5.0 | 4.9 | 4.9 | 4.9 | 4.9 | 4.8 | 5.2 | 5.1 | 5.1 | 5.1 | 5.1 | 5.0 | 5.0 |
| | CaO | 2.5 | 2.5 | 2.5 | 2.5 | 2.4 | 2.4 | 2.4 | 2.6 | 2.6 | 2.6 | 2.5 | 2.5 | 2.5 | 2.5 |
| | SrO | 2.0 | 3.0 | 3.5 | 4.0 | 4.5 | 5.0 | 5.5 | 2.0 | 2.5 | 3.0 | 3.5 | 4.0 | 4.5 | 5.0 |
| | BaO | 5.0 | 5.0 | 4.9 | 4.9 | 4.9 | 4.9 | 4.8 | 2.0 | 2.5 | 3.0 | 3.5 | 4.0 | 4.5 | 0.0 |
| | ZnO | 0.0 | 0.0 | 0.0 | 0.0 | 0.0 | 0.0 | 0.0 | 0.0 | 0.0 | 0.0 | 0.0 | 0.0 | 0.0 | 0.0 |
| | $SnO_2$ | 0.1 | 0.1 | 0.1 | 0.1 | 0.1 | 0.1 | 0.1 | 0.1 | 0.1 | 0.1 | 0.1 | 0.1 | 0.1 | 0.1 |
| | $[SiO_2] + [Al_2O_3]$ | 85.3 | 84.5 | 84.0 | 83.6 | 83.2 | 82.7 | 82.3 | 87.6 | 87.1 | 86.7 | 86.2 | 85.8 | 85.3 | 84.5 |
| | $[MgO] + [CaO] + [SrO] + [BaO]$ | 14.6 | 15.4 | 15.9 | 16.3 | 16.7 | 17.2 | 17.6 | 12.3 | 12.8 | 13.2 | 13.7 | 14.1 | 14.6 | 15.4 |
| | $[SrO] + [BaO]$ | 7.0 | 8.0 | 8.4 | 8.9 | 9.4 | 9.9 | 10.3 | 4.6 | 5.1 | 5.6 | 6.0 | 6.5 | 7.0 | 8.0 |
| | $[B_2O_3]/([SrO] + [BaO])$ | 0.0 | 0.0 | 0.0 | 0.0 | 0.0 | 0.0 | 0.0 | 0.0 | 0.0 | 0.0 | 0.0 | 0.0 | 0.0 | 0.0 |
| | $[Al_2O_3] + [B_2O_3] - [CaO] - [SrO] - [BaO]$ | 3.5 | 2.5 | 1.9 | 1.4 | 0.9 | 0.4 | −0.2 | 6.3 | 5.7 | 5.2 | 4.6 | 4.1 | 3.5 | 2.5 |
| | $[SiO_2] + 14[Al_2O_3] - 15[B_2O_3] + 6[MgO] + [CaO] + 14[SrO] + 16[BaO]$ | 396.3 | 406.5 | 411.6 | 416.8 | 421.9 | 427.0 | 432.1 | 363.6 | 369.9 | 376.2 | 382.5 | 388.8 | 395.1 | 407.7 |
| | $17.8[SiO_2] + 23.1[Al_2O_3] + 3.7[B_2O_3] + 12.9[MgO] + 14.1[CaO] + 15.5[SrO] + 15.0[BaO] + 7.2[ZnO]$ | 1,794.9 | 1,792.4 | 1,791.1 | 1,789.8 | 1,788.6 | 1,787.3 | 1,786.1 | 1,802.9 | 1,801.4 | 1,799.8 | 1,798.3 | 1,796.7 | 1,795.2 | 1,792.1 |
| Thermal expansion coefficient ($10^{-7}$/° C.) | | 37.5 | 39.4 | 40.3 | 41.2 | 42.2 | 43.1 | 44.0 | 32.5 | 33.4 | 34.4 | 35.4 | 36.4 | 37.4 | 39.5 |
| Density (g/cm³) | | 2.661 | 2.683 | 2.694 | 2.705 | 2.717 | 2.728 | 2.739 | 2.558 | 2.577 | 2.596 | 2.615 | 2.634 | 2.653 | 2.691 |
| Strain point (° C.) | | 771 | 767 | 764 | 761 | 758 | 755 | 752 | 781 | 779 | 778 | 776 | 774 | 772 | 766 |
| Annealing point (° C.) | | 834 | 828 | 824 | 821 | 817 | 813 | 809 | 844 | 843 | 841 | 839 | 837 | 834 | 828 |
| Softening point (° C.) | | 1,079 | 1,070 | 1,066 | 1,061 | 1,056 | 1,051 | 1,046 | 1,100 | 1,095 | 1,091 | 1,086 | 1,082 | 1,078 | 1,071 |
| $10^{4.5}$ dPa·s (° C.) | | 1,413 | 1,402 | 1,397 | 1,391 | 1,386 | 1,380 | 1,374 | 1,429 | 1,426 | 1,422 | 1,419 | 1,415 | 1,411 | 1,403 |
| $10^{4.0}$ dPa·s (° C.) | | 1,579 | 1,567 | 1,561 | 1,554 | 1,547 | 1,540 | 1,532 | 1,600 | 1,595 | 1,590 | 1,586 | 1,582 | 1,578 | 1,569 |
| $10^{3.0}$ dPa·s (° C.) | | 1,685 | 1,673 | 1,667 | 1,661 | 1,654 | 1,647 | 1,640 | 1,697 | 1,695 | 1,693 | 1,690 | 1,687 | 1,683 | 1,675 |
| $10^{2.5}$ dPa·s (° C.) | | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured |
| Young's modulus (GPa) | | 82.7 | 82.5 | 82.3 | 82.2 | 82.1 | 82.0 | 81.9 | 84.3 | 84.0 | 83.7 | 83.4 | 83.1 | 82.9 | 82.3 |
| Specific Young's modulus (GPa·g·cm⁻³) | | 31.1 | 30.7 | 30.6 | 30.4 | 30.2 | 30.1 | 29.9 | 32.9 | 32.6 | 32.2 | 31.9 | 31.6 | 31.2 | 30.6 |
| β-OH (mm⁻¹) | | 0.11 | 0.14 | 0.08 | 0.11 | 0.12 | 0.15 | 0.05 | 0.13 | 0.03 | 0.05 | 0.04 | 0.04 | 0.07 | 0.12 |

TABLE 43

| | | No. 589 | No. 590 | No. 591 | No. 592 | No. 593 | No. 594 | No. 595 | No. 596 | No. 597 | No. 598 | No. 599 | No. 600 | No. 601 | No. 602 |
|---|---|---|---|---|---|---|---|---|---|---|---|---|---|---|---|
| mol % | $SiO_2$ | 71.1 | 70.8 | 70.4 | 70.0 | 69.6 | 67.6 | 68.1 | 68.6 | 69.1 | 69.6 | 70.1 | 71.1 | 71.6 | 72.1 |
| | $Al_2O_3$ | 12.9 | 12.8 | 12.7 | 12.7 | 12.6 | 14.4 | 14.2 | 14.0 | 13.8 | 13.5 | 13.3 | 12.9 | 12.7 | 12.4 |
| | $B_2O_3$ | 0.0 | 0.0 | 0.0 | 0.0 | 0.0 | 0.3 | 0.3 | 0.3 | 0.3 | 0.3 | 0.3 | 0.3 | 0.3 | 0.3 |
| | MgO | 4.9 | 4.9 | 4.9 | 4.9 | 4.8 | 6.7 | 6.6 | 6.5 | 6.4 | 6.3 | 6.2 | 6.0 | 5.9 | 5.8 |
| | CaO | 2.5 | 2.5 | 2.4 | 2.4 | 2.4 | 4.2 | 4.1 | 4.1 | 4.0 | 3.9 | 3.9 | 3.7 | 3.7 | 3.6 |
| | SrO | 2.5 | 2.5 | 2.4 | 2.4 | 2.4 | 2.3 | 2.3 | 2.2 | 2.2 | 2.2 | 2.1 | 2.1 | 2.0 | 2.0 |
| | BaO | 6.0 | 6.5 | 7.0 | 7.5 | 8.0 | 4.3 | 4.2 | 4.2 | 4.1 | 4.0 | 4.0 | 3.8 | 3.8 | 3.7 |
| | ZnO | 0.0 | 0.0 | 0.0 | 0.0 | 0.0 | 0.0 | 0.0 | 0.0 | 0.0 | 0.0 | 0.0 | 0.0 | 0.0 | 0.0 |
| | $SnO_2$ | 0.1 | 0.1 | 0.1 | 0.1 | 0.1 | 0.1 | 0.1 | 0.1 | 0.1 | 0.1 | 0.1 | 0.1 | 0.1 | 0.1 |
| | [SiO₂] + [Al₂O₃] | 84.0 | 83.6 | 83.1 | 82.7 | 82.2 | 82.0 | 82.3 | 82.6 | 82.9 | 83.1 | 83.4 | 84.0 | 84.3 | 84.5 |
| | [MgO] + [CaO] + [SrO] + [BaO] | 15.9 | 16.3 | 16.8 | 17.2 | 17.7 | 17.5 | 17.3 | 17.0 | 16.7 | 16.4 | 16.2 | 15.6 | 15.4 | 15.1 |
| | [SrO] + [BaO] | 8.5 | 9.0 | 9.4 | 9.9 | 10.4 | 6.6 | 6.5 | 6.4 | 6.3 | 6.2 | 6.1 | 5.9 | 5.8 | 5.7 |
| | [B₂O₃]/([SrO] + [BaO]) | 0.0 | 0.0 | 0.0 | 0.0 | 0.0 | 0.1 | 0.1 | 0.1 | 0.1 | 0.1 | 0.1 | 0.1 | 0.1 | 0.1 |
| | [Al₂O₃] + [B₂O₃] − [CaO] − [SrO] − [BaO] | 1.9 | 1.4 | 0.8 | 0.3 | −0.3 | 4.0 | 3.9 | 3.8 | 3.8 | 3.7 | 3.7 | 3.5 | 3.5 | 3.4 |
| | [SiO₂] + 14[Al₂O₃] − 15[B₂O₃] + 6[MgO] + [CaO] + 14[SrO] + 16[BaO] | 414.0 | 420.3 | 426.6 | 432.9 | 439.2 | 410.6 | 405.7 | 400.9 | 396.1 | 391.3 | 386.5 | 376.9 | 372.1 | 367.3 |
| | 17.8[SiO₂] + 23.1[Al₂O₃] + 3.7[B₂O₃] + 12.9[MgO] + 14.1[CaO] + 15.5[SrO] + 15.0[BaO] + 7.2[ZnO] | 1,790.5 | 1,789.0 | 1,787.4 | 1,785.8 | 1,784.3 | 1,784.3 | 1,784.2 | 1,784.1 | 1,784.0 | 1,783.9 | 1,783.8 | 1,783.6 | 1,783.5 | 1,783.4 |
| Thermal expansion coefficient (10⁻⁷/° C.) | | 40.6 | 41.7 | 42.7 | 43.8 | 44.9 | 41.0 | 40.5 | 40.1 | 39.7 | 39.2 | 38.8 | 37.9 | 37.5 | 37.1 |
| Density (g/cm³) | | 2.710 | 2.729 | 2.748 | 2.766 | 2.785 | 2.689 | 2.681 | 2.674 | 2.666 | 2.659 | 2.652 | 2.637 | 2.629 | 2.622 |
| Strain point (° C.) | | 764 | 761 | 757 | 754 | 751 | 757 | 757 | 758 | 758 | 759 | 759 | 760 | 760 | 761 |
| Annealing point (° C.) | | 824 | 821 | 817 | 813 | 808 | 811 | 812 | 813 | 814 | 815 | 817 | 819 | 820 | 821 |
| Softening point (° C.) | | 1,067 | 1,063 | 1,059 | 1,054 | 1,050 | 1,041 | 1,043 | 1,045 | 1,047 | 1,049 | 1,052 | 1,056 | 1,059 | 1,061 |
| 10⁴·⁵ dPa · s (° C.) | | 1,399 | 1,395 | 1,390 | 1,386 | 1,381 | 1,338 | 1,344 | 1,350 | 1,356 | 1,363 | 1,369 | 1,381 | 1,387 | 1,393 |
| 10⁴·⁰ dPa · s (° C.) | | 1,564 | 1,558 | 1,552 | 1,545 | 1,538 | 1,494 | 1,500 | 1,507 | 1,514 | 1,522 | 1,529 | 1,544 | 1,552 | 1,560 |
| 10³·⁰ dPa · s (° C.) | | 1,670 | 1,665 | 1,660 | 1,655 | 1,649 | 1,585 | 1,594 | 1,603 | 1,612 | 1,622 | 1,631 | 1,649 | 1,657 | 1,666 |
| 10²·⁵ dPa · s (° C.) | | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured |
| Young's modulus (GPa) | | 82.0 | 81.7 | 81.5 | 81.2 | 80.9 | 85.3 | 85.1 | 84.8 | 84.6 | 84.4 | 84.1 | 83.7 | 83.5 | 83.2 |
| Specific Young's modulus (GPa/g · cm⁻³) | | 30.3 | 30.0 | 29.6 | 29.3 | 29.0 | 31.7 | 31.7 | 31.7 | 31.7 | 31.7 | 31.7 | 31.7 | 31.7 | 31.7 |
| β-OH (mm⁻¹) | | 0.10 | 0.10 | 0.03 | 0.07 | 0.09 | 0.04 | 0.15 | 0.09 | 0.14 | 0.12 | 0.06 | 0.10 | 0.06 | 0.13 |

TABLE 44

| | | No. 603 | No. 604 | No. 605 | No. 606 | No. 607 | No. 608 | No. 609 | No. 610 | No. 611 | No. 612 | No. 613 | No. 614 | No. 615 | No. 616 |
|---|---|---|---|---|---|---|---|---|---|---|---|---|---|---|---|
| mol % | $SiO_2$ | 72.6 | 73.1 | 73.6 | 73.0 | 72.6 | 72.2 | 71.8 | 71.4 | 71.0 | 70.2 | 69.8 | 69.4 | 69.0 | 68.6 |
| | $Al_2O_3$ | 12.2 | 12.0 | 11.8 | 10.1 | 10.6 | 11.1 | 11.6 | 12.1 | 12.6 | 13.6 | 14.1 | 14.6 | 15.1 | 15.6 |
| | $B_2O_3$ | 0.3 | 0.3 | 0.3 | 0.3 | 0.3 | 0.3 | 0.3 | 0.3 | 0.3 | 0.3 | 0.3 | 0.3 | 0.3 | 0.3 |
| | MgO | 5.7 | 5.6 | 5.5 | 6.3 | 6.3 | 6.2 | 6.2 | 6.2 | 6.1 | 6.1 | 6.0 | 6.0 | 6.0 | 5.9 |
| | CaO | 3.5 | 3.5 | 3.4 | 3.9 | 3.9 | 3.9 | 3.9 | 3.8 | 3.8 | 3.8 | 3.8 | 3.7 | 3.7 | 3.7 |
| | SrO | 2.0 | 1.9 | 1.9 | 2.2 | 2.2 | 2.1 | 2.1 | 2.1 | 2.1 | 2.1 | 2.1 | 2.1 | 2.1 | 2.0 |
| | BaO | 3.6 | 3.6 | 3.5 | 4.0 | 4.0 | 4.0 | 4.0 | 3.9 | 3.9 | 3.9 | 3.9 | 3.8 | 3.8 | 3.8 |
| | ZnO | 0.0 | 0.0 | 0.0 | 0.0 | 0.0 | 0.0 | 0.0 | 0.0 | 0.0 | 0.0 | 0.0 | 0.0 | 0.0 | 0.0 |
| | $SnO_2$ | 0.1 | 0.1 | 0.1 | 0.1 | 0.1 | 0.1 | 0.1 | 0.1 | 0.1 | 0.1 | 0.1 | 0.1 | 0.1 | 0.1 |
| | $[SiO_2] + [Al_2O_3]$ | 84.8 | 85.1 | 85.4 | 83.1 | 83.2 | 83.3 | 83.4 | 83.5 | 83.6 | 83.8 | 83.9 | 84.0 | 84.1 | 84.2 |
| | $[MgO] + [CaO] + [SrO] + [BaO]$ | 14.8 | 14.5 | 14.3 | 16.4 | 16.4 | 16.3 | 16.2 | 16.1 | 16.0 | 15.8 | 15.7 | 15.6 | 15.5 | 15.4 |
| | $[SrO] + [BaO]$ | 5.6 | 5.5 | 5.4 | 6.2 | 6.2 | 6.1 | 6.1 | 6.1 | 6.0 | 6.0 | 5.9 | 5.9 | 5.9 | 5.8 |
| | $[B_2O_3]/([SrO] + [BaO])$ | 0.1 | 0.1 | 0.1 | 0.1 | 0.1 | 0.1 | 0.1 | 0.1 | 0.1 | 0.1 | 0.1 | 0.1 | 0.1 | 0.1 |
| | $[Al_2O_3] + [B_2O_3] - [CaO] - [SrO] - [BaO]$ | 3.4 | 3.3 | 3.2 | 0.3 | 0.8 | 1.4 | 1.9 | 2.5 | 3.0 | 4.2 | 4.7 | 5.3 | 5.8 | 6.4 |
| | $[SiO_2] + 14[Al_2O_3] - 15[B_2O_3] + 6[MgO] + [CaO] + 14[SrO] + 16[BaO]$ | 362.5 | 357.7 | 352.8 | 346.6 | 352.4 | 358.3 | 364.1 | 370.0 | 375.8 | 387.6 | 393.4 | 399.3 | 405.1 | 411.0 |
| | $17.8[SiO_2] + 23.1[Al_2O_3] + 3.7[B_2O_3] + 12.9[MgO] + 14.1[CaO] + 15.5[SrO] + 15.0[BaO] + 7.2[ZnO]$ | 1,783.3 | 1,783.3 | 1,783.2 | 1,765.6 | 1,768.6 | 1,771.6 | 1,774.7 | 1,777.7 | 1,780.7 | 1,786.7 | 1,789.8 | 1,792.8 | 1,795.8 | 1,798.8 |
| Thermal expansion coefficient ($10^{-7}/°C$) | | 36.7 | 36.4 | 36.0 | 39.4 | 39.2 | 39.0 | 38.9 | 38.7 | 38.5 | 38.2 | 38.1 | 38.0 | 37.8 | 37.7 |
| Density (g/cm³) | | 2.615 | 2.607 | 2.600 | 2.631 | 2.633 | 2.636 | 2.638 | 2.640 | 2.642 | 2.646 | 2.648 | 2.651 | 2.653 | 2.655 |
| Strain point (°C) | | 761 | 762 | 762 | 745 | 747 | 750 | 752 | 755 | 757 | 761 | 763 | 764 | 766 | 767 |
| Annealing point (°C) | | 822 | 823 | 825 | 802 | 804 | 807 | 810 | 812 | 815 | 820 | 822 | 823 | 824 | 824 |
| Softening point (°C) | | 1,064 | 1,067 | 1,071 | 1,041 | 1,044 | 1,046 | 1,049 | 1,051 | 1,053 | 1,055 | 1,055 | 1,055 | 1,055 | 1,054 |
| $10^{4.5}$ dPa·s (°C) | | 1,399 | 1,405 | 1,410 | 1,381 | 1,381 | 1,381 | 1,380 | 1,379 | 1,377 | 1,373 | 1,370 | 1,367 | 1,364 | 1,361 |
| $10^{4.0}$ dPa·s (°C) | | 1,568 | 1,576 | 1,584 | 1,555 | 1,553 | 1,550 | 1,548 | 1,544 | 1,541 | 1,532 | 1,527 | 1,522 | 1,517 | 1,512 |
| $10^{3.0}$ dPa·s (°C) | | 1,674 | 1,683 | 1,691 | 1,664 | 1,662 | 1,659 | 1,655 | 1,650 | 1,645 | 1,634 | 1,628 | 1,621 | 1,615 | 1,609 |
| $10^{2.5}$ dPa·s (°C) | | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured |
| Young's modulus (GPa) | | 83.0 | 82.8 | 82.5 | 81.6 | 82.0 | 82.4 | 82.8 | 83.1 | 83.5 | 84.3 | 84.7 | 85.1 | 85.5 | 85.8 |
| Specific Young's modulus (GPa·g·cm⁻³) | | 31.7 | 31.7 | 31.7 | 31.0 | 31.1 | 31.3 | 31.4 | 31.5 | 31.6 | 31.9 | 32.0 | 32.1 | 32.2 | 32.3 |
| β-OH (mm⁻¹) | | 0.13 | 0.10 | 0.10 | 0.14 | 0.11 | 0.10 | 0.05 | 0.07 | 0.07 | 0.14 | 0.09 | 0.03 | 0.09 | 0.09 |

TABLE 45

|  |  | No. 617 | No. 618 | No. 619 | No. 620 | No. 621 | No. 622 | No. 623 | No. 624 | No. 625 | No. 626 | No. 627 | No. 628 | No. 629 | No. 630 |
|---|---|---|---|---|---|---|---|---|---|---|---|---|---|---|---|
| mol % | $SiO_2$ | 68.2 | 70.7 | 70.5 | 70.3 | 70.2 | 70.0 | 69.9 | 69.7 | 69.6 | 69.5 | 69.3 | 69.2 | 69.0 | 68.9 |
|  | $Al_2O_3$ | 16.1 | 13.1 | 13.1 | 13.0 | 13.0 | 13.0 | 13.0 | 12.9 | 12.9 | 12.9 | 12.9 | 12.8 | 12.8 | 12.8 |
|  | $B_2O_3$ | 0.3 | 0.1 | 0.5 | 0.7 | 0.9 | 1.1 | 1.3 | 1.5 | 1.7 | 1.9 | 2.1 | 2.3 | 2.5 | 2.7 |
|  | MgO | 5.9 | 6.1 | 6.1 | 6.1 | 6.1 | 6.1 | 6.0 | 6.0 | 6.0 | 6.0 | 6.0 | 6.0 | 6.0 | 6.0 |
|  | CaO | 3.7 | 3.8 | 3.8 | 3.8 | 3.8 | 3.8 | 3.8 | 3.8 | 3.7 | 3.7 | 3.7 | 3.7 | 3.7 | 3.7 |
|  | SrO | 2.0 | 2.1 | 2.1 | 2.1 | 2.1 | 2.1 | 2.1 | 2.1 | 2.1 | 2.1 | 2.1 | 2.1 | 2.1 | 2.1 |
|  | BaO | 3.8 | 3.9 | 3.9 | 3.9 | 3.9 | 3.9 | 3.9 | 3.9 | 3.8 | 3.8 | 3.8 | 3.8 | 3.8 | 3.8 |
|  | ZnO | 0.0 | 0.0 | 0.0 | 0.0 | 0.0 | 0.0 | 0.0 | 0.0 | 0.0 | 0.0 | 0.0 | 0.0 | 0.0 | 0.0 |
|  | $SnO_2$ | 0.1 | 0.1 | 0.1 | 0.1 | 0.1 | 0.1 | 0.1 | 0.1 | 0.1 | 0.1 | 0.1 | 0.1 | 0.1 | 0.1 |
|  | [$SiO_2$] + [$Al_2O_3$] | 84.3 | 83.9 | 83.5 | 83.4 | 83.2 | 83.0 | 82.9 | 82.7 | 82.5 | 82.4 | 82.2 | 82.0 | 81.9 | 81.7 |
|  | [MgO] + [CaO] + [SrO] + [BaO] | 15.4 | 15.9 | 15.9 | 15.8 | 15.8 | 15.8 | 15.7 | 15.7 | 15.7 | 15.6 | 15.6 | 15.6 | 15.5 | 15.5 |
|  | [SrO] + [BaO] | 5.8 | 6.0 | 6.0 | 6.0 | 6.0 | 6.0 | 5.9 | 5.9 | 5.9 | 5.9 | 5.9 | 5.9 | 5.9 | 5.9 |
|  | [$B_2O_3$]/([SrO] + [BaO]) | 0.1 | 0.0 | 0.1 | 0.1 | 0.2 | 0.2 | 0.2 | 0.3 | 0.3 | 0.3 | 0.4 | 0.4 | 0.4 | 0.5 |
|  | [$Al_2O_3$] + [$B_2O_3$] − [CaO] − [SrO] − [BaO] | 6.9 | 3.4 | 3.8 | 4.0 | 4.2 | 4.4 | 4.6 | 4.8 | 5.0 | 5.1 | 5.3 | 5.5 | 5.7 | 5.9 |
|  | [$SiO_2$] + 14[$Al_2O_3$] − 15[$B_2O_3$] + 6[MgO] + [CaO] + 14[SrO] + 16[BaO] | 416.8 | 385.5 | 377.9 | 374.1 | 370.4 | 366.6 | 362.8 | 359.0 | 355.3 | 351.5 | 347.7 | 343.9 | 340.2 | 336.4 |
|  | 17.8[$SiO_2$] + 23.1[$Al_2O_3$] + 3.7[$B_2O_3$] + 12.9[MgO] + 14.1[CaO] + 15.5[SrO] + 15.0[BaO] + 7.2[ZnO] | 1,801.8 | 1,786.6 | 1,780.9 | 1,778.0 | 1,775.2 | 1,772.4 | 1,769.5 | 1,766.7 | 1,763.8 | 1,761.0 | 1,758.2 | 1,755.3 | 1,752.5 | 1,749.6 |
| Thermal expansion coefficient ($10^{-7}$/° C.) | | 37.5 | 38.4 | 38.4 | 38.3 | 38.3 | 38.3 | 38.3 | 38.3 | 38.3 | 38.2 | 38.2 | 38.2 | 38.2 | 38.2 |
| Density (g/cm³) | | 2.657 | 2.646 | 2.642 | 2.640 | 2.637 | 2.635 | 2.633 | 2.631 | 2.629 | 2.626 | 2.624 | 2.622 | 2.620 | 2.617 |
| Strain point (° C.) | | 768 | 763 | 757 | 754 | 751 | 748 | 745 | 743 | 740 | 738 | 735 | 733 | 730 | 728 |
| Annealing point (° C.) | | 824 | 821 | 815 | 812 | 809 | 806 | 803 | 801 | 798 | 795 | 793 | 790 | 788 | 785 |
| Softening point (° C.) | | 1,053 | 1,057 | 1,051 | 1,048 | 1,045 | 1,042 | 1,038 | 1,035 | 1,031 | 1,028 | 1,024 | 1,020 | 1,017 | 1,013 |
| $10^{4.5}$ dPa · s (° C.) | | 1,358 | 1,378 | 1,372 | 1,369 | 1,366 | 1,364 | 1,361 | 1,358 | 1,355 | 1,352 | 1,349 | 1,346 | 1,343 | 1,340 |
| $10^{4.0}$ dPa · s (° C.) | | 1,506 | 1,539 | 1,534 | 1,531 | 1,528 | 1,526 | 1,523 | 1,520 | 1,517 | 1,514 | 1,512 | 1,509 | 1,506 | 1,503 |
| $10^{3.0}$ dPa · s (° C.) | | 1,603 | 1,642 | 1,637 | 1,634 | 1,631 | 1,628 | 1,625 | 1,622 | 1,619 | 1,616 | 1,613 | 1,609 | 1,606 | 1,603 |
| $10^{2.5}$ dPa · s (° C.) | | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured |
| Young's modulus (GPa) | | 86.2 | 84.1 | 83.7 | 83.5 | 83.3 | 83.0 | 82.8 | 82.6 | 82.4 | 82.2 | 81.9 | 81.7 | 81.5 | 81.3 |
| Specific Young's modulus (GPa/g · cm⁻³) | | 32.5 | 31.8 | 31.7 | 31.6 | 31.6 | 31.5 | 31.5 | 31.4 | 31.3 | 31.3 | 31.2 | 31.2 | 31.1 | 31.1 |
| β-OH (mm⁻¹) | | 0.11 | 0.11 | 0.10 | 0.15 | 0.11 | 0.11 | 0.11 | 0.08 | 0.06 | 0.10 | 0.10 | 0.11 | 0.07 | 0.12 |

TABLE 46

| | | No. 631 | No. 632 | No. 633 | No. 634 | No. 635 | No. 636 | No. 637 | No. 638 | No. 639 | No. 640 | No. 641 | No. 642 | No. 643 | No. 644 |
|---|---|---|---|---|---|---|---|---|---|---|---|---|---|---|---|
| mol % | $SiO_2$ | 68.8 | 68.6 | 68.5 | 72.9 | 72.5 | 72.1 | 71.7 | 71.4 | 71.0 | 70.2 | 69.8 | 69.5 | 69.1 | 68.7 |
| | $Al_2O_3$ | 12.8 | 12.7 | 12.7 | 13.5 | 13.4 | 13.4 | 13.3 | 13.2 | 13.2 | 13.0 | 13.0 | 12.9 | 12.8 | 12.8 |
| | $B_2O_3$ | 2.9 | 3.1 | 3.3 | 0.3 | 0.3 | 0.3 | 0.3 | 0.3 | 0.3 | 0.3 | 0.3 | 0.3 | 0.3 | 0.3 |
| | MgO | 5.9 | 5.9 | 5.9 | 3.1 | 3.6 | 4.1 | 4.6 | 5.1 | 5.6 | 6.6 | 7.1 | 7.6 | 8.1 | 8.6 |
| | CaO | 3.7 | 3.7 | 3.7 | 3.9 | 3.9 | 3.9 | 3.9 | 3.8 | 3.8 | 3.8 | 3.8 | 3.7 | 3.7 | 3.7 |
| | SrO | 2.0 | 2.0 | 2.0 | 2.2 | 2.2 | 2.1 | 2.1 | 2.1 | 2.1 | 2.1 | 2.1 | 2.1 | 2.1 | 2.0 |
| | BaO | 3.8 | 3.8 | 3.8 | 4.0 | 4.0 | 4.0 | 4.0 | 3.9 | 3.9 | 3.9 | 3.9 | 3.8 | 3.8 | 3.8 |
| | ZnO | 0.0 | 0.0 | 0.0 | 0.0 | 0.0 | 0.0 | 0.0 | 0.0 | 0.0 | 0.0 | 0.0 | 0.0 | 0.0 | 0.0 |
| | $SnO_2$ | 0.1 | 0.1 | 0.1 | 0.1 | 0.1 | 0.1 | 0.1 | 0.1 | 0.1 | 0.1 | 0.1 | 0.1 | 0.1 | 0.1 |
| | $[SiO_2] + [Al_2O_3]$ | 81.5 | 81.3 | 81.2 | 86.4 | 85.9 | 85.5 | 85.0 | 84.6 | 84.1 | 83.3 | 82.8 | 82.4 | 81.9 | 81.5 |
| | $[MgO] + [CaO] + [SrO] + [BaO]$ | 15.5 | 15.5 | 15.4 | 13.2 | 13.7 | 14.1 | 14.6 | 15.0 | 15.5 | 16.3 | 16.8 | 17.2 | 17.7 | 18.1 |
| | $[SrO] + [BaO]$ | 5.8 | 5.8 | 5.8 | 6.2 | 6.2 | 6.1 | 6.1 | 6.1 | 6.0 | 6.0 | 5.9 | 5.9 | 5.9 | 5.8 |
| | $[B_2O_3]/([SrO] + [BaO])$ | 0.5 | 0.5 | 0.6 | 0.1 | 0.1 | 0.1 | 0.1 | 0.1 | 0.1 | 0.1 | 0.1 | 0.1 | 0.1 | 0.1 |
| | $[Al_2O_3] + [B_2O_3] - [CaO] - [SrO] - [BaO]$ | 6.1 | 6.3 | 6.5 | 3.7 | 3.7 | 3.7 | 3.7 | 3.6 | 3.6 | 3.6 | 3.6 | 3.5 | 3.5 | 3.5 |
| | $[SiO_2] + 14[Al_2O_3] - 15[B_2O_3] + 6[MgO] + [CaO] + 14[SrO] + 16[BaO]$ | 332.6 | 328.8 | 325.1 | 374.7 | 375.9 | 377.1 | 378.2 | 379.4 | 380.5 | 382.9 | 394.0 | 385.2 | 386.3 | 387.5 |
| | $17.8[SiO_2] + 23.1[Al_2O_3] + 3.7[B_2O_3] + 12.9[MgO] + 14.1[CaO] + 15.5[SrO] + 15.0[BaO] + 7.2[ZnO]$ | 1,746.8 | 1,744.0 | 1,741.1 | 1,799.6 | 1,796.9 | 1,794.3 | 1,791.6 | 1,789.0 | 1,786.4 | 1,781.1 | 1,778.4 | 1,775.8 | 1,773.2 | 1,770.5 |
| Thermal expansion coefficient ($10^{-7}$/° C.) | | 38.2 | 38.1 | 38.1 | 36.3 | 36.6 | 37.0 | 37.3 | 37.7 | 38.0 | 38.7 | 39.1 | 39.4 | 39.8 | 40.2 |
| Density (g/cm³) | | 2.615 | 2.613 | 2.611 | 2.624 | 2.627 | 2.630 | 2.634 | 2.637 | 2.641 | 2.648 | 2.651 | 2.654 | 2.658 | 2.661 |
| Strain point (° C.) | | 725 | 723 | 721 | 778 | 773 | 769 | 766 | 763 | 761 | 758 | 756 | 755 | 753 | 751 |
| Annealing point (° C.) | | 783 | 780 | 778 | 842 | 837 | 832 | 828 | 824 | 821 | 815 | 812 | 810 | 808 | 806 |
| Softening point (° C.) | | 1,009 | 1,006 | 1,002 | 1,094 | 1,084 | 1,075 | 1,068 | 1,063 | 1,058 | 1,049 | 1,045 | 1,039 | 1,034 | 1,027 |
| $10^{4.5}$ dPa · s (° C.) | | 1,337 | 1,334 | 1,331 | 1,425 | 1,417 | 1,409 | 1,400 | 1,392 | 1,383 | 1,366 | 1,358 | 1,349 | 1,341 | 1,332 |
| $10^{4.0}$ dPa · s (° C.) | | 1,500 | 1,498 | 1,495 | 1,593 | 1,583 | 1,573 | 1,564 | 1,555 | 1,546 | 1,528 | 1,519 | 1,510 | 1,501 | 1,492 |
| $10^{3.0}$ dPa · s (° C.) | | 1,600 | 1,597 | 1,594 | 1,698 | 1,688 | 1,679 | 1,669 | 1,660 | 1,650 | 1,629 | 1,619 | 1,609 | 1,598 | 1,587 |
| $10^{2.5}$ dPa · s (° C.) | | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured |
| Young's modulus (GPa) | | 81.1 | 80.8 | 80.6 | 82.2 | 82.5 | 82.7 | 83.0 | 83.3 | 83.6 | 84.2 | 84.5 | 84.8 | 85.1 | 85.4 |
| Specific Young's modulus (GPa/g · cm⁻³) | | 31.0 | 30.9 | 30.9 | 31.3 | 31.4 | 31.5 | 31.5 | 31.6 | 31.7 | 31.8 | 31.9 | 31.9 | 32.0 | 32.1 |
| β-OH (mm⁻¹) | | 0.14 | 0.11 | 0.08 | 0.10 | 0.15 | 0.11 | 0.09 | 0.06 | 0.06 | 0.09 | 0.03 | 0.07 | 0.09 | 0.14 |

TABLE 47

| | | No. 645 | No. 646 | No. 647 | No. 648 | No. 649 | No. 650 | No. 651 | No. 652 | No. 653 | No. 654 | No. 655 | No. 656 | No. 657 | No. 658 |
|---|---|---|---|---|---|---|---|---|---|---|---|---|---|---|---|
| mol % | $SiO_2$ | 68.3 | 72.8 | 72.4 | 72.1 | 71.7 | 71.3 | 71.0 | 70.2 | 69.9 | 69.5 | 69.1 | 68.8 | 68.4 | 72.0 |
| | $Al_2O_3$ | 12.7 | 13.5 | 13.4 | 13.4 | 13.3 | 13.2 | 13.2 | 13.0 | 13.0 | 12.9 | 12.8 | 12.8 | 12.7 | 13.4 |
| | $B_2O_3$ | 0.3 | 0.3 | 0.3 | 0.3 | 0.3 | 0.3 | 0.3 | 0.3 | 0.3 | 0.3 | 0.3 | 0.3 | 0.3 | 0.3 |
| | MgO | 9.1 | 6.3 | 6.3 | 6.2 | 6.2 | 6.2 | 6.1 | 6.1 | 6.0 | 6.0 | 6.0 | 5.9 | 5.9 | 6.2 |
| | CaO | 3.7 | 0.8 | 1.3 | 1.8 | 2.3 | 2.8 | 3.3 | 4.3 | 4.8 | 5.3 | 5.8 | 6.3 | 6.8 | 3.9 |
| | SrO | 2.0 | 2.2 | 2.2 | 2.1 | 2.1 | 2.1 | 2.1 | 2.1 | 2.1 | 2.1 | 2.1 | 2.0 | 2.0 | 3.9 |
| | BaO | 3.8 | 4.0 | 4.0 | 4.0 | 4.0 | 3.9 | 3.9 | 3.9 | 3.9 | 3.8 | 3.8 | 3.8 | 3.8 | 4.0 |
| | ZnO | 0.0 | 0.0 | 0.0 | 0.0 | 0.0 | 0.0 | 0.0 | 0.0 | 0.0 | 0.0 | 0.0 | 0.0 | 0.0 | 0.0 |
| | $SnO_2$ | 0.1 | 0.1 | 0.1 | 0.1 | 0.1 | 0.1 | 0.1 | 0.1 | 0.1 | 0.1 | 0.1 | 0.1 | 0.1 | 0.1 |
| | $[SiO_2] + [Al_2O_3]$ | 81.0 | 86.3 | 85.9 | 85.4 | 85.0 | 84.6 | 84.1 | 83.3 | 82.8 | 82.4 | 82.0 | 81.5 | 81.1 | 85.4 |
| | $[MgO] + [CaO] + [SrO] + [BaO]$ | 18.6 | 13.3 | 13.7 | 14.2 | 14.6 | 15.0 | 15.5 | 16.3 | 16.8 | 17.2 | 17.6 | 18.1 | 18.5 | 14.2 |
| | $[SrO] + [BaO]$ | 5.8 | 6.2 | 6.2 | 6.1 | 6.1 | 6.1 | 6.0 | 6.0 | 5.9 | 5.9 | 5.9 | 5.8 | 5.8 | 4.1 |
| | $[B_2O_3]/([SrO] + [BaO])$ | 0.1 | 0.1 | 0.1 | 0.1 | 0.1 | 0.1 | 0.1 | 0.1 | 0.1 | 0.1 | 0.1 | 0.1 | 0.1 | 0.1 |
| | $[Al_2O_3] + [B_2O_3] - [CaO] - [SrO] - [BaO]$ | 3.5 | 6.8 | 6.3 | 5.8 | 5.2 | 4.7 | 4.1 | 3.1 | 2.5 | 2.0 | 1.4 | 0.9 | 0.4 | 5.7 |
| | $[SiO_2] + 14[Al_2O_3] - 15[B_2O_3] + 6[MgO] + [CaO] + 14[SrO] + 16[BaO]$ | 388.7 | 390.5 | 389.0 | 387.6 | 386.1 | 384.6 | 383.2 | 380.2 | 378.8 | 377.3 | 375.8 | 374.4 | 372.9 | 360.9 |
| | $17.8[SiO_2] + 23.1[Al_2O_3] + 3.7[B_2O_3] + 12.9[MgO] + 14.1[CaO] + 15.5[SrO] + 15.0[BaO] + 7.2[ZnO]$ | 1,767.9 | 1,795.4 | 1,793.5 | 1,791.5 | 1,789.6 | 1,787.6 | 1,785.7 | 1,781.8 | 1,779.8 | 1,777.9 | 1,775.9 | 1,774.0 | 1,772.0 | 1,788.5 |
| Thermal expansion coefficient ($10^{-7}/°C$) | | 40.5 | 34.1 | 34.8 | 35.4 | 36.2 | 36.9 | 37.6 | 39.1 | 39.9 | 40.7 | 41.4 | 42.2 | 42.9 | 34.8 |
| Density (g/cm³) | | 2.665 | 2.617 | 2.621 | 2.626 | 2.630 | 2.635 | 2.640 | 2.649 | 2.653 | 2.658 | 2.662 | 2.667 | 2.672 | 2.599 |
| Strain point (°C) | | 749 | 773 | 771 | 769 | 767 | 764 | 762 | 757 | 754 | 751 | 748 | 745 | 742 | 766 |
| Annealing point (°C) | | 804 | 838 | 834 | 831 | 828 | 825 | 821 | 814 | 811 | 807 | 803 | 799 | 796 | 827 |
| Softening point (°C) | | 1,021 | 1,083 | 1,077 | 1,071 | 1,066 | 1,062 | 1,058 | 1,049 | 1,045 | 1,040 | 1,034 | 1,029 | 1,023 | 1,064 |
| $10^{4.5}$ dPa·s (°C) | | 1,323 | 1,416 | 1,409 | 1,403 | 1,396 | 1,389 | 1,382 | 1,368 | 1,360 | 1,353 | 1,345 | 1,338 | 1,330 | 1,395 |
| $10^{4.0}$ dPa·s (°C) | | 1,483 | 1,582 | 1,574 | 1,566 | 1,559 | 1,551 | 1,544 | 1,529 | 1,521 | 1,513 | 1,504 | 1,496 | 1,487 | 1,556 |
| $10^{3.0}$ dPa·s (°C) | | 1,577 | 1,685 | 1,678 | 1,671 | 1,664 | 1,656 | 1,648 | 1,631 | 1,622 | 1,613 | 1,604 | 1,596 | 1,587 | 1,661 |
| $10^{2.5}$ dPa·s (°C) | | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured |
| Young's modulus (GPa) | | 85.7 | 83.6 | 83.7 | 83.7 | 83.8 | 83.8 | 83.9 | 84.0 | 84.0 | 84.1 | 84.1 | 84.1 | 84.2 | 84.4 |
| Specific Young's modulus (GPa·g·cm⁻³) | | 32.1 | 32.0 | 31.9 | 31.9 | 31.8 | 31.8 | 31.8 | 31.7 | 31.7 | 31.6 | 31.6 | 31.5 | 31.5 | 32.5 |
| β-OH (mm⁻¹) | | 0.06 | 0.08 | 0.04 | 0.13 | 0.11 | 0.04 | 0.09 | 0.07 | 0.10 | 0.14 | 0.04 | 0.05 | 0.13 | 0.12 |

TABLE 48

| | | No. 659 | No. 660 | No. 661 | No. 662 | No. 663 | No. 664 | No. 665 | No. 666 | No. 667 | No. 668 | No. 669 | No. 670 | No. 671 | No. 672 |
|---|---|---|---|---|---|---|---|---|---|---|---|---|---|---|---|
| mol % | SiO$_2$ | 71.7 | 71.3 | 71.0 | 70.2 | 69.9 | 69.5 | 69.2 | 68.8 | 68.4 | 72.8 | 72.4 | 72.1 | 71.7 | 71.3 |
| | Al$_2$O$_3$ | 13.3 | 13.2 | 13.2 | 13.0 | 13.0 | 12.9 | 12.8 | 12.8 | 12.7 | 13.5 | 13.4 | 13.4 | 13.3 | 13.2 |
| | B$_2$O$_3$ | 0.3 | 0.3 | 0.3 | 0.3 | 0.3 | 0.3 | 0.3 | 0.3 | 0.3 | 0.3 | 0.3 | 0.3 | 0.3 | 0.3 |
| | MgO | 6.2 | 6.2 | 6.1 | 6.1 | 6.0 | 6.0 | 6.0 | 5.9 | 5.9 | 6.3 | 6.3 | 6.2 | 6.2 | 6.2 |
| | CaO | 3.9 | 3.8 | 3.8 | 3.8 | 3.8 | 3.7 | 3.7 | 3.7 | 3.7 | 3.9 | 3.9 | 3.9 | 3.9 | 3.8 |
| | SrO | 0.6 | 1.1 | 1.6 | 2.6 | 3.1 | 3.6 | 4.1 | 4.6 | 5.1 | 2.2 | 2.2 | 2.1 | 2.1 | 2.1 |
| | BaO | 4.0 | 3.9 | 3.9 | 3.9 | 3.9 | 3.8 | 3.8 | 3.8 | 3.8 | 0.9 | 1.4 | 1.9 | 2.4 | 2.9 |
| | ZnO | 0.0 | 0.0 | 0.0 | 0.0 | 0.0 | 0.0 | 0.0 | 0.0 | 0.0 | 0.0 | 0.0 | 0.0 | 0.0 | 0.0 |
| | SnO$_2$ | 0.1 | 0.1 | 0.1 | 0.1 | 0.1 | 0.1 | 0.1 | 0.1 | 0.1 | 0.1 | 0.1 | 0.1 | 0.1 | 0.1 |
| | [SiO$_2$] + [Al$_2$O$_3$] | 85.0 | 84.6 | 84.1 | 83.3 | 82.8 | 82.4 | 82.0 | 81.6 | 81.1 | 86.3 | 85.9 | 85.4 | 85.0 | 84.6 |
| | [MgO] + [CaO] + [SrO] + [BaO] | 14.6 | 15.0 | 15.5 | 16.3 | 16.8 | 17.2 | 17.6 | 18.0 | 18.5 | 13.3 | 13.7 | 14.2 | 14.6 | 15.0 |
| | [SrO] + [BaO] | 4.6 | 5.0 | 5.5 | 6.5 | 7.0 | 7.4 | 7.9 | 8.4 | 8.9 | 3.1 | 3.6 | 4.0 | 4.5 | 5.0 |
| | [B$_2$O$_3$]/([SrO] + [BaO]) | 0.1 | 0.1 | 0.1 | 0.0 | 0.0 | 0.0 | 0.0 | 0.0 | 0.0 | 0.1 | 0.1 | 0.1 | 0.1 | 0.1 |
| | [Al$_2$O$_3$] + [B$_2$O$_3$] − [CaO] − [SrO] − [BaO] | 5.2 | 4.7 | 4.1 | 3.1 | 2.5 | 2.0 | 1.5 | 1.0 | 0.4 | 6.8 | 6.3 | 5.8 | 5.2 | 4.7 |
| | [SiO$_2$] + 14[Al$_2$O$_3$] − 15[B$_2$O$_3$] + 6[MgO] + [CaO] + 14[SrO] + 16[BaO] | 366.1 | 371.3 | 376.5 | 386.9 | 392.1 | 397.3 | 402.5 | 407.7 | 412.9 | 343.7 | 350.0 | 356.4 | 362.7 | 369.0 |
| | 17.8[SiO$_2$] + 23.1[Al$_2$O$_3$] + 3.7[B$_2$O$_3$] + 12.9[MgO] + 14.1[CaO] + 15.5[SrO] + 15.0[BaO] + 7.2[ZnO] | 1,787.3 | 1,786.1 | 1,784.9 | 1,782.5 | 1,781.3 | 1,780.1 | 1,778.9 | 1,777.7 | 1,776.5 | 1,792.6 | 1,791.1 | 1,789.7 | 1,788.2 | 1,786.7 |
| Thermal expansion coefficient (10$^{-7}$/° C.) | | 35.7 | 36.6 | 37.5 | 39.3 | 40.2 | 41.2 | 42.1 | 43.0 | 43.9 | 32.5 | 33.4 | 34.3 | 35.3 | 36.3 |
| Density (g/cm$^3$) | | 2.610 | 2.622 | 2.633 | 2.655 | 2.667 | 2.678 | 2.689 | 2.701 | 2.712 | 2.531 | 2.550 | 2.569 | 2.588 | 2.606 |
| Strain point (° C.) | | 765 | 763 | 762 | 757 | 755 | 753 | 750 | 748 | 745 | 769 | 768 | 766 | 765 | 763 |
| Annealing point (° C.) | | 825 | 823 | 820 | 815 | 811 | 808 | 805 | 801 | 797 | 830 | 829 | 827 | 825 | 823 |
| Softening point (° C.) | | 1,062 | 1,059 | 1,057 | 1,051 | 1,047 | 1,043 | 1,038 | 1,033 | 1,029 | 1,067 | 1,065 | 1,063 | 1,061 | 1,059 |
| 10$^{4.5}$ dPa · s (° C.) | | 1,390 | 1,385 | 1,380 | 1,370 | 1,365 | 1,359 | 1,354 | 1,349 | 1,343 | 1,395 | 1,392 | 1,389 | 1,386 | 1,382 |
| 10$^{4.0}$ dPa · s (° C.) | | 1,551 | 1,547 | 1,542 | 1,531 | 1,525 | 1,519 | 1,513 | 1,506 | 1,499 | 1,558 | 1,554 | 1,550 | 1,547 | 1,544 |
| 10$^{3.0}$ dPa · s (° C.) | | 1,656 | 1,651 | 1,645 | 1,634 | 1,628 | 1,621 | 1,615 | 1,608 | 1,602 | 1,660 | 1,657 | 1,654 | 1,651 | 1,648 |
| 10$^{2.5}$ dPa · s (° C.) | | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured | Unmeasured |
| Young's modulus (GPa) | | 84.3 | 84.2 | 84.0 | 83.8 | 83.7 | 83.5 | 83.4 | 83.3 | 83.2 | 85.6 | 85.3 | 85.0 | 84.8 | 84.5 |
| Specific Young's modulus (GPa/g · cm$^{-3}$) | | 32.3 | 32.1 | 31.9 | 31.6 | 31.4 | 31.2 | 31.0 | 30.8 | 30.7 | 33.8 | 33.5 | 33.1 | 32.8 | 32.4 |
| β-OH (mm$^{-1}$) | | 0.08 | 0.07 | 0.13 | 0.08 | 0.05 | 0.12 | 0.15 | 0.08 | 0.08 | 0.04 | 0.13 | 0.13 | 0.06 | 0.14 |

TABLE 49

|  |  | No. 673 | No. 674 | No. 675 | No. 676 | No. 677 | No. 678 | No. 679 |
|---|---|---|---|---|---|---|---|---|
| mol % | SiO$_2$ | 71.0 | 70.2 | 69.9 | 69.5 | 69.1 | 68.8 | 68.4 |
|  | Al$_2$O$_3$ | 13.2 | 13.0 | 13.0 | 12.9 | 12.8 | 12.8 | 12.7 |
|  | B$_2$O$_3$ | 0.3 | 0.3 | 0.3 | 0.3 | 0.3 | 0.3 | 0.3 |
|  | MgO | 6.1 | 6.1 | 6.0 | 6.0 | 6.0 | 5.9 | 5.9 |
|  | CaO | 3.8 | 3.8 | 3.8 | 3.7 | 3.7 | 3.7 | 3.7 |
|  | SrO | 2.1 | 2.1 | 2.1 | 2.1 | 2.1 | 2.0 | 2.0 |
|  | BaO | 3.4 | 4.4 | 4.9 | 5.4 | 5.9 | 6.4 | 6.9 |
|  | ZnO | 0.0 | 0.0 | 0.0 | 0.0 | 0.0 | 0.0 | 0.0 |
|  | SnO$_2$ | 0.1 | 0.1 | 0.1 | 0.1 | 0.1 | 0.1 | 0.1 |
|  | [SiO$_2$] + [Al$_2$O$_3$] | 84.1 | 83.3 | 82.8 | 82.4 | 82.0 | 81.5 | 81.1 |
|  | [MgO] + [CaO] + [SrO] + [BaO] | 15.5 | 16.3 | 16.8 | 17.2 | 17.7 | 18.1 | 18.5 |
|  | [SrO] + [BaO] | 5.5 | 6.5 | 7.0 | 7.5 | 8.0 | 8.4 | 8.9 |
|  | [B$_2$O$_3$]/([SrO] + [BaO]) | 0.1 | 0.0 | 0.0 | 0.0 | 0.0 | 0.0 | 0.0 |
|  | [Al$_2$O$_3$] + [B$_2$O$_3$] − [CaO] − [SrO] − [BaO] | 4.1 | 3.1 | 2.5 | 2.0 | 1.4 | 0.9 | 0.4 |
|  | [SiO$_2$] + 14[Al$_2$O$_3$] − 15[B$_2$O$_3$] + 6[MgO] + [CaO] + 14[SrO] + 16[BaO] | 375.4 | 368.0 | 394.4 | 400.7 | 407.0 | 413.4 | 419.7 |
|  | 17.8[SiO$_2$] + 23.1[Al$_2$O$_3$] + 3.7[B$_2$O$_3$] + 12.9[MgO] + 14.1[CaO] + 15.5[SrO] + 15.0[BaO] + 7.2[ZnO] | 1,785.2 | 1,782.2 | 1,780.7 | 1,779.3 | 1,777.8 | 1,776.3 | 1,774.8 |
| Thermal expansion coefficient (10$^{-7}$/° C.) | | 37.3 | 39.4 | 40.5 | 41.6 | 42.6 | 43.7 | 44.7 |
| Density (g/cm$^3$) | | 2.625 | 2.663 | 2.682 | 2.701 | 2.720 | 2.739 | 2.757 |
| Strain point (° C.) | | 762 | 757 | 755 | 753 | 750 | 748 | 746 |
| Annealing point (° C.) | | 821 | 815 | 811 | 808 | 804 | 801 | 797 |
| Softening point (° C.) | | 1,056 | 1,051 | 1,048 | 1,044 | 1,039 | 1,035 | 1,031 |
| 10$^{4.5}$ dPa·s (° C.) | | 1,379 | 1,371 | 1,367 | 1,363 | 1,359 | 1,355 | 1,351 |
| 10$^{4.0}$ dPa·s (° C.) | | 1,540 | 1,532 | 1,528 | 1,523 | 1,517 | 1,511 | 1,505 |
| 10$^{3.0}$ dPa·s (° C.) | | 1,644 | 1,635 | 1,631 | 1,626 | 1,621 | 1,616 | 1,611 |
| 10$^{2.5}$ dPa·s (° C.) | | Unmeasured | Unmeasured | Unmeasured | Unmeasured | Unmeasured | Unmeasured | Unmeasured |
| Young's modulus (GPa) | | 84.2 | 83.6 | 83.3 | 83.1 | 82.8 | 82.5 | 82.2 |
| Specific Young's modulus (GPa/g · cm$^{-3}$) | | 32.1 | 31.4 | 31.1 | 30.8 | 30.4 | 30.1 | 29.8 |
| β-OH (mm$^{-1}$) | | 0.08 | 0.08 | 0.05 | 0.13 | 0.09 | 0.15 | 0.12 |

First, a glass batch prepared by blending glass raw materials so as to achieve the glass composition shown in each Table was loaded in a platinum crucible, and then melted at from 1,600° C. to 1,650° C. for 24 hours. In melting the glass batch, molten glass was stirred to be homogenized by using a platinum stirrer. Next, the molten glass was poured on a carbon sheet and formed into a sheet shape, followed by being annealed at a temperature around an annealing point for 30 minutes. Each of the resultant samples was evaluated for its thermal expansion coefficient, density, strain point, annealing point, softening point, temperature at a viscosity at high temperature of 10$^{4.5}$ dPa·s, temperature at a viscosity at high temperature of 10$^{4.0}$ dPa·s, temperature at a viscosity at high temperature of 10$^{3.0}$ dPa·s, temperature at a viscosity at high temperature of 10$^{2.5}$ dPa·s, Young's modulus, specific Young's modulus, and β-OH.

The thermal expansion coefficient is a value obtained by measuring an average thermal expansion coefficient within a temperature range of from 30° C. to 380° C. with a dilatometer.

The density is a value measured by a well-known Archimedes method.

The strain point, the annealing point, and the softening point are values measured in accordance with methods specified in ASTM C336 and C338.

The temperatures at viscosities at high temperature of 10$^{4.5}$ dPa·s, 10$^{4.0}$ dPa·s, 10$^{3.0}$ dPa·s, and 10$^{2.5}$ dPa·s are values measured by a platinum sphere pull up method.

The Young's modulus is a value measured by a flexural resonance method.

The specific Young's modulus is a value obtained by dividing the Young's modulus by the density.

The β-OH is a value measured by the above-mentioned method.

As apparent from Tables 1 to 49, each of Sample Nos. 1 to 679 has a high strain point, and is free of Y$_2$O$_3$ and La$_2$O$_3$ in the glass composition, and is hence considered to enable a reduction in manufacturing cost.

Example 2

Data on a relationship between β-OH and a thermal shrinkage rate are shown in Table 50. Sample A and Sample B each have the glass composition according to Sample No. 1, but have different β-OH values. Sample A and Sample B were each measured for its thermal shrinkage rate when held at 500° C. for 1 hour and its thermal shrinkage rate when held at 600° C. for 1 hour.

TABLE 50

| Glass composition | A Sample No. 1 | B Sample No. 1 |
|---|---|---|
| β-OH | 0.13 mm$^{-1}$ | 0.36 mm$^{-1}$ |
| Thermal shrinkage rate at 500° C.-1 hr. | 8 ppm | 10 ppm |
| Thermal shrinkage rate at 500° C.-2 hr. | 31 ppm | 39 ppm |

The thermal shrinkage rate may be measured as described below. First, linear markings are engraved in parallel in two portions on the glass sheet. Then, the glass sheet is divided in a direction perpendicular to the markings to obtain two glass pieces. Next, one of the glass pieces is increased in temperature from normal temperature to 500° C. or 600° C. at a temperature increase rate of 5° C./min, held at 500° C. or 600° C. for 1 hour, and cooled to normal temperature at a temperature decrease rate of 5° C./min. Subsequently, the glass piece subjected to the heat treatment and the glass piece not subjected to the heat treatment are arranged so that divided surfaces are aligned with each other and fixed with an adhesive tape. After that, a deviation amount ΔL between the markings is measured. Finally, a value of ΔL/L$_0$ is measured as a thermal shrinkage rate. The "L$_0$" refers to the length of the glass piece before the heat treatment.

From Table 50, it is revealed that, even with the same glass composition, the thermal shrinkage rate can be reduced more at lower β-OH.

Example 3

Glasses having the glass compositions of the above-mentioned Sample Nos. 1, 15, and 115 were each melted using an existing facility under the conventional temperature conditions, and formed into a glass sheet by an overflow down-draw method, followed by being measured for the contents of trace components by X-ray fluorescence analysis. The results are shown in Table 51.

TABLE 51

| (wt:ppm) | No. 1 | No. 15 | No. 115 |
|---|---|---|---|
| Rh | 0.8 | 0.5 | 0.6 |
| Pt | 0.1 | 0.1 | 0.1 |
| Ir | 0.1-1 | 0.1-1 | 0.1-1 |
| ZrO$_2$ | 300 | 350 | 320 |
| Sb$_2$O$_3$ | <30 | <30 | <30 |
| Fe$_2$O$_3$ | 100 | 90 | 110 |
| MoO$_3$ | Unmeasured | Unmeasured | Unmeasured |
| TiO$_2$ | 10 | 8 | 12 |
| Na$_2$O | 120 | 90 | 100 |

Example 4

Glasses having the glass compositions of the above-mentioned Sample Nos. 1, 15, and 115 were each melted using an existing facility other than the facility used in [Example 3] at a higher temperature than in the conventional conditions, and formed into a glass sheet by an overflow down-draw method, followed by being measured for the contents of trace components by X-ray fluorescence analysis. The results are shown in Table 52.

TABLE 52

| (wt:ppm) | No. 1 | No. 15 | No. 115 |
|---|---|---|---|
| Rh | 0.6 | 0.4 | 0.9 |
| Pt | Unmeasured | Unmeasured | Unmeasured |
| Ir | Unmeasured | Unmeasured | Unmeasured |
| ZrO$_2$ | 1,200 | 500 | 1,500 |
| Sb$_2$O$_3$ | Unmeasured | Unmeasured | Unmeasured |
| Fe$_2$O$_3$ | 130 | 300 | 100 |
| MoO$_3$ | 10 | 3 | 20 |
| TiO$_2$ | Unmeasured | Unmeasured | Unmeasured |
| Na$_2$O | Unmeasured | Unmeasured | Unmeasured |

The invention claimed is:

1. An alkali-free glass sheet, comprising as a glass composition, in terms of mol %, 55% to 80% of SiO$_2$, 10% to 25% of Al$_2$O$_3$, 0.1% to 4% of B$_2$O$_3$, 0% to 30% of MgO, 0% to 25% of CaO, 0% to 15% of SrO, 0% to 15% of BaO, 0% to 5% of ZnO, and 0% to less than 1.0% of Y$_2$O$_3$+La$_2$O$_3$, being substantially free of an alkali metal oxide, and having a strain point of 750° C. or more,
wherein the alkali-free glass sheet satisfies a relationship of [SiO$_2$]+14×[Al$_2$O$_3$]−15×[B$_2$O$_3$]+6×[MgO]+[CaO]+ 14×[SrO]+16×[BaO]≥380 mol %.

2. The alkali-free glass sheet according to claim 1, wherein the glass composition, in terms of mol %, has 1.1% to 4% of B$_2$O$_3$.

3. The alkali-free glass sheet according to claim 1, wherein the glass composition, in terms of mol %, has 1.5% to 4% of B$_2$O$_3$.

4. The alkali-free glass sheet according to claim 1, wherein the alkali-free glass sheet has a content of Rh of from 0.1 ppm by mass to 3 ppm by mass.

5. The alkali-free glass sheet according to claim 1, wherein the alkali-free glass sheet satisfies a relationship of 17.8×[SiO$_2$]+23.1×[Al$_2$O$_3$]+3.7×[B$_2$O$_3$]+12.9×[MgO]+ 14.1×[CaO]+15.5×[SrO]+15.0×[BaO]+7.2×[ZnO]≥1,786 mol %.

6. The alkali-free glass sheet according to claim 1, wherein the alkali-free glass sheet satisfies a relationship of [SiO$_2$]+14×[Al$_2$O$_3$]−15×[B$_2$O$_3$]+6×[MgO]+[CaO]+14× [SrO]+16×[BaO]≥390 mol %.

7. The alkali-free glass sheet according to claim 6, wherein the alkali-free glass sheet satisfies a relationship of 17.8×[SiO$_2$]+23.1×[Al$_2$O$_3$]+3.7×[B$_2$O$_3$]+12.9×[MgO]+ 14.1×[CaO]+15.5×[SrO]+15.0×[BaO]+7.2×[ZnO]≥1,786 mol %.

8. The alkali-free glass sheet according to claim 1, wherein the alkali-free glass sheet has a Young's modulus of 82 GPa or more.

* * * * *